(12) United States Patent
Hamilton et al.

(10) Patent No.: US 12,435,035 B2
(45) Date of Patent: Oct. 7, 2025

(54) NANOMATERIALS

(71) Applicant: Guide Therapeutics, LLC, Cambridge, MA (US)

(72) Inventors: Gregory Lawrence Hamilton, Atlanta, GA (US); Neeraj Narendra Patwardhan, Atlanta, GA (US); Cory Dane Sago, Atlanta, GA (US); Mina Fawzy Gaballa Shehata, Dunwoody, GA (US); Milloni Balwantkumar Chhabra, Dunwoody, GA (US)

(73) Assignee: Guide Therapeutics, LLC, Cambridge, MA (US)

( * ) Notice: Subject to any disclaimer, the term of this patent is extended or adjusted under 35 U.S.C. 154(b) by 0 days.

(21) Appl. No.: 17/142,595

(22) Filed: Jan. 6, 2021

(65) Prior Publication Data
US 2021/0230112 A1    Jul. 29, 2021

Related U.S. Application Data

(60) Provisional application No. 62/958,876, filed on Jan. 9, 2020.

(51) Int. Cl.
| | | |
|---|---|---|
| C07D 205/04 | (2006.01) | |
| A61K 9/1271 | (2025.01) | |
| A61K 47/10 | (2017.01) | |
| A61K 47/24 | (2006.01) | |
| A61K 47/28 | (2006.01) | |
| C07C 229/30 | (2006.01) | |
| C07D 207/06 | (2006.01) | |
| C07D 207/09 | (2006.01) | |
| C07D 211/14 | (2006.01) | |
| C07D 211/34 | (2006.01) | |
| C07D 265/30 | (2006.01) | |
| C07D 295/145 | (2006.01) | |
| C07D 319/06 | (2006.01) | |
| C07D 401/04 | (2006.01) | |
| C07D 405/12 | (2006.01) | |
| C07D 471/04 | (2006.01) | |
| C07D 487/08 | (2006.01) | |
| A61K 9/51 | (2006.01) | |
| B82Y 5/00 | (2011.01) | |

(Continued)

(52) U.S. Cl.
CPC .......... *C07D 205/04* (2013.01); *A61K 9/1271* (2013.01); *A61K 47/10* (2013.01); *A61K 47/24* (2013.01); *A61K 47/28* (2013.01); *C07C 229/30* (2013.01); *C07D 207/06* (2013.01); *C07D 207/09* (2013.01); *C07D 211/14* (2013.01); *C07D 211/34* (2013.01); *C07D 265/30* (2013.01); *C07D 295/145* (2013.01); *C07D 319/06* (2013.01); *C07D 401/04* (2013.01); *C07D 405/12* (2013.01); *C07D 471/04* (2013.01); *C07D 487/08* (2013.01); *A61K 9/5123* (2013.01); *B82Y 5/00* (2013.01); *B82Y 30/00* (2013.01); *B82Y 40/00* (2013.01); *C07C 219/22* (2013.01); *C07D 207/08* (2013.01); *C07D 207/14* (2013.01); *C07D 207/16* (2013.01); *C07D 211/58* (2013.01); *C07D 211/62* (2013.01); *C07D 213/36* (2013.01); *C07D 241/04* (2013.01); *C07D 243/08* (2013.01); *C07D 295/088* (2013.01); *C07D 295/096* (2013.01); *C07D 295/13* (2013.01); *C07D 295/15* (2013.01); *C07D 451/06* (2013.01); *C07D 455/02* (2013.01)

(58) Field of Classification Search
CPC ................................................... C07D 205/04
See application file for complete search history.

(56) References Cited

U.S. PATENT DOCUMENTS

| | | |
|---|---|---|
| 3,686,238 A | 8/1972 | Zaffaroni |
| 8,058,069 B2 | 11/2011 | Yaworski et al. |

(Continued)

FOREIGN PATENT DOCUMENTS

| | | |
|---|---|---|
| AU | 2020369940 A1 | 5/2022 |
| CN | 108368028 A | 8/2018 |

(Continued)

OTHER PUBLICATIONS

Brown and Foote, Organic Chemistry 1995, Saunders College Publishing: Fort Worth, p. 169.*

(Continued)

Primary Examiner — David K O'Dell
(74) Attorney, Agent, or Firm — Proskauer Rose LLP

(57) ABSTRACT

Lipid nanoparticle compositions for delivery of nucleic acids are described. In various embodiments the lipid nanoparticle contains an ionizable lipid of the Formula (I). Methods of using such lipid nanoparticle compositions to achieve targeted delivery of therapeutic cargo without the need for a targeting ligand are also provided.

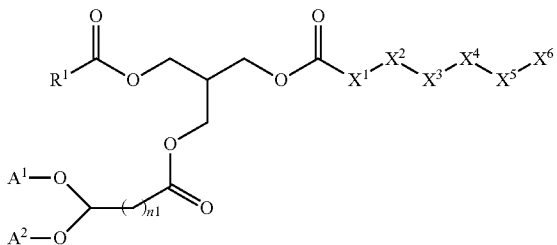

(I)

2 Claims, 34 Drawing Sheets

(51) Int. Cl.
  *B82Y 30/00* (2011.01)
  *B82Y 40/00* (2011.01)
  *C07C 219/22* (2006.01)
  *C07D 207/08* (2006.01)
  *C07D 207/14* (2006.01)
  *C07D 207/16* (2006.01)
  *C07D 211/58* (2006.01)
  *C07D 211/62* (2006.01)
  *C07D 213/36* (2006.01)
  *C07D 241/04* (2006.01)
  *C07D 243/08* (2006.01)
  *C07D 295/088* (2006.01)
  *C07D 295/096* (2006.01)
  *C07D 295/13* (2006.01)
  *C07D 295/15* (2006.01)
  *C07D 451/06* (2006.01)
  *C07D 455/02* (2006.01)

(56) References Cited

U.S. PATENT DOCUMENTS

| | | |
|---|---|---|
| 9,364,435 B2 | 6/2016 | Yaworski et al. |
| 9,840,699 B2 | 12/2017 | Liu et al. |
| 10,113,163 B2 | 10/2018 | Liu et al. |
| 10,124,065 B2 | 11/2018 | Baryza et al. |
| 10,167,457 B2 | 1/2019 | Liu et al. |
| 2003/0083272 A1 | 5/2003 | Wiederholt et al. |
| 2016/0311759 A1 | 10/2016 | Brito et al. |
| 2017/0210698 A1 | 7/2017 | Benenato et al. |
| 2018/0147166 A1 | 5/2018 | Dong et al. |
| 2018/0290965 A1 | 10/2018 | Brito et al. |
| 2019/0002393 A1 | 1/2019 | Beckwith et al. |
| 2019/0076462 A1 | 3/2019 | Dong et al. |
| 2019/0358170 A1 | 11/2019 | Brito et al. |
| 2021/0113365 A1 | 4/2021 | Kim |
| 2021/0130805 A1 | 5/2021 | Gaudelli et al. |
| 2021/0169804 A1 | 6/2021 | Patwardhan et al. |
| 2021/0230112 A1 | 7/2021 | Hamilton et al. |
| 2022/0096381 A1 | 3/2022 | Endo et al. |
| 2022/0249693 A1 | 8/2022 | Sago et al. |
| 2022/0249694 A1 | 8/2022 | Shehata et al. |
| 2022/0273566 A1 | 9/2022 | Dahlman et al. |
| 2023/0348359 A1 | 11/2023 | Shehata et al. |

FOREIGN PATENT DOCUMENTS

| | | |
|---|---|---|
| CN | 110520409 A | 11/2019 |
| EP | 1164125 A1 | 12/2001 |
| EP | 3733211 A1 | 11/2020 |
| EP | 3842538 A1 | 6/2021 |
| EP | 4069675 A1 | 10/2022 |
| GB | 968849 A | 9/1964 |
| JP | 2005181734 A | 7/2005 |
| WO | 0244321 A2 | 6/2002 |
| WO | 03101952 A2 | 12/2003 |
| WO | 2008155141 A2 | 12/2008 |
| WO | 2011153493 A2 | 12/2011 |
| WO | 2013086354 A1 | 6/2013 |
| WO | 2014136086 A1 | 9/2014 |
| WO | 2015095346 A1 | 6/2015 |
| WO | WO 2015/095340 A1 | 6/2015 |
| WO | 2016187531 A1 | 11/2016 |
| WO | 2017173054 A1 | 10/2017 |
| WO | 2018011799 A1 | 1/2018 |
| WO | 2018220553 A1 | 12/2018 |
| WO | 2019008441 A1 | 1/2019 |
| WO | 2019089561 A1 | 5/2019 |
| WO | 2019099501 A1 | 5/2019 |
| WO | 2019126378 A1 | 6/2019 |
| WO | 2020028787 A1 | 2/2020 |
| WO | 2020072605 A1 | 4/2020 |
| WO | 2020118041 A1 | 6/2020 |
| WO | 2020150320 A1 | 7/2020 |
| WO | 2020152037 A1 | 7/2020 |
| WO | 2020176856 A1 | 9/2020 |
| WO | 2020176859 A1 | 9/2020 |
| WO | 2020176868 A1 | 9/2020 |
| WO | WO 2020/219876 A1 | 10/2020 |
| WO | 2020246581 A1 | 12/2020 |
| WO | 2020247382 A1 | 12/2020 |
| WO | 2021021634 A1 | 2/2021 |
| WO | 2021021636 A1 | 2/2021 |
| WO | 2021080847 A1 | 4/2021 |
| WO | 2021113365 A1 | 6/2021 |
| WO | 2021141969 A1 | 7/2021 |
| WO | 2022140238 A1 | 6/2022 |
| WO | 2022140239 A1 | 6/2022 |
| WO | 2022140252 A1 | 6/2022 |
| WO | 2022159421 A1 | 7/2022 |
| WO | 2022159463 A1 | 7/2022 |
| WO | 2022159472 A1 | 7/2022 |
| WO | WO2022/159475 A1 | 7/2022 |
| WO | 2022251665 A1 | 12/2022 |
| WO | 2023056917 A1 | 4/2023 |
| WO | 2023121964 A1 | 6/2023 |
| WO | 2023121965 A1 | 6/2023 |
| WO | 2023121970 A1 | 6/2023 |
| WO | 2023121971 A1 | 6/2023 |
| WO | 2023121975 A1 | 6/2023 |
| WO | 2024019936 A1 | 1/2024 |

OTHER PUBLICATIONS

Funakoshi "Effect of Alkyl Chain Length and Unsaturation of the Phospholipid on the Physicochemical Properties of Lipid Nanoparticles" Chem. Pharm. Bull. 2015, 63, 731-736.*
International Search Report and Written Opinion dated Mar. 3, 2021 for Application No. PCT/US2021/012282.
CAS Registry No. 751440-44-5; STN Entry Date Sep. 24, 2004; 3-octyl-6-[7-oxo-7-[[2-[(1-oxooctadecyl)oxy]-1-[[(oxooctadecyl)oxy]methyl]ethoxy]heptyl]-4-Cyclohexene-1,2-dicarboxylic acid, (1 page).
International Search Report and Written Opinion for PCT/US2020/062893 dated Feb. 19, 2021 (19 pages).
International Search Report for PCT/US22/12951 dated May 23, 2022 (5 pages).
International Search Report for PCT/US2022/012867 dated Jun. 8, 2022 (5 pages).
International Search Report for PCT/US2022/053209 dated Mar. 24, 2023 (5 pages).
International Search Report for PCT/US2022/053193 dated May 3, 2023 (4 pages).
International Search Report and Written Opinion for PCT/US2020/043512 dated Sep. 23, 2020 (16 pages).
"SID 402741750", PubChem, National Center for Biotechnology Information, SID 402741750, Jan. 23, 2020, retrieved Mar. 21, 2022 from URL: https://pubchem.ncbi.nlm.nih.gov/substance/402741750, (5 pages).
"SID 46481541", PubChem, National Center for Biotechnology Information, SID 46481541, Dec. 12, 2007, retrieved May 10, 2022 from URL: https://pubchem.ncbi.nlm.nih.gov/substance/46481541, (5 pages).
"Tris(deoxycholic acid) 1,3,5-benzenetriyltris(methylene) ester", PubChem, National Center for Biotechnology Information, SID 274013917, Dec. 18, 2015, retrieved Mar. 21, 2022 from URL: https://pubchem.ncbi.nlm.nih.gov/substance/274013917, (2 pages).
Adams, David, et al., "Patisiran, an RNAi Therapeutic, for Hereditary Transthyretin Amyloidosis", The New England Journal of Medicine, vol. 379, No. 1, Jul. 5, 2018, pp. 11-21, DOI: 10.1056/NEJMoa1716153 (11 pages).
Augustin, Hellmut G., et al., "Organotypic vasculature: From descriptive heterogeneity to functional pathophysiology", Science, vol. 357, No. 771, Aug. 25, 2017, DOI: 10.1126/science.aal2379 (13 pages).
Belliveau, Nathan M., et al., "Microfluidic Synthesis of Highly Potent Limit-size Lipid Nanoparticles for In Vitro Delivery of

(56) References Cited

OTHER PUBLICATIONS siRNA", Molecular Therapy—Nucleic Acids, vol. 1, No. e37, 2012, DOI: 10.1038/mtna.2012.28 (9 pages).
Chen, Delai, et al., "Rapid Discovery of Potent siRNA-Containing Lipid Nanoparticles Enabled by Controlled Microfluidic Formulation", Journal of the American Chemical Society, vol. 134, No. 16, Apr. 25, 2012, pp. 6948-6951, DOI: 10.1025/ja301621z (4 pages).
Cheng, Zhiliang, et al., "Multifunctional Nanoparticles: Cost versus benefit of adding targeting and imaging capabilities", Science, vol. 338, No. 6109, Nov. 16, 2012, pp. 903-910, DOI: 10.1126/science.1226338 (18 pages).
Cullis, Pieter R., et al., "Lipid Nanoparticle Systems for Enabling Gene Therapies", Molecular Therapy, vol. 25, No. 7, Jul. 5, 2017, pp. 1467-1475, DOI: 10.1016/j.ymthe.2017.03.013 (9 pages).
Dahlman, James E., et al., "In vivo endothelial siRNA delivery using polymeric nanoparticles with low molecular weight", Nature Nanotechnology, vol. 9, No. 8, Aug. 2014, pp. 648-655, DOI: 10.1038/nnano.2014.84 (17 pages).
Dang, Chi V., et al., "Drugging the 'undruggable' cancer targets", Nature Reviews Cancer, vol. 17, No. 8, Aug. 2017, pp. 502-508, DOI: 10.1038/nrc.2017.36, Author Manuscript (16 pages).
Diab, Hadeer M., et al., "ZnO-Nanoparticles-Catalyzed Synthesis of Poly(tetrahydrobenzimidazo[2, 1-b]quinazolin-1(2H)-ones) as Novel Multi-armed Molecules", Synlett, vol. 29, No. 12, 2018, pp. 1627-1633, DOI: 10.1055/s-0037-1609967, (7 pages).
Dixon, Scott J., et al., "Identifying Druggable Disease-Modifying Gene Products", Current Opinion in Chemical Biology, vol. 13, No. 5-6, Dec. 2009, pp. 549-555, DOI: 10.1016/j.cbpa.2009.08.003, Author Manuscript (12 pages).
Elbashir, Sayda M., et al., "Duplexes of 21-nucleotide RNAs mediate RNA interference in cultured mammalian cells", Nature, vol. 411, May 24, 2001, pp. 494-498 (5 pages).
Gelsema, W. J., et al., "Benzoolysis of diacylglycerophosphocholines: dephosphorylation and sequential formation of isomeric reaction products", Journal of Lipid Research, vol. 37, 1996, pp. 1224-1233 (10 pages).
Heidenreich, Olaf, et al., "High Activity and Stability of Hammerhead Ribozymes Containing 2'-Modified Pyrimidine Nucleosides and Phosphorothioates", The Journal of Biological Chemistry, vol. 269, Jan. 21, 1994, pp. 2131-2138 (8 pages).
Jenkins, Russell W., et al., "Mechanisms of resistance to immune checkpoint inhibitors", British Journal of Cancer, vol. 118, No. 1, Jan. 2018, pp. 9-16, DOI: 10.1038/bjc.2017.434 (8 pages).
Junquera, Elena, et al., "Recent progress in gene therapy to deliver nucleic acids with multivalent cationic vectors", Advances in Colloid and Interface Science, vol. 233, 2016, pp. 161-175, (15 pages).
Karikó, Katalin, et al., "Incorporation of Pseudouridine Into mRNA Yields Superior Nonimmunogenic Vector With Increased Translational Capacity and Biological Stability", Molecular Therapy, vol. 16, No. 11, Nov. 2008, pp. 1833-1840, DOI:10.1038/mt.2008.200 (8 pages).
Kedmi et al., "A modular platform for targeted RNAi therapeutics", Nature Nanotechnology, vol. 13, Jan. 29, 2018, pp. 214-219, DOI: 10.1038/s41565-017-0043-5, 214-219 (6 pages).
Khalil, Danny N., et al., "The future of cancer treatment: immunomodulation, CARs and combination immunotherapy", Nature Reviews: Clinical Oncology, vol. 13, No. 5, May 2016, pp. 273-290, DOI: 10.1038/nrclinonc.2016.25, Author Manuscript (40 pages).
Kozak, Marilyn, "An analysis of 5'-noncoding sequences from 699 vertebrate messenger RNAs", Nucleic Acids Research, vol. 15, No. 20, 1987, pp. 8125-8148 (24 pages).
Kumar, Priti, et al., "T Cell-Specific siRNA Delivery Suppresses HIV-1 Infection in Humanized Mice", Cell, vol. 134, Aug. 22, 2008, pp. 577-586, DOI: 10.1016/j.cell.2008.06.034 (10 pages).
Leung, Alex K., et al., "Lipid Nanoparticles Containing siRNA Synthesized by Microfluidic Mixing Exhibit an Electron-Dense Nanostructured Core", The Journal of Physical Chemistry, vol. 116, No. 34, Jul. 18, 2012, pp. 18440-18450, DOI: 10.1021/jp303267y (11 pages).
Lokugamage, Melissa P., et al., "Constrained Nanoparticles Deliver siRNA and sgRNA to T Cells In Vivo without Targeting Ligands", Advanced Materials, vol. 31, Issue 41, No. 1902251, Aug. 29, 2019, DOI: 10.1002/adma.201902251 (8 pages).
Lokugamage, Melissa P., et al., "Constrained Nanoparticles Deliver siRNA and sgRNA to T Cells In Vivo without Targeting Ligands", Advanced Materials, vol. 31, Issue 41, No. 1902251, Aug. 29, 2019, DOI: 10.1002/adma.201902251, Supporting Information (32 pages).
Lokugamage, Melissa P., et al., "Testing thousands of nanoparticles in vivo using DNA barcodes", Current Opinion: Biomedical Engineering, vol. 7, Sep. 2018, p. 1-8, DOI: 10.1016/j.cobme.2018.08.001, Author Manuscript (16 pages).
Lorenzer, Cornelia, et al., "Going beyond the liver: Progress and challenges of targeted delivery of siRNA therapeutics", Journal of Controlled Release, vol. 203, Apr. 10, 2015, pp. 1-15, DOI: 10.1016/j.jconrel.2015.02.003 (15 pages).
Macparland, Sonya A., et al., "Phenotype Determines Nanoparticle Uptake by Human Macrophages from Liver and Blood", ACS Nano, vol. 11, 2017, pp. 2428-2443, DOI: 10.1021/acsnano.6b06245 (16 pages).
Makarova, Kira M., et al., "An updated evolutionary classification of CRISPR—Cas systems", Nature Reviews Microbiology, vol. 13, 2015, pp. 722-736, DOI: 10.1038/nrmicro3569, (15 pages).
Mathiowitz, E., et al., "Novel Microcapsules for Delivery Systems", Reactive Polymers, vol. 6, 1987, pp. 275-283 (9 pages).
Mathiowitz, E., et al., "Polyanhydride Microspheres as Drug Carriers I. Hot-Melt Microencapsulation", Journal of Controlled Release, vol. 5, 1987, pp. 13-22 (10 pages).
Mathiowitz, E., et al., "Polyanhydride Microspheres as Drug Carriers. II. Microencapsulation by Solvent Removal", Journal of Applied Polymer Science, vol. 35, 1988, pp. 755-775 (20 pages).
Paunovska, Kalina, et al., "A direct comparison of in vitro and in vivo nucleic acid delivery mediated by hundreds of nanoparticles reveals a weak correlation", Nano Lett., vol. 18, No. 3, Mar. 14, 2018, pp. 2148-2157, DOI: 10.1021/acs.nanolett.8b00432, Author Manuscript (20 pages).
Paunovska, Kalina, et al., "Analyzing 2,000 in vivo Drug Delivery Data Points Reveals Cholesterol Structure Impacts Nanoparticle Delivery", ACS Nano, vol. 12, No. 8, Aug. 28, 2018, pp. 8341-8349, DOI: 10.1021/acsnano.8b03640, Author Manuscript (17 pages).
Platt, Randall J., et al., "CRISPR-Cas9 Knockin Mice for Genome Editing and Cancer Modeling", Cell, vol. 159, Oct. 9, 2014, pp. 440-455, DOI: 10.1016/j.cell.2014.09.014 (16 pages).
Pollastri, M. P., et al., "Synthesis, structure, and thermal properties of 1,2-dipalmitoylgalloylglycerol (DPGG), a novel self-adhering lipid", Chemistry and Physics of Lipids, vol. 104, 2000, pp. 67-74 (8 pages).
Ramishetti, Srinivas, et al., "Systemic Gene Silencing in Primary T Lymphocytes Using Targeted Lipid Nanoparticles", ACS Nano, vol. 9, No. 7, Jun. 4, 2015, pp. 6706-6716, DOI: 10.1021/acsnano.5b02796 (11 pages).
Sago, Cory D., et al., "High-throughput in vivo screen of functional mRNA delivery identifies nanoparticles for endothelial cell gene editing", PNAS, vol. 115, No. 43, 2018, pp. E9944-E9952, Doi: 10.1073/pnas.1811276115, (9 pages).
Sago, Cory D., et al., "Modifying a commonly expressed endocytic receptor retargets nanoparticles in vivo", Nano Lett., vol. 18, No. 12, Dec. 12, 2018, pp. 7590-7600, DOI: 10.1021/acs.nanolett.8b03149, Author Manuscript (21 pages).
Sago, Cory D., et al., "Nanoparticles That Deliver RNA to Bone Marrow Identified by in Vivo Directed Evolution", Journal of the American Chemical Society, vol. 140, No. 49, 2018, p. 17095-17105, DOI: 10.1021/jacs.8b08976, Author Manuscript (23 pages).
Sharma, Padmanee, et al., "The future of immune checkpoint therapy", Science, vol. 348, No. 6230, Apr. 3, 2015, pp. 56-61, DOI: 10.1126/science.aaa8172 (6 pages).
Shmakov, Sergey, et al., "Discovery and Functional Characterization of Diverse Class 2 CRISPR-Cas Systems", Molecular Cell, vol. 60, No. 3, 2015, pp. 385-397, DOI: 10.1016/j.molcel.2015.10.008, (14 pages).
Tavares, Anthony J., et al., "Effect and removing Kupffer cells on nanoparticle tumor delivery", Proceedings of the National Academy

(56) References Cited

OTHER PUBLICATIONS of Sciences, vol. 114, No. 51, Dec. 5, 2017, pp. E10871-E10880, Doi: 10.1073/pnas. 1713390114 (10 pages).
Tsoi, Kim M., et al., "Mechanism of hard nanomaterial clearance by the liver", Nature Materials, vol. 15, No. 11, Nov. 2016, pp. 1212-1221, DOI: 10.1038/nmat4718, Author Manuscript (21 pages).
Ui-Tei, Kumiko, et al., "Sensitive assay of RNA interference in *Drosophila* and Chinese hamster cultured cells using firefly luciferase gene as target", FEBS Letters, vol. 479, 2000, pp. 79-82 (4 pages).
Yokoe, Hiroko, et al., "Spatial dynamics of GFP-tagged proteins investigated by local fluorescence enhancement", Nature Biotechnology, vol. 14, Oct. 1996, pp. 1252-1256 (5 pages).
Zetsche, Bernd, et al., "Cpf1 Is a Single RNA-Guided Endonuclease of a Class 2 CRISPR-Cas System", Cell, vol. 163, No. 3, 2015, pp. 759-771, DOI: 10.1016/j.cell.2015.09.038, (15 pages).
International Search Report for PCT/US2023/027741 dated Oct. 13, 2023 (3 pages).
Chenthamara, et al., "Therapeutic efficacy of nanoparticles and routes of administration", Biomaterials Research, vol. 23, No. 20, Nov. 21, 2019, DOI: 10.1186/s40824-019-0166-x (29 pages) (Exhibit A).
Epand, et al., "Role of the position of unsaturation on the phase behavior and intrinsic curvature of phosphatidylethanolamines", Biophysical Journal, vol. 71, No. 4, pp. 1806-1810, Oct. 1996, DOI:10.1016/S0006-3495(96)79381-5 (5 pages) (Exhibit E).
Fenton, et al., "Synthesis and Biological Evaluation of Ionizable Lipid Materials for the In Vivo Delivery of Messenger RNA to B Lymphocytes", Advanced materials (Deerfield Beach, Fla.), vol. 29, No. 33, Sep. 2017, DOI:10.1002/adma.201606944 (7 pages) (Exhibit D).
Reichmuth, et al., "mRNA vaccine delivery using lipid nanoparticles", Therapeutic Delivery, vol. 7, No. 5, pp. 319-334, 2016, DOI: 10.4155/tde-2016-0006 (16 pages) (Exhibit C).
Scheidt, et al., "The interaction of small molecules with phospholipid membranes studied by 1H NOESY NMR under magic-angle spinning", Acta Pharmacologica Sinica, vol. 29, No. 1, 2008, pp. 35-49, DOI:10.1111/j.1745-7254.2008.00726.x (15 pages) (Exhibit B).
Wang, et al., "Effects of various numbers and positions of cis double bonds in the sn-2 acyl chain of phosphatidylethanolamine on the chain-melting temperature", The Journal of Biological Chemistry, vol. 274, No. 18, pp. 12289-12299. Apr. 30, 1999, DOI:10.1074/jbc.274.18.12289 (11 pages) (Exhibit F).
CAS SciFinder Search, Ionizable Lipid, 2025 (21 pages).
Google Search, Is Adamantyl Cycloalkyl, 2025 (4 pages).
Google Search, Why is adamantyl group on an ionizable lipid, 2025 (4 pages).
Partial Search Report for PCT/US2022/012867 dated Mar. 28, 2022 (3 pages).
Partial Search Report for PCT/US2022/012941 dated Mar. 21, 2022 (2 pages).
Partial Search Report for PCT/US2022/012951 dated Mar. 23, 2022 (2 pages).
Partial Search Report for PCT/US2022/012954 dated Mar. 23, 2022 (3 pages).
Kanasty, Rosemary, et al., "Delivery Materials for siRNA Therapeutics", Nature Materials, vol. 12, No. 11, pp. 967-977, Nov. 2013, DOI: 10.1038/nmat3765 (11 pages).
Zhang, Xinfu, et al., "Functionalized lipid-like nanoparticles for in vivo mRNA delivery and base editing", Science Advances, vol. 6, No. 34, 2020, eabc2315, DOI: 10.1126/sciadv.abc2315, (9 pages).

\* cited by examiner

| Example | Structure |
|---|---|
| 1 |  Example 1 |
| 2 |  Example 2 |
| 3 |  Example 3 |
| 4 |  Example 4 |

| Example | Structure |
|---|---|
| 5 |  Example 5 |
| 6 |  Example 6 |
| 7 |  Example 7 |
| 8 |  Example 8 |
| 9 |  Example 9 |

| Example | Structure |
|---|---|
| 10 |  Example 10 |
| 11 |  Example 11 |
| 12 |  Example 12 |
| 13 |  Example 13 |
| 14 |  Example 14 |

| Example | Structure |
|---|---|
| 15 |  Example 15 |
| 16 |  Example 16 |
| 17 |  Example 17 |
| 18 |  Example 18 |

| Example | Structure |
|---|---|
| 19 |  Example 19 |
| 20 |  Example 20 |
| 21 |  Example 21 |
| 22 |  Example 22 |

| Example | Structure |
|---|---|
| 23 | Example 23 |
| 24 | Example 24 |
| 25 | Example 25 |
| 26 | Example 26 |
| 27 | Example 27 |

FIG. 2 (continued)

| Example | Structure |
|---|---|
| 28 |   Example 28 |
| 29 |   Example 29 |
| 30 |   Example 30 |
| 31 |   Example 31 |

| Example | Structure |
|---|---|
| 32 | Example 32 |
| 33 | Example 33 |
| 34 | Example 34 |
| 35 | Example 35 |

FIG. 2 (continued)

| Example | Structure |
|---|---|
| 36 | Example 36 |
| 37 | Example 37 |
| 38 | Example 38 |
| 39 | Example 39 |

| Example | Structure |
|---|---|
| 40 |  Example 40 |
| 41 |  Example 41 |
| 42 |  Example 42 |
| 43 |  Example 43 |

| Example | Structure |
|---|---|
| 44 | Example 44 |
| 45 | Example 45 |
| 46 | Example 46 |
| 47 | Example 47 |

| Example | Structure |
|---------|-----------|
| 48 |  Example 48 |
| 49 |  Example 49 |
| 50 |  Example 50 |
| 51 |  Example 51 |

| Example | Structure |
|---|---|
| 52 | <br>Example 52 |
| 53 | <br>Example 53 |
| 54 | <br>Example 54 |
| 55 | <br>Example 55 |

| Example | Structure |
|---|---|
| 56 | <br>Example 56 |
| 57 | <br>Example 57 |
| 58 | <br>Example 58 |
| 59 | <br>Example 59 |
| 60 | <br>Example 60 |

| Example | Structure |
|---|---|
| 66 |  Example 66 |
| 67 |  Example 67 |
| 68 |  Example 68 |
| 69 |  Example 69 |

| Example | Structure |
|---|---|
| 70 | 
Example 70 |
| 71 | 
Example 71 |
| 72 | 
Example 72 |
| 73 | 
Example 73 |
| 74 | 
Example 74 |

| Example | Structure |
|---|---|
| 75 | 
Example 75 |
| 76 | 
Example 76 |
| 77 | 
Example 77 |
| 78 | 
Example 78 |
| 79 | 
Example 79 |

| Example | Structure |
|---------|-----------|
| 80 | Example 80 |
| 81 | Example 81 |
| 82 | Example 82 |
| 83 | Example 83 |

| Example | Structure |
|---|---|
| 84 |   Example 84 |
| 85 |   Example 85 |
| 86 |   Example 86 |
| 87 |   Example 87 |

| Example | Structure |
|---|---|
| 88 | Example 88 |
| 89 | Example 89 |
| 90 | Example 90 |
| 91 | Example 91 |
| 92 | Example 92 |

| Example | Structure |
|---|---|
| 93 | Example 93 |
| 94 | Example 94 |
| 95 | Example 95 |
| 96 | Example 96 |
| 97 | Example 97 |

| Example | Structure |
|---|---|
| 98 | Example 98 |
| 99 | Example 99 |
| 100 | Example 100 |
| 101 | Example 101 |
| 102 | Example 102 |

FIG. 2 (continued)

| Example | Structure |
|---|---|
| 103 | Example 103 |
| 104 | Example 104 |
| 105 | Example 105 |
| 106 | Example 106 |
| 107 | Example 107 |

FIG. 2 (continued)

| Example | Structure |
|---|---|
| 113 | 
Example 113 |
| 114 | 
Example 114 |
| 115 | 
Example 115 |
| 116 | 
Example 116 |
| 117 | 
Example 117 |

| Example | Structure |
|---|---|
| 118 | Example 118 |
| 119 | Example 119 |
| 120 | Example 120 |
| 121 | Example 121 |
| 122 | Example 122 |

| Example | Structure |
|---------|-----------|
| 123 | 
Example 123 |
| 124 | 
Example 124 |
| 125 | 
Example 125 |
| 126 | 
Example 126 |

| Example | Structure |
|---|---|
| 127 | :contentReference Example 127 |
| 128 | Example 128 |
| 129 | Example 129 |
| 130 | Example 130 |
| 131 | Example 131 |

| Example | Structure |
|---|---|
| 132 | Example 132 |
| 133 | Example 133 |
| 134 | Example 134 |
| 135 | Example 135 |

FIG. 2 (continued)

| Example | Structure |
|---|---|
| 136 |  Example 136 |
| 137 |  Example 137 |
| 138 |  Example 138 |
| 139 |  Example 139 |
| 140 |  Example 140 |

| Example | Structure |
|---|---|
| 141 |  Example 141 |
| 142 |  Example 142 |
| 143 |  Example 143 |
| 144 |  Example 144 |
| 145 |  Example 145 |

| Example | Structure |
|---------|-----------|
| 146 | Example 146 |
| 147 | Example 147 |
| 148 | Example 148 |

FIG. 2 (continued)

NANOMATERIALS

RELATED APPLICATION INFORMATION

This application claims priority to U.S. Provisional Application No. 62/958,876, filed Jan. 9, 2020, which is hereby incorporated herein by reference in its entirety.

BACKGROUND

Field

The present application relates to the fields of chemistry, biology, and medicine. Disclosed herein are drug delivery systems and methods of their use. More particularly, disclosed herein are nanoparticle compositions for delivery of nucleic acids to cells.

Description

Hepatocytes help maintain homeostasis and produce many secreted proteins and, thus, are implicated in many genetic diseases. While nanoparticles carrying RNA have been directed to hepatocytes, systemic delivery to hepatocytes without targeting ligands remains challenging.

SUMMARY

Some embodiments described herein relate to a compound of Formula (I):

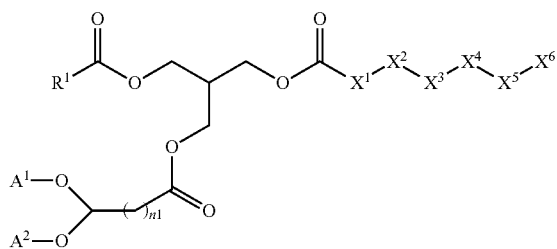

(I)

wherein:

$R^1$ is $C_9$-$C_{20}$ alkyl or $C_9$-$C_{20}$ alkenyl with 1-3 units of unsaturation.

$X^1$ and $X^2$ are each independently absent or selected from —O—, $NR^2$—, and —$(CH_2)_a$—$X^7$, wherein each $R^2$ is independently hydrogen or $C_1$-$C_6$ alkyl;

each a is independently an integer between 1 and 6;

$X^3$ and $X^4$ are each independently absent or selected from the group consisting of: 4- to 8-membered heterocyclyl optionally substituted with 1 or 2 $C_1$-$C_6$ alkyl groups, 5- to 6-membered heteroaryl optionally substituted with 1 or 2 $C_1$-$C_6$ alkyl groups, 5- to 6-membered aryl optionally substituted with 1 or 2 $C_1$-$C_6$ alkyl groups, 4- to 7-membered cycloalkyl optionally substituted with 1 or 2 $C_1$-$C_6$ alkyl groups, —O— and —$NR^3$—, wherein each $R^3$ is a hydrogen atom or $C_1$-$C_6$ alkyl and wherein $X^1$—$X^2$—$X^3$—$X^4$ does not contain any oxygen-oxygen, oxygen-nitrogen or nitrogen-nitrogen bonds;

$X^5$ is —$(CH_2)_b$—, wherein b is an integer between 0 and 6;

$X^6$ is hydrogen, $C_1$-$C_6$ alkyl, 5- to 6-membered heteroaryl optionally substituted with 1 or 2 $C_1$-$C_6$ alkyl groups, or —$NR^4R^5$—, wherein $R^4$ and $R^5$ are each independently hydrogen or $C_1$-$C_6$ alkyl; or alternatively $R^4$ and $R^5$ join together with the nitrogen to which they are bound to form a 4- to 7-membered heterocyclyl optionally substituted with 1 or 2 $C_1$-$C_6$ alkyl groups, wherein the heterocyclyl optionally includes an additional heteroatom selected from oxygen, sulfur, and nitrogen;

each $X^7$ is independently hydrogen, hydroxyl or —$NR^6R^7$, wherein $R^6$ and $R^7$ are each independently hydrogen or $C_1$-$C_6$ alkyl; or alternatively $R^4$ and $R^5$ join together with the nitrogen to which they are bound to form a 4- to 7-membered heterocyclyl optionally substituted with 1 or 2 $C_1$-$C_6$ alkyl groups, wherein the heterocyclyl optionally includes an additional heteroatom selected from oxygen, sulfur, and nitrogen;

at least one of $X^1$, $X^2$, $X^3$, $X^4$, and $X^5$ is present, $A^1$ and $A^2$ are each independently selected from the group consisting of: $C_5$-$C_{12}$ haloalkyl, $C_5$-$C_{12}$ alkenyl, $C_5$-$C_{12}$ alkynyl, ($C_5$-$C_{12}$ alkoxy)-$(CH_2)_{n2}$—, ($C_5$-$C_{10}$ aryl)-$(CH_2)_{n3}$— optionally ring substituted with one or two halo, $C_1$-$C_6$ alkyl, $C_1$-$C_6$ haloalkyl, or $C_1$-$C_6$ alkoxy groups, and ($C_3$-$C_8$ cycloalkyl)-$(CH_2)_{n4}$— optionally ring substituted with 1 or 2 $C_1$-$C_6$ alkyl groups; or alternatively $A^1$ and $A^2$ join together with the atoms to which they are bound to form a 5- to 6-membered cyclic acetal substituted with 1 or 2 $C_4$-$C_{10}$ alkyl groups;

n1, n2 and n3 are each individually an integer between 1 and 4; and n4 is an integer between zero and 4.

Some embodiments feature a lipid nanoparticle composition comprising: an ionizable lipid as described herein; a phospholipid, a polyethylene glycol-lipid; a cholesterol, and optionally a nucleic acid. Further embodiments are directed toward a method of delivering a nucleic acid to a subject in need thereof, comprising administering to the subject in need the lipid nanoparticle composition.

These and other embodiments are described in greater detail below.

DETAILED DESCRIPTION

Definitions

Figure 1:
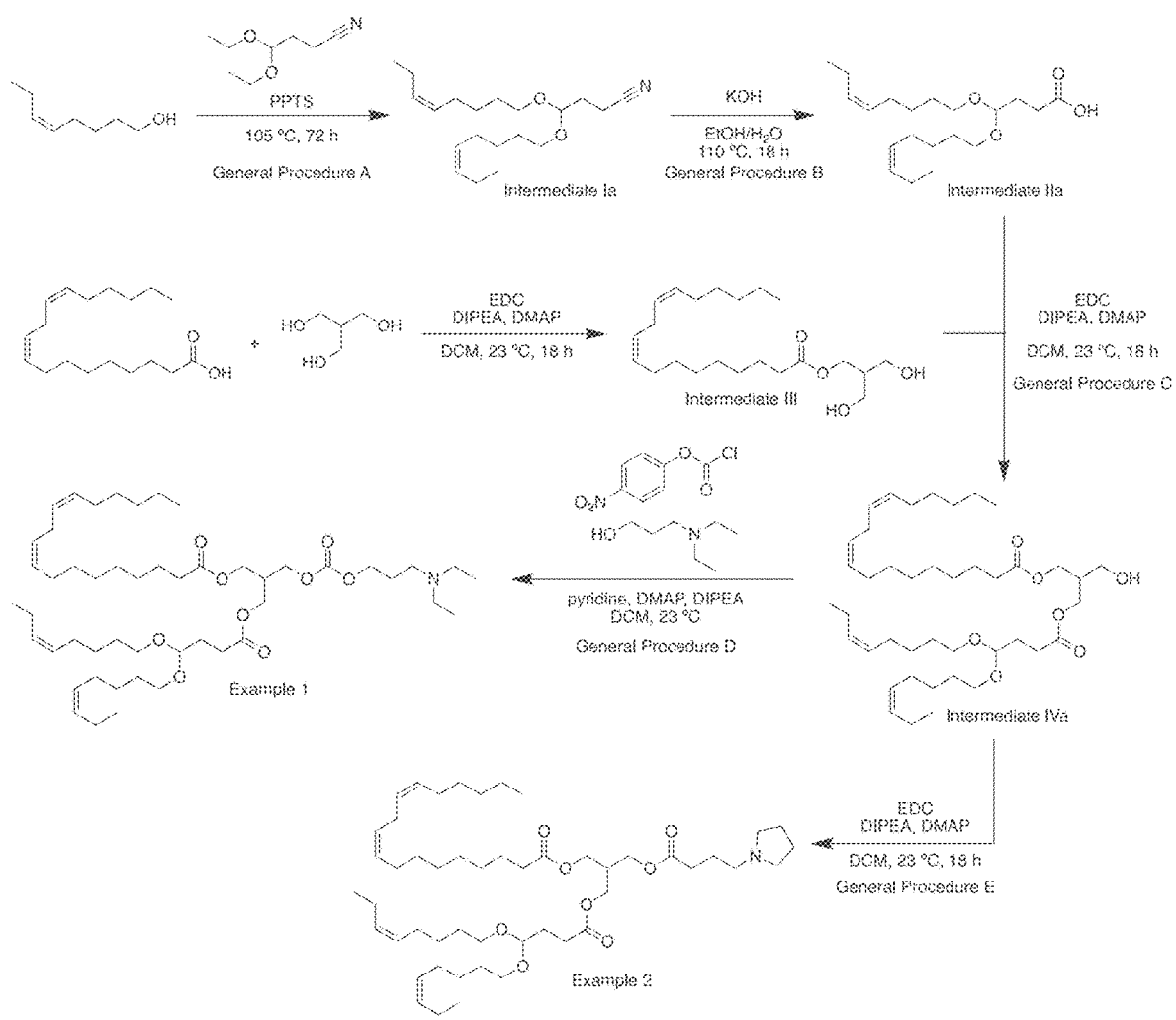
FIG. 1 illustrates a reaction scheme for preparing compounds of the Formula (I).
Figure 2:
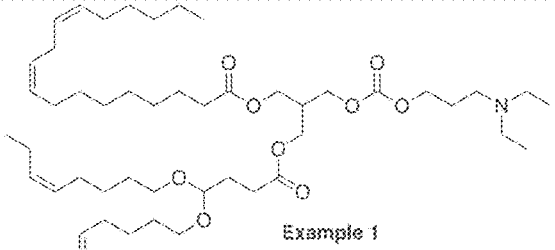
FIG. 2 summarizes the structures of the compounds of Examples 1-148.
Figure 2:
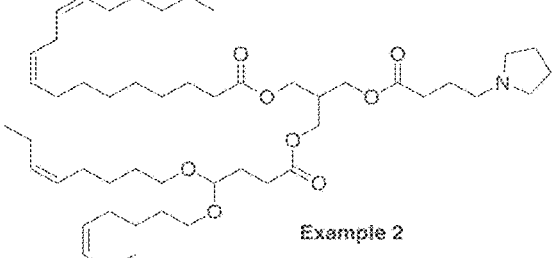
Figure 2:
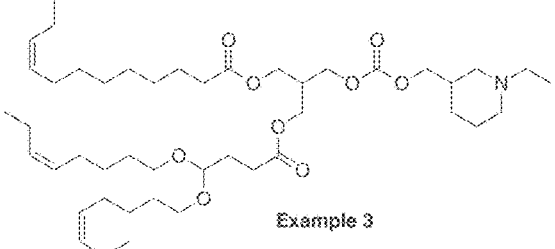
Figure 2:
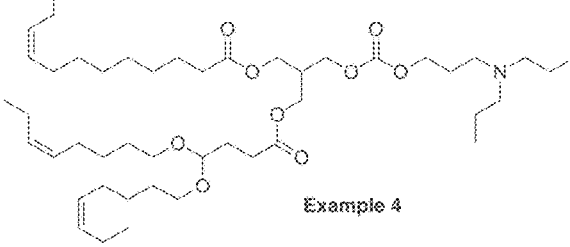
Figure 2:
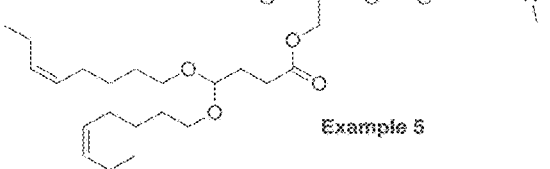
Figure 2:
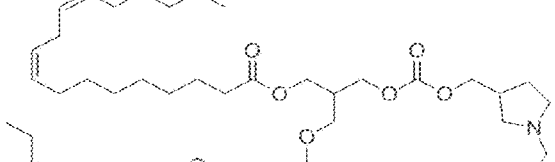
Figure 2:
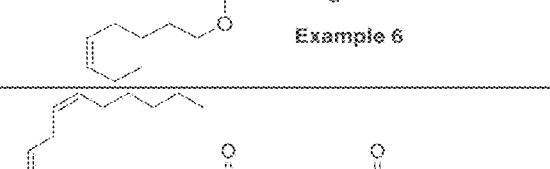
Figure 2:
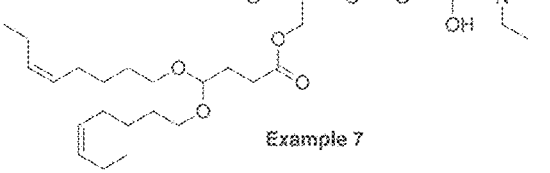
Figure 2:
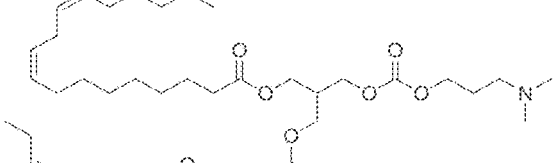
Figure 2:
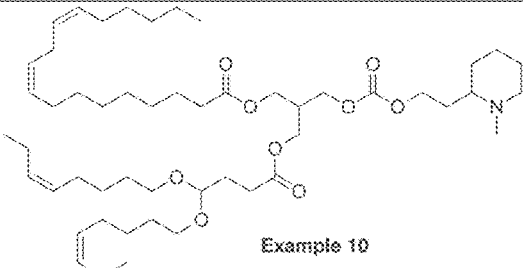
Figure 2:
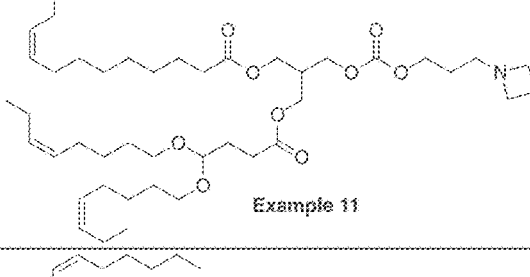
Figure 2:
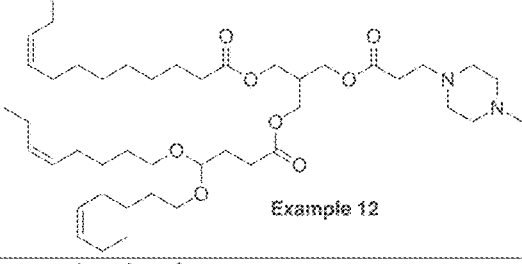
Figure 2:
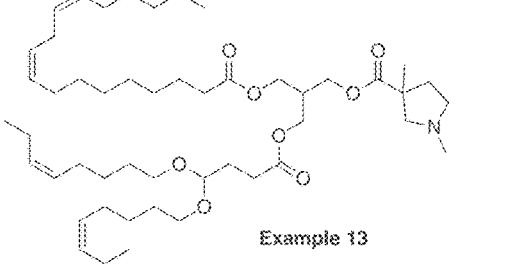
Figure 2:
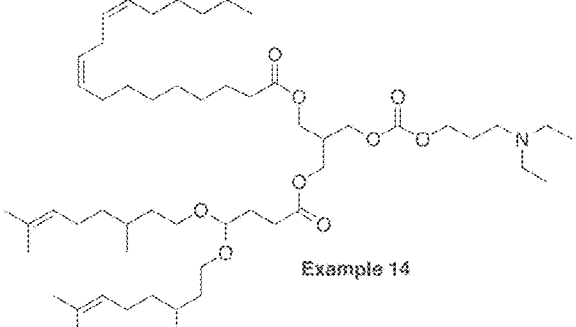
Figure 2:
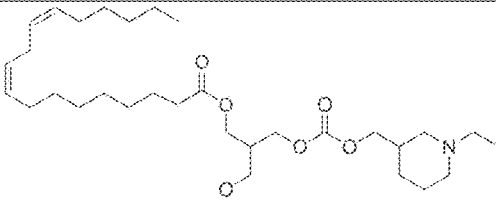
Figure 2:
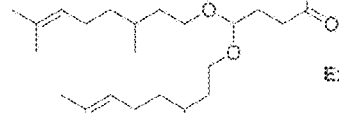
Figure 2:
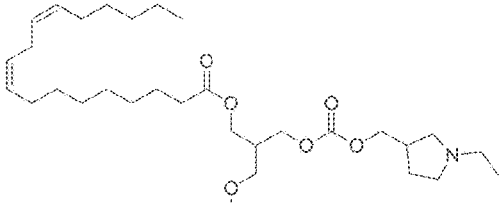
Figure 2:
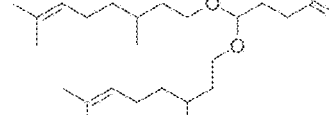
Figure 2:
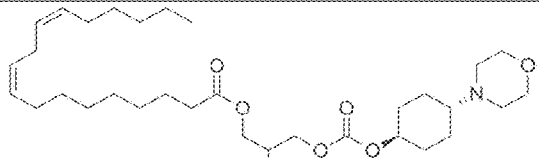
Figure 2:
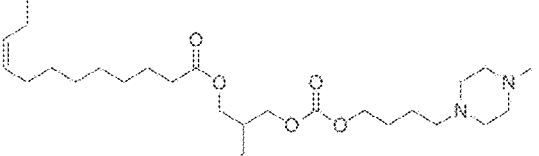
Figure 2:
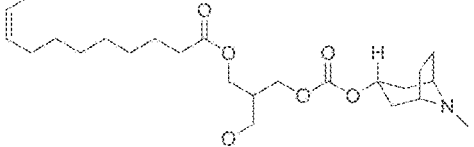
Figure 2:
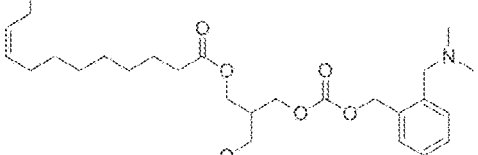
Figure 2:
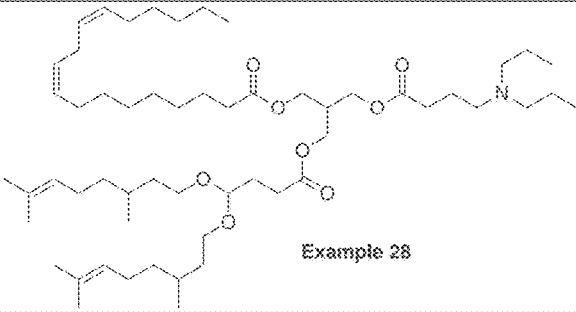
Figure 2:
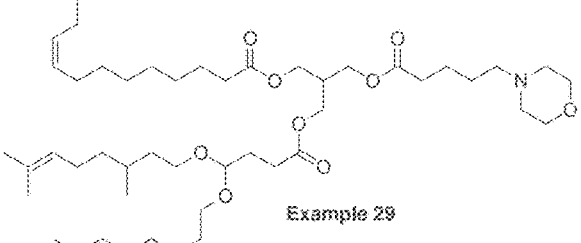
Figure 2:
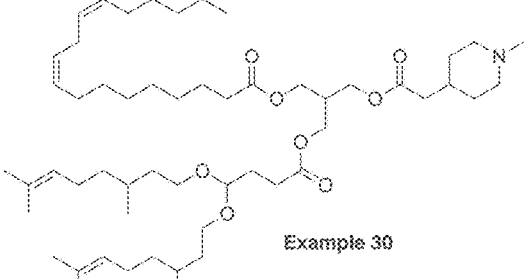
Figure 2:
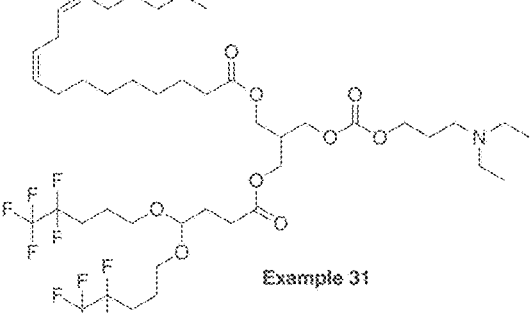
Figure 2:
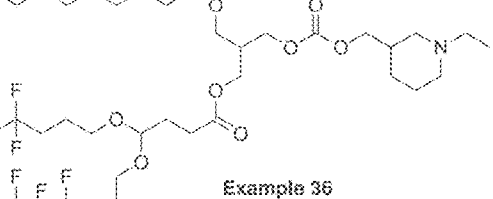
Figure 2:
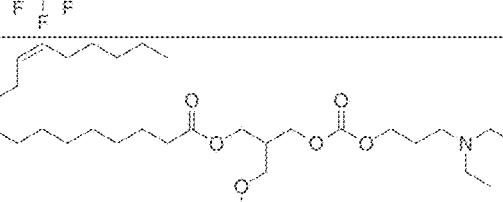
Figure 2:
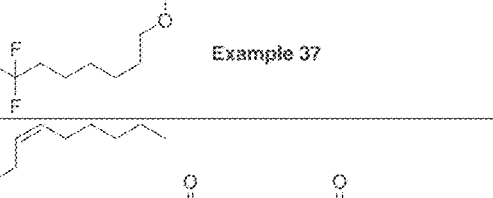
Figure 2:
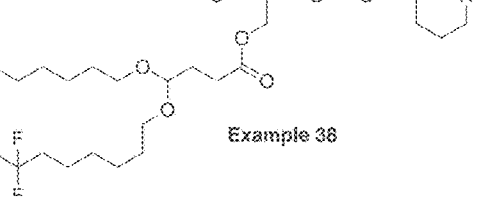
Figure 2:
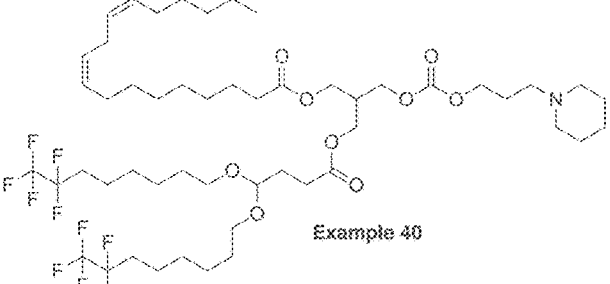
Figure 2:
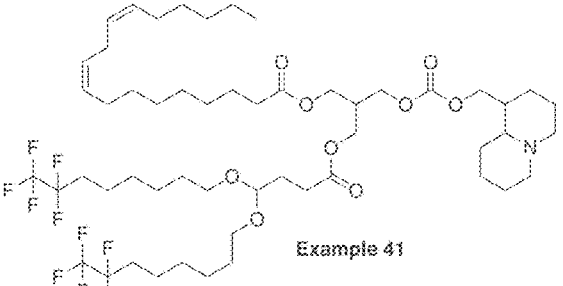
Figure 2:
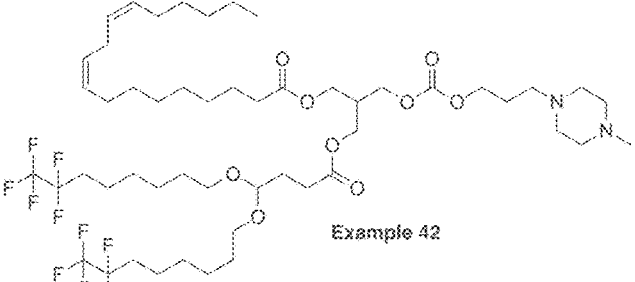
Figure 2:
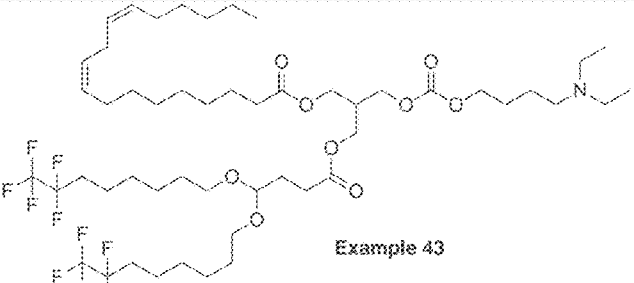
Figure 2:
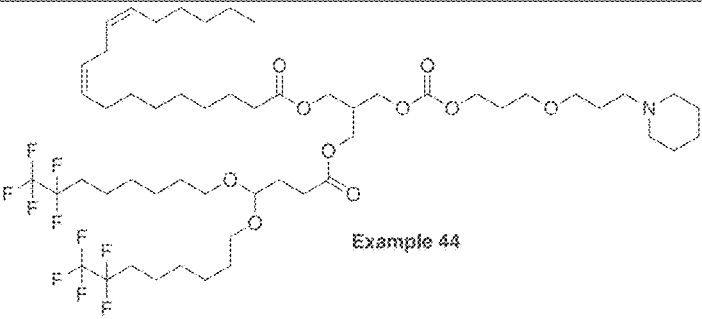
Figure 2:
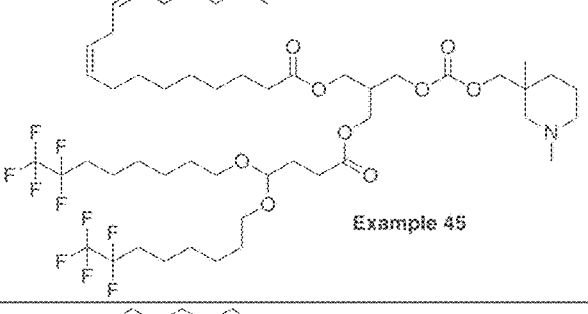
Figure 2:
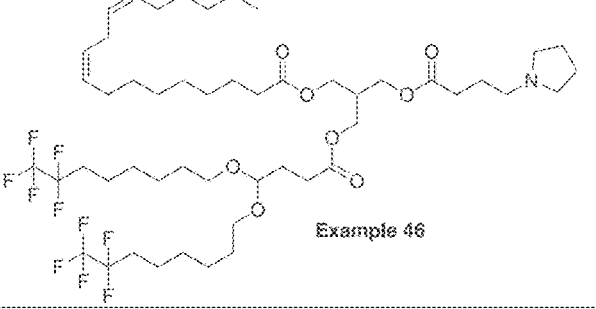
Figure 2:
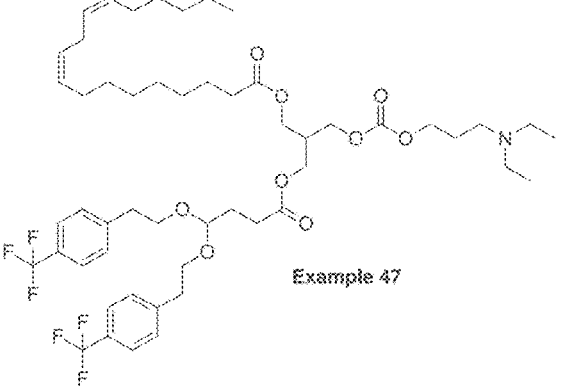
Figure 2:
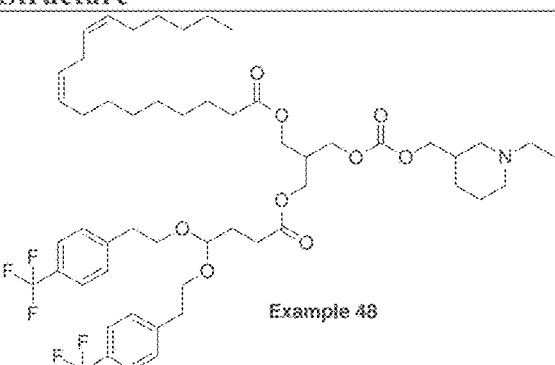
Figure 2:
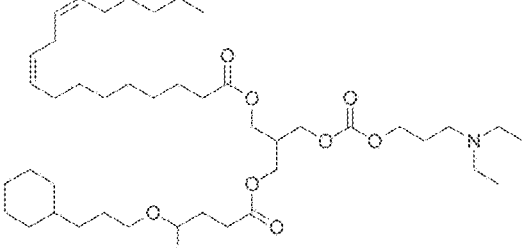
Figure 2:
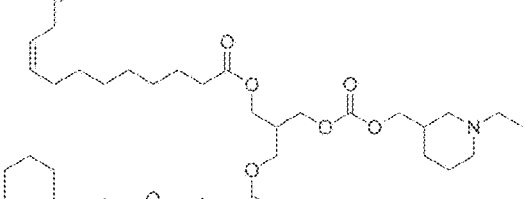
Figure 2:
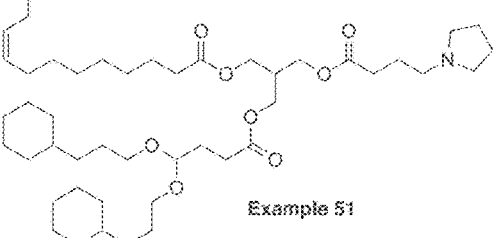
Figure 2:
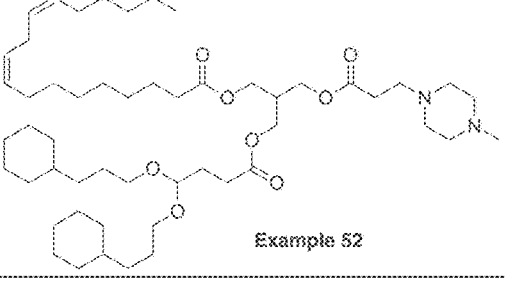
Figure 2:
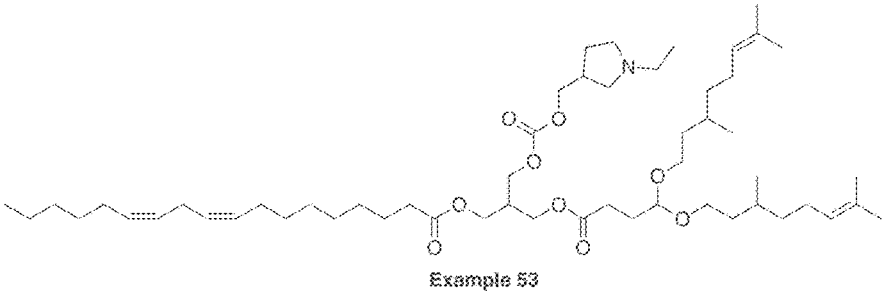
Figure 2:
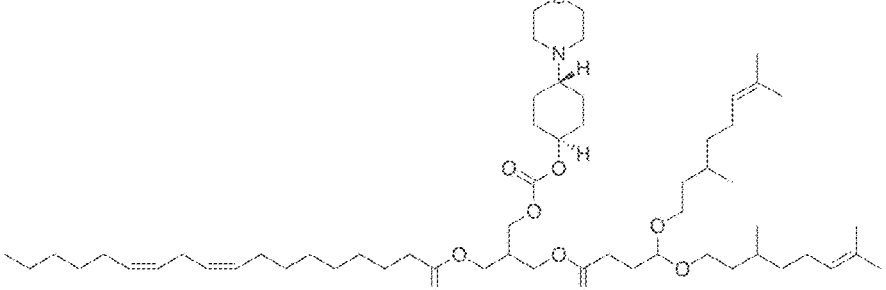
Figure 2:
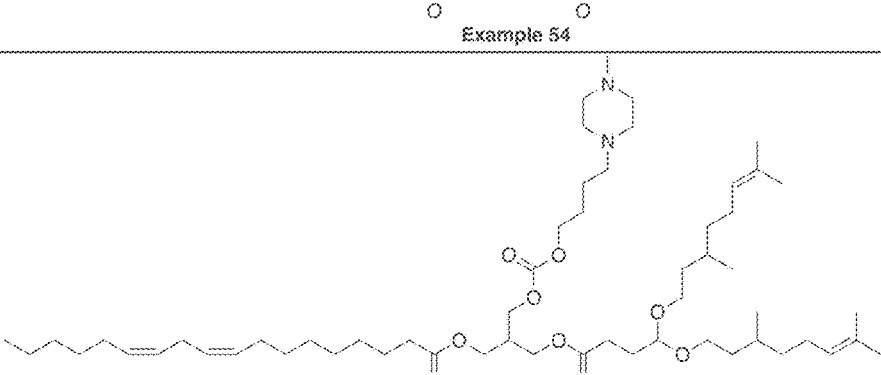
Figure 2:
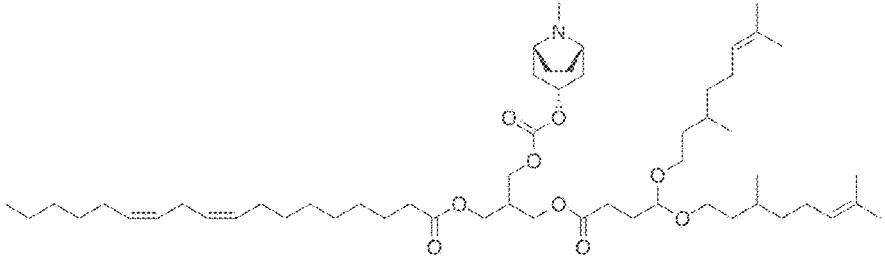
Figure 2:
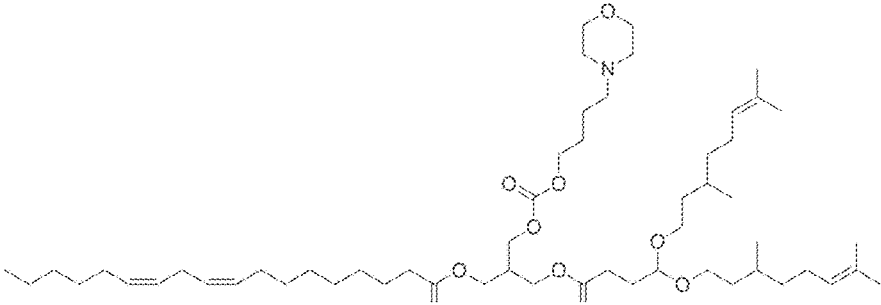
Figure 2:
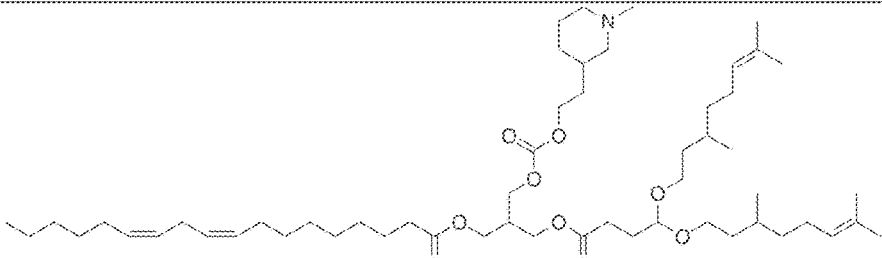
Figure 2:
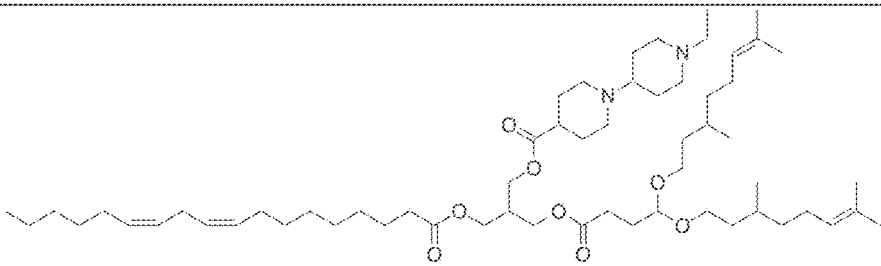
Figure 2:
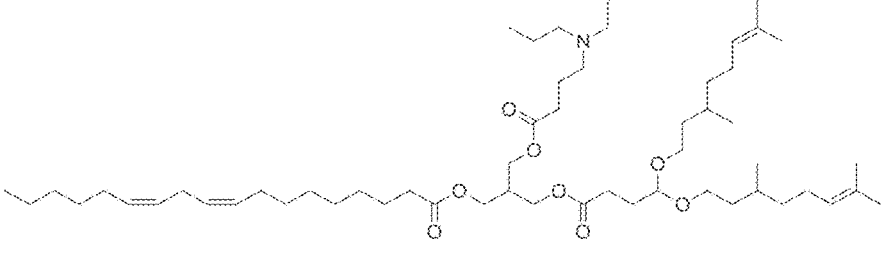
Figure 2:
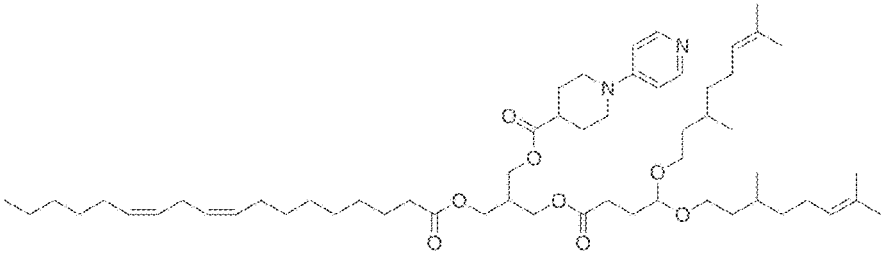
Figure 2:
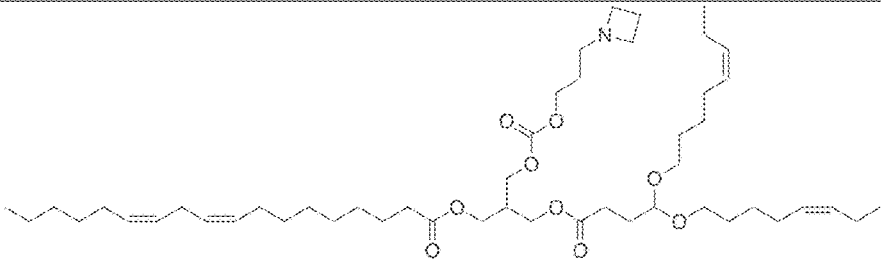
Figure 2:
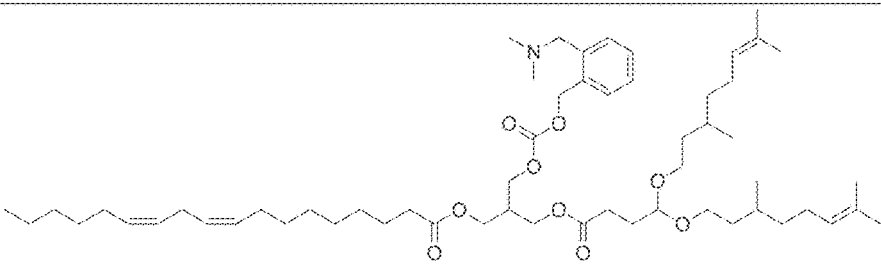
Figure 2:
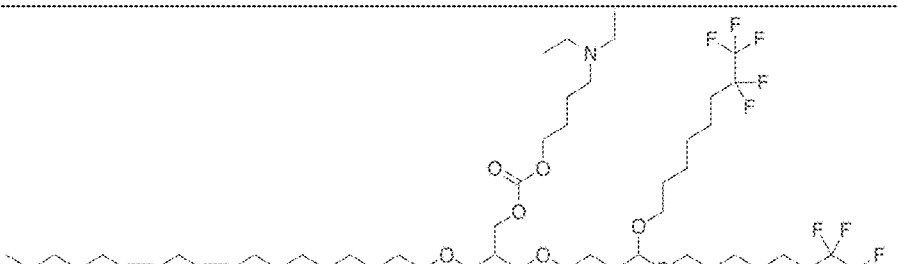
Figure 2:
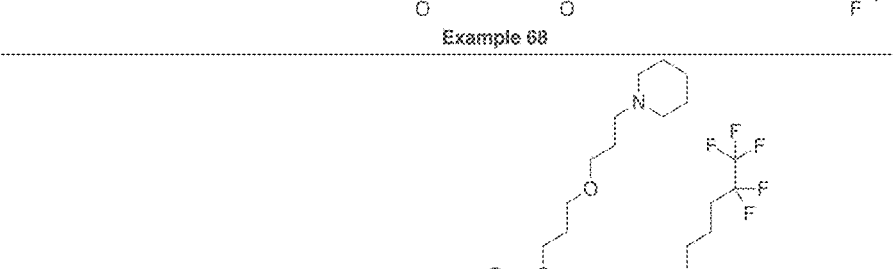
Figure 2:
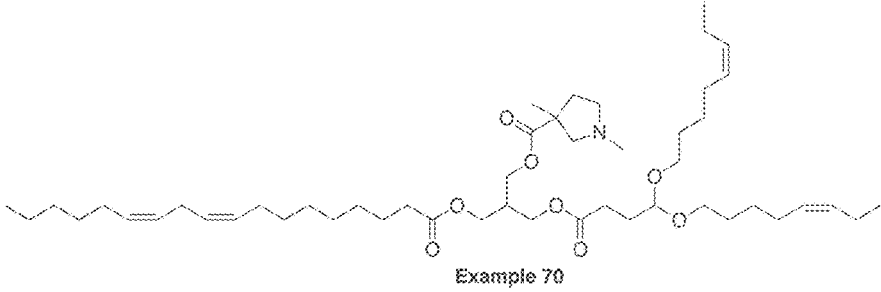
Figure 2:
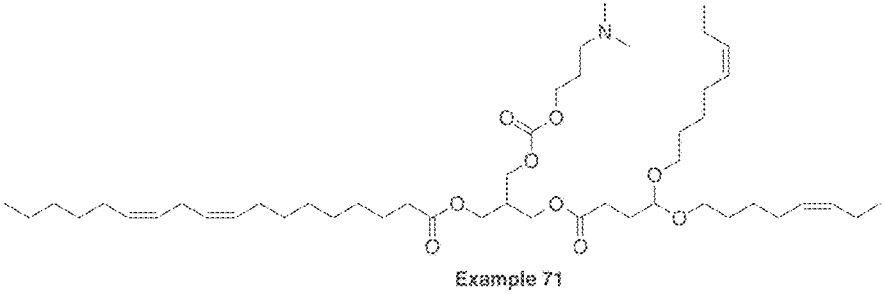
Figure 2:
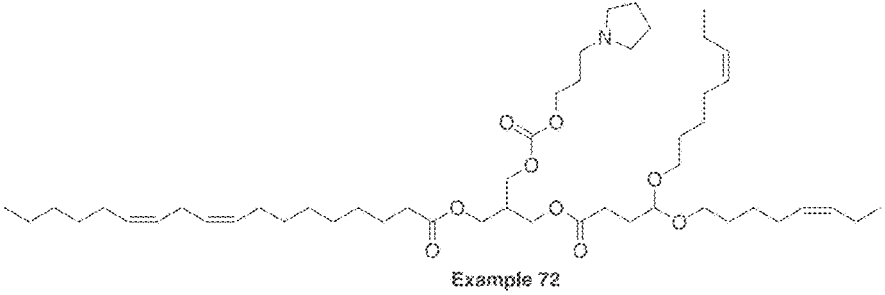
Figure 2:
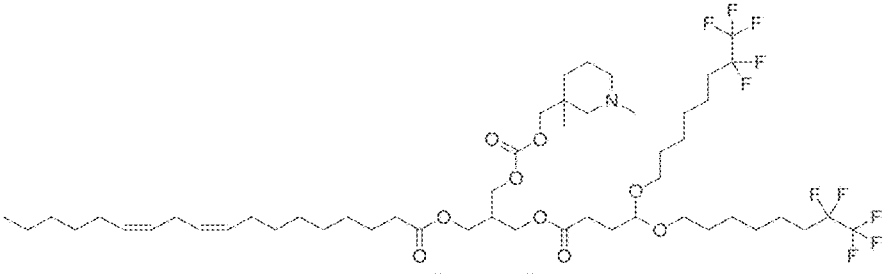
Figure 2:
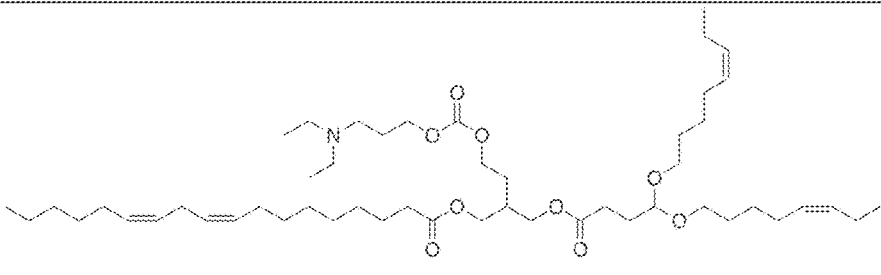
Figure 2:
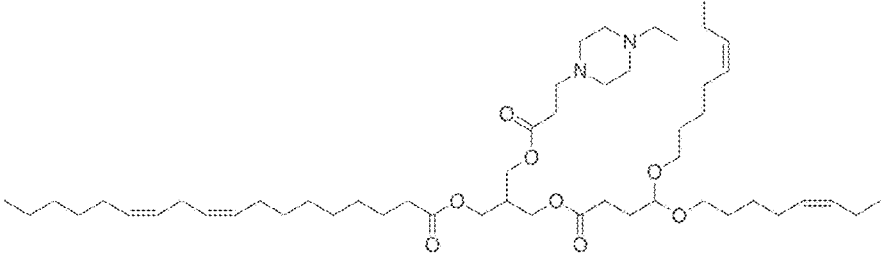
Figure 2:
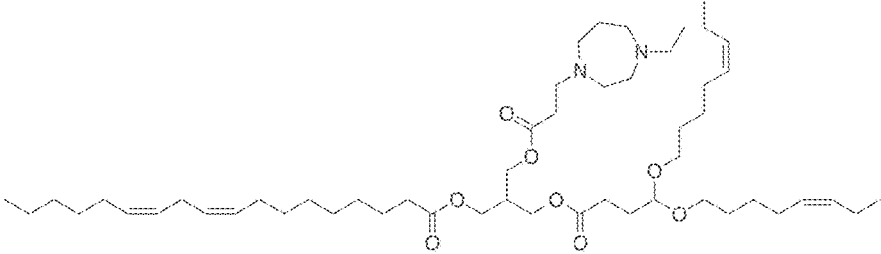
Figure 2:
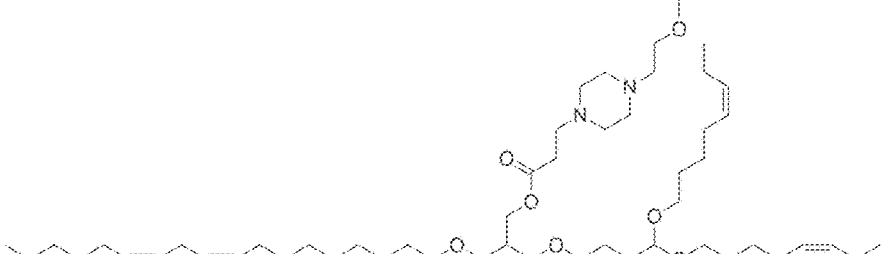
Figure 2:
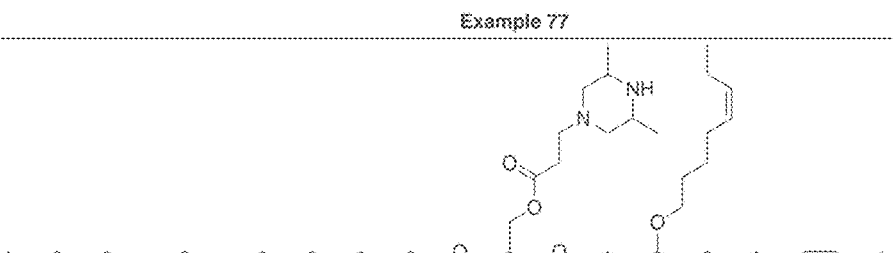
Figure 2:
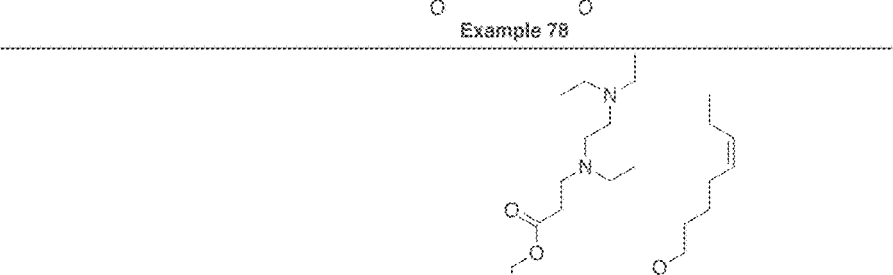
Figure 2:
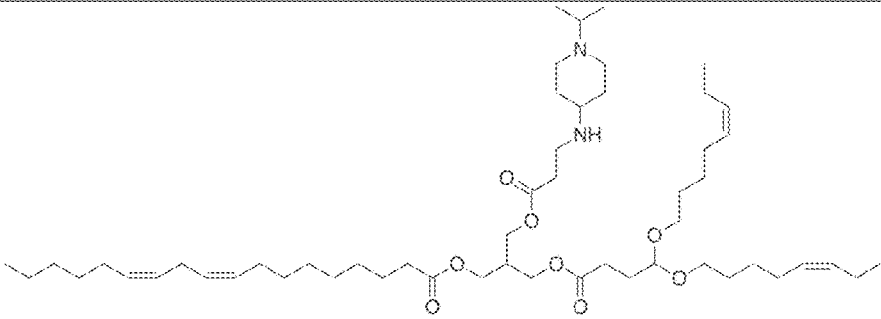
Figure 2:
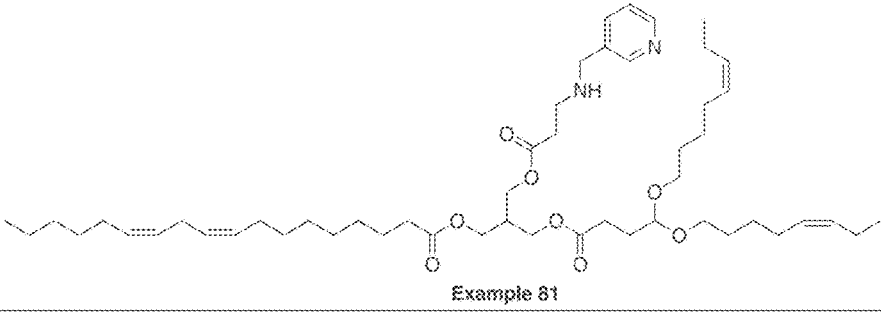
Figure 2:
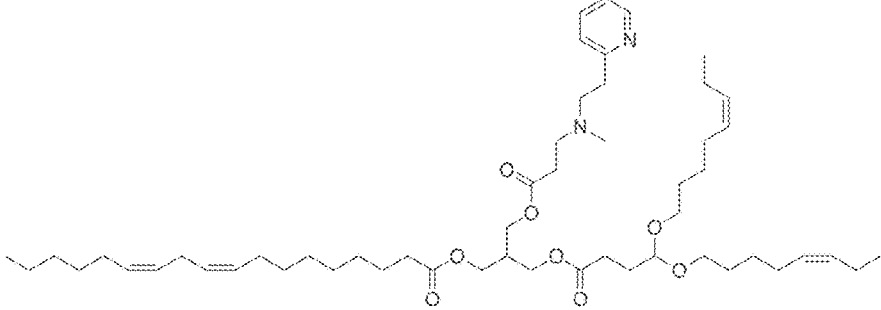
Figure 2:
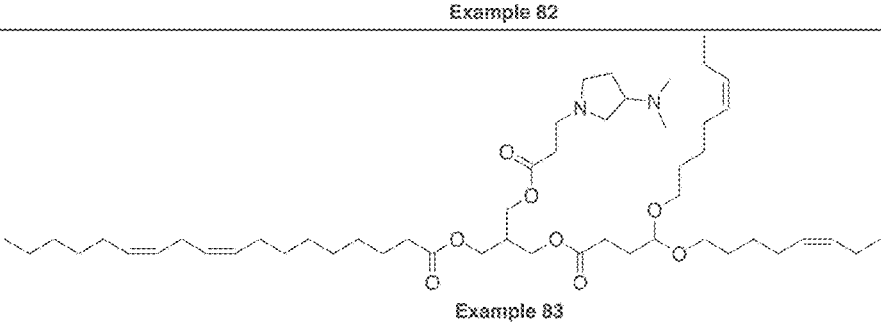
Figure 2:
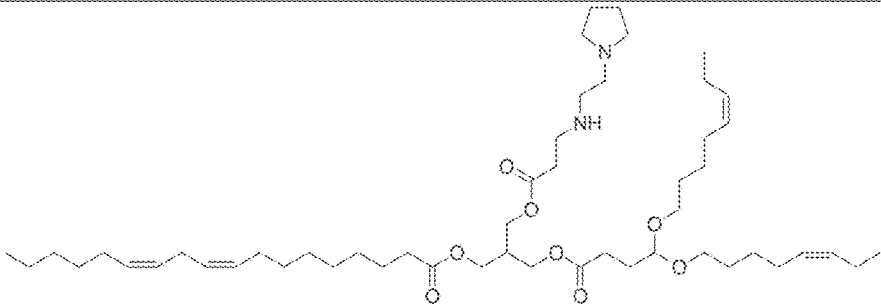
Figure 2:
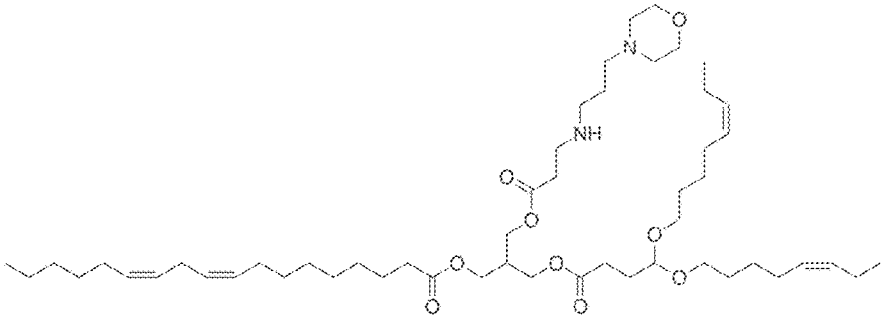
Figure 2:
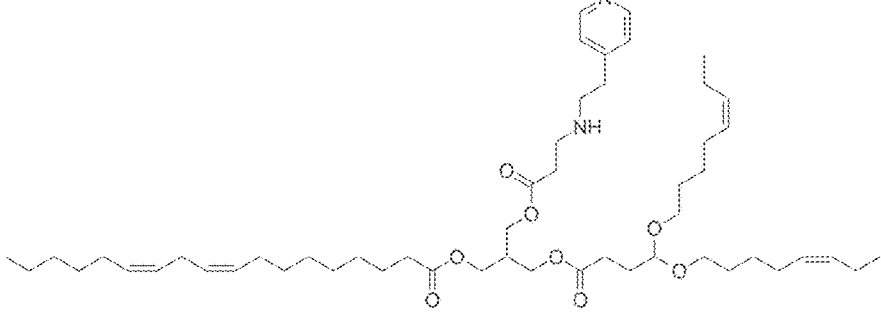
Figure 2:
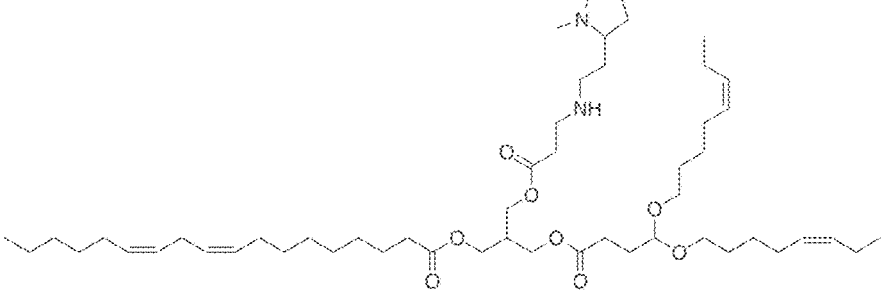
Figure 2:
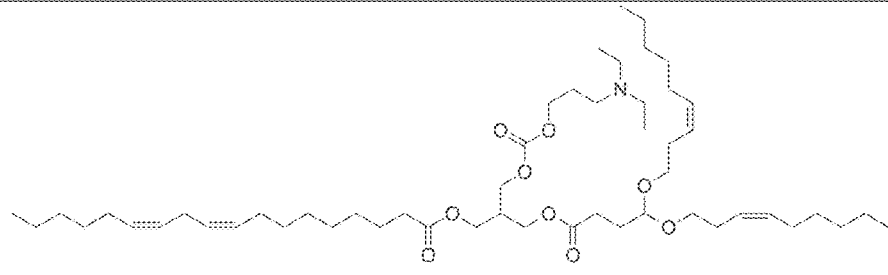
Figure 2:
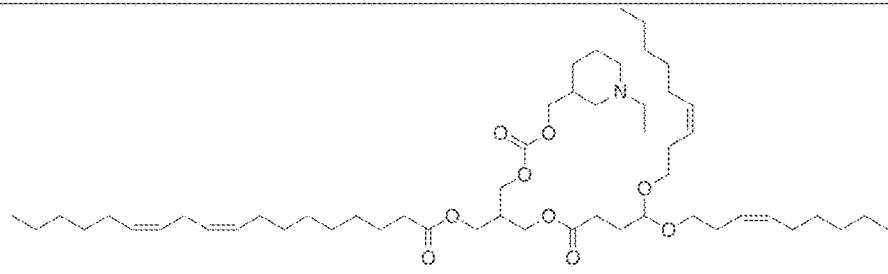
Figure 2:
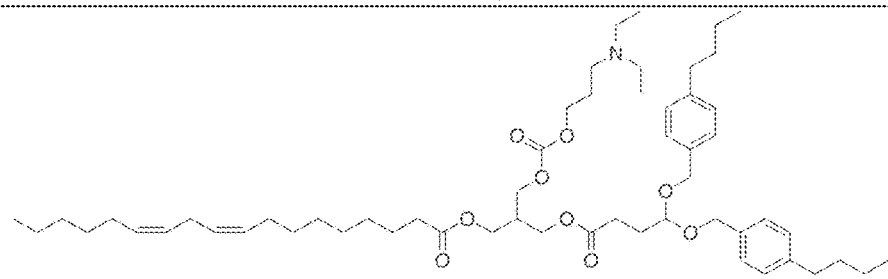
Figure 2:
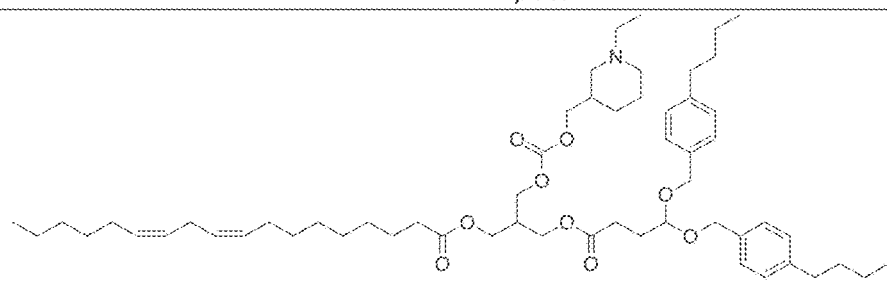
Figure 2:
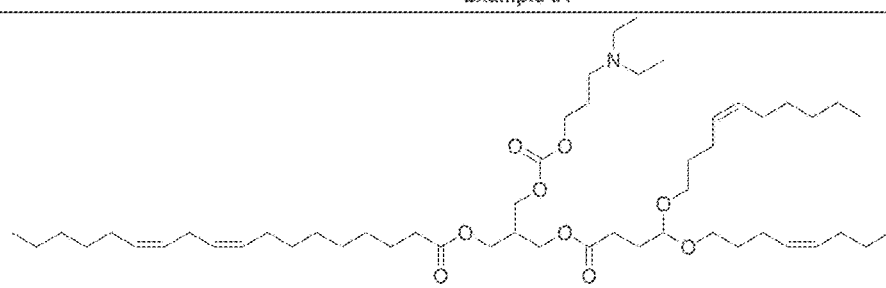
Figure 2:
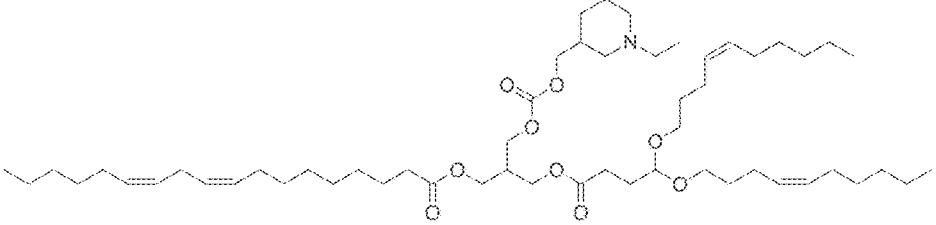
Figure 2:
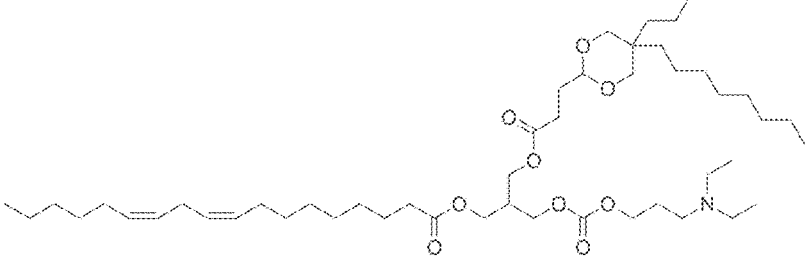
Figure 2:
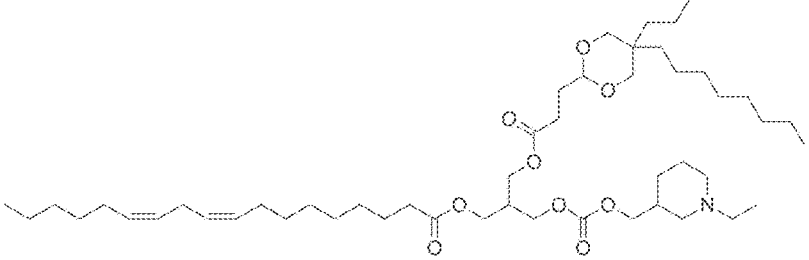
Figure 2:
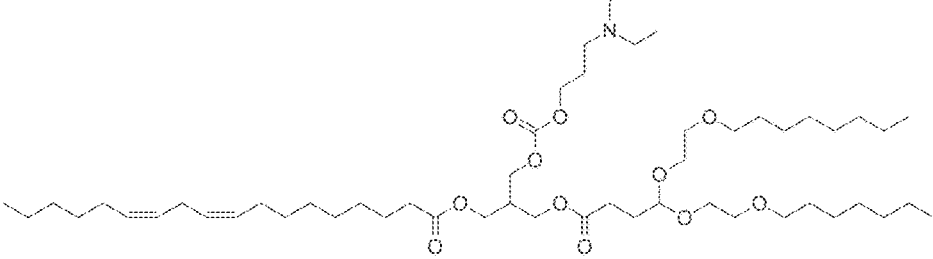
Figure 2:
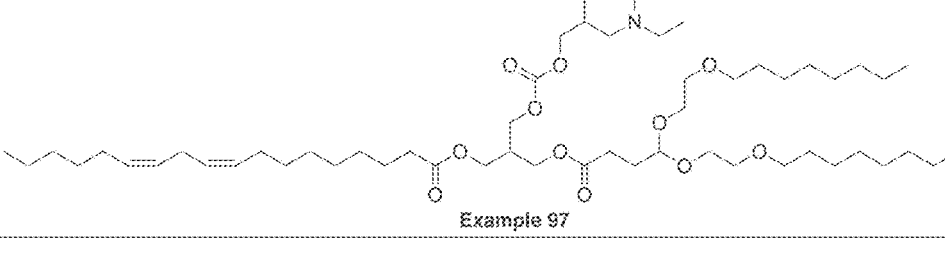
Figure 2:
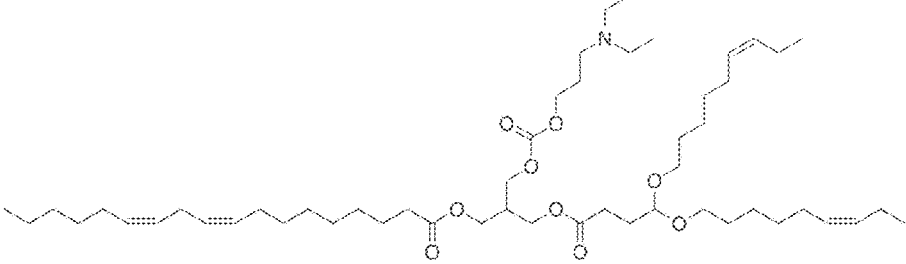
Figure 2:
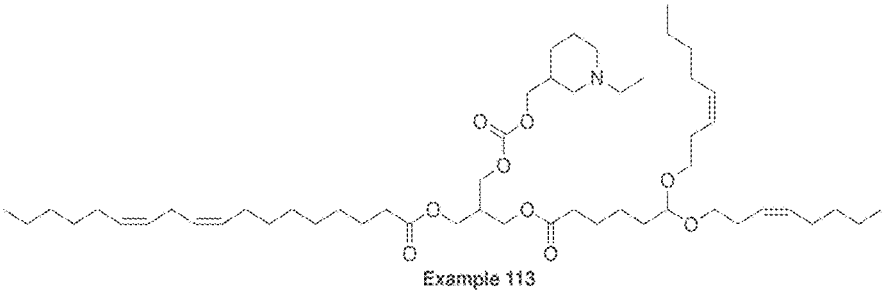
Figure 2:
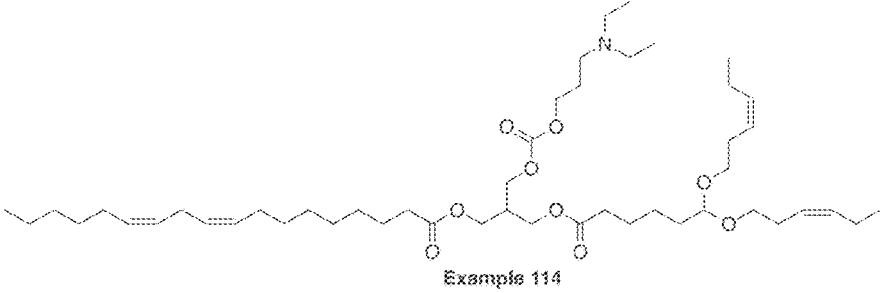
Figure 2:
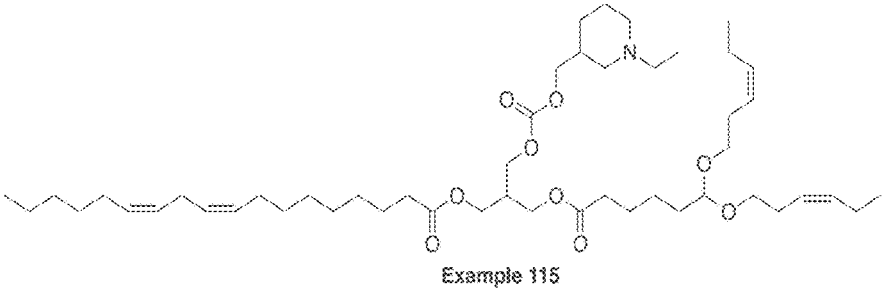
Figure 2:
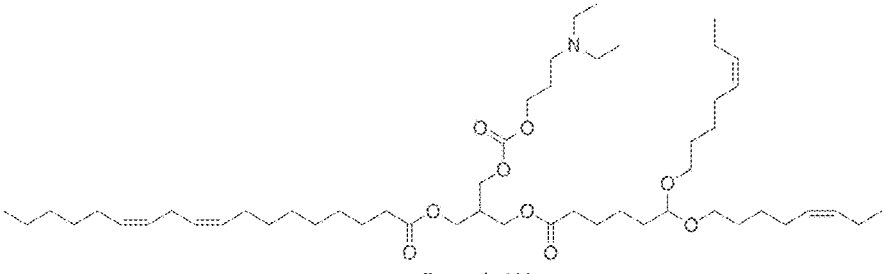
Figure 2:
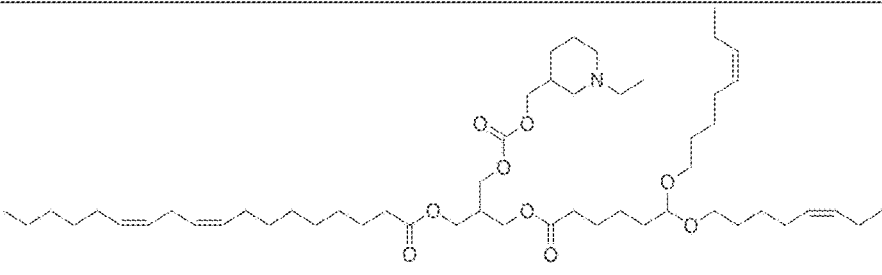
Figure 2:
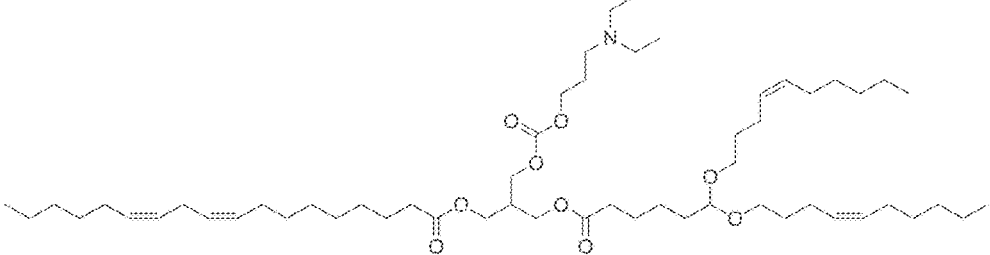
Figure 2:
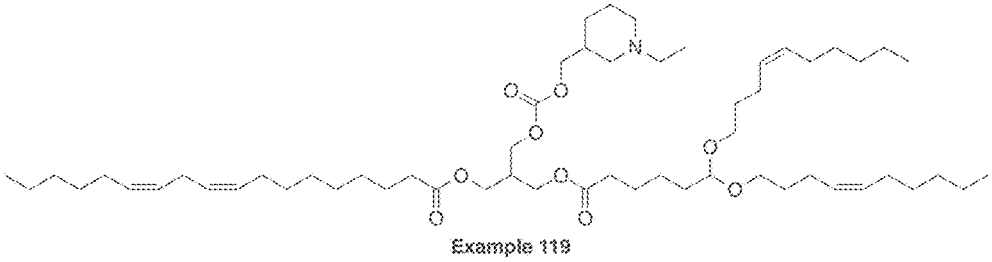
Figure 2:
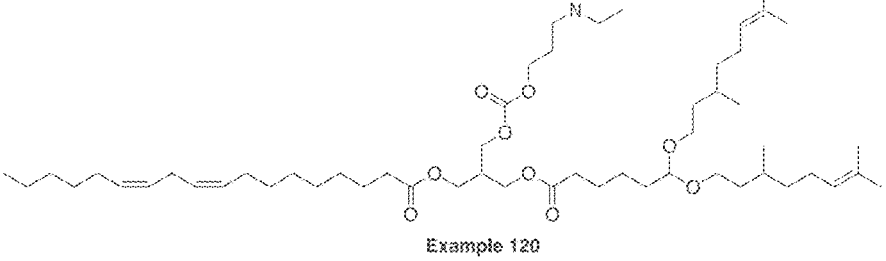
Figure 2:
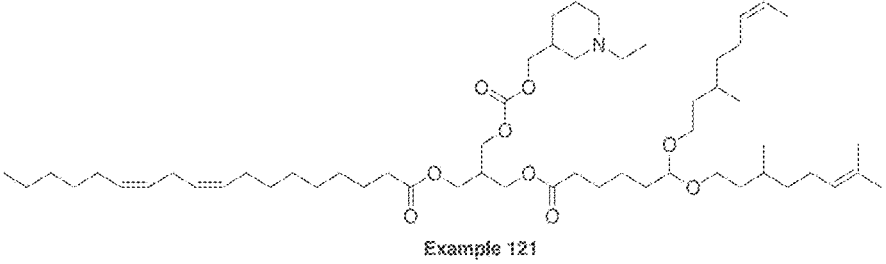
Figure 2:
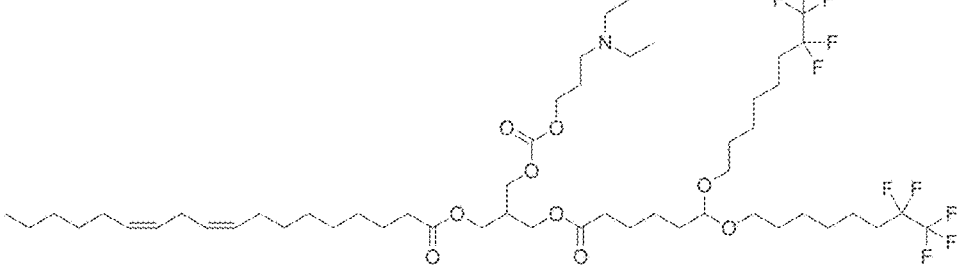
Figure 2:
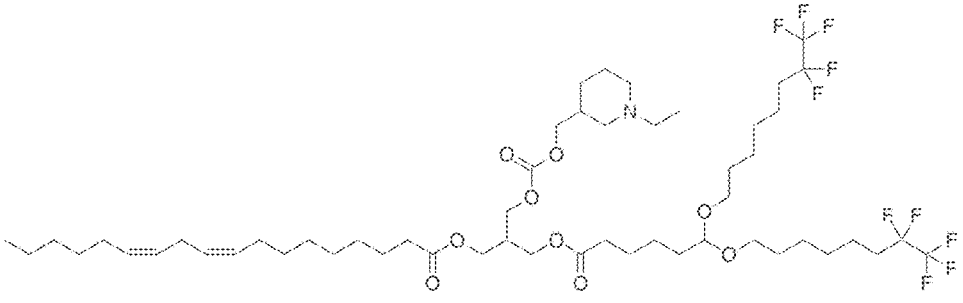
Figure 2:
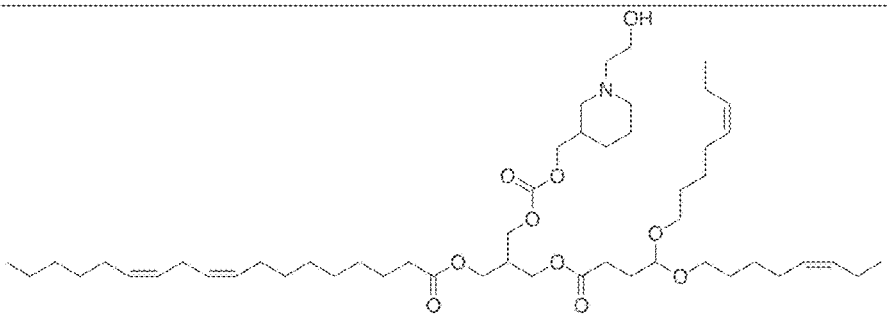
Figure 2:
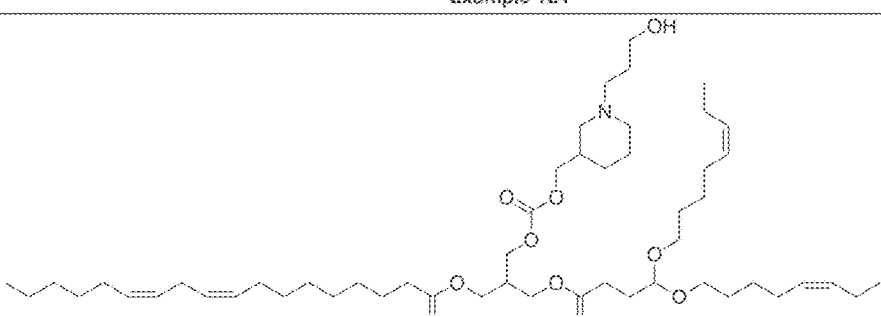
Figure 2:
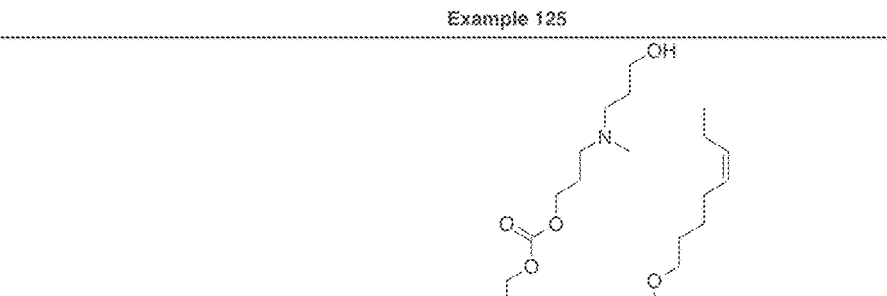
Figure 2:
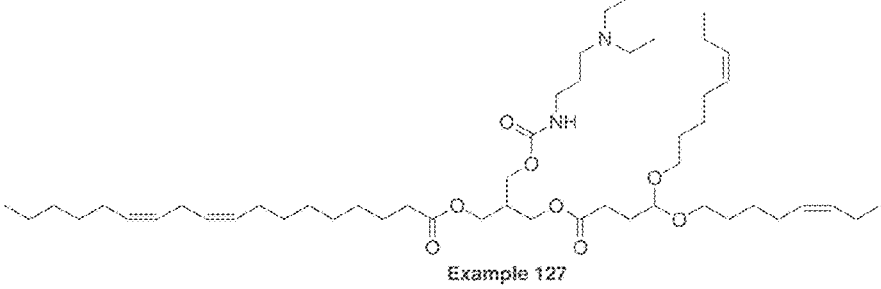
Figure 2:
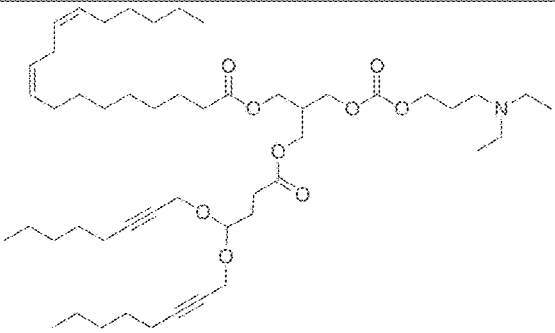
Figure 2:
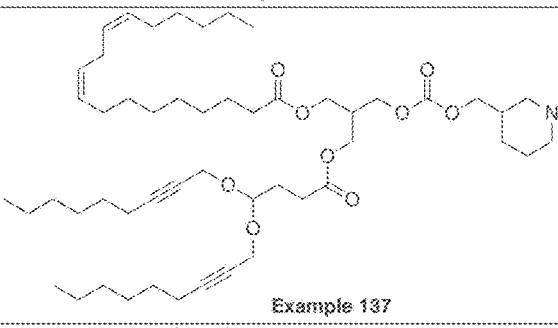
Figure 2:
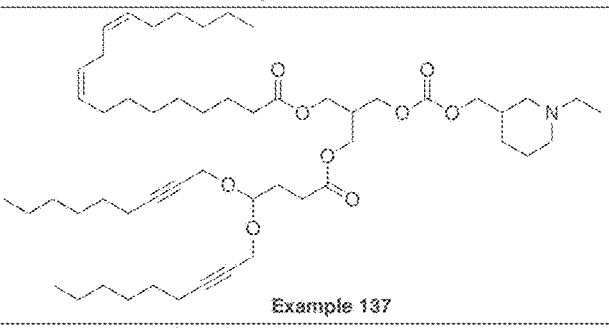
Figure 2:
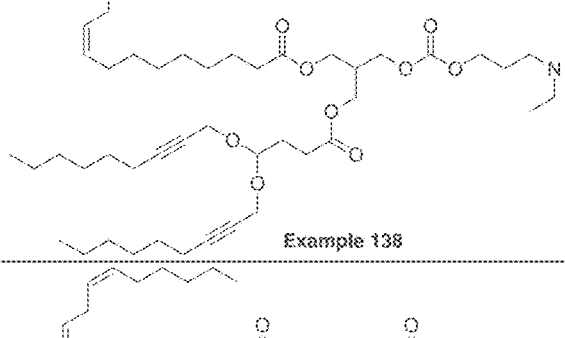
Figure 2:
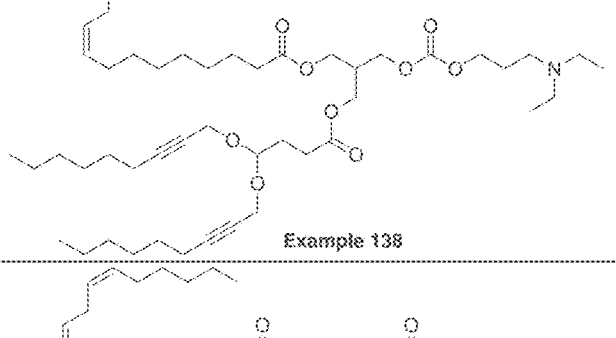
Figure 2:
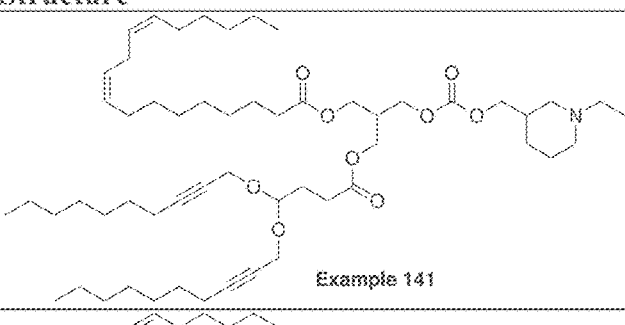
Figure 2:
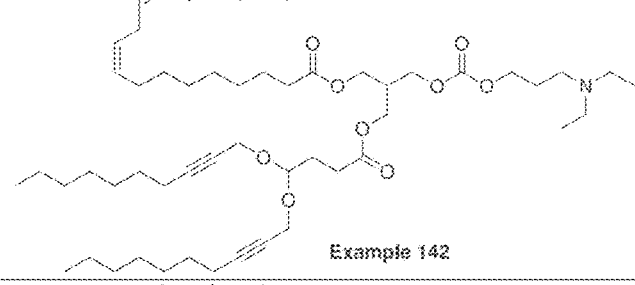
Figure 2:
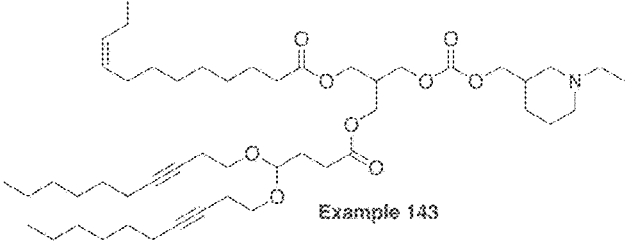
Figure 2:
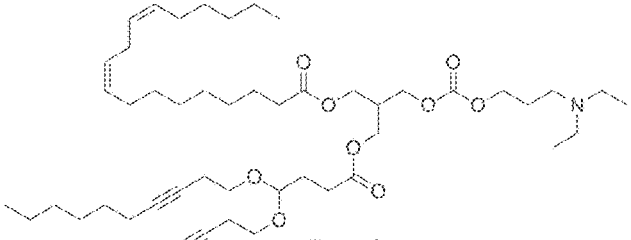
Figure 2:
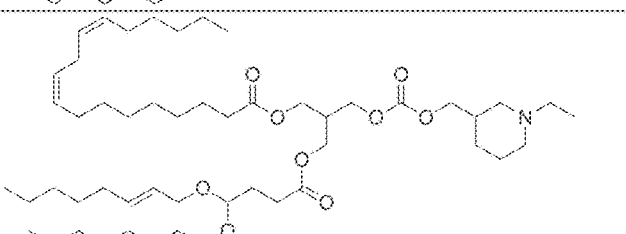

Unless defined otherwise, all technical and scientific terms used herein have the same meaning as is commonly understood by one of ordinary skill in the art. All patents, applications, published applications and other publications referenced herein are incorporated by reference in their entirety unless stated otherwise. In the event that there are a plurality of definitions for a term herein, those in this section prevail unless stated otherwise.

As used herein, any "R" or "X" group(s) such as, without limitation, $R^1$, $R^2$, $R^3$, $R^4$, $R^5$, $R^6$, $R^7$, $X^1$, $X^2$, $X^3$, $X^4$, $X^5$, $X^6$, $X^7$, $A^1$ and $A^2$ represent substituents that can be attached to the indicated atom(s). Such R, X and A groups may be referred to herein in a general way as "R" groups. An R group may be substituted or unsubstituted. If two "R" groups are said to "join together" it will be understood that the R groups and the atoms to which they are bound can form a cyclic structure such as a cycloalkyl, cycloalkenyl, aryl, heteroaryl or heterocycle. For example, without limitation, if $R^a$ and $R^b$ of an $NR^aR^b$ group are indicated to "join together," it means that they are covalently bonded to one another to form a ring:

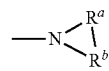

In addition, if two "R" groups "join together" with the atom(s) to which they are attached to form a ring as an alternative, the R groups are not limited to the variables or substituents defined previously.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more of the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, acylalkyl, hydroxy, alkoxy, alkoxyalkyl, aminoalkyl, amino acid, aryl, heteroaryl, heterocyclyl, aryl(alkyl), heteroaryl(alkyl), heterocyclyl(alkyl), hydroxyalkyl, acyl, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, azido, nitro, silyl, sulfenyl, sulfinyl, sulfonyl, haloalkyl, haloalkoxy, trihalomethanesulfonyl, trihalomethanesulfonamido, an amino, a mono-substituted amino group and a di-substituted amino group.

As used herein, "$C_a$ to $C_b$" in which "a" and "b" are integers refer to the number of carbon atoms in an alkyl, alkenyl or alkynyl group, or the number of carbon atoms in the ring of a cycloalkyl, cycloalkenyl, aryl, heteroaryl or heteroalicyclyl group. That is, the alkyl, alkenyl, alkynyl, ring(s) of the cycloalkyl, ring(s) of the cycloalkenyl, ring(s) of the aryl, ring(s) of the heteroaryl or ring(s) of the heteroalicyclyl can contain from "a" to "b", inclusive, carbon atoms. Thus, for example, a "$C_1$ to $C_4$ alkyl" group refers to all alkyl groups having from 1 to 4 carbons, that is, $CH_3-$, $CH_3CH_2-$, $CH_3CH_2CH_2-$, $(CH_3)_2CH-$, $CH_3CH_2CH_2CH_2-$, $CH_3CH_2CH(CH_3)-$ and $(CH_3)_3C-$. If no "a" and "b" are designated with regard to an alkyl, alkenyl, alkynyl, cycloalkyl, cycloalkenyl, aryl, heteroaryl or heteroalicyclyl group, the broadest range described in these definitions is to be assumed.

As used herein, "alkyl" refers to a straight or branched hydrocarbon chain that comprises a fully saturated (no double or triple bonds) hydrocarbon group. The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 6 carbon atoms. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl and hexyl. The alkyl group may be substituted or unsubstituted.

As used herein, "alkenyl" refers to an alkyl group that contains in the straight or branched hydrocarbon chain one or more double bonds. Examples of alkenyl groups include allenyl, vinylmethyl and ethenyl. An alkenyl group may be unsubstituted or substituted.

As used herein, "alkynyl" refers to an alkyl group that contains in the straight or branched hydrocarbon chain one or more triple bonds. Examples of alkynyls include ethynyl and propynyl. An alkynyl group may be unsubstituted or substituted.

As used herein, "cycloalkyl" refers to a completely saturated (no double or triple bonds) mono- or multi-cyclic hydrocarbon ring system. When composed of two or more rings, the rings may be joined together in a fused, bridged or spiro fashion. As used herein, the term "fused" refers to two rings which have two atoms and one bond in common. As used herein, the term "bridged cycloalkyl" refers to compounds wherein the cycloalkyl contains a linkage of one or more atoms connecting non-adjacent atoms. As used herein, the term "spiro" refers to two rings which have one atom in common and the two rings are not linked by a bridge. Cycloalkyl groups can contain 3 to 30 atoms in the ring(s), 3 to 20 atoms in the ring(s), 3 to 10 atoms in the ring(s), 3 to 8 atoms in the ring(s) or 3 to 6 atoms in the ring(s). A cycloalkyl group may be unsubstituted or substituted. Typical mono-cycloalkyl groups include, but are in no way limited to, cyclopropyl, cyclobutyl, cyclopentyl, cyclohexyl, cycloheptyl and cyclooctyl. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, bicyclo[2.1.1]heptane, adamantanyl, and norbornanyl, and examples of spiro cycloalkyl groups include spiro[3.3]heptane and spiro[4.5]decane.

As used herein, "cycloalkenyl" refers to a mono- or multi-cyclic hydrocarbon ring system that contains one or more double bonds in at least one ring; although, if there is more than one, the double bonds cannot form a fully delocalized pi-electron system throughout all the rings (otherwise the group would be "aryl," as defined herein). Cycloalkenyl groups can contain 3 to 10 atoms in the ring(s) or 3 to 8 atoms in the ring(s). When composed of two or more rings, the rings may be connected together in a fused fashion. A cycloalkenyl group may be unsubstituted or substituted.

As used herein, "aryl" refers to a carbocyclic (all carbon) monocyclic or multicyclic aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group, or a $C_6$ aryl group. Examples of aryl groups include, but are not limited to, benzene, naphthalene and azulene. An aryl group may be substituted or unsubstituted.

As used herein, "heteroaryl" refers to a monocyclic or multicyclic aromatic ring system (a ring system with fully delocalized pi-electron system) that contain(s) one, two, three or more heteroatoms, that is, an element other than carbon, including but not limited to, nitrogen, oxygen and sulfur. The number of atoms in the ring(s) of a heteroaryl group can vary. For example, the heteroaryl group can contain 4 to 14 atoms in the ring(s), 5 to 10 atoms in the ring(s) or 5 to 6 atoms in the ring(s). Furthermore, the term "heteroaryl" includes fused ring systems where two rings, such as at least one aryl ring and at least one heteroaryl ring, or at least two heteroaryl rings, share at least one chemical bond. Examples of heteroaryl rings include, but are not limited to, those described herein and the following: furan, furazan, thiophene, benzothiophene, phthalazine, pyrrole, oxazole, benzoxazole, 1,2,3-oxadiazole, 1,2,4-oxadiazole, thiazole, 1,2,3-thiadiazole, 1,2,4-thiadiazole, benzothiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, pteridine, quinoline, isoquinoline, quinazoline, quinoxaline, cinnoline and triazine. A heteroaryl group may be substituted or unsubstituted.

As used herein, "heterocyclyl" or "heteroalicyclyl" refers to three-, four-, five-, six-, seven-, eight-, nine-, ten-, up to 18-membered monocyclic, bicyclic, and tricyclic ring system wherein carbon atoms together with from 1 to 5 heteroatoms constitute said ring system. A heterocycle may optionally contain one or more unsaturated bonds situated in such a way, however, that a fully delocalized pi-electron system does not occur throughout all the rings. The heteroatom(s) is an element other than carbon including, but not limited to, oxygen, sulfur, and nitrogen. A heterocycle may further contain one or more carbonyl or thiocarbonyl functionalities, so as to make the definition include oxo-systems and thio-systems such as lactams, lactones, cyclic imides, cyclic thioimides and cyclic carbamates. When composed of two or more rings, the rings may be joined together in a fused or spiro fashion, as described herein with respect to "cycloalkyl." Additionally, any nitrogens in a heterocyclyl may be quaternized. Heterocyclyl or heteroalicyclic groups may be unsubstituted or substituted. Examples of such "heterocyclyl" or "heteroalicyclyl" groups include, but are not limited to, those described herein and the following 1,3-dioxin, 1,3-dioxane, 1,4-dioxane, 1,2-dioxolane, 1,3-dioxolane, 1,4-dioxolane, 1,3-oxathiane, 1,4-oxathiin, 1,3,4-oxadiazol-2(3H)-one, 1,2,3-oxadiazol-5(2H)-one, 1,3-oxathiolane, 1,3-dithiole, 1,3-dithiolane, 1,4-oxathiane, tetrahydro-1,4-thiazine, 2H-1,2-oxazine, 1,3-thiazinane, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, and 3,4-methylenedioxyphenyl).

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl and naphthylalkyl.

As used herein, "heteroaralkyl" and "heteroaryl(alkyl)" refer to a heteroaryl group connected, as a substituent, via a lower alkylene group. The lower alkylene and heteroaryl group of heteroalkyl may be substituted or unsubstituted. Examples include but are not limited to 2-thienylalkyl, 3-thienylalkyl, furylalkyl, thienylalkyl, pyrrolylalkyl, pyridylalkyl, isoxazolylalkyl, inidazolylalkyl and their benzo-fused analogs.

A "heteroalicyclyl(alkyl)" and "heterocyclyl(alkyl)" refer to a heterocyclic or a heteroalicyclylic group connected, as a substituent, via a lower alkylene group. The lower alkylene and heterocyclyl of a heteroalicyclyl(alkyl) may be substituted or unsubstituted. Examples include but are not limited tetrahydro-2H-pyran-4-yl(methyl), piperidin-4-yl(ethyl), piperidin-4-yl(propyl), tetrahydro-2H-thiopyran-4-yl (methyl), and 1,3-thiazinan-4-yl(methyl).

"Lower alkylene groups" are straight-chained —$CH_2$— tethering groups, forming bonds to connect molecular fragments via their terminal carbon atoms. Examples include but are not limited to methylene (—$CH_2$—), ethylene (—$CH_2CH_2$—), propylene (—$CH_2CH_2CH_2$—), and butylene (—$CH_2CH_2CH_2CH_2$—). A lower alkylene group can be substituted by replacing one or more hydrogen of the lower alkylene group with a substituent(s) listed under the definition of "substituted."

As used herein, "alkoxy" refers to a group of the formula —OR wherein R is an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl) as defined herein. A non-limiting list of alkoxys are methoxy, ethoxy, n-propoxy, 1-methylethoxy (isopropoxy), cyclopropoxy, n-butoxy, iso-butoxy, sec-butoxy, tert-butoxy, cyclobutoxy, phenoxy and benzoxy. An alkoxy may be substituted or unsubstituted.

As used herein, "acyl" refers to a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl) connected, as substituents, via a carbonyl group. Examples include formyl, acetyl, propanoyl, benzoyl and acryl. An acyl may be substituted or unsubstituted.

As used herein, "acylalkyl" refers to an acyl connected, as a substituent, via a lower alkylene group. Examples include aryl-C(=O)—$(CH_2)_n$— and heteroaryl-C(=O)—$(CH_2)_n$—, where n is an integer in the range of 1 to 6.

As used herein, "alkoxyalkyl" refers to an alkoxy group connected, as a substituent, via a lower alkylene group. Examples include $C_{1-4}$, alkyl-O—$(CH_2)_n$—, wherein n is an integer in the range of 1 to 6.

As used herein, "aminoalkyl" refers to an optionally substituted amino group connected, as a substituent, via a lower alkylene group. Examples include $H_2N(CH_2)_n$—, wherein n is an integer in the range of 1 to 6.

As used herein, "hydroxyalkyl" refers to an alkyl group in which one or more of the hydrogen atoms are replaced by a hydroxy group. Exemplary hydroxyalkyl groups include but are not limited to, 2-hydroxyethyl, 3-hydroxypropyl, 2-hydroxypropyl, and 2,2-dihydroxyethyl. A hydroxyalkyl may be substituted or unsubstituted.

As used herein, "haloalkyl" refers to an alkyl group in which one or more of the hydrogen atoms are replaced by a halogen (e.g., mono-haloalkyl, di-haloalkyl and tri-haloalkyl). Such groups include but are not limited to, chloromethyl, fluoromethyl, difluoromethyl, trifluoromethyl, chlorofluoroalkyl, chloro-difluoroalkyl and 2-fluoroisobutyl. A haloalkyl may be substituted or unsubstituted.

As used herein, "haloalkoxy" refers to an alkoxy group in which one or more of the hydrogen atoms are replaced by a halogen (e.g., mono-haloalkoxy, di-haloalkoxy and tri-haloalkoxy). Such groups include but are not limited to, chloromethoxy, fluoromethoxy, difluoromethoxy, trifluoromethoxy, chloro-fluoroalkyl, chloro-difluoroalkoxy and 2-fluoroisobutoxy. A haloalkoxy may be substituted or unsubstituted.

A "sulfenyl" group refers to an "—SR" group in which R can be hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A sulfenyl may be substituted or unsubstituted.

A "sulfinyl" group refers to an "—S(=O)—R" group in which R can be the same as defined with respect to sulfenyl. A sulfinyl may be substituted or unsubstituted.

A "sulfonyl" group refers to an "SO$_2$R" group in which R can be the same as defined with respect to sulfenyl. A sulfonyl may be substituted or unsubstituted.

An "O-carboxy" group refers to a "RC(=O)O—" group in which R can be hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. An O-carboxy may be substituted or unsubstituted.

The terms "ester" and "C-carboxy" refer to a "—C(=O) OR" group in which R can be the same as defined with respect to O-carboxy. An ester and C-carboxy may be substituted or unsubstituted.

A "thiocarbonyl" group refers to a "—C(=S)R" group in which R can be the same as defined with respect to O-carboxy. A thiocarbonyl may be substituted or unsubstituted.

A "trihalomethanesulfonyl" group refers to an "X$_3$CSO$_2$—" group wherein each X is a halogen.

A "trihalomethanesulfonamido" group refers to an "X$_3$CS(O)$_2$N(R$_A$)—" group wherein each X is a halogen, and R$_A$ hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl).

The term "amino" as used herein refers to a —NH$_2$ group.

As used herein, the term "hydroxy" refers to a —OH group.

A "cyano" group refers to a "—CN" group.

The term "azido" as used herein refers to a —N$_3$ group.

An "isocyanato" group refers to a "—NCO" group.

A "thiocyanato" group refers to a "—CNS" group.

An "isothiocyanato" group refers to an "—NCS" group.

A "carbonyl" group refers to a C=O group.

An "S-sulfonamido" group refers to a "—SO$_2$N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An S-sulfonamido may be substituted or unsubstituted.

An "N-sulfonamido" group refers to a "RSO$_2$N(R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-sulfonamido may be substituted or unsubstituted.

An "O-carbamyl" group refers to a "—OC(=O)N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-carbamyl may be substituted or unsubstituted.

An "N-carbamyl" group refers to an "ROC(=O)N(R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-carbamyl may be substituted or unsubstituted.

An "O-thiocarbamyl" group refers to a "—OC(=S)—N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-thiocarbamyl may be substituted or unsubstituted.

An "N-thiocarbamyl" group refers to an "ROC(=S)N(R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-thiocarbamyl may be substituted or unsubstituted.

A "C-amido" group refers to a "—C(=O)N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A C-amido may be substituted or unsubstituted.

An "N-amido" group refers to a "RC(=O)N(R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-amido may be substituted or unsubstituted.

A "urea" group refers to "N(R)—C(=O)—NR$_A$R$_B$ group in which R can be hydrogen or an alkyl, and R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A urea may be substituted or unsubstituted.

An "oxime" group refers to "—C(=N—OH)R$_A$" in which R$_A$ can be independently an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An oxime may be substituted or unsubstituted.

An "acyl hydrozone" refers to "—C(=N—NH-acyl)-R$_A$." in which the acyl portion has the structure as provided herein for "acyl", and R$_A$ can be independently an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An acyl hydrozone may be substituted or unsubstituted.

A "hydrazine" refers to "—NHNR$_A$R$_B$" in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A hydrazine may be substituted or unsubstituted.

The term "halogen atom" or "halogen" as used herein, means any one of the radio-stable atoms of column 7 of the Periodic Table of the Elements, such as, fluorine, chlorine, bromine and iodine.

As used herein, "$\rule{1cm}{0.4pt}$" indicates a single or double bond, unless stated otherwise.

Where the numbers of substituents is not specified (e.g. haloalkyl), there may be one or more substituents present. For example "haloalkyl" may include one or more of the same or different halogens. As another example, "$C_1$-$C_3$ alkoxyphenyl" may include one or more of the same or different alkoxy groups containing one, two or three atoms.

As used herein, the abbreviations for any protective groups, amino acids and other compounds, are, unless indicated otherwise, in accord with their common usage, recognized abbreviations, or the IUPAC-IUB Commission on Biochemical Nomenclature (See, Biochem. 11:942-944 (1972)).

The terms "protecting group" and "protecting groups" (and the abbreviation "PG") as used herein refer to any atom or group of atoms that is added to a molecule in order to prevent existing groups in the molecule from undergoing unwanted chemical reactions. Examples of protecting group moieties are described in T. W. Greene and P. G. M. Wuts, *Protective Groups in Organic Synthesis,* 3. Ed. John Wiley & Sons, 1999, and in J. F. W. McOmie, *Protective Groups in Organic Chemistry* Plenum Press, 1973, both of which are hereby incorporated by reference for the limited purpose of disclosing suitable protecting groups. The protecting group moiety may be chosen in such a way, that they are stable to certain reaction conditions and readily removed at a convenient stage using methodology known from the art. A non-limiting list of protecting groups include benzyl; substituted benzyl; alkylcarbonyls and alkoxycarbonyls (e.g., t-butoxycarbonyl (BOC), acetyl, or isobutyryl), arylalkylcarbonyls and arylalkoxycarbonyls (e.g., benzyloxycarbonyl), substituted methyl ether (e.g. methoxymethyl ether); substituted ethyl ether; a substituted benzyl ether; tetrahydropyranyl ether; silyls (e.g., trimethylsilyl, triethylsilyl, triisopropylsilyl, t-butyldimethylsilyl, tri-iso-propylsilyloxymethyl, [2-(trimethylsilyl)ethoxy]methyl or t-butyldiphenylsilyl); esters (e.g. benzoate ester); carbonates (e.g. methoxymethylcarbonate), sulfonates (e.g. tosylate or mesylate), acyclic ketal (e g. dimethyl acetal); cyclic ketals (e.g., 1,3-dioxane, 1,3-dioxolanes, and those described herein); acyclic acetal, cyclic acetal (e.g., those described herein), acyclic hemiacetal; cyclic hemiacetal; cyclic dithioketals (e.g., 1,3-dithiane or 1,3-dithiolane); orthoesters (e.g., those described herein) and triarylmethyl groups (e g., trityl; monomethoxytrityl (MMTr), 4,4'-dimethoxytrityl (DMTr), 4,4',4"-trimethoxytrityl (TMTr), and those described herein).

The term "leaving group" (and the abbreviation "LG") as used herein refers to any atom or moiety that is capable of being displaced by another atom or moiety in a chemical reaction. More specifically, in some embodiments, "leaving group" refers to the atom or moiety that is displaced in a nucleophilic substitution reaction. In some embodiments, "leaving groups" are any atoms or moieties that are conjugate bases of strong acids. Examples of suitable leaving groups include, but are not limited to, tosylates, mesylates, trifluoroacetates and halogens (e.g., I, Br, and Cl). Non-limiting characteristics and examples of leaving groups can be found, for example in *Organic Chemistry,* 2d ed., Francis Carey (1992), pages 328-331; *Introduction to Organic Chemistry,* 2d ed., Andrew Streitwieser and Clayton Heathcock (1981), pages 169-171; and *Organic Chemistry,* $5^{th}$ ed., John McMurry (2000), pages 398 and 408, all of which are incorporated herein by reference for the limited purpose of disclosing characteristics and examples of leaving groups.

The term "pharmaceutically acceptable salt" refers to a salt of a compound that does not cause significant irritation to an organism to which it is administered and does not abrogate the biological activity and properties of the compound. In some embodiments, the salt is an acid addition salt of the compound. Pharmaceutical salts can be obtained by reacting a compound with inorganic acids such as hydrohalic acid (e.g., hydrochloric acid or hydrobromic acid), sulfuric acid, nitric acid and phosphoric acid. Pharmaceutical salts can also be obtained by reacting a compound with an organic acid such as aliphatic or aromatic carboxylic or sulfonic acids, for example formic, acetic, succinic, lactic, malic, tartaric, citric, ascorbic, nicotinic, methanesulfonic, ethanesulfonic, p-toluenesulfonic, salicylic or naphthalenesulfonic acid. Pharmaceutical salts can also be obtained by reacting a compound with a base to form a salt such as an ammonium salt, an alkali metal salt, such as a sodium or a potassium salt, an alkaline earth metal salt, such as a calcium or a magnesium salt, a salt of organic bases such as dicyclohexylamine, N-methyl-D-glucamine, tris(hydroxymethyl)methylamine, $C_1$-$C_7$ alkylamine, cyclohexylamine, triethanolamine, ethylenediamine, and salts with amino acids such as arginine and lysine.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like, the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof, and use of terms like 'preferably,' 'preferred,' 'desired,' or 'desirable,' and words of similar meaning should not be understood as implying that certain features are critical, essential, or even important to the structure or function, but instead as merely intended to highlight alternative or additional features that may or may not be utilized in a particular embodiment. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless the context indicates otherwise. Similarly, a group of items linked with the conjunction 'or' should not be read as requiring mutual exclusivity among that group, but rather should be read as 'and/or' unless the context indicates otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure, enantiomerically enriched, racemic mixture, diastereomerically pure, diastereomerically enriched, or a stereoisomeric mixture. In addition it is understood that, in any compound described herein having one or more double bond(s) generating geometrical isomers that can be defined as E or Z, each double bond may independently be E or Z, or a mixture thereof.

Likewise, it is understood that, in any compound described, all tautomeric forms are also intended to be included.

It is to be understood that where compounds disclosed herein have unfilled valencies, then the valencies are to be filled with hydrogens or isotopes thereof, e.g., hydrogen-1 (protium) and hydrogen-2 (deuterium).

It is understood that the compounds described herein can be labeled isotopically. Substitution with isotopes such as deuterium may afford certain therapeutic advantages resulting from greater metabolic stability, such as, for example, increased in vivo half-life or reduced dosage requirements. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium) and hydrogen-2 (deuterium). Thus, reference herein to a compound encompasses all potential isotopic forms unless the context clearly dictates otherwise.

It is understood that the methods and combinations described herein include crystalline forms (also known as polymorphs, which include the different crystal packing arrangements of the same elemental composition of a compound), amorphous phases, salts, solvates, and hydrates. In some embodiments, the compounds described herein exist in solvated forms with pharmaceutically acceptable solvents such as water, ethanol, or the like. In other embodiments, the compounds described herein exist in unsolvated form. Solvates contain either stoichiometric or non-stoichiometric amounts of a solvent, and may be formed during the process of crystallization with pharmaceutically acceptable solvents such as water, ethanol, or the like. Hydrates are formed when the solvent is water, or alcoholates are formed when the solvent is alcohol. In addition, the compounds provided herein can exist in unsolvated as well as solvated forms. In general, the solvated forms are considered equivalent to the unsolvated forms for the purposes of the compounds and methods provided herein.

Where a range of values is provided, it is understood that the upper and lower limit, and each intervening value between the upper and lower limit of the range is encompassed within the embodiments.

As used herein, an "RNA" refers to a ribonucleic acid that may be naturally or non-naturally occurring. For example, an RNA may include modified and/or non-naturally occurring components such as one or more nucleobases, nucleosides, nucleotides, or linkers. An RNA may include a cap structure, a chain terminating nucleoside, a stem loop, a polyA sequence, and/or a polyadenylation signal. An RNA may have a nucleotide sequence encoding a polypeptide of interest. For example, an RNA may be a messenger RNA (mRNA). Translation of an mRNA encoding a particular polypeptide, for example, in vivo translation of an mRNA inside a mammalian cell, may produce the encoded polypeptide. RNAs may be selected from the nonlimiting group consisting of small interfering RNA (siRNA), microRNA (miRNA), Dicer-substrate RNA (dsRNA), small hairpin RNA (shRNA), mRNA, single-guide RNA (sgRNA), cas9 mRNA, and mixtures thereof.

The terms "polypeptide", "peptide", and "protein", may be used interchangeably to refer a string of at least three amino acids linked together by peptide bonds. Peptide may refer to an individual peptide or a collection of peptides. Peptides can contain natural amino acids, non-natural amino acids (i.e., compounds that do not occur in nature but that can be incorporated into a polypeptide chain), and/or amino acid analogs. Also, one or more of the amino acids in a peptide may be modified, for example, by the addition of a chemical entity such as a carbohydrate group, a phosphate group, a farnesyl group, an isofarnesyl group, a fatty acid group, a linker for conjugation, functionalization, or other modification, etc.. Modifications may include cyclization of the peptide, the incorporation of D-amino acids, etc.

As used herein, the terms "treat," "treating," "treatment" and "therapeutic use" refer to the elimination, reduction or amelioration of one or more symptoms of a disease or disorder. As used herein, a "therapeutically effective amount" refers to that amount of a therapeutic agent sufficient to mediate a clinically relevant elimination, reduction or amelioration of such symptoms. An effect is clinically relevant if its magnitude is sufficient to impact the health or prognosis of a recipient subject. A therapeutically effective amount may refer to the amount of therapeutic agent sufficient to delay or minimize the onset of disease, e.g., delay or minimize the spread of cancer. A therapeutically effective amount may also refer to the amount of the therapeutic agent that provides a therapeutic benefit in the treatment or management of a disease.

The compositions described herein are preferably provided in unit dosage form. As used herein, a "unit dosage form" is a composition containing an amount of a compound or composition that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation. As used herein, the term "prophylactic agent" refers to an agent that can be used in the prevention of a disorder or disease prior to the detection of any symptoms of such disorder or disease. A "prophylactically effective" amount is the amount of prophylactic agent sufficient to mediate such protection. A prophylactically effective amount may also refer to the amount of the prophylactic agent that provides a prophylactic benefit in the prevention of disease.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. The skilled artisan will appreciate that oral and nasal compositions comprise compositions that are administered by inhalation, and made using available methodologies. Depending upon the particular route of administration desired, a variety of pharmaceutically-acceptable carriers well-known in the art may be used Pharmaceutically-acceptable carriers include, for example, solid or liquid fillers, diluents, hydrotropes, surface-active agents, and encapsulating substances. Optional pharmaceutically-active materials may be included, which do not substantially interfere with the inhibitory activity of the compound. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms. Tablets (1989); and Ansel, Introduction to Pharmaceutical Dosage Forms 8th Edition (2004).

As used herein, the terms "individual," "host," "subject," and "patient" are used interchangeably herein, and refer to a mammal, including, but not limited to, humans, rodents, such as mice and rats, and other laboratory animals.

As used herein, the term "pharmaceutically acceptable carrier" encompasses any of the standard pharmaceutical carriers, such as a phosphate buffered saline solution, water and emulsions such as an oil/water or water/oil emulsion, and various types of wetting agents.

The term "PEG-lipid" refers to a lipid modified with polyethylene glycol. Exemplary PEG-lipids, include but are not limited to $C_{14}PEG_{350}$, $C_{14}PEG_{1000}$, $C_{14}PEG_{2000}$, $C_{14}PEG_{3000}$, and $C_{18}PEG_{2000}$.

The term "oligonucleotide" refers to short DNA, RNA, or DNA/RNA molecules or oligomers containing a relatively small number of nucleotides.

A. Lipid Nanoparticles

Effective, targeted delivery of biologically active substances such as small molecule drugs, proteins, and nucleic acids is a continuing challenge in the field of medicine. The delivery of nucleic acids specifically is made difficult by the relative instability and low cell permeability of nucleic acids. It has been discovered that lipid nanoparticles having ionizable lipids as described herein can more effectively deliver nucleic acids to specific tissues in the body. In one embodiment, lipid nanoparticles can be formulated by mixing nucleic acids with ionizable lipids, PEG-lipids, phospholipids, cholesterol, and optionally a nucleic acid. In some embodiments, the lipid nanoparticles do not contain a targeting ligand. In some embodiments, the disclosed lipid nanoparticles preferentially target T cells over hepatocytes in the absence of a targeting ligand.

Lipid nanoparticle sizes vary. In one embodiment, the lipid nanoparticles can have an average hydrodynamic diameter from between about 30 to about 170 nm. The lipid nanoparticles can have an average hydrodynamic diameter that is about 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, or any range having endpoints defined by any two of the aforementioned values. For example, in an embodiment the nanoparticles have an average hydrodynamic diameter from between 50 nm to 100 nm.

1. Compounds

Some embodiments described herein relate to a compound of Formula (I):

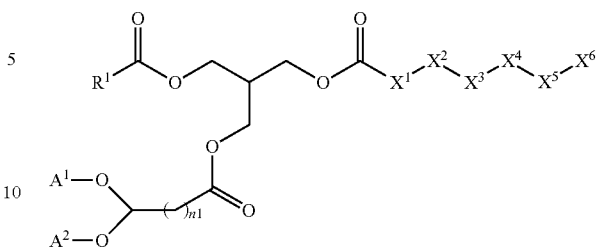

In various embodiments, the compound of Formula (I) is an ionizable lipid as described elsewhere herein. In various embodiments, $R^1$ in Formula (I) is $C_9$-$C_{20}$ alkyl or $C_9$-$C_{20}$ alkenyl with 1-3 units of unsaturation. For example, in some embodiments $R^1$ in Formula (I) is $C_9$-$C_{20}$ alkenyl with 2 units of unsaturation, such as a $C_{17}$ alkenyl group of the formula

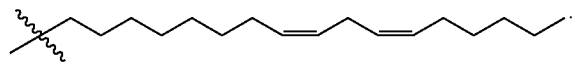

In various embodiments, $X^1$ and $X^2$ in Formula (I) are each independently absent or selected from —O—, —$NR^2$—, and

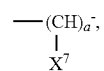

wherein $R^2$ is hydrogen or $C_1$-$C_6$ alkyl, a is an integer between 1 and 6, $X^7$ is independently hydrogen, hydroxyl or —$NR^6R^7$, and $R^6$ and $R^7$ are each independently hydrogen or $C_1$-$C_6$ alkyl; or alternatively $R^6$ and $R^7$ join together with the nitrogen to which they are bound to form a 4- to 7-membered heterocyclyl optionally substituted with 1 or 2 $C_1$-$C_6$ alkyl groups, wherein the heterocyclyl optionally includes an additional heteroatom selected from oxygen, sulfur, and nitrogen. In some embodiments, $X^1$ is absent, $X^2$ is absent, or both $X^1$ and $X^2$ are absent. As described elsewhere herein, $X^1$—$X^2$—$X^3$—$X^4$ does not contain any oxygen-oxygen, oxygen-nitrogen or nitrogen-nitrogen bonds to one another. Accordingly, $X^1$ and $X^2$ cannot both be —O— and cannot both be —$NR^2$—. Similarly, $X^1$ and $X^2$ cannot be —O— and —$NR^2$—, respectively, nor —$NR^2$— and —O—, respectively.

In various embodiments, $X^1$ is —O—. In various embodiments, $X^2$ is —O—. In some embodiments, $X^1$ is

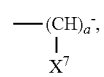

such as —$(CH_2)_a$—, —CH(OH)— or —$(CH)_{n-1}$CH(OH)—. In some embodiments, $X^2$ is

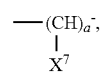

such as —$(CH_2)_n$—, —CH(OH)— or —$(CH_2)_{n-1}$CH(OH)—. In various embodiments, each a is independently 1, 2, 3, 4, 5 or 6. In various embodiments, $X^1$ is —$NR^6R^7$. In various embodiments, $X^2$ is —$NR^6R^7$. In some embodiments, $R^6$ is hydrogen or $C_1$-$C_6$ alkyl. In some embodiments, $R^7$ is hydrogen or $C_1$-$C_6$ alkyl. In other embodiments, $R^6$ and $R^7$ join together with the nitrogen to which they are bound to form a 4- to 7-membered heterocyclyl optionally substituted with 1 or 2 $C_1$-$C_6$ alkyl groups. In some embodiments, the 4- to 7-membered heterocyclyl formed by the joining together of $R^6$ and $R^7$ optionally includes an additional heteroatom selected from oxygen, sulfur, and nitrogen.

In various embodiments, $X^3$ and $X^4$ in Formula (I) are each independently absent or selected from:
(1) 4- to 8-membered heterocyclyl optionally substituted with 1 or 2 $C_1$-$C_6$ alkyl groups;
(2) 5- to 6-membered heteroaryl optionally substituted with 1 or 2 $C_1$-$C_6$ alkyl groups,
(3) 5- to 6-membered aryl optionally substituted with 1 or 2 $C_1$-$C_6$ alkyl groups;
(4) 4- to 7-membered cycloalkyl optionally substituted with 1 or 2 $C_1$-$C_6$ alkyl groups;
(5) —O—; or
(6) —$NR^3$—, wherein each $R^3$ is independently a hydrogen atom or $C_1$-$C_6$ alkyl.

In some embodiments, $X^3$ is absent, $X^4$ is absent, or both $X^3$ and $X^4$ are absent. As described elsewhere herein, $X^1$—$X^2$—$X^3$—$X^4$ does not contain any oxygen-oxygen, oxygen-nitrogen or nitrogen-nitrogen bonds to one another. Accordingly, $X^2$ and $X^3$ cannot both be —O—. When $X^2$ is —O— or —$NR^2$— then $X^3$ cannot be —$NR^3$—. Similarly, when $X^3$ is —O— or —$NR^3$— then $X^2$ cannot be —$NR^2$—. Likewise. $X^3$ and $X^4$ cannot both be —O— and cannot both be —$NR^3$—. Similarly, $X^3$ and $X^4$ cannot be —O— and —$NR^3$—, respectively, nor —$NR^3$— and —O—, respectively.

In various embodiments, $X^3$ and $X^4$ in Formula (I) are each independently a 4- to 8-membered heterocyclyl optionally substituted with 1 or 2 $C_1$-$C_6$ or $C_1$-$C_3$ alkyl groups. For example, in various embodiments $X^3$ and $X^4$ are each independently azetidinyl, methylazetidinyl, pyrrolidinyl, methylpyrrolidinyl, piperidinyl, methylpiperidinyl, piperazinyl, methylpiperazinyl, dimethylpiperazinyl, morpholinyl, diazepanyl, methyldiazepanyl, octahydro-2H-quinolizinyl, azabicyclo[3.2.1]octyl, methyl-azabicyclo[3.2.1]octyl, diazaspiro[3.5]nonyl or methyldiazaspiro[3.5]nonyl.

In various embodiments, $X^3$ and $X^4$ in Formula (I) are each independently a 5- to 6-membered heteroaryl optionally substituted with 1 or 2 $C_1$-$C_6$ or $C_1$-$C_3$ alkyl groups. For example, in various embodiments $X^3$ and $X^4$ are each independently pyrrolyl, methylpyrrolyl, imidazolyl, methylimidazolyl, pyridinyl, or methylpyridinyl.

In various embodiments, $X^3$ and $X^4$ in Formula (I) are each independently a 5- to 6-membered aryl optionally substituted with 1 or 2 $C_1$-$C_6$ or $C_1$-$C_3$ alkyl groups. For example, in various embodiments $X^3$ and $X^4$ are each independently phenyl, methylphenyl, naphthyl or methylnaphthyl.

In various embodiments, $X^3$ and $X^4$ in Formula (I) are each independently a 4- to 7-membered cycloalkyl optionally substituted with 1 or 2 $C_1$-$C_6$ or $C_1$-$C_3$ alkyl groups. For example, in various embodiments $X^3$ and $X^4$ are each independently cyclopentyl, methylcyclopentyl, cyclohexyl, or methylcyclohexyl.

In various embodiments, $X^3$ in Formula (I) is —O—. In other embodiments, $X^4$ in Formula (I) is —O— In various embodiments, $X^3$ is —$NR^3$—, wherein $R^3$ is a hydrogen atom or $C_1$-$C_6$ alkyl, such as a $C_1$-$C_3$ alkyl. For example, in various embodiments $X^3$ is —$N(CH_3)$—, —$N(CH_2CH_3)$—, or $N(CH_2CH_2CH_3)$—. In other embodiments, $X^4$ is —$NR^3$—, wherein $R^3$ is a hydrogen atom or $C_1$-$C_6$ alkyl, such as a $C_1$-$C_3$ alkyl. For example, in various embodiments $X^4$ is —$N(CH_3)$—, —$N(CH_2CH_3)$—, or $N(CH_2CH_2CH_3)$—.

In various embodiments, $X^5$ in Formula (I) is —$(CH_2)_b$—, wherein b is an integer between 0 and 6. In some embodiments, b is 0, in which case $X^5$ is absent. In other embodiments, b is 1, 2, 3, 4, 5 or 6.

In various embodiments, $X^6$ in Formula (I) is hydrogen, $C_1$-$C_6$ alkyl, 5- to 6-membered heteroaryl optionally substituted with 1 or 2 $C_1$-$C_6$ alkyl groups, or —$NR^4R^5$. In some embodiments, $R^4$ and $R^5$ are each independently hydrogen or $C_1$-$C_6$ alkyl. Alternatively, in other embodiments $R^4$ and $R^5$ join together with the nitrogen to which they are bound to form a 4- to 7-membered heterocyclyl optionally substituted with 1 or 2 $C_1$-$C_6$ alkyl groups, wherein the 4- to 7-membered heterocyclyl optionally includes an additional heteroatom selected from oxygen, sulfur, and nitrogen.

In various embodiments of Formula (I), at least one of $X^1$, $X^2$, $X^3$, $X^4$, and $X^5$ is present. For example, in various embodiments at least two of $X^1$, $X^2$, $X^3$, $X^4$, and $X^5$ are present in Formula (I). In other embodiments, at least three of $X^1$, $X^2$, $X^3$, $X^4$, and $X^5$ are present in Formula (I). For example, in some embodiments, at least four of $X^1$, $X^2$, $X^3$, $X^4$, and $X^5$ are present in Formula (I). In other embodiments, all of $X^1$, $X^2$, $X^3$, $X^4$, and $X^5$ are present in Formula (I).

In some embodiments, $X^6$ is hydrogen. In other embodiments, $X^6$ is $C_1$-$C_6$ alkyl, such as $C_1$-$C_3$ alkyl (e.g., methyl, ethyl or propyl). In other embodiments, $X^6$ is 5- to 6-membered heteroaryl optionally substituted with 1 or 2 $C_1$-$C_6$ alkyl groups. For example, in various embodiments $X^6$ is pyrrolyl, methylpyrrolyl, imidazolyl, methylimidazolyl, pyridinyl, or methylpyridinyl. In other embodiments, $X^6$ is —$NR^4R^5$. For example, in some embodiments $X^6$ is —$NH_2$, —$NHCH_3$, —$NHCH_2CH_3$, —$NHCH_2CH_2CH_3$, —$N(CH_3)_2$, —$N(CH_2CH_3)_2$, or —$N(CH_2CH_2CH_3)_2$. Alternatively, in other embodiments, $R^4$ and $R^5$ join together with the nitrogen to which they are bound to form a 4- to 7-membered heterocyclyl. The 4- to 7-membered heterocyclyl can be optionally substituted with 1 or 2 $C_1$-$C_6$ alkyl groups, such as $C_1$-$C_3$ alkyl, and/or the 4- to 7-membered heterocyclyl can optionally include an additional heteroatom selected from oxygen, sulfur, and nitrogen. For example, in some embodiments $X^6$ is azetidinyl, methylazetidinyl, pyrrolidinyl, methylpyrrolidinyl, piperidinyl, methylpiperidinyl, piperazinyl, methylpiperazinyl, dimethylpiperazinyl, morpholinyl, diazepanyl, or methyldiazepanyl.

In various embodiments, each $X^7$ in Formula (I) is hydrogen. In other embodiments, each $X^7$ is hydroxyl. In other embodiments, each $X^7$ is —$NR^6R^7$. For embodiments in which a is between 2 and 6, each $X^7$ can be the same or different. For example, in various embodiments $X^7$ is —$(CH_2)_{n-1}CH(X^7)$—, where a is 2, 3, 4, 5 or 6. In some embodiments for which $X^7$ is —$NR^6R^7$, $R^6$ and $R^7$ are each independently hydrogen or $C_1$-$C_6$ alkyl, such as $C_1$-$C_3$ alkyl. For example, in some embodiments $X^7$ is —$NH_2$, —$NHCH_3$, —$NHCH_2CH_3$, —$NHCH_2CH_2CH_3$, —$N(CH_3)_2$, —$N(CH_2CH_3)_2$, or —$N(CH_2CH_2CH_3)_2$. Alternatively, in some embodiments for which $X^7$ is —$NR^6R^7$, $R^6$ and $R^7$ join together with the nitrogen to which they are bound to form a 4- to 7-membered heterocyclyl optionally substituted with 1 or 2 $C_1$-$C_6$ alkyl groups. Alternatively, in other embodiments for which $X^7$ is —$NR^6R^7$, the $R^6$ and $R^7$ can join together with the nitrogen to which they are bound to form a 4- to 7-membered heterocyclyl. The 4- to 7-membered heterocyclyl can be optionally substituted with 1 or 2 $C_1$-$C_6$ alkyl groups, such as $C_1$-$C_3$ alkyl, and/or the 4- to 7-membered heterocyclyl can optionally include an additional heteroatom selected from oxygen, sulfur, and nitrogen. For example, in some embodiments $X^6$ is azetidinyl, methylazetidinyl, pyrrolidinyl, methylpyrrolidinyl, piperidinyl, methylpiperidinyl, piperazinyl, methylpiperazinyl, dimethylpiperazinyl, morpholinyl, diazepanyl, or methyldiazepanyl.

In various embodiments, $A^1$ and $A^2$ in Formula (I) are each independently selected from:
(1) $C_5$-$C_{12}$ haloalkyl;
(2) $C_5$-$C_{12}$ alkenyl;
(3) $C_5$-$C_{12}$ alkynyl;
(4) ($C_5$-$C_{12}$ alkoxy)-$(CH_2)_{n2}$—;
(5) ($C_5$-$C_{10}$ aryl)-$(CH_2)_{n3}$— optionally ring substituted with one or two halo, $C_1$-$C_6$ alkyl, $C_1$-$C_6$ haloalkyl, or $C_1$-$C_6$ alkoxy groups; and
(6) ($C_3$-$C_8$ cycloalkyl)-$(CH_2)_{n4}$— optionally ring substituted with 1 or 2 $C_1$-$C_6$ alkyl groups;
or alternatively $A^1$ and $A^2$ join together with the atoms to which they are bound to form a 5- to 6-membered cyclic acetal substituted with 1 or 2 $C_4$-$C_{10}$ alkyl groups.

In various embodiments of Formula (I), n1, n2 and n3 are each individually an integer between 1 and 4 (i.e., 1, 2, 3 or 4), and n4 is an integer between zero and 4 (i.e., 0, 1, 2, 3 or 4). In various embodiments, $A^1$ and $A^2$ have the same chemical structure.

In various embodiments of Formula (I), $A^1$ and $A^2$ are each independently a $C_5$-$C_{12}$ haloalkyl. For example, in various embodiments the $C_5$-$C_{12}$ haloalkyl is a $C_5$-$C_{12}$ fluoroalkyl such as a $C_6$ fluoroalkyl, a $C_7$ fluoroalkyl, a $C_8$ fluoroalkyl, a $C_9$ fluoroalkyl, a $C_{10}$ fluoroalkyl, a $C_{11}$ fluoroalkyl, or a $C_{12}$ fluoroalkyl. The number of halogen atoms attached to the $C_5$-$C_{12}$ haloalkyl can vary over a broad range, depending on the length of the alkyl chain and the degree of halogenation. For example, in various embodiments the $C_5$-$C_{12}$ haloalkyl contains between 1 and 25 halogen atoms, such as 1, 2, 3, 4, 5, 6, 7, 8, 9, 10 or 11 halogen atoms. In various embodiments, the $C_5$-$C_{12}$ haloalkyl is a $C_5$-$C_{12}$ fluoroalkyl that comprises a fluorinated end group such as $CF_3(CF_2)_{n5}$—, where n5 is an integer in the range of 0 to 5 For example in various embodiments the $C_5$-$C_{12}$ fluoroalkyl is $CF_3(CF_2)_{n5}(CH_2)_{n6}$—, where n5 is an integer in the range of 0 to 5, n6 is an integer in the range of 0 to 11, and n5+n6+1 is equal to number of carbons in the $C_5$-$C_{12}$ fluoroalkyl.

In various embodiments of Formula (I), $A^1$ and $A^2$ are each independently a $C_5$-$C_{12}$ alkenyl. The position of the alkenyl double bond(s) can vary. For example, in various embodiments the $C_5$-$C_{12}$ alkenyl is $CH_3CH_2CH=CH(CH_2)_{n7}$—, where n7 is an integer in the range of 1 to 8, such as $CH_3CH_2CH=CH(CH_2)_4$—. In some embodiments, the $C_5$-$C_{12}$ alkenyl is branched, such as, for example, $(CH_3)_2C=CH(CH_2)_{n8}$—$CH(CH_3)$—$(CH_2)_{n9}$— wherein n8 and n9 are each independently 1, 2 or 3.

In various embodiments of Formula (I), $A^1$ and $A^2$ are each independently a $C_5$-$C_{12}$ alkynyl. The position of the alkynyl triple bond(s) can vary. For example, in various embodiments the $C_5$-$C_{12}$ alkynyl is $CH_3CH_2C\equiv C(CH_2)_{n10}$—, where n10 is an integer in the range of 1 to 8, such as $CH_3CH_2C\equiv C(CH_2)_4$—. In some embodiments, the $C_5$-$C_{12}$ alkynyl is branched, such as, for example, $(CH_3)_2CHC\equiv C(CH_2)_{n11}$—$CH(CH_3)$—$(CH_2)_{n12}$— wherein n11 and n12 are each independently 1, 2 or 3 and n11+n12 is in the range of 2 to 5.

In various embodiments of Formula (I), $A^1$ and $A^2$ are each independently a ($C_5$-$C_{12}$ alkoxy)-$(CH_2)_{n2}$— in various embodiments, each n2 is independently an integer in the range of 1 to 4 (i.e., 1, 2, 3 or 4). The position of the oxygen(s) can vary. For example, in various embodiments the ($C_5$-$C_{12}$ alkoxy)-$(CH_2)_{n2}$— is $CH_3O(CH_2)_{n13}$—$(CH_2)_{n2}$—, where n13 is an integer in the range of 1 to 11, such as $CH_3O(CH_2)_7$—. In other embodiments the ($C_5$-$C_{12}$ alkoxy)-$(CH_2)_{n2}$— is $CH_3(CH_2)_{n14}$—O—$(CH_2)_{n15}$—$(CH_2)_{n2}$—, wherein n14 and n15 are each independently integers between 1 and 8, and n14+n15 is an integer in the range of 4 to 11, such as $CH_3(CH_2)_7$—O—$(CH_2)_2$—$(CH_2)_{n2}$—. In some embodiments, the $C_5$-$C_{12}$ alkoxy is branched, such as, for example, $CH_3O(CH_2)_{n16}$—$CH(CH_3)_{n17}$—$(CH_2)_{n2}$—, wherein n16 and n17 are each independently 1, 2, 3, 4 or 5 and n16+n17 is an integer in the range of 2 to 9.

In various embodiments of Formula (I), $A^1$ and $A^2$ are each independently a ($C_5$-$C_{10}$ aryl)-$(CH_2)_{n3}$— optionally ring substituted with one or two halo, $C_1$-$C_6$ alkyl, $C_1$-$C_6$ haloalkyl, or $C_1$-$C_6$ alkoxy groups. In various embodiments, each n3 is independently an integer between 1 and 4 (i.e., 1, 2, 3 or 4). In some embodiments, the $C_5$-$C_{10}$ aryl is a phenyl. For example, in various embodiments the ($C_5$-$C_{10}$ aryl)-$(CH_2)_{n3}$— is $C_6H_5$—$(CH_2)_{n3}$— optionally ring substituted with one or two halo. $C_1$-$C_6$ alkyl, $C_1$-$C_6$ haloalkyl, or $C_1$-$C_6$ alkoxy groups. In an embodiment, the optionally ring substituted ($C_5$-$C_{10}$ aryl)-$(CH_2)_{n3}$— is $CF_3$—$C_6H_4$—$(CH_2)_{n3}$—, such as $CF_3$—$C_6H_4$—$CH_2$— or $CF_3$—$C_6H_4$—$(CH_2)_2$—. In another embodiment, the optionally ring substituted ($C_5$-$C_{10}$ aryl)-$(CH_2)_{n3}$— is $CH_3$—$(CH_2)_{n18}$—$C_6H_4$—$(CH_2)_{n2}$—, wherein n18 is 1, 2 or 3 and n2 is 1, 2, 3 or 4, such as $CH_3(CH_2)_3$—$C_6H_4$—$CH_2$— or $CH_3(CH_2)_3$—$C_6H_4$—$(CH_2)_2$—.

In various embodiments of Formula (I), $A^1$ and $A^2$ are each independently a ($C_3$-$C_8$ cycloalkyl)-$(CH_2)_{n4}$— optionally ring substituted with 1 or 2 $C_1$-$C_6$ alkyl groups. In various embodiments, each n4 is independently an integer between 0 and 4 (i.e., 0, 1, 2, 3 or 4) In some embodiments, the $C_3$-$C_8$ cycloalkyl is a cyclohexyl or cyclopentyl. For example, in various embodiments the ($C_3$-$C_8$ cycloalkyl)-$(CH_2)_{n4}$— is $C_6H_{11}$—$(CH_2)_{n4}$— optionally ring substituted with 1 or 2 $C_1$-$C_6$ alkyl groups, such as $C_6H_{11}$—$(CH_2)_2$—, $C_6H_{11}$—$(CH_2)_3$— or $CH_3$—$C_6H_{10}$—$(CH_2)_3$—.

Alternatively, in other embodiments of Formula (I), $A^1$ and $A^2$ join together with the atoms to which they are bound to form a 5- to 6-membered cyclic acetal substituted with 1 or 2 $C_4$-$C_{10}$ alkyl groups. For example, in an embodiment, $A^1$ and $A^2$ join together with the atoms to which they are bound to form a 6-membered cyclic acetal that is ring substituted with 2 $C_8$ alkyl groups as follows:

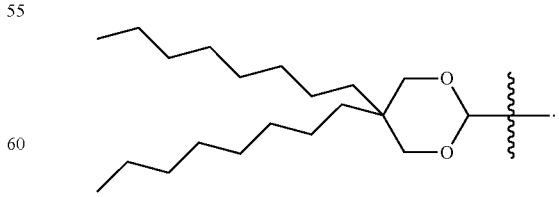

In another embodiment, $A^1$ and $A^2$ join together with the atoms to which they are bound to form a 5-membered cyclic acetal that is ring substituted with 2 $C_8$ alkyl groups as follows

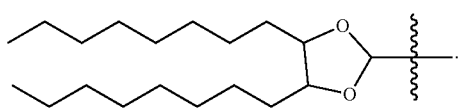

2. Ionizable Lipids

In one embodiment, the disclosed lipid nanoparticles include an ionizable lipid. The ionizable lipid typically includes an amine-containing group on the head group. In various embodiments, the ionizable lipid is a compound of the Formula (I). In some embodiments, the ionizable lipid is present in the lipid nanoparticle at 35, 45, 50, or 65 mole percent, based on total moles of components of the lipid nanoparticle. In another embodiment, the ionizable lipid is present at about 33 mol % to about 36 mol %, based on total moles of components of the lipid nanoparticle. In yet another embodiment, the ionizable lipid is present at about 35 mol %, based on total moles of components of the lipid nanoparticle.

Additional embodiments relate to a lipid nanoparticle composition comprising: an ionizable lipid, a phospholipid; a polyethylene glycol-lipid; a cholesterol; and optionally a nucleic acid. In some embodiments, the ionizable lipid comprises a structure according to any one of Formulas (I), (Ia), (II), (IIa), (IIb), and (IIc). In some embodiments, the amount of ionizable lipid is present in the range of about 35 to 65 mole percent, based on total moles of components of the lipid nanoparticle.

3. Sterols

In some embodiments, the disclosed lipid nanoparticles include one or more sterols. In one embodiment, the sterol is cholesterol, or a variant or derivative thereof. In some embodiments, the cholesterol is modified, for example oxidized. Unmodified cholesterol can be acted upon by enzymes to form variants that are side-chain or ring oxidized. The cholesterol can be oxidized on the beta-ring structure or on the hydrocarbon tail structure. Exemplary cholesterols that are considered for use in the disclosed lipid nanoparticles include but are not limited to 25-hydroxycholesterol (25-OH), 20α-hydroxycholesterol (20α-OH), 27-hydroxycholesterol, 6-keto-5α-hydroxycholesterol, 7-ketocholesterol, 7β-hydroxycholesterol, 7α-hydroxycholesterol, 7β-25-dihydroxycholesterol, beta-sitosterol, stigmasterol, brassicasterol, campesterol, or combinations thereof. In one embodiment, side-chain oxidized cholesterol can enhance cargo delivery relative to other cholesterol variants. In one embodiment, the cholesterol is an unmodified cholesterol.

4. PEG-Lipids

In some embodiments, the disclosed nanoparticle compositions also include one or more PEG or PEG-modified lipids. Such lipids may be alternately referred to as PEGylated lipids or PEG-lipids. Inclusion of a PEGylating lipid can be used to enhance lipid nanoparticle colloidal stability in vitro and circulation time in vivo. In some embodiments, the PEGylation is reversible in that the PEG moiety is gradually released in blood circulation. Exemplary PEG-lipids include but are not limited to PEG conjugated to saturated or unsaturated alkyl chains having a length of $C_6$-$C_{20}$. PEG-modified phosphatidylethanolamines, PEG-modified phosphatidic acids, PEG-modified ceramides (PEG-CER), PEG-modified dialkylamines, PEG-modified diacylglycerols (PEG-DAG), PEG-modified dialkylglycerols, and mixtures thereof. For example, a PEG lipid may be PEG-c-DOMG, PEG-DMG, PEG-DLPE, PEG-DMPE, PEG-DPPE, PEG-DSG or a PEG-DSPE lipid.

5. Phospholipids

The phospholipid component of the nanoparticle may include one or more phospholipids, such as one or more (poly)unsaturated lipids. The phospholipids may assemble into one or more lipid bilayers. In some embodiments, the phospholipids may include a phospholipid moiety and one or more fatty acid moieties.

In some embodiments, the phospholipid moiety includes but is not limited to phosphatidyl choline, phosphatidyl ethanolamine, phosphatidyl glycerol, phosphatidyl serine, phosphatidic acid, 2-lysophosphatidic choline, and sphingomyelin. In some embodiments, the fatty acid moiety includes but is not limited to lauric acid, myristic acid, myristoleic acid, palmitic acid, palmitoleic acid, stearic acid, oleic acid, linoleic acid, alpha-linolenic acid, erucic acid, phytanic acid, arachidic acid, arachidonic acid, eicosapentaenoic acid, behenic acid, docosapentaenoic acid, and docosahexaenoic acid. Non-natural species including natural species with modifications and substitutions including branching, oxidation, cyclization, and alkynes are also contemplated. For example, a phospholipid may be functionalized with or cross-linked to one or more alkynes (e.g. an alkenyl group in which one or more double bonds is replaced with a triple bond). Under appropriate reaction conditions, an alkyne group may undergo a copper-catalyzed cycloaddition upon exposure to an azide. Such reactions may be useful in functionalizing a lipid bilayer of a nanoparticle composition to facilitate membrane permeation or cellular recognition or in conjugating a nanoparticle composition to a useful component such as a targeting or imaging moiety (e.g., a dye).

Exemplary phospholipids include but are not limited to 1,2-distearoyl-sn-glycero-3-phosphocholine (DSPC), 1,2-dioleoyl-sn-glycero-3-phosphoethanolamine (DOPE), 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-diundecanoyl-sn-glycero-phosphocholine (DLPC), 1-palmitoyl-2-oleoyl-sn-glycero-3-phosphocholine (POPC), 1,2-di-0-octadecenyl-sn-glycero-3-phosphocholine (18:0 Diether PC), 1-oleoyl-2-cholesterylhemisuccinoy 1-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-diphytanoyl-sn-glycero-3-phosphoethanolamine (ME 16.0 PE), 1,2-distearoyl-sn-glycero-3-phosphoethanolamine, 1,2-dilinolenoyl-sn-glycero-3-phosphoethanolamine, 1,2-dilinolenoyl-sn-glycero-3-phosphoethanolamine, 1,2-diarachidonoyl-sn-glycero-3-phosphoethanolamine, 1,2-didocosahexaenoyl-sn-glycero-3-phosphoethanolamine, 1,2-dioleoyl-sn-glycero-3-phospho-rac-(1-glycerol) sodium salt (DOPG), dipalmitoylphosphatidylglycerol (DPPG), palmitoyloleoylphosphatidylethanolamine (POPE), distearoyl-phosphatidyl-ethanolamine (DSPE), dipalmitoyl phosphatidyl ethanolamine (DPPE), dimyristoylphosphoethanolamine (DMPE), 1-stearoyl-2-oleoyl-phosphatidy ethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyloleoyl phosphatidylcholine, lysophosphatidylcholine, lysophosphatidylethanolamine (LPE).

In a preferred embodiment, the phospholipid is DSPC. In another embodiment, the phospholipid is DMPC.

E. Cargo

In one embodiment, the disclosed lipid nanoparticle compositions include a therapeutic or prophylactic agent for delivery to a subject. In some embodiments, the therapeutic or prophylactic agent is encapsulated by the lipid nanoparticle. In one embodiment, the lipid nanoparticles are loaded with one or more nucleic acids.

Representative nucleic acids include but are not limited to deoxyribonucleic acid (DNA), ribonucleic acid (RNA) RNA, DNA, single-stranded RNA, single-stranded DNA, double-stranded RNA, double stranded DNA, triple-stranded DNA, siRNA, shRNA, sgRNA, mRNA, miRNA, and antisense DNA. In an embodiment, the nucleic acid is siRNA, miRNA, mRNA, expressing DNA, anti-sense oligonucleotide, or immunostimulatory oligonucleotide.

CRISPR (Clustered Regularly Interspaced Short Palindromic Repeats) based gene editing requires two components: a guide-RNA and a CRISPR-associated endonuclease protein (Cas). The guide RNA directs the Cas nuclease to the specific target DNA sequence. Cas then creates a double-strand break in the DNA at that site. In one embodiment, the disclosed lipid nanoparticles can be used to carry the components required for CRISPR-based gene editing. In one lipid nanoparticle, the nucleic acid cargo is a guide-RNA. In such an embodiment, a second lipid nanoparticle can contain nucleic acid cargo that encodes an RNA-guided endonuclease. The two lipid nanoparticles can be administered together. Exemplary RNA-guided endonucleases include but are not limited to Cas9, CasX, CasY, Cas13, or Cpf1.

In one embodiment, the cargo is siRNA. Short Interfering RNA (siRNA) is a double-stranded RNA that can induce sequence-specific post-transcriptional gene silencing, thereby decreasing or even inhibiting gene expression. In one example, an siRNA triggers the specific degradation of homologous RNA molecules, such as mRNAs, within the region of sequence identity between both the siRNA and the target RNA. For example, WO 02/44321 discloses siRNAs capable of sequence-specific degradation of target mRNAs when base-paired with 3' overhanging ends, herein incorporated by reference for the method of making these siRNAs. Sequence specific gene silencing can be achieved in mammalian cells using synthetic, short double-stranded RNAs that mimic the siRNAs produced by the enzyme dicer (Elbashir, et al. (2001) Nature, 411:494 498) (Ui-Tei, et al. (2000) FEBS Lett 479:79-82.

In one embodiment, the cargo is messenger RNA (mRNA). Messenger RNA is a single-stranded RNA that can be translated into the protein it encodes using cellular protein synthesis machinery once the cargo reaches the cell cytoplasm. Translation and stability of mRNA can be affected by modifications of the 5' and 3' UTR which is responsible for recruiting RNA binding proteins and microRNAs, which can all have an effect on translational activity (Sahin, et al (2014) Nat Rev Drug Disco 13: 759-580) (Kariko et al (2008) Mol Ther 11:1833-1840).

In one embodiment, the lipid nanoparticle contains less than 1.0 mg/kg inhibitory nucleic acid. The nanoparticle can contain 1.0, 0.9, 0.8, 0.7, 0.6, or 0.5 mg/kg inhibitory nucleic acid. In another embodiment, the lipid nanoparticle contains 0.5 mg/kg inhibitory nucleic acid. This is an advantage over current technology in which nanoparticles require high doses of nucleic acid (>1 mg/kg) to achieve gene silencing, doses of which are not approve for human delivery. The disclosed technology can achieve gene silencing using 0.5 mg/kg inhibitory nucleic acid in a lipid nanoparticle that does not include targeting ligands.

In some embodiments, the nucleic acids, including but not limited to oligonucleotides, are modified or include one more modified nucleotides to increase stability, half-life, and/or nuclease stability. To limit nuclease sensitivity, the native phosphodiester oligodeoxyribonucleotide, native phosphodiester oligoribonucleotide, ribonucleotide polymers, and deoxyribonucleotide polymers can include one more different modifications. Exemplary modifications, include but are not limited to phosphorothioate (PS) bonds, 2"-O Methyl (2'OMe), 2' Fluoro bases, inverted dT and ddT, phosphorylation of the 3' end of oligonucleotides, locked nucleic acids, and including a phosphoramidite C3 Spacer.

The phosphorothioate bond substitutes a sulfur atom for a non-bridging oxygen in the phosphate backbone of an oligonucleotide. Approximately 50% of the time (due to the 2 resulting stereoisomers that can form), PS modification renders the internucleotide linkage more resistant to nuclease degradation. In some embodiments, the nucleic acids include one or more PS bonds, for example at least 3 PS bonds at the 5' and 3' oligonucleotide ends to inhibit exonuclease degradation. Some nucleic acid include PS bonds throughout the entire oligonucleotide to help reduce attack by endonucleases as well.

A naturally occurring post-transcriptional modification of RNA, 2'OMe is found in tRNA and other small RNAs. In some embodiments, the nucleic acids or oligonucleotides are directly synthesized to contain 2'OMe. This modification increases the Tm of RNA:RNA duplexes, but results in only small changes in RNA:DNA stability. It prevents attack by single-stranded endonucleases, but not exonuclease digestion. In some embodiment, these nucleic acids or oligonucleotides are also end blocked. DNA oligonucleotides that include this modification are typically 5- to 10-fold less susceptible to DNases than unmodified DNA. The 2'OMe modification is commonly used in antisense oligonucleotides as a means to increase stability and binding affinity to target transcripts.

2'-Fluoro bases have a fluorine-modified ribose which increases binding affinity (Tm) and also confers some relative nuclease resistance compared to native RNA. In some embodiments, the nucleic acids or oligonucleotides include 2' fluoro bases in conjunction with PS-modified bonds.

Inverted dT can be incorporated at the 3' end of an oligonucleotide, leading to a 3'-3' linkage that will inhibit degradation by 3' exonucleases and extension by DNA polymerases. In addition, placing an inverted, 2',3' dideoxy-dT base (5' Inverted ddT) at the 5' end of an oligonucleotide prevents spurious ligations and may protect against some forms of enzymatic degradation.

Some embodiments provide nucleic acids or oligonucleotides that include a phosphoramidite C3 Spacer. The phosphoramidite C3 Spacer can be incorporated internally, or at either end of an oligo to introduce a long hydrophilic spacer arm for the attachment of fluorophores or other pendent groups. The C3 spacer also can be used to inhibit degradation by 3' exonucleases.

In some embodiments, the nucleic acids or oligonucleotides include locked nucleic acids. Locked nucleic acids include modified RNA nucleotides in which the 2'-O and 4'-C atoms of the ribose are joined through a methylene bridge. This additional bridge limits the flexibility normally associated with the ring, essentially locking the structure into a rigid conformation LNAs can be inserted into both RNA and DNA oligonucleotides.

Other types of cargo that can be delivered via the disclosed nanoparticles include but are not limited to chemotherapeutic agents, cytotoxic agents, radioactive ions, small molecules, proteins, polynucleotides, and nucleic acids.

Representative chemotherapeutic agents include, but are not limited to amsacrine, bleomycin, busulfan, capecitabine, carboplatin, carmustine, chlorambucil, cisplatin, cladribine, clofarabine, crisantaspase, cyclophosphamide, cytarabine, dacarbazine, dactinomycin, daunorubicin, docetaxel, doxorubicin, epirubicin, etoposide, fludarabine, fluorouracil, gemcitabine, hydroxycarbamide, idarubicin, ifosfamide, irinotecan, leucovorin, liposomal doxorubicin, liposomal daunorubicin, lomustine, melphalan, mercaptopurine, mesna, methotrexate, mitomycin, mitoxantrone, oxaliplatin, paclitaxel, pemetrexed, pentostatin, procarbazine, raltitrexed, satraplatin, streptozocin, tegafur-uracil, temozolomide, teniposide, thiotepa, tioguanine, topotecan, treosulfan, vinblastine, vincristine, vindesine, vinorelbine, or a combination thereof. Representative pro-apoptotic agents include, but are not limited to fludarabinetaurosporine, cycloheximide, actinomycin D, lactosylceramide, 15d-PGJ(2) and combinations thereof.

Some embodiments relate to a method of delivering a nucleic acid to a subject in need thereof, comprising administering to the subject a lipid nanoparticle composition as described herein. In some embodiments, the nucleic acid is siRNA, miRNA, m RNA, expressing DNA, anti-sense oligonucleotide, or immunostimulatory oligonucleotide.

B. Exemplary Lipid Nanoparticle Formulations

In one embodiment, the lipid nanoparticle formulation includes about 30 mol % to about 70 mol % ionizable lipid, about 5 mol % to about 25 mot % phospholipid, about 25 mol % to about 45 mol % cholesterol, and about 0 mol % to about 5 mol % PEG-lipid. In another embodiment, the lipid nanoparticle formulation include about 45 mol % ionizable lipid, about 9 mol % phospholipid, about 44 mol % cholesterol, and about 2 mol % PEG-lipid. In another embodiment, the lipid nanoparticle formulation include about 50 mol % ionizable lipid, about 9 mol % phospholipid, about 38 mol % cholesterol, and about 3 mol % PEG-lipid.

One embodiment provides a lipid nanoparticle formulation including about 40 mol % to about 60 mol % ionizable lipid of Formula (I), about 5 mol % to about 15 mol % 1-2-distearoyl-sn-glycero-3-phosphocholine, about 1 mol % to about 5 mol % $C_{14}PEG_{2000}$, and about 30 mot % to about 47 mol % cholesterol, based on the total moles of these four ingredients.

Another embodiment provides a lipid nanoparticle formulation including 50 mol % ionizable lipid of Formula (I), 9 mol % 1-2-distearoyl-sn-glycero-3-phosphocholine, and 3 mol % $C_{14}PEG_{2000}$, 38 mol % cholesterol, based on the total moles of these four ingredients.

Another embodiment provides a lipid nanoparticle formulation in which the mass ratio of (ionizable lipid, cholesterol, lipid-PEG, and phospholipid):mRNA is between about 2:1 and 50:1.

C. Pharmaceutical Compositions

Pharmaceutical compositions including the disclosed lipid nanoparticles are provided. The lipid nanoparticle compositions can be formulated in whole or in part as pharmaceutical compositions. Pharmaceutical compositions may include one or more nanoparticle compositions. For example, a pharmaceutical composition may include one or more nanoparticle compositions including one or more different therapeutic and/or prophylactics including but not limited to one or more nucleic acids of different types or encode different agents. In some embodiments the pharmaceutical compositions include one or more pharmaceutically acceptable excipients or accessory ingredients including but not limited to a pharmaceutically acceptable carrier.

Pharmaceutical compositions containing the nanoparticles can be formulated for administration by parenteral (intramuscular, intraperitoneal, intravenous (IV) or subcutaneous injection), transdermal (either passively or using iontophoresis or electroporation), or transmucosal (nasal, vaginal, rectal, or sublingual) routes of administration or using bioerodible inserts and can be formulated in dosage forms appropriate for each route of administration.

In some in vivo approaches, the nanoparticle compositions disclosed herein are administered to a subject in a therapeutically effective amount. As used herein the term "effective amount" or "therapeutically effective amount" means a dosage sufficient to treat, inhibit, or alleviate one or more symptoms of the disorder being treated or to otherwise provide a desired pharmacologic and/or physiologic effect. The precise dosage will vary according to a variety of factors such as subject-dependent variables (e g., age, immune system health, etc.), the disease, and the treatment being effected.

For the disclosed nanoparticles, as further studies are conducted, information will emerge regarding appropriate dosage levels for treatment of various conditions in various patients, and the ordinary skilled worker, considering the therapeutic context, age, and general health of the recipient, will be able to ascertain proper dosing. The selected dosage depends upon the desired therapeutic effect, on the route of administration, and on the duration of the treatment desired. For the disclosed nanoparticles, generally dosage levels of 0.001 mg to 5 mg of nucleic acid per kg of body weight daily are administered to mammals. More specifically, a preferential dose for the disclosed nanoparticles is 0.01 mg/kg to 0.25 mg/kg. For the disclosed nanoparticles, generally dosage levels of 0.2 mg to 100 mg of the four components (ionizable lipid, cholesterol, PEG-lipid, and phospholipid)/kg of body weight are administered to mammals. More specifically, a preferential dose of the disclosed nanoparticles is 0.05 mg/kg to 0.5 mg/kg of the four components/kg of body weight.

In certain embodiments, the lipid nanoparticle composition is administered locally, for example by injection directly into a site to be treated. Typically, the injection causes an increased localized concentration of the lipid nanoparticle composition which is greater than that which can be achieved by systemic administration. The lipid nanoparticle compositions can be combined with a matrix as described above to assist in creating an increased localized concentration of the polypeptide compositions by reducing the passive diffusion of the polypeptides out of the site to be treated 1. Formulations for Parenteral Administration In some embodiments, the nanoparticle compositions disclosed herein, including those containing lipid nanoparticles, are administered in an aqueous solution, by parenteral injection. The formulation may also be in the form of a suspension or emulsion. In general, pharmaceutical compositions are provided including effective amounts of a lipid nanoparticle, and optionally include pharmaceutically acceptable diluents, preservatives, solubilizers, emulsifiers, adjuvants and/or carriers. Such compositions optionally include one or more for the following: diluents, sterile water, buffered saline of various buffer content (e.g., Tris-HCl, acetate, phosphate), pH and ionic strength; and additives such as detergents and solubilizing agents (e.g., TWEEN 20 (polysorbate-20), TWEEN 80 (polysorbate-80)), anti-oxidants (e.g., ascorbic acid, sodium metabisulfite), and preservatives (e.g., Thimersol, benzyl alcohol) and bulking substances (e.g., lactose, mannitol). Examples of non-aqueous solvents or vehicles are propylene glycol, polyethylene glycol, vegetable oils, such as olive oil and corn oil, gelatin, and injectable organic esters such as ethyl oleate. The formulations may be lyophilized and redissolved/resuspended immediately before use. The formulation may be sterilized by, for example, filtration through a bacteria retaining filter, by incorporating sterilizing agents into the compositions, by irradiating the compositions, or by heating the compositions.

2. Controlled Delivery Polymeric Matrices

The lipid nanoparticles disclosed herein can also be administered in controlled release formulations. Controlled release polymeric devices can be made for long term release systemically following implantation of a polymeric device (rod, cylinder, film, disk) or injection (microparticles). The matrix can be in the form of microparticles such as microspheres, where the agent is dispersed within a solid polymeric matrix or microcapsules, where the core is of a different material than the polymeric shell, and the peptide is dispersed or suspended in the core, which may be liquid or solid in nature. Unless specifically defined herein, microparticles, microspheres, and microcapsules are used interchangeably. Alternatively, the polymer may be cast as a thin slab or film, ranging from nanometers to four centimeters, a powder produced by grinding or other standard techniques, or even a gel such as a hydrogel.

Either non-biodegradable or biodegradable matrices can be used for delivery of lipid nanoparticles, although in some embodiments biodegradable matrices are preferred. These may be natural or synthetic polymers, although synthetic polymers are preferred in some embodiments due to the better characterization of degradation and release profiles. The polymer is selected based on the period over which release is desired. In some cases, linear release may be most useful, although in others a pulse release or "bulk release" may provide more effective results. The polymer may be in the form of a hydrogel (typically in absorbing up to about 90% by weight of water), and can optionally be crosslinked with multivalent ions or polymers.

The matrices can be formed by solvent evaporation, spray drying, solvent extraction and other methods known to those skilled in the art. Bioerodible microspheres can be prepared using any of the methods developed for making microspheres for drug delivery, for example, as described by Mathiowitz and Langer, J. Controlled Release, 5:13-22 (1987), Mathiowitz, et al., Reactive Polymers, 6:275-283 (1987); and Mathiowitz, et al., J. Appl. Polymer Sci., 35:755-774 (1988).

The devices can be formulated for local release to treat the area of implantation or injection—which will typically deliver a dosage that is much less than the dosage for treatment of an entire body—or systemic delivery. These can be implanted or injected subcutaneously, into the muscle, fat, or swallowed.

D. Methods of Manufacturing Lipid Nanoparticles

Methods of manufacturing lipid nanoparticles are known in the art. In one embodiment, the disclosed lipid nanoparticles are manufactured using microfluidics. For exemplary methods of using microfluidics to form lipid nanoparticles, see Leung, A. K. K, et al., *J Phys Chem,* 116:18440-18450 (2012), Chen, D., et al., *J Am Chem Soc,* 134:6947-6951 (2012), and Belliveau. N. M., et al., *Molecular Therapy—Nucleic Acids,* 1: e37 (2012). Briefly, the cargo, such as an oligonucleotide or siRNA, is prepared in one buffer. The other lipid nanoparticle components (ionizable lipid, PEG-lipid, cholesterol, and DSPC) are prepared in another buffer. A syringe pump introduces the two solutions into a microfluidic device. The two solutions come into contact within the microfluidic device to form lipid nanoparticles encapsulating the cargo.

Methods of screening the disclosed lipid nanoparticles are discussed in International Patent Application No. PCT/US/2018/058171, which is incorporated by reference in its entirety. The screening methods characterizes vehicle delivery formulations to identify formulations with a desired tropism and that deliver functional cargo to the cytoplasm of specific cells. The screening method uses a reporter that has a functionality that can be detected when delivered to the cell. Detecting the function of the reporter in the cell indicates that the formulation of the delivery vehicle will deliver functional cargo to the cell. A chemical composition identifier is included in each different delivery vehicle formulation to keep track of the chemical composition specific for each different delivery vehicle formulation. In one embodiment, the chemical composition identifier is a nucleic acid barcode. The sequence of the nucleic acid bar code is paired to the chemical components used to formulate the delivery vehicle in which it is loaded so that when the nucleic acid bar code is sequenced, the chemical composition of the delivery vehicle that delivered the barcode is identified. Representative reporters include, but are not limited to siRNA, mRNA, nuclease protein, nuclease mRNA, small molecules, epigenetic modifiers, and phenotypic modifiers.

E. Methods of Use

Methods of using the disclosed lipid nanoparticles to deliver cargo, for example nucleic acids, to specific cells or organs are disclosed herein. In some embodiments, the nanoparticles deliver therapeutic or prophylactic agents to specific cells or organs in a subject in need thereof in the absence of a targeting ligand. In another embodiment, the disclosed lipid nanoparticles are useful to treat or prevent diseases in a subject in need thereof.

In some embodiments, the disclosed nanoparticles are delivered directly to the subject. In other embodiments, the lipid nanoparticles are contacted with cells ex vivo, and the treated cells are administered to the subject. The cells can be autologous cells, for example immune cells including but not limited to T cells or cells that differentiate into T cells. In some embodiments, the disclosed lipid nanoparticles may be used as vehicles for adoptive cell transfer.

1. Methods of Delivering Cargo to Cells

Methods of delivering a therapeutic and/or prophylactic nucleic acids to a subject in need thereof are provided herein.

In some embodiments, the disclosed lipid nanoparticle composition targets a particular type or class of cells (e.g., cells of a particular organ or system thereof). For example, a nanoparticle composition including a therapeutic and/or prophylactic of interest may be specifically delivered to immune cells in the subject. Exemplary immune cells include but are not limited to CD8+, CD4+, or CD8+CD4+ cells. In other embodiments, the lipid nanoparticles can be formulated to be delivered in the absence of a targeting ligand to a mammalian liver hepatocytes, liver immune cells, spleen T cells, or lung endothelial cells. Specific delivery to a particular class or type of cells indicates that a higher proportion of lipid nanoparticles are delivered to target type or class of cells. In some embodiments, specific delivery may result in a greater than 2 fold, 5 fold, 10 fold, 15 fold, or 20 fold increase in the amount of therapeutic and/or prophylactic per 1 g of tissue of the targeted destination.

2. Methods of Gene Regulation

Methods of using the disclosed lipid nanoparticles for gene regulation are provided herein. In one embodiment, the lipid nanoparticles can be used for reducing gene expression in a target cell in a subject in need thereof. The lipid nanoparticle can deliver the inhibitory nucleic acid to the target cell in the subject without a targeting ligand. The inhibitory nucleic acid can be siRNA.

Another embodiment provides methods of using the disclosed lipid nanoparticles for editing a gene in a cell in a subject in need thereof.

In one embodiment, the cell that is targeted for gene regulation is an immune cell. The immune cell can be a T cell, such as CD8+ T cell, CD4+ T cell, or T regulatory cell. Other exemplary immune cells for gene editing include but are not limited to macrophages, dendritic cells, B cells or natural killer cells. In some embodiments, the cell that is targeted for gene regulation in a hepatocyte.

Exemplary genes that can be targeted include but are not limited to T cell receptors, B cell receptors, CTLA4, PD1, FOXO1, FOXO3, AKTs, CCR5, CXCR4, LAG3, TIM3, Killer immunoglobulin-like receptors, GITR, BTLA, LFA-4, T4, LFA-1, Bp35, CD27L receptor, TNFRSF8, TNFRSF5, CD47, CD52, ICAM-1, LFA-3, L-selectin, Ki-24, MB1, B7, B70, M-CSFR, TNFR-II, IL-7R, OX-40, CD137, CD137L, CD30L, CD40L, FasL, TRAIL, CD257, LIGHT, TRAIL-R1, TRAILR2, TRAIL-R4, TWEAK-R, TNFR, BCMA, B7DC, BTLA, B7-H1, B7-H2, B7-H3, ICOS, VEGFR2, NKG2D, JAG1, GITR, CD4, CCR2, GATA-3, MTORC1, MTORC2, RAPTOR, GATOR, FOXP3, NFAT, IL2R, and IL7. Other exemplary genes that can be targeted include but are not limited to OCT, G6Pase, Mut, PCCA, PCCB, and PAH.

Exemplary tumor-associated antigens that can be recognized by T cells and are contemplated for targeting, include but are not limited to MAGE1, MAGE3, MAGE6, BAGE, GAGE, NYESO-1, MART1/Melan A, MC1R, GP100, tyrosinase, TRP-1, TRP-2, PSA, CEA, Cyp-B, Her2/Neu, hTERT, MUC1, PRAME, WT1, RAS, CDK-4, MUM-1, KRAS, MSLN and β-catenin.

3. Subjects to be Treated

In some embodiments, the subjects treated are mammals experiencing cancer, autoimmune disease, infections disease, organ transplant, organ failure, protein deficiency, or a combination thereof. In an embodiment, the subject is a human in some embodiments, the methods described herein may cause hepatocytes to translate certain proteins in some embodiments, the methods described herein may be used to deliver one or more DNA, mRNA, sgRNA, or siRNA to a hepatocyte.

EXAMPLES

General notes: All reactions were run using anhydrous grade solvents under an atmosphere of nitrogen in flasks or vials with magnetic stirring, unless otherwise noted. Anhydrous solvents were purchased from Sigma-Aldrich and used as received. Flash column chromatography was performed using a Biotage Selekt or Teledyne-Isco Combiflash Nextgen300+ with prepacked Biotage Sfar silica gel cartridges. Thin layer chromatography was performed using Merck silica gel 60 plates, and compounds were visualized using iodine. Nuclear magnetic resonance (NMR) spectroscopy was performed using a Varian INOVA 500 MHz spectrometer: chemical shifts are reported in δ parts per million (ppm) upfield of tetramethylsilane, referenced to residual solvent peak of $CHCl_3$ at δ=7.26 ppm. Liquid chromatography-mass spectrometry (LCMS) was performed using a Waters Acquity UPLC H-class Plus with QDa detector (ESI) equipped with a Waters Acquity UPLC BEH C18 column (130 Å, 1.7 μM, 2.1 mm×50 mm). Compounds were analyzed using one of the following general LCMS methods. Method A: solvent A=water+0.1% formic acid, solvent B=acetonitrile; gradient from 90% A, 10% B to 5% A, 95% B over 3 minutes, then hold at 95% B for 2 minutes, then ramp back to 10% B over 1 minute: flow rate=0.5 mL/min. Method B: Column-XTERRA RP 18 (4.6×50 mm), 5μ, (mobile phase: initially 50% [0.1% HCOOH in WATER] and 50% [0.1% HCOOH in (70:30) ACN: THF]; then to 2% [0.1% HCOOH in WATER] and 98% [0.1% HCOOH in (70:30) ACN: THF] in 2.65 min, held this mobile phase composition up to 3.75 min, and finally back to initial condition, i.e.; 50% [0.1% HCOOH in WATER] and 50% [0.1% HCOOH in (70:30) ACN: THF] in 4.90 min, held this mobile phase composition up to 5.10 min. Flow=1.2 ml/min

LIST OF ABBREVIATIONS

DCM: dichloromethane
DIPEA: N,N-diisopropylethylamine
DMAP: 4-(dimethylamino)pyridine
DMPC: 1,2-Dimyristoyl-sn-glycero-3-phosphocholine
DSPC: 1,2-Distearoyl-sn-glycero-3-phosphocholine
EDC: N-(3-Dimethylaminopropyl)-N'-ethylcarbodiimide hydrochloride
Eq: Equivalents
ESI: electrospray ionization
LCMS: liquid chromatography-mass spectrometry
LNP: lipid nanoparticle
NMR: Nuclear magnetic resonance
PPTS: pyridinium p-toluenesulfonate
RT: retention time Example lipids were prepared according to the synthetic scheme illustrated in FIG. 1.

Representative synthetic procedures are illustrated using the preparation of Example 1: 3-((4,4-bis(((Z)-oct-5-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-oct-5-en-1-yl)oxy)butanenitrile (Intermediate Ia)

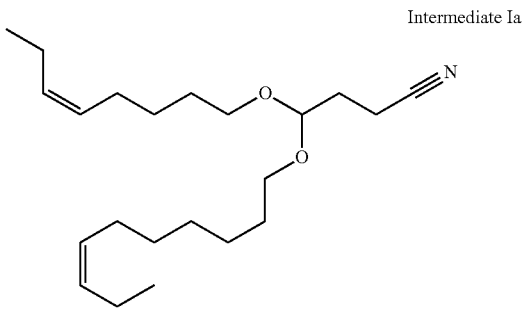 [SMILES: CC/C=C\CCCCCCOC(CCC#N)OCCCC/C=C\CC]

Intermediate Ia

The following is representative of General Procedure A: to a vial containing pyridinium p-toluene sulfonate (0.12 g, 0.48 mmol, 0.05 Eq) was added 4,4-diethyoxybutanenitrile (1.5 g, 9.5 mmol, 1 Eq) and cis-5-octen-1-ol (3.7 g, 29 mmol, 3 Eq). The vial was tightly capped, and the resulting mixture was heated at 105° C. for 72 h. After this time, the mixture was allowed to cool to room temperature. The crude material was purified by flash column chromatography (100 g silica, 0 to 100% dichloromethane in hexanes over 20 minutes). Obtained 4,4-bis(((Z)-oct-5-en-1-yl)oxy)butanenitrile (1.14 g, 37%) as a colorless oil. $^1$H NMR (500 MHz, Chloroform-d) δ 5.43-5.27 (m, 4H), 4.56 (t, J=5.3 Hz, 1H), 3.61 (dt, J=9.3, 6.6 Hz, 2H), 3.44 (dt, J=9.3, 6.6 Hz, 2H), 2.42 (t, J=7.4 Hz, 2H), 2.12-1.91 (m, 9H), 1.66-1.54 (m, 5H), 1.49-1.36 (m, 4H), 0.96 (t, J=7.6 Hz, 6H).

Step 2: 4,4-bis(((Z)-oct-5-en-1-yl)oxy)butanoic acid (Intermediate IIa)

Intermediate IIa

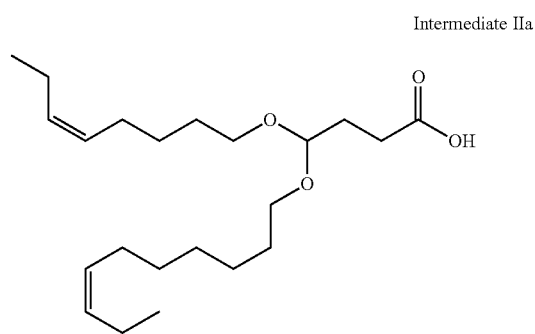 [SMILES: CC/C=C\CCCCCCOC(CCC(=O)O)OCCCC/C=C\CC]

The following is representative of General Procedure B: to a vial containing 4,4-bis(((Z)-oct-5-en-1-yl)oxy)butanenitrile (Intermediate Ia, 1.14 g, 3.54 mmol, 1 Eq) was added potassium hydroxide (0.60 g, 10.6 mmol, 3 Eq) followed by ethanol (3.5 mL) and water (3.5 mL). The vial was tightly capped, and the reaction mixture was heated to 110° C. for 18 h. After this time, the mixture was allowed to cool to room temperature. The mixture was diluted with ethyl acetate (20 mL), and the pH was adjusted to ~5 by the addition of 1 M HCl. The resulting biphasic mixture was separated, and the aqueous phase was extracted two more times with ethyl acetate (2×20 mL). The organic extracts were combined, dried over sodium sulfate, filtered and concentrated to afford 4,4-bis(((Z)-oct-5-en-1-yl)oxy)butanoic acid (1.16 g, 96% yield) as a sticky white solid. $^1$H NMR (400 MHz, Chloroform-d) δ5.41-5.24 (m, 4H), 4.45 (t, J=5.6 Hz, 1H), 3.51 (dt, J=9.0, 6.7 Hz, 2H), 3.39 (dt, J=9.0, 6.7 Hz, 2H), 2.17 (t, J=7.6 Hz, 2H), 2.08-1.98 (m, 8H), 1.81 (q, J=7.3 Hz, 2H), 1.59-1.52 (m, 4H), 1.44-1.32 (m, 4H), 0.94 (t, J=7.5 Hz, 6H).

Step 3: 3-hydroxy-2-(hydroxymethyl)propyl (9Z,12Z)-octadeca-9,12-dienoate (Intermediate III)

Intermediate III

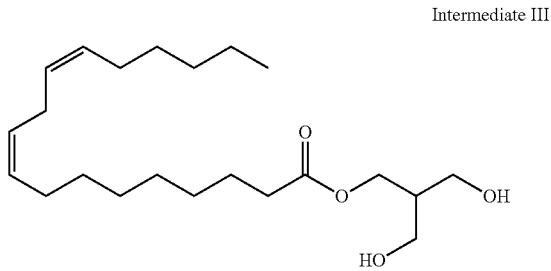 [SMILES: CCCCC/C=C\C/C=C\CCCCCCCC(=O)OCC(CO)CO]

To a mixture of trimethylolmethane (3.0 g, 1 Eq, 28 mmol) in dichloromethane (100 mL) was added linoleic acid (7.9 g, 1 Eq, 28 mmol), DIPEA (5.5 g, 7.4 mL, 1.5 Eq, 42 mmol), and DMAP (0.69 g, 0.2 Eq, 5.7 mmol). Added EDC (8.1 g, 1.5 Eq, 42 mmol) last, and stirred at 23° C. for 18 h. After this time, the reaction mixture was concentrated and purified by flash column chromatography (200 g silica, 0 to 90% ethyl acetate in hexanes over 20 minutes). Obtained 3-hydroxy-2-(hydroxymethyl)propyl (9Z,12Z)-octadeca-9,12-dienoate (2.6 g, 25%) as a colorless oil. $^1$H NMR (500 MHz, Chloroform-d) δ 5.43-5.27 (m, 5H), 4.24 (d, J=6.3 Hz, 2H), 3.76 (ddt, J=21.1, 11.1, 5.3 Hz, 4H), 2.77 (d, J=6.8 Hz, 2H), 2.61-2.55 (m, 2H), 2.36-2.29 (m, 2H), 2.10-1.98 (m, 6H), 1.66-1.58 (m, 2H), 1.41-1.21 (m, 12H), 0.92-0.85 (m, 3H).

Step 4: 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa)

Intermediate IVa

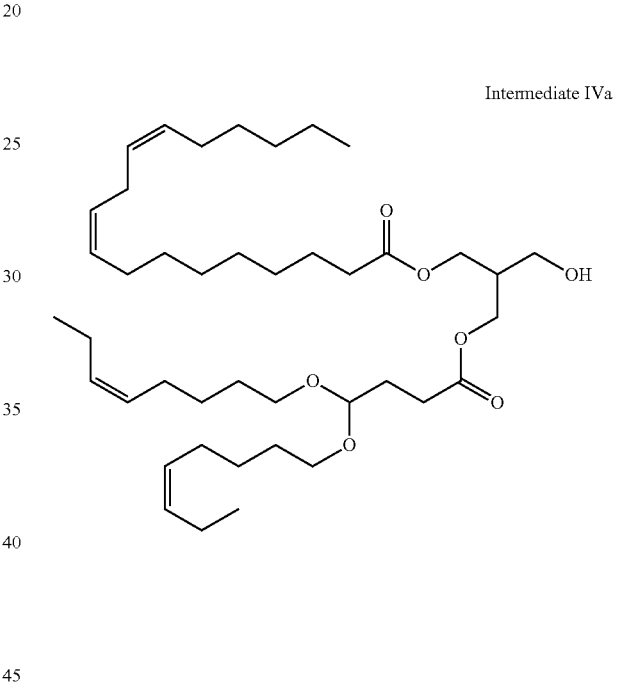

The following is representative of General Procedure C: to a mixture of 4,4-bis(((Z)-oct-5-en-1-yl)oxy)butanoic acid (Intermediate IIa, 591 mg, 1 Eq, 1.74 mmol) in dichloromethane (10 mL) was added 3-hydroxy-2-(hydroxymethyl)propyl (9Z,12Z)-octadeca-9,12-dienoate (Intermediate III, 640 mg, 1 Eq, 1.74 mmol), DIPEA (673 mg, 904 µL, 3 Eq, 5.21 mmol), and DMAP (42.4 mg, 0.2 Eq, 347 µmol). Added EDC (666 mg, 2 Eq, 3.47 mmol) last, stirred at 23° C. for 18 h. Ater this time, the reaction mixture was concentrated and purified by flash column chromatography (50 g silica, 0 to 40% ethyl acetate in hexanes over 12 column volumes). Obtained 3-((4,4-bis(((Z)-oct-5-en-1-yl)oxy)butanoyl)oxy)-2-(hydroxymethyl)propyl (9Z,12Z)-octadeca-9,12-dienoate (450 mg, 38%) as a colorless oil $^1$H NMR (500 MHz, Chloroform-d) δ 5.43-5.27 (m, 8H), 4.49 (t, J=5.5 Hz, 1H), 4.23-4.12 (m, 4H), 3.65-3.60 (m, 2H), 3.58 (dt, J=9.3, 6.6 Hz, 2H), 3.41 (dt, J=9.3, 6.6 Hz, 2H), 2.81-2.73 (m, 2H), 2.41 (t, J=7.5 Hz, 2H), 2.32 (dd, J=7.9, 7.2 Hz, 2H), 2.25-2.15 (m, 2H), 2.12-1.97 (m, 12H), 1.94 (ddd, J=8.0, 7.2, 5.5 Hz, 2H), 1.67-1.53 (m, 8H), 1.45-1.26 (m, 17H), 0.96 (t, J=7.6 Hz, 5H), 0.92-0.87 (m, 3H)

Step 5: 3-((4,4-bis(((Z)-oct-5-en-1-yl)oxy)butanoyl)oxy)-2-((((3-(diethylamino)propoxy)carbonyl)oxy)methyl)propyl (9Z,12Z)-octadeca-9,12-dienoate (Example 1)

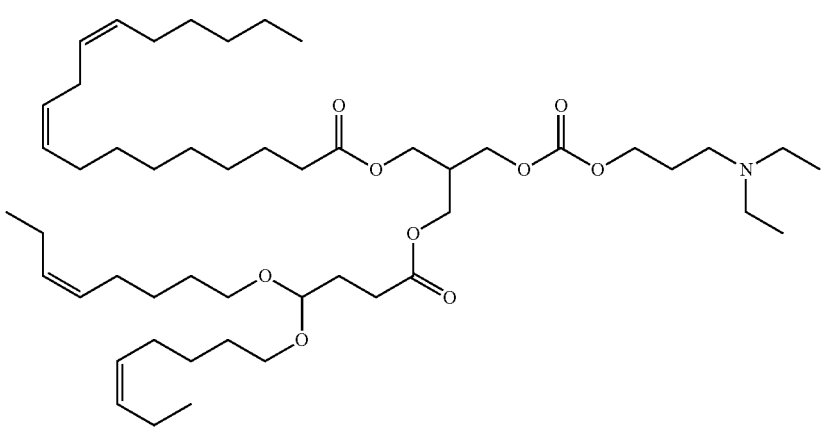

Example 1

The following is representative of General Procedure D: to a solution of 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa, 100 mg, 1 Eq, 145 μmol) in dichloromethane (1 mL) was added pyridine (22.9 mg, 23.3 μL, 2 Eq, 289 μmol), DMAP (4.42 mg, 0.25 Eq, 36.2 μmol), and 4-nitrophenyl chloroformate (58.3 mg, 2 Eq, 289 μmol). The resulting mixture was stirred for 1 h at 23° C. After this time, to it was added DIPEA (74.8 mg, 101 μL, 4 Eq, 579 μmol) and 3-(diethylamino)propan-1-ol (76.0 mg, 85.9 μL, 4 Eq, 579 μmol). The resulting mixture was stirred for an additional 18 h at 23° C. After this time, the reaction mixture was diluted with dichloromethane (10 mL), washed with 0.75 M aqueous sodium carbonate solution (3×10 mL), water (10 mL), and saturated aqueous sodium chloride (10 mL). The resulting organic layer was dried over sodium sulfate, concentrated, and the residue purified by flash column chromatography (10 g silica, 0 to 25% methanol in dichloromethane over 12 minutes). Obtained 3-((4,4-bis(((Z)-oct-5-en-1-vi)oxy)butanoyl)oxy)-2-((((3-(diethylamino)propoxy)carbonyl)oxy)methyl)propyl (9Z,12Z)-octadeca-9,12-dienoate (81 mg, 66%) as a pale yellow oil. $^1$H NMR (500 MHz, Chloroform-d) δ 5.43-5.27 (m, 8H), 4.49 (t, J=5.5 Hz, 1H), 4.22-4.11 (m, 8H), 3.57 (dt, J=9.3, 6.6 Hz, 2H), 3.41 (dt, J=9.3, 6.6 Hz, 2H), 2.81-2.74 (m, 2H), 2.51 (q, J=7.1 Hz, 6H), 2.45-2.36 (m, 3H), 2.31 (dd, J=8.0, 7.2 Hz, 2H), 2.11-1.97 (m, 14H), 1.92 (ddd, J=8.2, 7.1, 5.5 Hz, 2H), 1.86-1.77 (m, 2H), 1.65-1.53 (m, 8H), 1.49-1.23 (m, 14H), 1.01 (t, J=7.1 Hz, 6H), 0.95 (t, J=7.5 Hz, 6H), 0.92-0.86 (m, 3H). LCMS (Method A): found m/z for (M+H) 848.7, RT=3.73 min.

Example 2: 3-((4,4-bis(((Z)-oct-5-en-1-yl)oxy)butanoyl)oxy)-2-(((4-(pyrrolidin-1-yl)butanoyl)oxy)methyl)propyl (9Z,12Z)-octadeca-9,12-dienoate

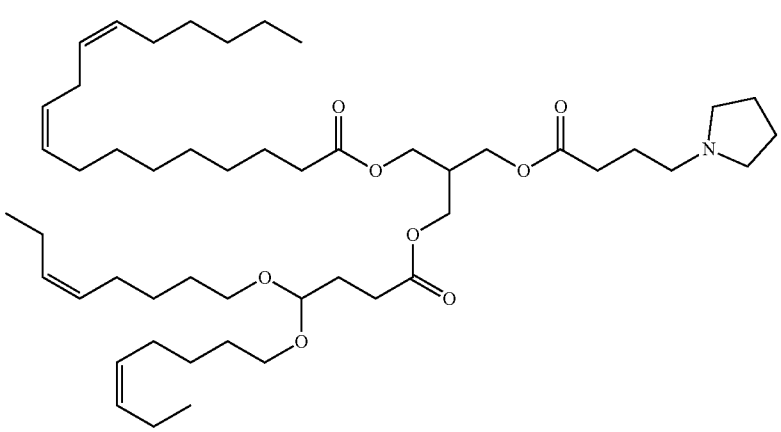

Example 2

The following is representative of General Procedure E: to a mixture of 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa, 78 mg, 1 Eq, 0.11 mmol) in dichloromethane (1 mL) was added 4-(pyrrolidin-1-yl)butanoic acid hydrochloride (26 mg, 1.2 Eq, 0.14 mmol, DIPEA (73 mg, 98 μL, 5 Eq, 0.56 mmol), and DMAP (2.8 mg, 0.2 Eq, 23 µmol). Added EDC (43 mg, 2 Eq, 0.23 mmol) last, stirred at 23° C. for 18 h. After this time, the reaction mixture was concentrated and purified by flash column chromatography (10 g silica, 0 to 20% methanol in DCM over 12 column volumes). Obtained 3-((4,4-bis(((Z)-oct-5-en-1-yl)oxy)butanoyl)oxy)-2-(((4-(pyrrolidin-1-yl)butanoyl)oxy)methyl)propyl (9Z,12Z)-octadeca-9,12-dienoate (74 mg, 78%) as a colorless oil. $^1$H NMR (500 MHz, Chloroform-cd) δ 5.42-5.28 (m, 8H), 4.49 (t, J=5.6 Hz, 1H), 4.15-4.10 (m, 6H), 3.57 (dt, J=9.3, 6.6 Hz, 2H), 3.41 (dt, J=9.3, 6.6 Hz, 2H), 2.77 (tdq, J=7.1, 1.4, 0.8 Hz, 2H), 2.57-2.43 (m, 6H), 2.43-2.35 (m, 5H), 2.30 (dd, J=8.0, 7.2 Hz, 2H), 2.11-1.97 (m, 12H), 1.92 (ddd, J=8.3, 7.2, 5.6 Hz, 2H), 1.89-1.73 (m, 6H), 1.68-1.52 (m, 8H), 1.48-1.24 (m, 16H), 0.95 (t, J=7.6 Hz, 6H), 0.92-0.85 (m, 3H), LCMS (Method A): found m/Z for (M+H)=830.7, RT=3.75 min The following Intermediates Ib-Ih were prepared according to General Procedure A, varying the alcohol building block.

Intermediate Ib

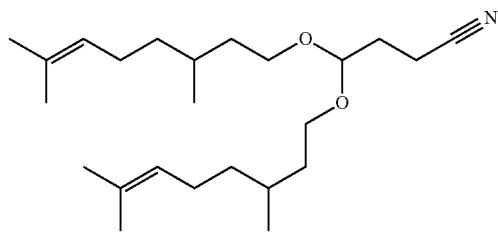

Intermediate Ib, 4,4-bis((3,7-dimethyloct-6-en-1-yl)oxy)butanenitrile: prepared from rac-citronellol on a 9.5 mmol scale, yield 0.87 g (24%).

Intermediate Ic

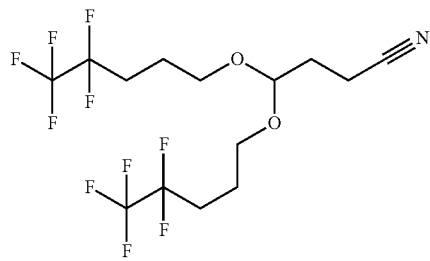

Intermediate Ic, 4,4-bis((4,4,5,5,5-pentafluoropentyl)oxy)butanenitrile: prepared from 4,4,5,5,5-pentafluoropentan-1-ol on a 9.5 mmol scale, yield 1.8 g (45%)

Intermediate Id

Intermediate Id, 4,4-bis((5,5,6,6,6-pentafluorohexyl)oxy)butanenitrile: prepared from 5,5,6,6,6-penafluorohexan-1-ol on a 9.5 mmol scale, yield 0.70 g (16%).

Intermediate Ie

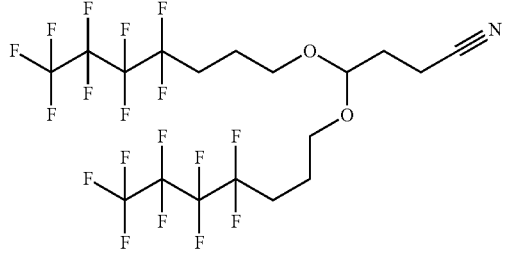

Intermediate Ie, 4,4-bis((4,4,5,5,6,6,7,7,7-nonafluoroheptyl)oxy)butanenitrile: prepared from 4,4,5,5,6,6,7,7,7-nonafluoroheptan-1-ol on a 9.5 mmol scale, yield 2.0 g (34%).

Intermediate If

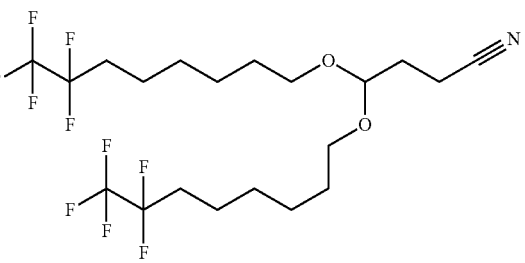

Intermediate If, 4,4-bis((7,7,8,8,8-pentafluorooctyl)oxy)butanenitrile: prepared from 7,7,8,8,8-pentafluorooctan-1-ol on a 9.5 mmol scale, yield 1.6 g (33%). $^1$H NMR (500 MHz, Chloroform-d) δ 4.57 (t, J=5.3 Hz, 1H), 3.61 (dt, J=9.2, 6.5 Hz, 2H), 3.45 (dt, J=9.3, 6.5 Hz, 2H), 2.43 (t, J=7.3 Hz, 2H), 2.09-1.91 (m, 6H), 1.65-1.53 (m, 8H), 1.47-1.35 (m, 8H)

Intermediate Ig

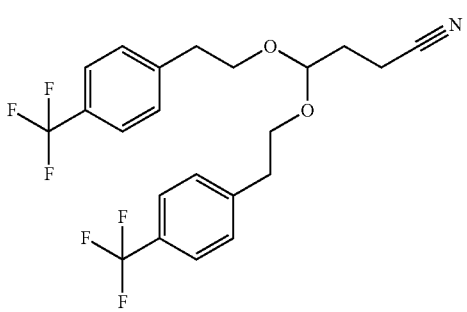

Intermediate Ig, 4,4-bis(4-(trifluoromethyl)phenethoxy)butanenitrile: prepared from (4-trifluoromethylphenyl)ethanol on a 9.5 mmol scale, yield 2.2 g (52%).

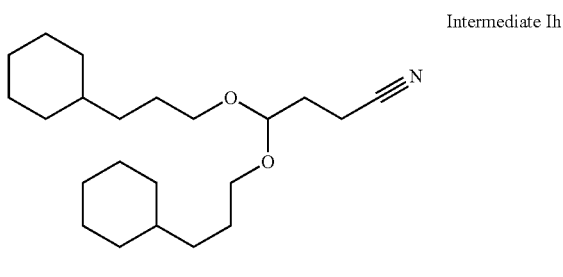 [SMILES: N#CCCC(OCCCC1CCCCC1)OCCCC1CCCCC1]

Intermediate Ih

Intermediate Ih, 4,4-bis(3-cyclohexylpropoxy)butanenitrile: prepared from 3-cyclohexylpropan-1-ol on a 9.5 mmol scale, yield 2.3 g (68%).

The following Intermediates IIb-IIh were prepared from the corresponding Intermediates Ib-Ih according to General Procedure B.

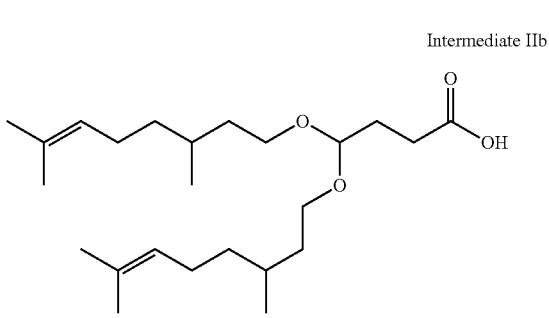 [SMILES: CC(C)=CCCC(C)CCOC(CCC(=O)O)OCCC(C)CCC=C(C)C]

Intermediate IIb

Intermediate IIb, 4,4-bis((3,7-dimethyloct-6-en-1-yl)oxy)butanoic acid-prepared from 4,4-bis((3,7-dimethyloct-6-en-1-yl)oxy)butanenitrile (Intermediate Ib) on a 2.3 mmol scale, yield 0.88 g (97%). $^1$H NMR (500 MHz, Chloroform-d) δ 5.09 (dddd, J=7.1, 5.7, 2.9, 1.4 Hz, 2H), 4.51 (t, J=5.5 Hz, 1H), 3.62 (dddd, J=16.2, 14.0, 6.9, 1.5 Hz, 2H), 3.45 (ddt, J=16.7, 9.2, 6.7 Hz, 2H), 2.45 (t, J=7.3 Hz, 2H), 2.06-1.89 (m, 6H), 1.68 (d, J=1.4 Hz, 6H), 1.66-1.52 (m, 8H), 1.42-1.29 (m, 8H), 1.16 (dddd, J=13.4, 9.8, 7.8, 5.8 Hz, 3H), 0.89 (dd, J=6.6, 1.7 Hz, 6H).

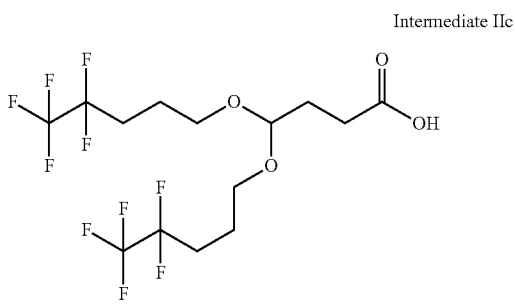 [SMILES: O=C(O)CCC(OCCCC(F)(F)C(F)(F)F)OCCCC(F)(F)C(F)(F)F]

Intermediate IIc

Intermediate IIc, 4,4-bis((4,4,5,5,5-pentafluoropentyl)oxy)butanoic acid: prepared from 4,4-bis((4,4,5,5,5-pentafluoropentyl)oxy)butanenitrile (Intermediate Ic) on a 4.3 mmol scale, yield 1.6 g (83%). $^1$H NMR (500 MHz, Chloroform-d) δ 4.55 (t, J=5.4 Hz, 1H), 3.65 (dt, J=9.5, 6.1 Hz, 2H), 3.49 (dt, J=9.5, 6.1 Hz, 2H), 2.43 (t, J=7.2 Hz, 2H), 2.22-2.06 (m, 4H), 1.92-1.82 (m, 6H).

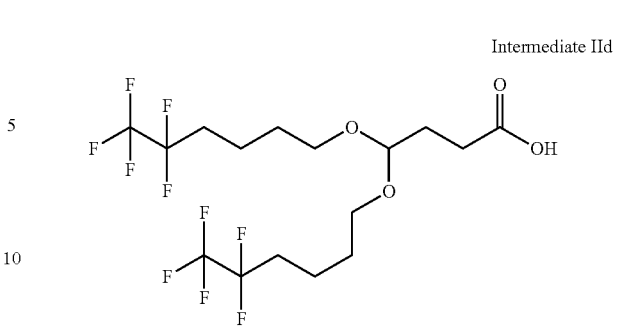

Intermediate IId

Intermediate IId, 4,4-bis((5,5,6,6,6-pentafluorohexyl)oxy)butanoic acid-prepared from 4,4-bis((5,5,6,6,6-pentafluorohexyl)oxy)butanenitrile (Intermediate Id) on a 1.6 mmol scale, yield 0.53 g (73%).

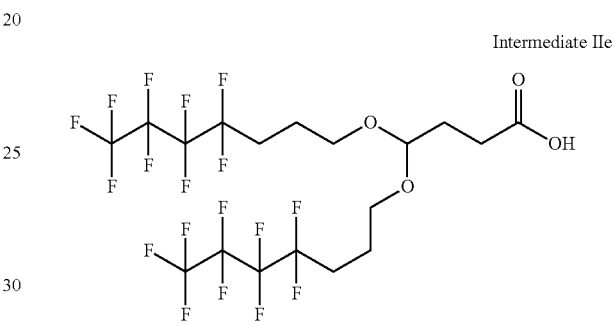

Intermediate IIe

Intermediate IIe, 4,4-bis((4,4,5,5,6,6,7,7,7-nonafluoroheptyl)oxy)butanoic acid: prepared from 4,4-bis((4,4,5,5,6,6,7,7,7-nonafluoroheptyl)oxy)butanenitrile (Intermediate Ie) on a 3.3 mmol scale, yield 1.9 g (91%). $^1$H NMR (500 MHz, Chloroform-d) δ 4.55 (t, J=5.5 Hz, 1H), 3.65 (dt, J=9.5, 6.1 Hz, 2H), 3.50 (dt, J=9.5, 6.1 Hz, 2H), 2.43 (td, J=7.2, 3.5 Hz, 2H), 2.18 (tt, J=18.5, 7.8 Hz, 4H), 2.02-1.83 (m, 6H).

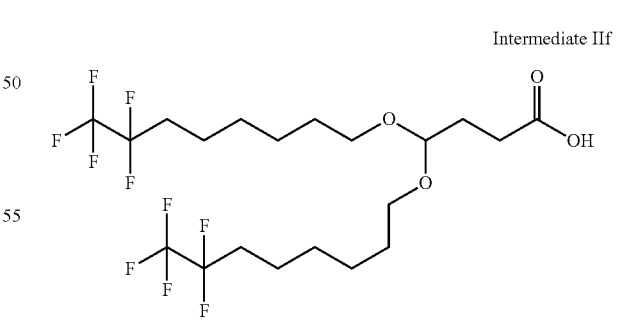

Intermediate IIf

Intermediate IIf, 4,4-bis((7,7,8,8,8-pentafluorooctyl)oxy)butanoic acid: prepared from 4,4-bis((7,7,8,8,8-pentafluorooctyl)oxy)butanenitrile (Intermediate If) on a 3.1 mmol scale, yield 1.6 g (96%). $^1$H NMR (500 MHz, Chloroform-d) δ 4.50 (t, J=5.5 Hz, 1H), 3.57 (dt, J=9.4, 6.6 Hz, 2H), 3.41 (dt, J=9.4, 6.6 Hz, 2H), 2.38 (t, J=7.5 Hz, 2H), 2.08-1.87 (m, 6H), 1.69-1.51 (m, 8H), 1.41-1.38 (m, J=3.5 Hz, 8H).

Intermediate IIg

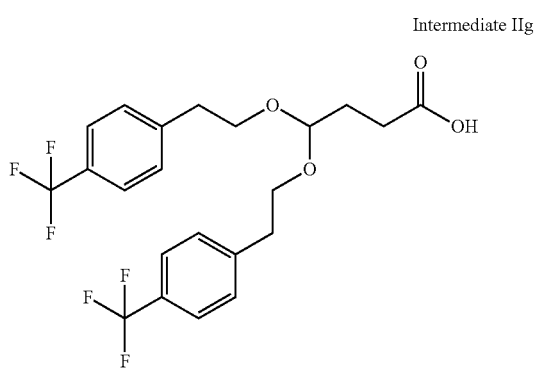 [SMILES: O=C(O)CCC(OCCc1ccc(C(F)(F)F)cc1)OCCc1ccc(C(F)(F)F)cc1]

Intermediate IIg, 4,4-bis(4-(trifluoromethyl)phenethoxy)butanoic acid prepared from 4,4-bis(4-(trifluoromethyl)phenethoxy)butanenitrile (Intermediate Ig) on a 5.0 mmol scale, yield 1.7 g (74%). $^1$H NMR (500 MHz, Chloroform-d) δ 7.52 (d, J=7.6 Hz, 4H) 7.27 (d, J=7.6 Hz, 4H), 4.49 (t, J=5.5 Hz, 1H), 3.66 (dt, J=9.4, 6.6 Hz, 2H), 3.53 (dt, J=9.4, 6.6 Hz, 2H), 2.84 (t, J=6.6 Hz, 4H), 2.31 (t, J=7.3 Hz, 2H), 1.88 (td, J=7.4, 5.6 Hz, 2H).

Intermediate IIh

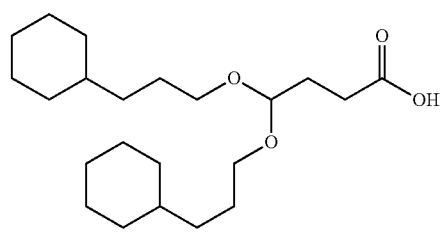

Intermediate IIh, 4,4-bis(3-cyclohexylpropoxy)butanoic acid: prepared from 4,4-bis(3-cyclohexylpropoxy)butanenitrile (Intermediate Ih) on a 6.5 mmol scale, yield 1.9 g (79%). $^1$H NMR (500 MHz, Chloroform-d) δ 4.50 (t, J=5.5 Hz, 1H), 3.55 (dt, J=9.3, 6.8 Hz, 2H), 3.40 (dt, J=9.3, 6.8 Hz, 2H), 2.41 (t, J=7.3 Hz, 2H), 1.92 (td, J=7.4, 5.4 Hz, 2H), 1.76-1.49 (m, 14H), 1.33-1.06 (m, 12H), 0.94-0.73 (m, 4H).

The following Intermediates IVb-IVh were prepared from the corresponding Intermediates IIb-IIh and Intermediate III according to General Procedure C.

Intermediate IVb, 3-((4,4-bis((3,7-dimethyloct-6-en-1-yl)oxy)butanoyl)oxy)-2-(hydroxymethyl)propyl (9Z,12Z)-octadeca-9,12-dienoate: prepared from 4,4-bis((3,7-dimethyloct-6-en-1-yl)oxy)butanoic acid (Intermediate IIb) on a 1.1 mmol scale, yield 0.37 g (45%). $^1$H NMR (500 MHz, Chloroform-d) δ 5.43-5.28 (m, 4H), 5.13-5.06 (m, 2H), 4.49 (t, J=5.5 Hz, 1H), 4.23-4.12 (m, 4H), 3.68-3.55 (m, 4H), 3.50-3.38 (m, 2H), 2.80-2.74 (m, 2H), 2.41 (t, J=7.5 Hz, 2H), 2.35-2.29 (m, 2H), 2.25-2.15 (m, 2H), 2.10-1.89 (m, 10H), 1.74-1.66 (m, 6H), 1.66-1.51 (m, 12H), 1.44-1.23 (m, 18H), 1.22-1.11 (m, 2H), 0.96-0.84 (m, 9H).

Intermediate IVc

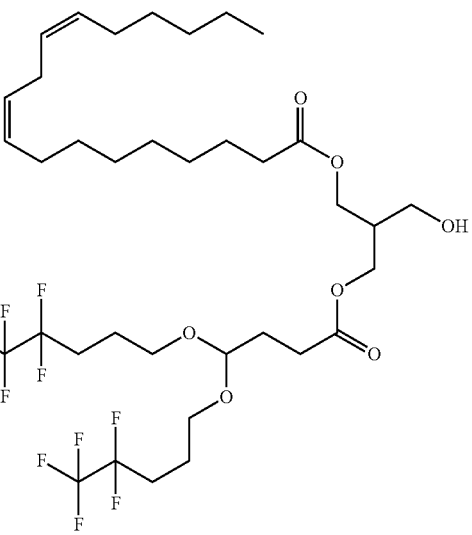

Intermediate IVc, 3-((4,4-bis((4,4,5,5,5-pentafluoropentyl)oxy)butanoyl)oxy)-2-(hydroxymethyl)propyl (9Z,12Z)-octadeca-9,12-dienoate: prepared from 4,4-bis((4,4,5,5,5-pentafluoropentyl)oxy)butanoic acid (Intermediate IIc) on a 1.4 mmol scale, yield 0.40 g (37%). $^1$H NMR (500 MHz, Chloroform-d) δ 5.43-5.28 (m, 4H), 4.53 (t, J=5.5 Hz, 1H), 4.23-4.08 (m, 4H), 3.68-3.57 (m, 4H), 3.49 (dt, J=9.5, 6.0 Hz, 2H), 2.80-2.74 (m, 2H), 2.40 (t, J=7.4 Hz, 2H), 2.32 (dd, J=7.9, 7.2 Hz, 2H), 2.23-2.00 (m, 11H), 1.99-1.81 (m, 6H), 1.68-1.55 (m, 4H), 1.40-1.24 (m, 11H), 0.91-0.86 (m, 3H).

Intermediate IVb

Intermediate IVd

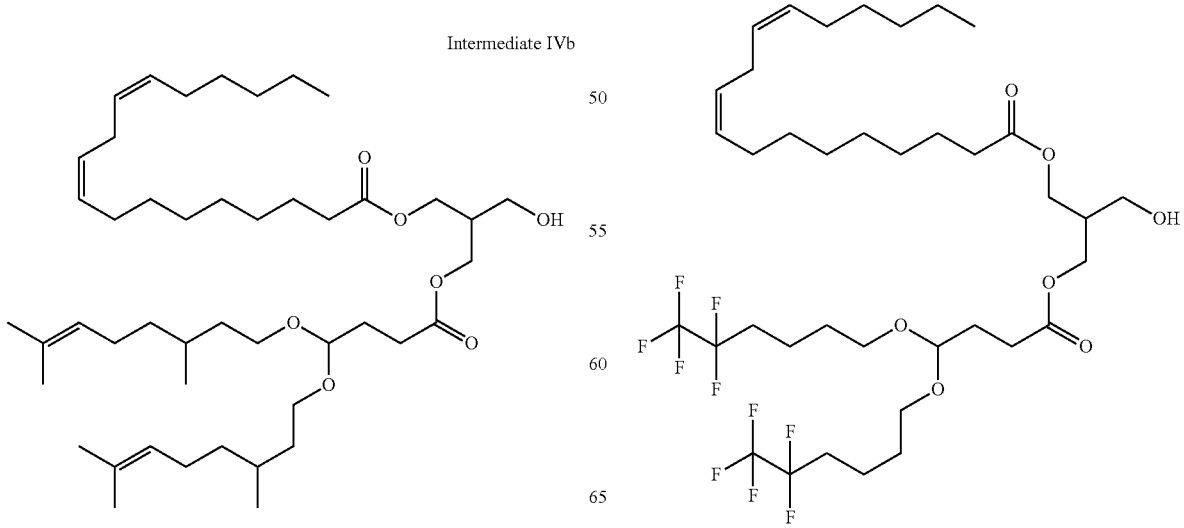

Intermediate IVd, 3-((4,4-bis((5,5,6,6,6-pentafluorohexyl)oxy)butanoyl)oxy)-2-(hydroxymethyl)propyl (9Z,12Z)-octadeca-9,12-dienoate prepared from 4,4-bis((5,5,6,6,6-pentafluorohexyl)oxy)butanoic acid (Intermediate IId) on a 1.1 mmol scale, yield 0.20 g (23%).

Intermediate IVe

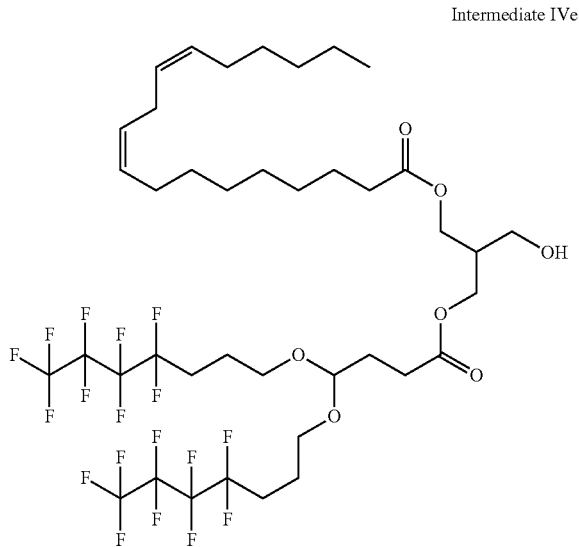 [SMILES: CCCCC/C=C\C/C=C\CCCCCCCC(=O)OCC(CO)COC(=O)CCC(OCCCC(F)(F)C(F)(F)C(F)(F)C(F)(F)F)OCCCC(F)(F)C(F)(F)C(F)(F)C(F)(F)F]

Intermediate IVe, 3-((4,4-bis((4,4,5,5,6,6,7,7,7-nonafluoroheptyl)oxy)butanoyl)oxy)-2-(hydroxymethyl)propyl (9Z,12Z)-octadeca-9,12-dienoate: prepared from 4,4-bis((4,4,5,5,6,6,7,7,7-nonafluoroheptyl)oxy)butanoic acid (Intermediate IIe) on a 1.4 mmol scale, yield 0.50 g (37%). $^1$H NMR (500 MHz, Chloroform-d) δ 5.43-5.28 (m, 4H), 4.54 (t, J=5.5 Hz, 1H), 4.24-4.08 (m, 4H), 3.68-3.60 (m, 4H), 3.51 (dt, J=9.5, 6.1 Hz, 2H), 2.80-2.74 (m, 2H), 2.41 (t, J=7.4 Hz, 2H), 2.32 (dd, J=8.0, 7.2 Hz, 2H), 2.26-2.11 (m, 5H), 2.10-2.01 (m, 5H), 1.99-1.84 (m, 6H), 1.65-1.59 (m, 2H), 1.57 (s, 2H), 1.40-1.23 (m, 12H), 0.92-0.86 (m, 3H).

Intermediate IVf

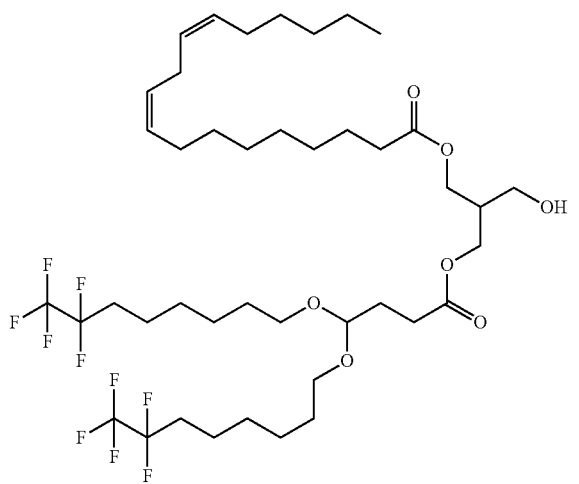

Intermediate IVf, 3-((4,4-bis((7,7,8,8,8-pentafluorooctyl)oxy)butanoyl)oxy)-2-(hydroxymethyl)propyl (9Z,12Z)-octadeca-9,12-dienoate: prepared from 4,4-bis((7,7,8,8,8-pentafluorooctyl)oxy)butanoic acid (Intermediate IIf) on a 1.1 mmol scale, yield 0.39 g (41%) $^1$H NMR (500 MHz, Chloroform-d) δ 5.43-5.28 (m, 4H), 4.49 (t, J=5.5 Hz, 1H), 4.23-4.12 (m, 4H), 3.62 (t, J=5.9 Hz, 2H), 3.57 (dt, J=9.3, 6.5 Hz, 2H), 3.41 (dt, J=9.3, 6.6 Hz, 2H), 2.81-2.74 (m, 2H), 2.41 (t, J=7.5 Hz, 2H), 2.32 (dd, J=7.9, 7.2 Hz, 2H), 2.24-2.16 (m, 2H), 2.10-1.89 (m, 12H), 1.66-1.57 (m, 9H), 1.46-1.24 (m, 2H), 0.92-0.86 (m, 3H).

Intermediate IVg

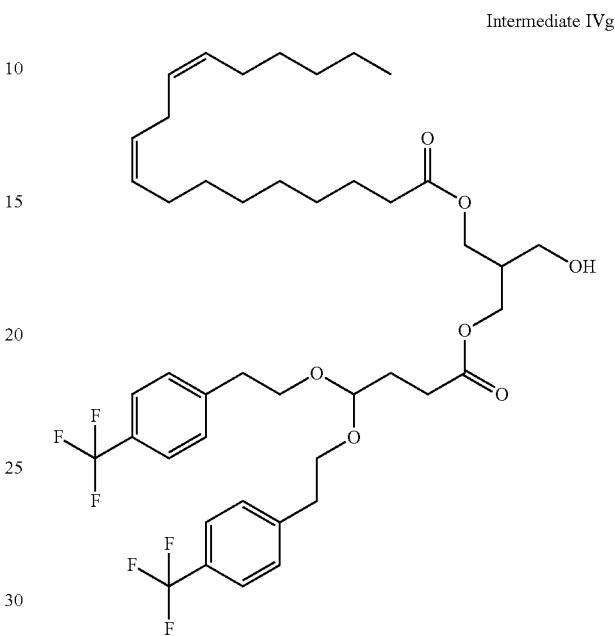

Intermediate IVg, 3-((4,4-bis(4-(trifluoromethyl)phenethoxy)butanoyl)oxy)-2-(hydroxymethyl)propyl (9Z,12Z)-octadeca-9,12-dienoate: prepared from 4,4-bis(4-(trifluoromethyl)phenethoxy)butanoic acid (Intermediate IIg) on a 1.4 mmol scale, yield 0.38 g (35%). $^1$H NMR (500 MHz, Chloroform-d) δ 7.54-7.50 (m, 4H), 7.29-7.26 (m, 4H), 5.43-5.28 (m, 4H), 4.48 (t, J=5.5 Hz, 1H), 4.22-4.06 (m, 5H), 3.69-3.62 (m, 2H), 3.60 (t, J=5.7 Hz, 2H), 3.57-3.47 (m, 2H), 2.85 (t, J=6.7 Hz, 4H), 2.80-2.74 (m, 2H), 2.38-2.23 (m, 4H), 2.23-2.12 (m, 2H), 2.10-2.01 (m, 4H), 1.95-1.85 (m, 2H), 1.65-1.56 (m, 4H), 1.41-1.23 (m, 11H), 0.92-0.86 (m, 3H).

Intermediate IVh

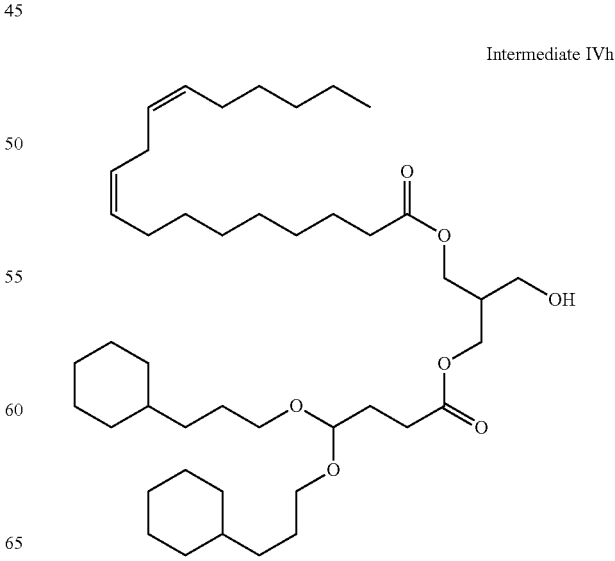

Intermediate IVh, 3-((4,4-bis(3-cyclohexylpropoxy)butanoyl)oxy)-2-(hydroxymethyl)propyl (9Z,12Z)-octadeca-9,12-dienoate: prepared from 4,4-bis(3-cyclohexylpropoxy)butanoic acid (Intermediate IIh) on a 1.4 mmol scale, yield 0.40 g (41%) $^1$H NMR (500 MHz, Chloroform-d) δ 5.43-5.28 (m, 4H), 4.49 (t, J=5.5 Hz, 1H), 4.23-4.11 (m, 4H), 3.62 (t, J=5.8 Hz, 2H), 3.55 (dt, J=9.3, 6.8 Hz, 2H), 3.39 (dt, J=9.3, 6.8 Hz, 2H), 2.77 (ttd, J=7.0, 1.4, 0.7 Hz, 2H), 2.41 (t, J=7.5 Hz, 2H), 2.32 (dd, J=7.9, 7.2 Hz, 2H), 2.25-2.16 (m, 1H), 2.09-2.01 (m, 4H), 1.93 (ddd, J=7.9, 7.2, 5.5 Hz, 2H), 1.74-1.50 (m, 181H), 1.42-1.09 (m, 25H), 0.92-0.83 (m, 7H).

The following examples 3-11 were prepared from Intermediate IVa according to General Procedure D.

Example 3

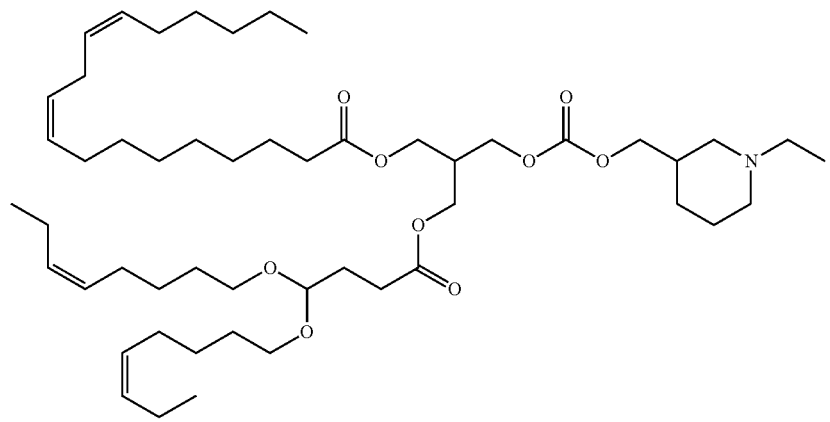

Example 3, 3-((4,4-bis(((Z)-oct-5-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from Intermediate IVa and (1-ethylpiperidin-3-yl)methanol on a 0.15 mmol scale, yield 0.082 g (66%). $^1$H NMR (500 MHz, Chloroform-d) δ 5.43-5.27 (m, 8H), 4.49 (t, J=5.6 Hz, 1H), 4.22-4.12 (m, 6H), 4.09-3.93 (m, 1H), 3.57 (dt, J=9.3, 6.6 Hz, 2H), 3.41 (dt, J=9.4, 6.6 Hz, 2H), 2.80-2.74 (m, 2H), 2.47-2.36 (m, 4H), 2.31 (dd, J=8.0, 7.2 Hz, 2H), 2.12-1.96 (m, 12H), 1.96-1.85 (m, 3H), 1.82-1.67 (m, 3H), 1.67-1.51 (m, 10H), 1.48-1.24 (m, 2H), 1.08 (t, J=7.2 Hz, 3H), 0.96 (t, J=7.6 Hz, 6H), 0.92-0.85 (m, 31H) LCMS (Method A): found m/z for (M+H)=860.6, RT=3.75 min.

Example 4

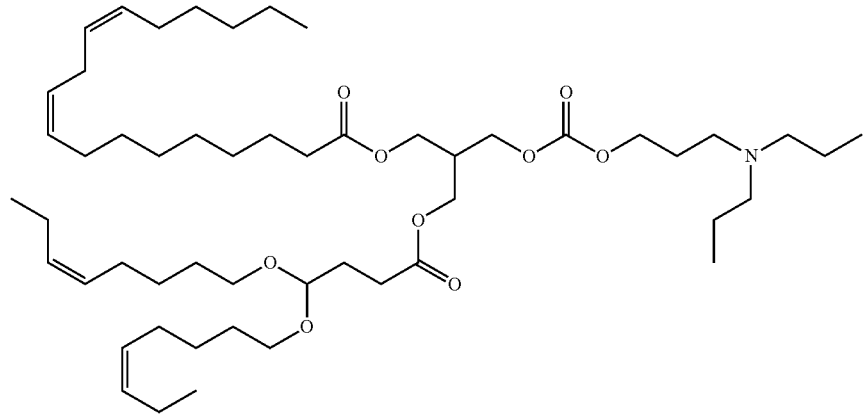

Example 4, 3-((4,4-bis(((Z)-oct-5-en-1-yl)oxy)butanoyl)oxy)-2-((((3-(dipropylamino)propoxy)carbonyl)oxy)methyl)propyl (9Z,12Z)-octadeca-9,12-dienoate: prepared from Intermediate IVa and 3-(dipropylamino)propan-1-ol on a 0.072 mmol scale, yield 0.057 g (90%). LCMS (Method A): found m/z for (M+H)=876.6, RT=3.76 min.

Example 5

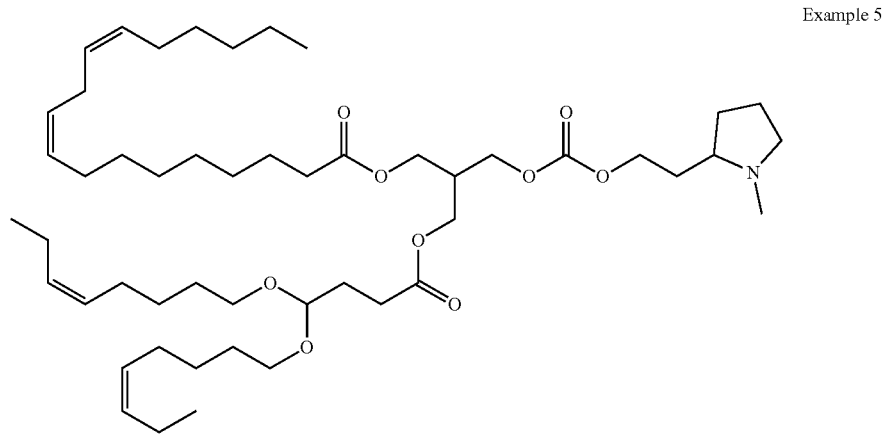 [SMILES: CC/C=C\CCCCOC(CCC(=O)OCC(COC(=O)CCCCCCC/C=C\C/C=C\CCCCC)COC(=O)OCCC1CCCN1C)OCCCC/C=C\CC]

Example 5, 3-((4,4-bis(((Z)-oct-5-en-1-yl)oxy)butanoyl)oxy)-2-((((2-(1-methylpyrrolidin-2-yl)ethoxy)carbonyl)oxy)methyl)propyl (9Z,12Z)-octadeca-9,12-dienoate: prepared from Intermediate IVa and 2-(1-methylpyrrolidin-2-yl)methanol on a 0.072 mmol scale, yield 0.042 g (69%). LCMS (Method A): found m/z for (M+H)=846.7, RT=3.72 min.

Example 6

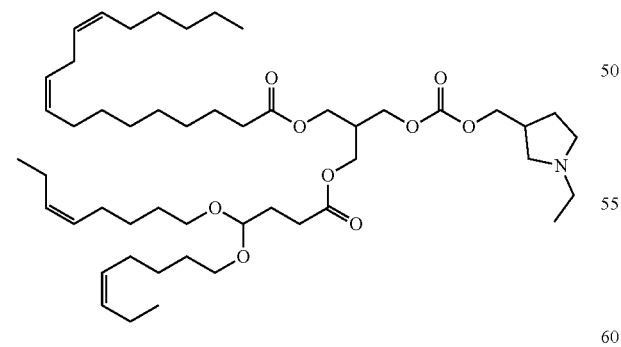

Example 6, 3-((4,4-bis(((Z)-oct-5-en-1-yl)oxy)butanoyl)oxy)-2-(((((1-ethylpyrrolidin-3-yl)methoxy)carbonyl)oxy)methyl)propyl (9Z,12Z)-octadeca-9,12-dienoate: prepared from Intermediate IVa and (1-ethylpyrrolidin-3-yl)methanol on a 0.072 mmol scale, yield 0.039 g (64%). LCMS (Method A): found m/z for (M+H)=846.6, RT=3.72 min.

Example 7

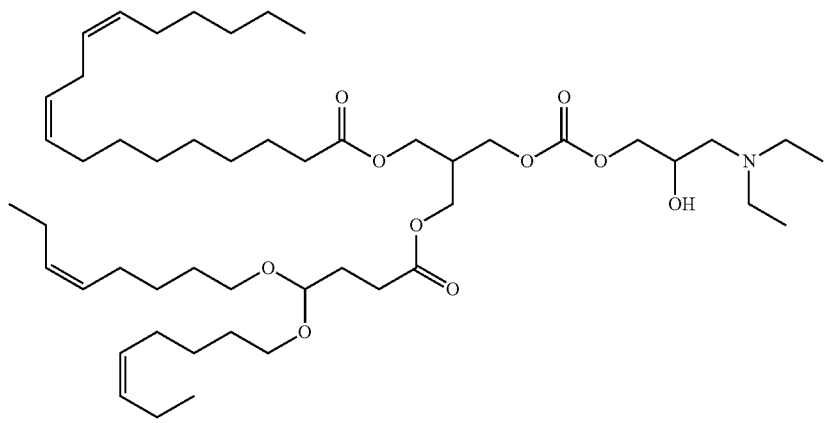

Example 7, 3-((4,4-bis(((Z)-oct-5-en-1-yl)oxy)butanoyl)oxy)-2-((((3-(diethylamino)-2-hydroxypropoxy)carbonyl)oxy)methyl)propyl (9Z,12Z)-octadeca-9,12-dienoate: prepared from Intermediate IVa and 3-(diethylamino)propane-1,2-diol on a 0.072 mmol scale, yield 0.002 g (3%). LCMS (Method A): found m/z for (M+H)=864.6, RT=3.66 min.

Example 8

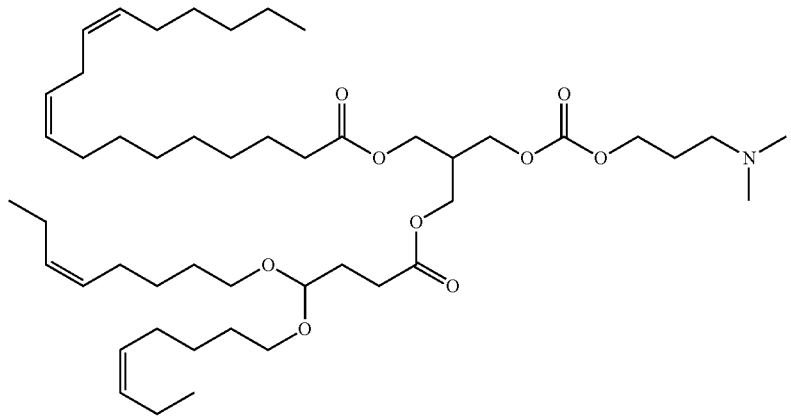

Example 8, 3-((4,4-bis(((Z)-oct-5-en-1-yl)oxy)butanoyl)oxy)-2-((((3-(dimethylamino)propoxy)carbonyl)oxy)methyl)propyl (9Z,12Z)-octadeca-9,12-dienoate-prepared from Intermediate IVa and 3-(dimethylamino)propan-1-ol on a 0.077 mmol scale, yield 0.022 g (35%). LCMS (Method A): found m/z for (M+H)=820.7, RT=3.77 min.

Example 9

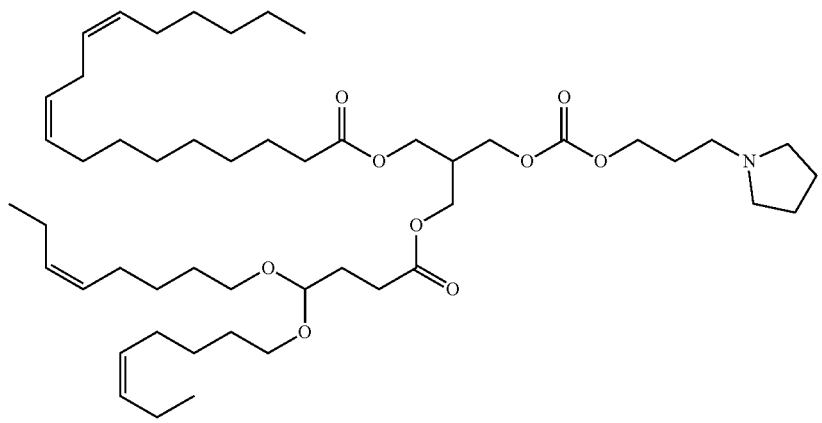

Example 9, 3-((4,4-bis(((Z)-oct-5-en-1-yl)oxy)butanoyl)oxy)-2-((((3-(pyrrolidin-1-yl)propoxy)carbonyl)oxy)methyl)propyl (9Z,12Z)-octadeca-9,12-dienoate: prepared from Intermediate IVa and 3-(pyrrolidin-1-yl)propan-1-ol on a 0.077 mmol scale, yield 0.027 g (41%). LCMS (Method A): found m/z for (M+H)=846.7, RT=3.76 min.

Example 10

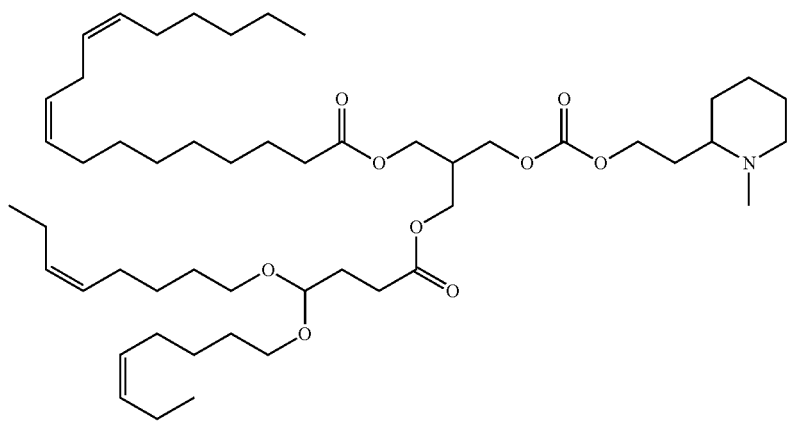

Example 10, 3-((4,4-bis(((Z)-oct-5-en-1-yl)oxy)butanoyl)oxy)-2-((((2-(1-methylpiperidin-2-yl)ethoxy)carbonyl)oxy)methyl)propyl (9Z,12Z)-octadeca-9,12-dienoate: prepared from Intermediate IVa and 2-(1-methylpiperidin-2-yl)ethan-1-ol on a 0.087 mmol scale, yield 0.039 g (52%). LCMS (Method A): found m/z for (M+H)=860.6, RT=3.83 min.

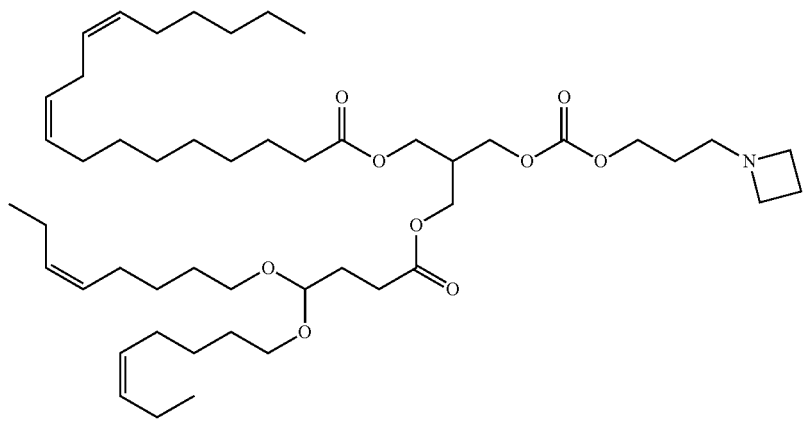

Example 11

Example 11, 3-(((3-(azetidin-1-yl)propoxy)carbonyl)oxy)-2-(((4,4-bis(((Z)-oct-5-en-1-yl)oxy)butanoyl)oxy)methyl)propyl (9Z,12Z)-octadeca-9,12-dienoate: prepared from Intermediate IVa and 3-(azetidin-1-yl)propan-1-ol on a 0.087 mmol scale, yield 0.041 g (57%). LCMS (Method A): found m/z for (M+H)=832.5, RT=3.74 min.

The following examples 12 and 13 were prepared from Intermediate IVa according to General Procedure E.

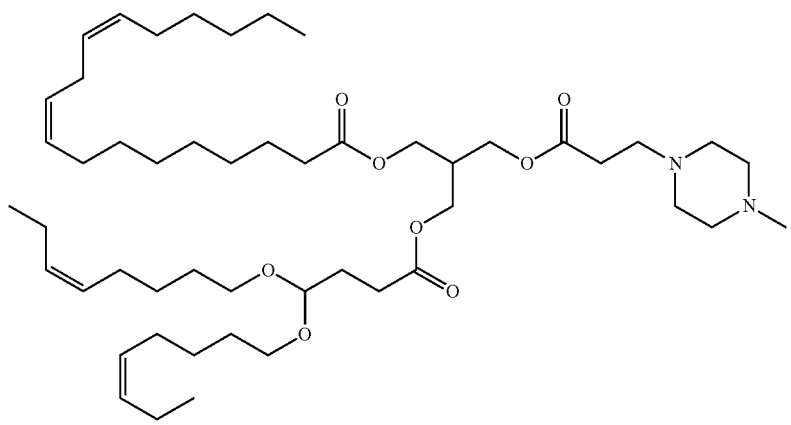

Example 12

Example 12, 3-((4,4-bis(((Z)-oct-5-en-1-yl)oxy)butanoyl)oxy)-2-(((3-(4-methylpiperazin-1-yl)propanoyl)oxy)methyl)propyl (9Z,12Z)-octadeca-9,12-dienoate: prepared from Intermediate IVa and 3-(4-methylpiperazin-1-yl)propanoic acid dihydrochloride on a 0.072 mmol scale, yield 0.056 g (91%). $^1$H NMR (500 MHz, Chloroform-d) δ 5.42-5.27 (m, 8H), 4.49 (t, J=5.6 Hz, 1H), 4.21-4.10 (m, 6H), 3.64-3.53 (m, 2H), 3.41 (dt, J=9.3, 6.6 Hz, 2H), 2.80-2.74 (m, 2H), 2.72-2.65 (m, 2H), 2.62-2.46 (m, 6H), 2.46-2.35 (m, 7H), 2.35-2.23 (m, 4H), 2.12-1.96 (m, 13H), 1.96-1.89 (m, 2H), 1.67-1.52 (m, 9H), 1.48-1.23 (m, 15H), 0.95 (t, J=7.6 Hz, 6H), 0.92-0.86 (m, 3H). LCMS (Method A): found m/z for (M+H)=845.6, RT=3.67 min.

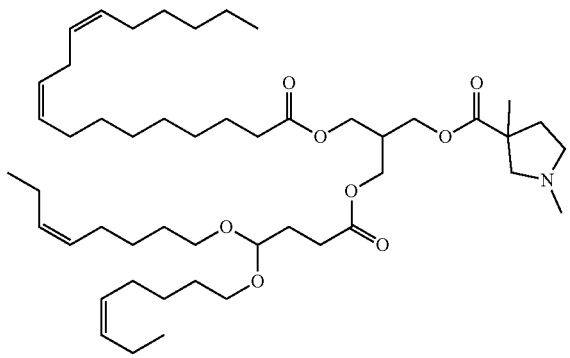

Example 13

Example 13, 3-((4,4-bis(((Z)-oct-5-en-1-yl)oxy)butanoyl)oxy)-2-((((9Z,12Z)-octadeca-9,12-dienoyl)oxy)methyl)propyl 1,3-dimethylpyrrolidine-3-carboxylate: prepared from Intermediate IVa and 1,3-dimethylpyrrolidine-3-carboxylic acid on a 0.077 mmol scale, yield 0.007 g (11%). LCMS (Method A): found m/z for (M+H)=816.6, RT=3.76 min.

The following examples 14-22 were prepared from Intermediate IVb according to General Procedure D.

Example 14

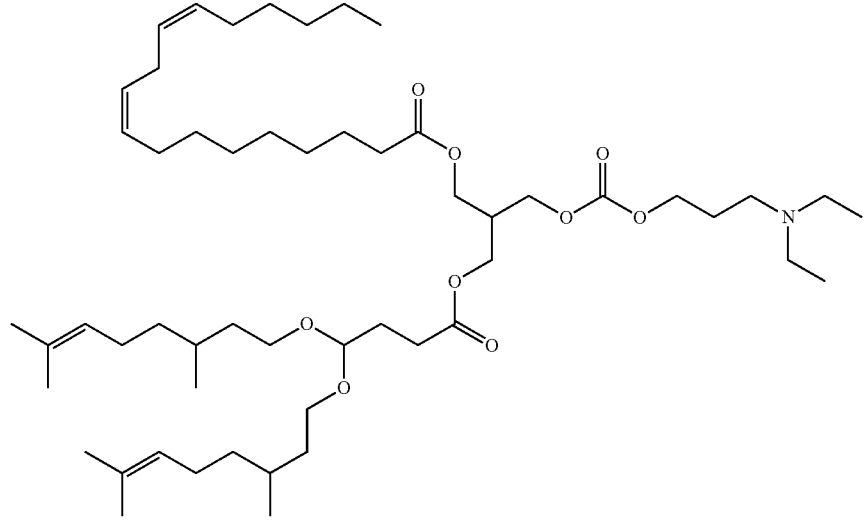

Example 14, 3-((4,4-bis((3,7-dimethyloct-6-en-1-yl)oxy)butanoyl)oxy)-2-((((3-(diethylamino)propoxy)carbonyl)oxy)methyl)propyl (9Z,12Z)-octadeca-9,12-dienoate prepared from Intermediate IVb and 3-(diethylamino)propan-1-ol on a 0.13 mmol scale, yield 0.056 g (46%). $^1$H NMR (500 MHz, Chloroform-d) δ 5.43-5.28 (m, 4H), 5.13-5.06 (m, 2H), 4.48 (t, J=5.5 Hz, 1H), 4.22-4.10 (m, 8H), 3.66-3.55 (m, 2H), 3.50-3.38 (m, 2H), 2.80-2.74 (m, 2H), 2.51 (q, J=7.1 Hz, 6H), 2.48-2.37 (m, 3H), 2.31 (dd, J=8.0, 7.2 Hz, 2H), 2.05 (dd, J=7.2, 1.1 Hz, 3H), 2.02-1.89 (m, 3H), 1.81 (p, J=6.7 Hz, 2H), 1.73-1.50 (m, 23H), 1.45-1.23 (m, 17H), 1.22-1.11 (m, 2H), 1.01 (t, J=7.1 Hz, 6H), 0.95-0.82 (m, 9H) LCMS (Method A): found m/z for (M+H)=904.8, RT=4.06 min.

Example 15

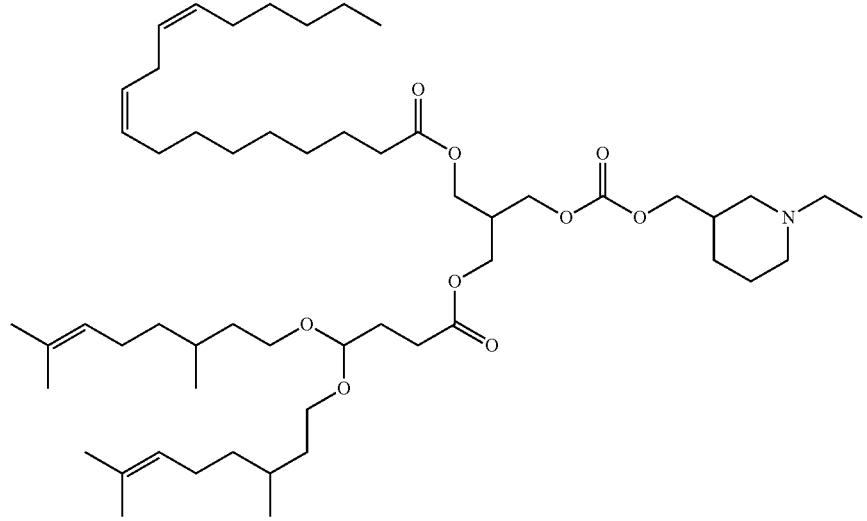

Example 15, 3-((4,4-bis((3,7-dimethyloct-6-en-1-yl)oxy) butanoyl)oxy)-2-(((((1-ethylpiperidin-3-yl)methoxy)carbonyl)oxy)methyl)propyl (9Z,12Z)-octadeca-9,12-dienoate: prepared from Intermediate IVb and (1-ethylpiperidin-3-yl)methanol on a 0.13 mmol scale, yield 0.070 g (57%). LCMS (Method A): found m/z for (M+H)=916.7, RT=4.06 min.

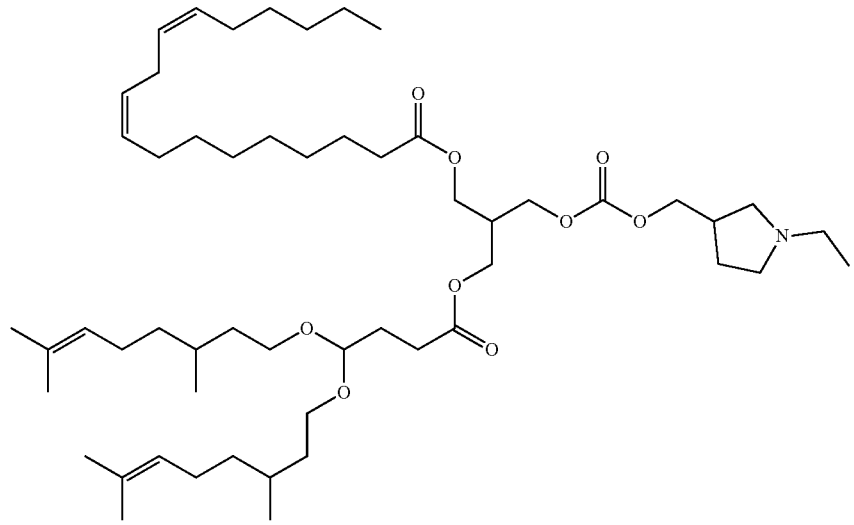

Example 16

Example 16, 3-((4,4-bis((3,7-dimethyloct-6-en-1-yl)oxy) butanoyl)oxy)-2-(((((1-ethylpyrrolidin-3-yl)methoxy)carbonyl)oxy)methyl)propyl (9Z,12Z)-octadeca-9,12-dienoate: prepared from Intermediate IVb and (l-ethylpyrrolidin-3-yl)methanol on a 0.08 mmol scale, yield 0.040 g (55%). LCMS (Method A): found m/z for (M+H)=902.7, RT=4.00 min.

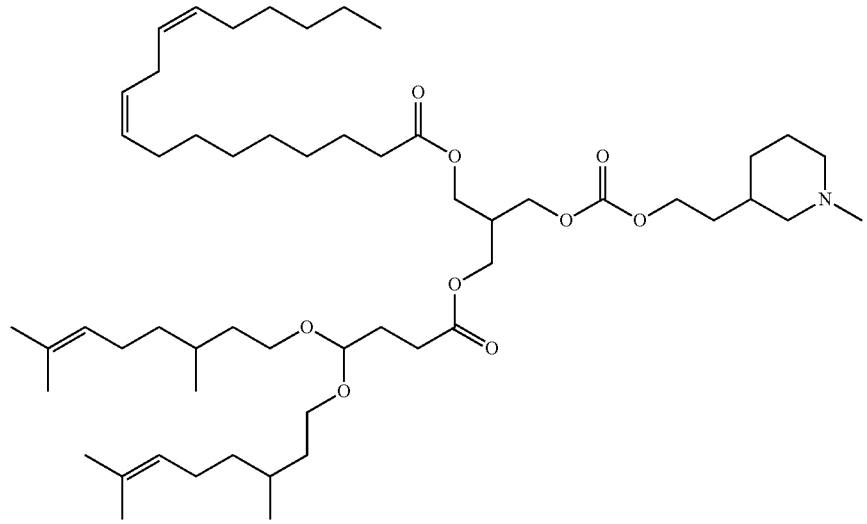

Example 17

Example 17, 3-((4,4-bis((3,7-dimethyloct-6-en-1-yl)oxy) butanoyl)oxy)-2-((((2-(1-methylpiperidin-3-yl)ethoxy)carbonyl)oxy)methyl)propyl (9Z,12Z)-octadeca-9,12-dienoate: prepared from Intermediate IVb and 2-(1-methylpiperidin-3-yl)ethan-1-ol on a 0.08 mmol scale, yield 0.038 g (52%). LCMS (Method A): found m/z for (M+H)=916.8, RT=3.94 min.

Example 18

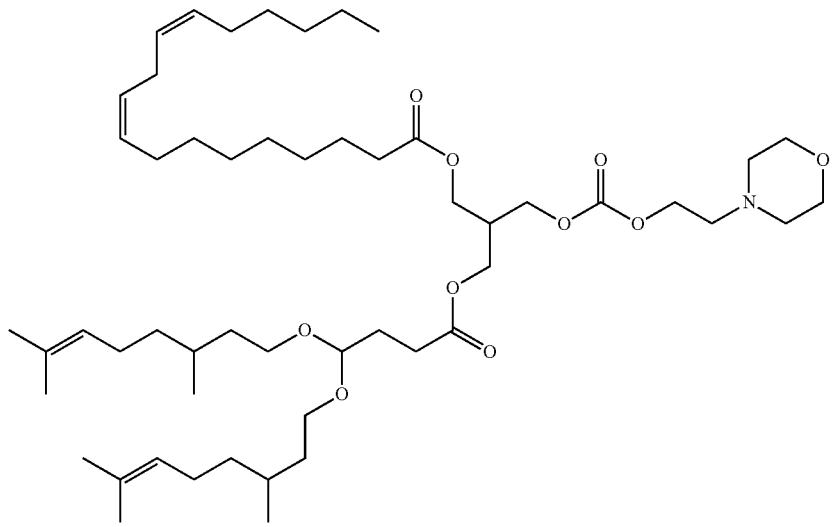

Example 18, 3-((4,4-bis((3,7-dimethyloct-6-en-1-yl)oxy) butanoyl)oxy)-2-((((4-morpholinobutoxy)carbonyl)oxy) methyl)propyl (9Z,12Z)-octadeca-9,12-dienoate: prepared from Intermediate IVb and 4-morpholinobutan-1-ol on a 0.08 mmol scale, yield 0.039 g (52%). LCMS (Method A): found m/z for (M+H)=932.6, RT=3.95 min.

Example 19

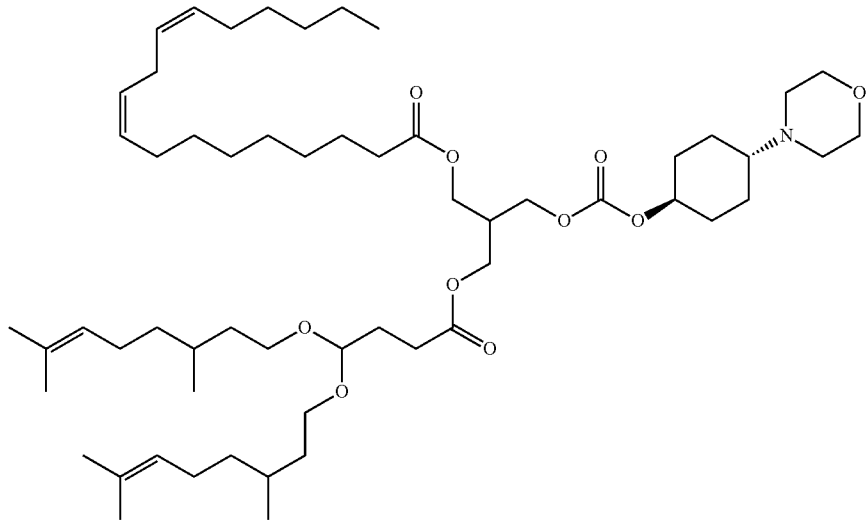

Example 19, 3-((4,4-bis((3,7-dimethyloct-6-en-1-yl)oxy) butanoyl)oxy)-2-((((((1r,4r)-4-morpholinocyclohexyl)oxy) carbonyl)oxy)methyl)propyl (9Z,12Z)-octadeca-9,12-dienoate: prepared from Intermediate IVb and trans-4-morpholinocyclohexan-1-ol on a 0.08 mmol scale, yield 0.036 g (47%). LCMS (Method A): found m/z for (M+H)=958.6, RT=3.95 min

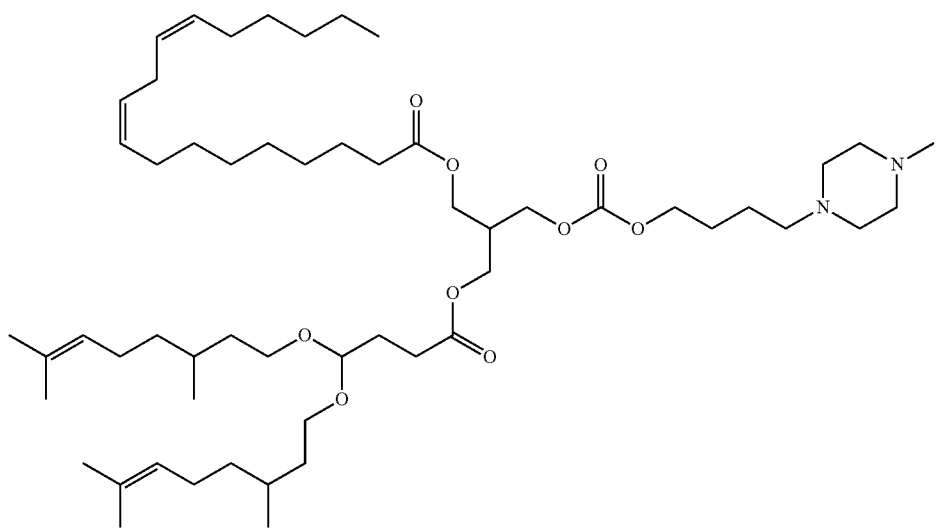

Example 20

Example 20, 3-((4,4-bis((3,7-dimethyloct-6-en-1-yl)oxy) butanoyl)oxy)-2-((((4-(4-methylpiperazin-1-yl)butoxy)carbonyl)oxy)methyl)propyl (9Z,12Z)-octadeca-9,12-dienoate: prepared from Intermediate IVb and 4-(4-methylpiperazin-1-yl)butan-1-ol on a 0.08 mmol scale, yield 0.027 g (36%). LCMS (Method A): found m/z for (M+H)=945.7, RT=3.95 min.

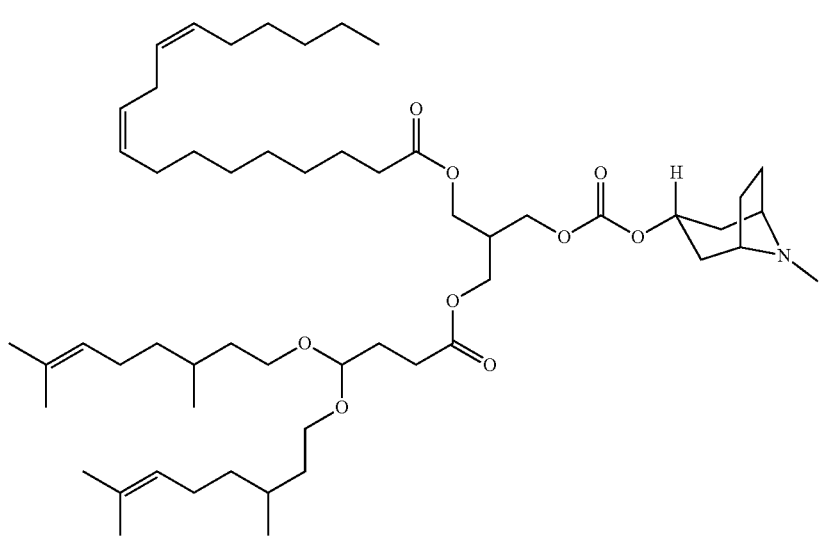

Example 21

Example 21, 3-((4,4-bis((3,7-dimethyloct-6-en-1-yl)oxy) butanoyl)oxy)-2-((((((1R,3s,5S)-8-methyl-8-azabicyclo [3.2.1]octan-3-yl)oxy)carbonyl)oxy)methyl)propyl (9Z, 12Z)-octadeca-9,12-dienoate: prepared from Intermediate IVb and pseudotropine on a 0.08 mmol scale, yield 0.019 g (26%) LCMS (Method A): found m/z for (M+H)=914.6, RT=3.88 min.

Example 22

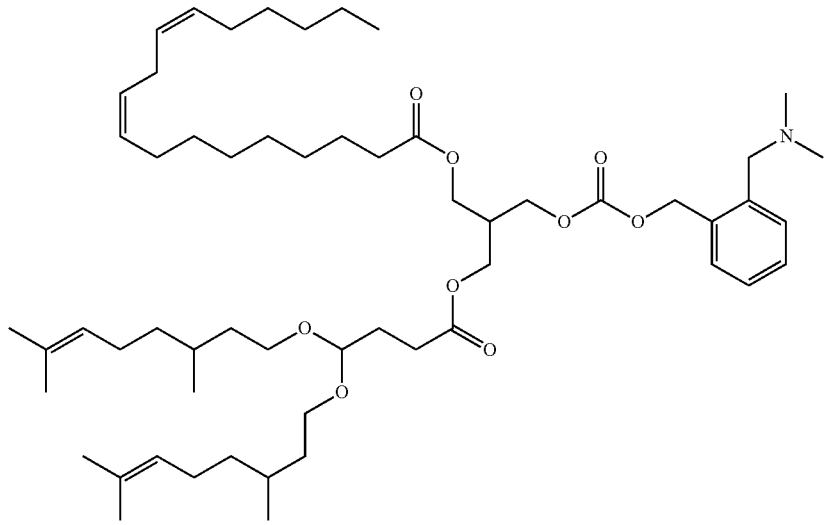

Example 22, 3-((4,4-bis((3,7-dimethyloct-6-en-1-yl)oxy) butanoyl)oxy)-2-(((((2-((dimethylamino)methyl)benzyl) oxy)carbonyl)oxy)methyl)propyl (9Z,12Z)-octadeca-9,12-dienoate prepared from Intermediate IVb and (2-((dimethylamino)methyl)phenyl)methanol on a 0.08 mmol scale, yield 0.030 g (40%). LCMS (Method A): found m/z for (M+H)=938.8, RT=4.28 min.

The following examples 23-30 were prepared from Intermediate IVb according to General Procedure E.

Example 23

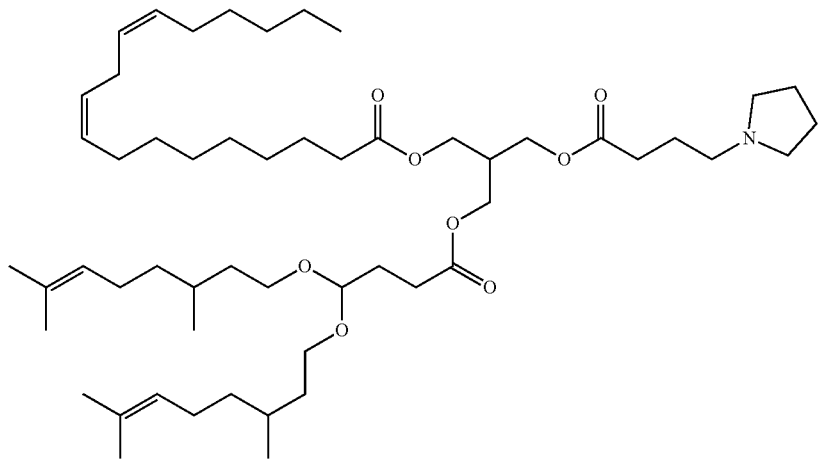

Example 23, 3-((4,4-bis((3,7-dimethyloct-6-en-1-yl)oxy) butanoyl)oxy)-2-(((4-(pyrrolidin-1-yl)butanoyl)oxy) methyl)propyl (9Z,12Z)-octadeca-9,12-dienoate prepared from Intermediate IVb and 4-(pyrrolidin-1-yl)butanoic acid hydrochloride on a 0.09 mmol scale, yield 0.052 g (64%) LCMS (Method A): found m/z for (M+H)=886.7, RT=3.98 min.

Example 24

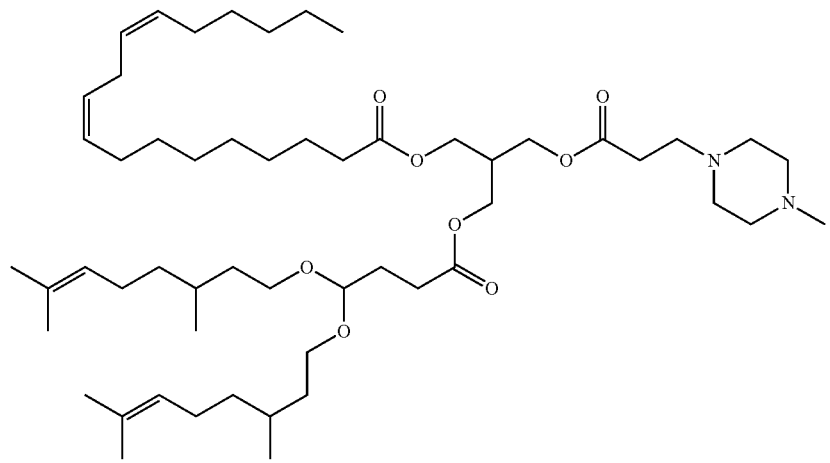

Example 24, 3-((4,4-bis((3,7-dimethyloct-6-en-1-yl)oxy)butanoyl)oxy)-2-(((3-(4-methylpiperazin-1-yl)propanoyl)oxy)methyl)propyl (9Z,12Z)-octadeca-9,12-dienoate: prepared from Intermediate IVb and 3-(4-methylpiperazin-1-yl)propanoic acid dihydrochloride on a 0.09 mmol scale, yield 0.060 g (72%) LCMS (Method A): found n/z for (M+H)=901.8, RT=4.08 min.

Example 25

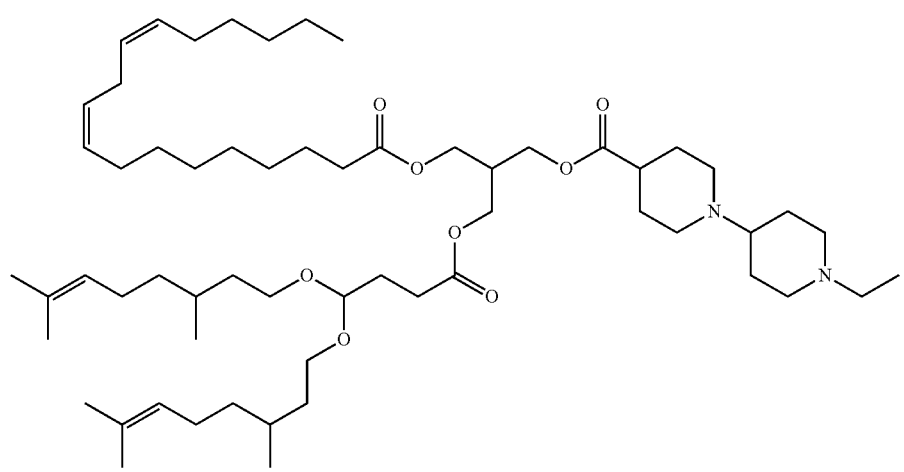

Example 25, 3-((4,4-bis((3,7-dimethyloct-6-en-1-yl)oxy)butanoyl)oxy)-2-((((9Z,12Z)-octadeca-9,12-dienoyl)oxy)methyl)propyl 1'-ethyl-[1,4'-bipiperidine]-4-carboxylate: prepared from Intermediate IVb and 1'-ethyl-[1,4'-bipiperidine]-4-carboxylic acid dihydrochloride on a 0.08 mmol scale, yield 0.021 g (27%). LCMS (Method A): found m/z for (M+H)=969.8, RT=3.60 min.

Example 26

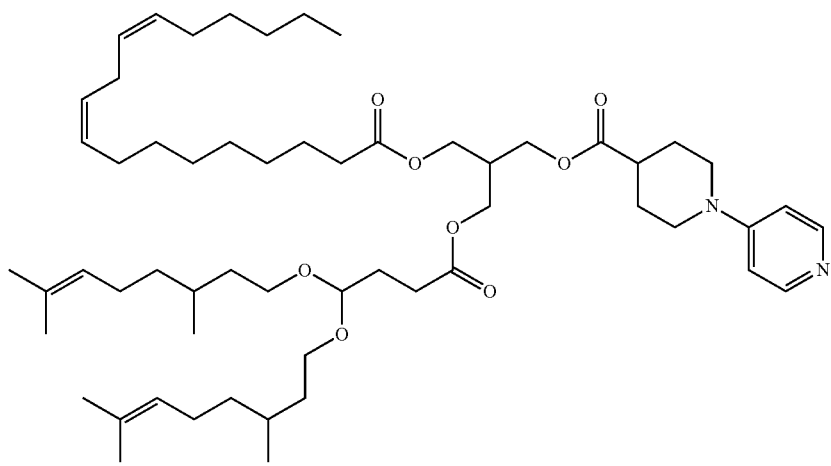

Example 26, 3-((4,4-bis((3,7-dimethyloct-6-en-1-yl)oxy) butanoyl)oxy)-2-((((9Z,12Z)-octadeca-9,12-dienoyl)oxy) methyl)propyl 1-(pyridin-4-yl)piperidine-4-carboxylate: prepared from Intermediate IVb and 1-(pyridin-4-yl)piperidine-4-carboxylic acid on a 0.08 mmol scale, yield 0.020 g (27%). LCMS (Method A): found m/z for (M+H)=935.5, RT=3.88 min.

Example 27

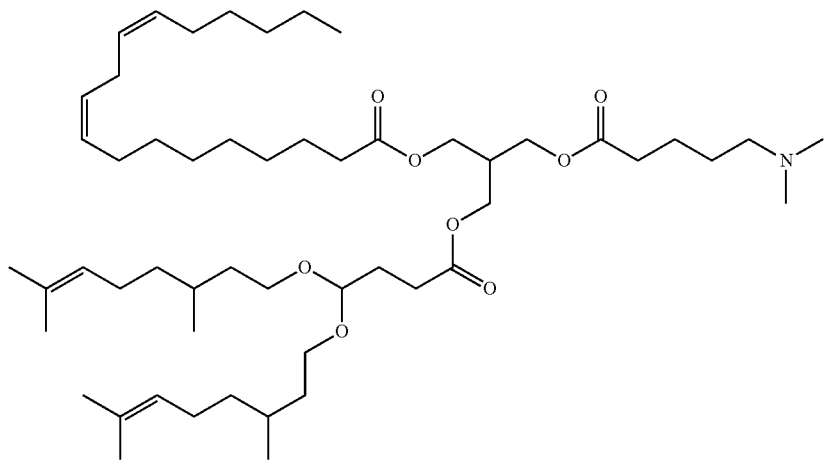

Example 27, 3-((4,4-bis((3,7-dimethyloct-6-en-1-yl)oxy) butanoyl)oxy)-2-(((5-(dimethylamino)pentanoyl)oxy) methyl)propyl (9Z,12Z)-octadeca-9,12-dienoate: prepared from Intermediate IVb and 5-(dimethylamino)pentanoic acid hydrochloride on a 0.08 mmol scale, yield 0.057 g (81%). LCMS (Method A): found m/z for (M+H)=874.8, RT=3.95 min.

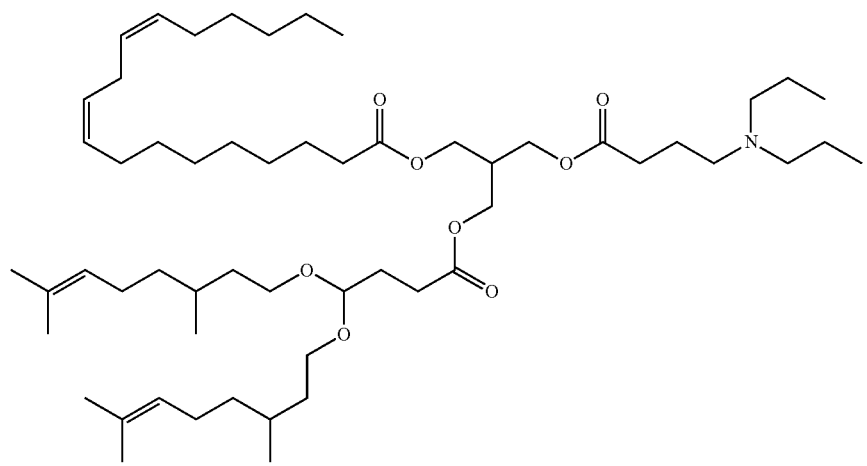

Example 28

Example 28, 3-((4,4-bis((3,7-dimethyloct-6-en-1-yl)oxy)butanoyl)oxy)-2-(((4-(dipropylamino)butanoyl)oxy)methyl)propyl (9Z,12Z)-octadeca-9,12-dienoate: prepared from Intermediate IVb and 4-(dipropylamino)butanoic acid hydrochloride on a 0.08 mmol scale, yield 0.062 g (84%). LCMS (Method A): found m/z for (M+H)=916.8, RT=4.00 min.

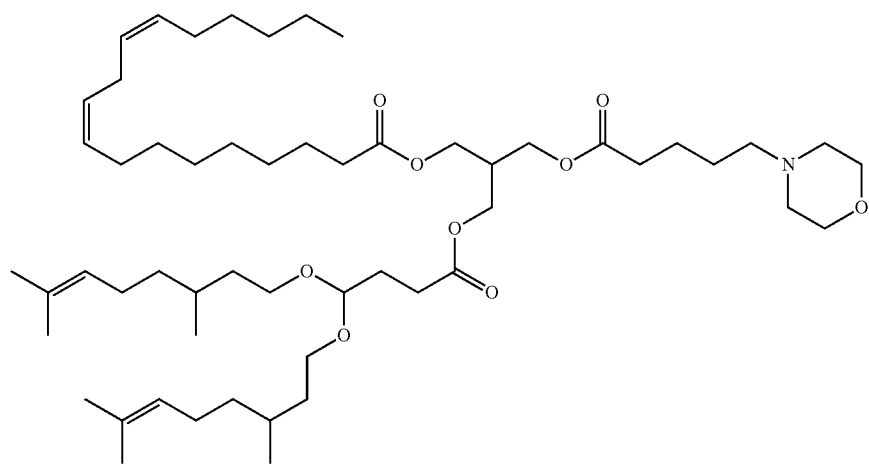

Example 29

Example 29, 3-((4,4-bis((3,7-dimethyloct-6-en-1-yl)oxy)butanoyl)oxy)-2-(((5-morpholinopentanoyl)oxy)methyl)propyl (9Z,12Z)-octadeca-9,12-dienoate: prepared from Intermediate IVb and 5-morpholinopentanoic acid hydrochloride on a 0.08 mmol scale, yield 0.064 g (87%). LCMS (Method A): found m/z for (M+H)=916.8, RT=3.96 min.

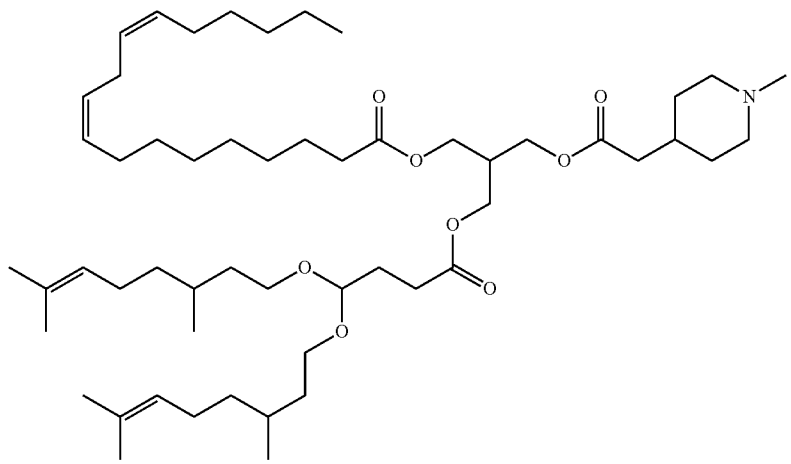

Example 30

Example 30, 3((4,4-bis((3,7-dimethyloct-6-en-1-yl)oxy)butanoyl)oxy)-2-((2-(1-methylpiperidin-4-yl)acetoxy)methyl)propyl (9Z,12Z)-octadeca-9,12-dienoate: prepared from Intermediate IVb and 2-(1-methylpiperidin-4-yl)acetic acid on a 0.08 mmol scale, yield 0.040 g (56%). LCMS (Method A): found m/z for (M+H)=886.7, RT=3.96 min.

The following examples 31 and 32 were prepared from Intermediate IVc according to General Procedure D.

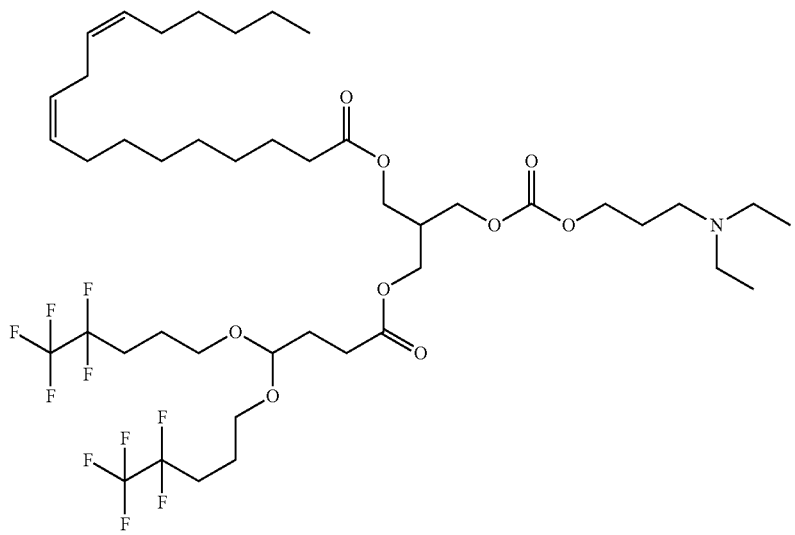

Example 31

Example 31, 3-((4,4-bis((4,4,5,5,5-pentafluoropentyl)oxy)butanoyl)oxy)-2-((((3-(diethylamino)propoxy)carbonyl)oxy)methyl)propyl (9Z,12Z)-octadeca-9,12-dienoate: prepared from Intermediate IVc and 3-(diethylamino)propan-1-ol on a 0.13 mmol scale, yield 0.042 g (35%) LCMS (Method A): found m/z for (M+H)=948.5, RT=3.49 min.

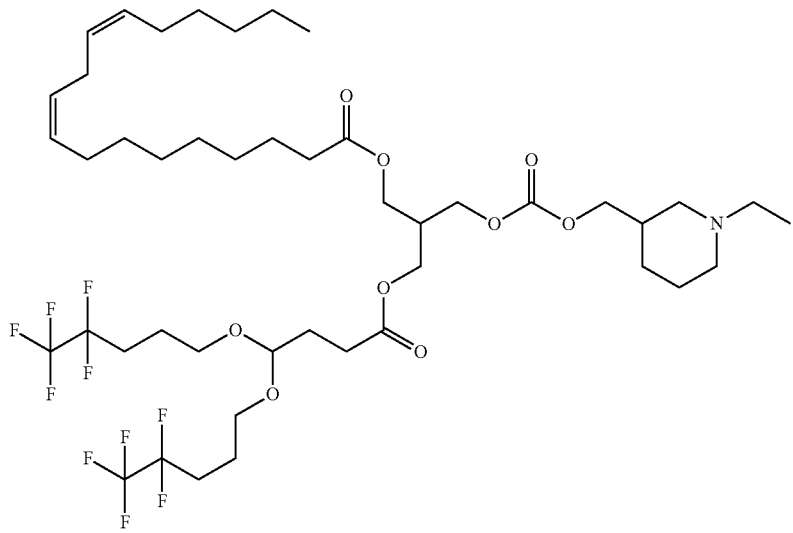

Example 32

Example 32, 3-((4,4-bis((4,4,5,5,5-pentafluoropentyl) oxy)butanoyl)oxy)-2-(((((1-ethylpiperidin-3-yl)methoxy) carbonyl)oxy)methyl)propyl (9Z,12Z)-octadeca-9,12-dienoate: prepared from Intermediate IVc and (1-ethylpiperidin-3-yl)methanol on a 0.13 mmol scale, yield 0.050 g (41%). LCMS (Method A): found m/z for (M+H) =960.6, RT=3.52 min.

The following examples 33 and 34 were prepared from Intermediate IVd according to General Procedure D.

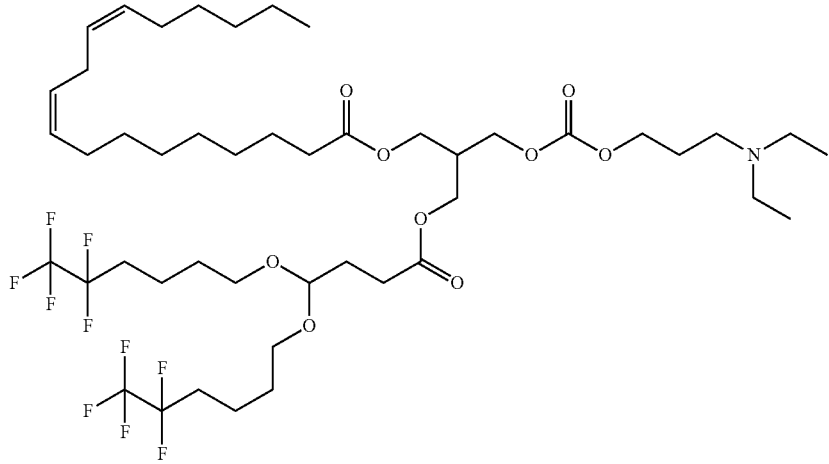

Example 33

Example 33, 3-((4,4-bis((5,5,6,6,6-pentafluorohexyl)oxy) butanoyl)oxy)-2-((((3-(diethylamino)propoxy)carbonyl) oxy)methyl)propyl (9Z,12Z)-octadeca-9,12-dienoate-prepared from Intermediate IVd and 3-(diethylamino)propan-1-ol on a 0.12 mmol scale, yield 0.044 g (37%). $^1$H NMR (500 MHz, Chloroform-d) δ 5.43-5.29 (m, 414), 4.50 (t, J=5.5 Hz, 1H), 4.22-4.09 (m, 8H), 3.60 (dt, J=9.2, 5.8 Hz, 2H), 3.44 (dt, J=9.3, 5.8 Hz, 2H), 2.77 (t, J=6.7 Hz, 2H), 2.51 (q, J=7.2 Hz, 6H), 2.46-2.37 (m, 3H), 2.31 (t, J=7.6 Hz, 21H), 2.13-1.99 (m, 9H), 1.93 (td, J=7.5, 5.4 Hz, 2H), 1.86-1.76 (m, 2H), 1.73-1.56 (m, 11H), 1.41-1.24 (m, 12H), 1.01 (t, J=7.1 Hz, 6H), 0.92-0.83 (m, 3H). LCMS (Method A): found m/z for (M+H)=976.6, RT=3.52 min.

Example 34

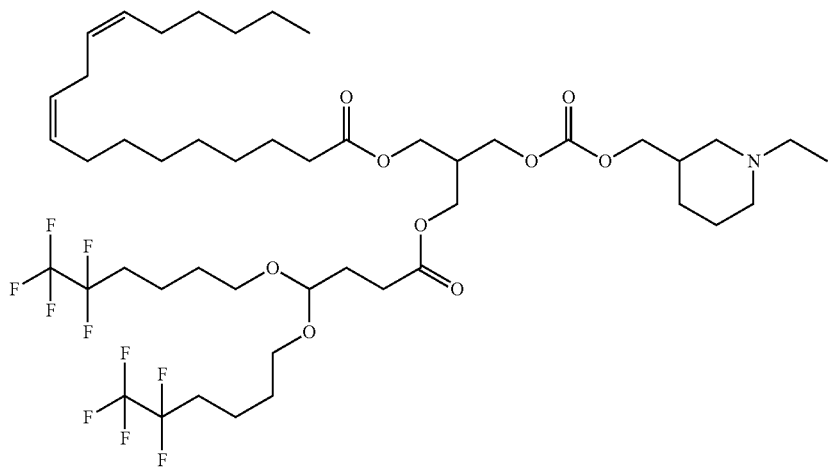

Example 34, 3-((4,4-bis((5,5,6,6,6-pentafluorohexyl)oxy) butanoyl)oxy)-2-(((((1-ethylpiperidin-3-yl)methoxy)carbonyl)oxy)methyl)propyl (9Z,12Z)-octadeca-9,12-dienoate: prepared from Intermediate IVd and (I-ethylpiperidin-3-yl) methanol on a 0.12 mmol scale, yield 0.035 g (29%). $^1$H NMR (500 MHz, Chloroform-d) δ 5.43-5.29 (m, 4H), 4.51 (t, J=5.5 Hz, 11H), 4.21-4.11 (m, 6H), 4.05 (dd, J=10.6, 5.8 Hz, 1H), 3.96 (dd, J=10.6, 7.2 Hz, 1H), 3.60 (dt, J=9.3, 5.8 Hz, 2H), 3.44 (dt, J=9.3, 5.8 Hz, 2H), 2.89 (dd, J=35.3, 11.1 Hz, 2H), 2.77 (t, J=6.7 Hz, 2H), 2.47-2.36 (m, 5H), 2.31 (t, J=7.6 Hz, 2H), 2.13-1.83 (m, 9H), 1.78-1.55 (m, 15H), 1.42-1.23 (m, 17H), 1.08 (t, J=7.2 Hz, 3H), 0.89 (t, J=6.9 Hz, 3H) LCMS (Method A): found m/z for (M+H)=988.4, RT=3.52 min.

The following examples 35 and 36 were prepared from Intermediate IVe according to General Procedure D.

Example 35

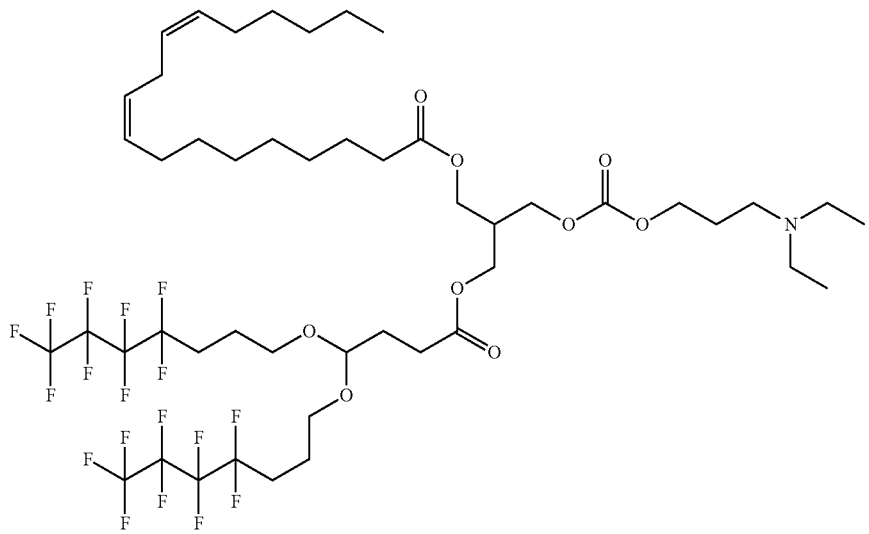

Example 35, 3-((4,4-bis((4,4,5,5,6,6,7,7,7-nonafluoroheptyl)oxy)butanoyl)oxy)-2-((((3-(diethylamino)propoxy)carbonyl)oxy)methyl)propyl (9Z,12Z)-octadeca-9,12-dienoate: prepared from Intermediate IVe and 3-(diethylamino)propan-1-ol on a 0.12 mmol scale, yield 0.050 g (36%). LCMS (Method A): found m/z for (M+H)=1148.4, RT=3.72 min.

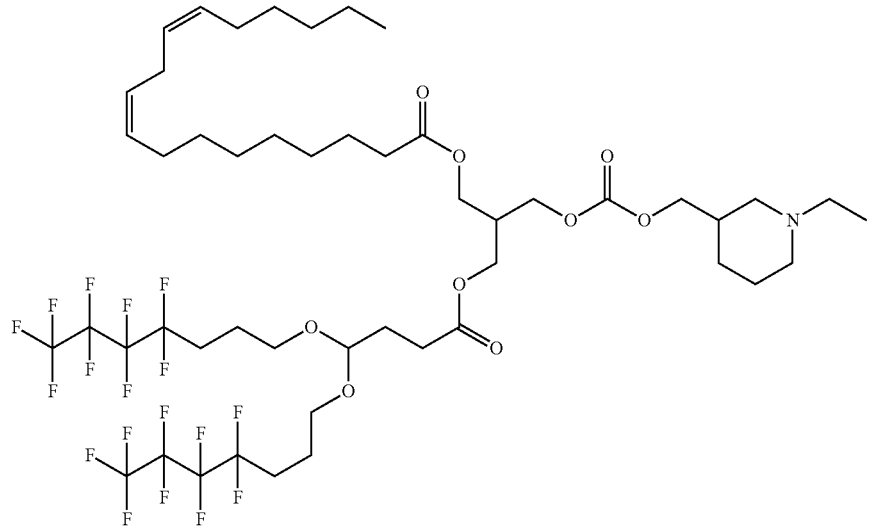

Example 36

Example 36, 3-((4,4-bis((4,4,5,5,6,6,7,7,7-nonafluoroheptyl)oxy)butanoyl)oxy)-2-(((((1-ethylpiperidin-3-yl)methoxy)carbonyl)oxy)methyl)propyl (9Z,12Z)-octadeca-9,12-dienoate: prepared from Intermediate IVe and (1-ethylpiperidin-3-yl)methanol on a 0.12 mmol scale, yield 0.072 g (51%). LCMS (Method A): found m/z for (M+H)=1160.4, RT=3.73 min.

The following examples 37-45 were prepared from Intermediate IVf according to General Procedure D.

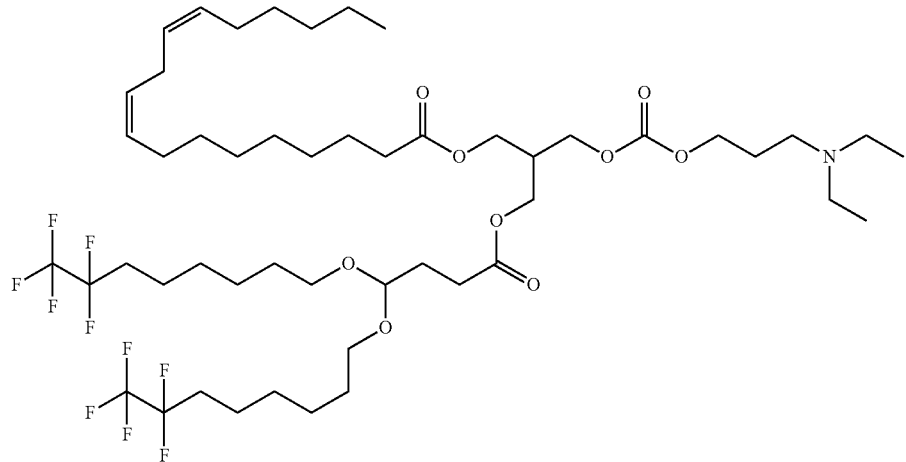

Example 37

Example 37, 3-((4,4-bis((7,7,8,8,8-pentafluorooctyl)oxy) butanoyl)oxy)-2-((((3-(diethylamino)propoxy)carbonyl) oxy)methyl)propyl (9Z,12Z)-octadeca-9,12-dienoate: prepared from Intermediate IVf and 3-(diethylamino)propan-1-ol on a 0.11 mmol scale, yield 0.084 g (71%). $^1$H NMR (500 MHz, Chloroform-d) δ 5.43-5.28 (m, 4H), 4.48 (t, J=5.5 Hz, 1H), 4.22-4.10 (m, 8H), 3.57 (dt, J=9.3, 6.5 Hz, 2H), 3.41 (dt, J=9.3, 6.5 Hz, 2H), 2.80-2.74 (m, 2H), 2.51 (q, J=7.2 Hz, 6H), 2.45-2.36 (m, 3H), 2.31 (dd, J=8.0, 7.2 Hz, 2H), 2.09-1.88 (m, 10H), 1.86-1.76 (m, 2H), 1.73-1.49 (m, 12H), 1.46-1.23 (m, 20H), 1.01 (t, J=7.1 Hz, 6H), 0.92-0.86 (m, 3H) LCMS (Method A): found m/z for (M+H)=1032.5, RT=3.69 min.

Example 38

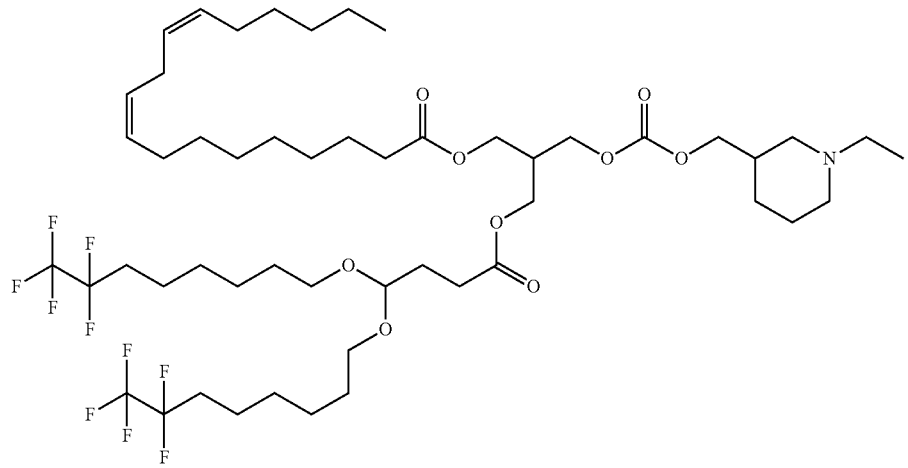

Example 38, 3-((4,4-bis((7,7,8,8,8-pentafluorooctyl)oxy) butanoyl)oxy)-2-(((((1-ethylpiperidin-3-yl)methoxy)carbonyl)oxy)methyl)propyl (9Z,12Z)-octadeca-9,12-dienoate: prepared from Intermediate IVf and (1-ethylpiperidin-3-yl) methanol on a 0.11 mmol scale, yield 0.081 g (68%). $^1$H NMR (500 MHz, Chloroform-d) δ 5.43-5.28 (m, 4H), 4.49 (t, J=5.5 Hz, 1H), 4.19 (d, J=6.0 Hz, 2H), 4.17-4.12 (m, 4H), 4.05 (dd, J=10.6, 5.8 Hz, 1H), 3.96 (dd, J=10.7, 7.2 Hz, 1H), 3.57 (dt, J=9.3, 6.6 Hz, 2H), 3.41 (dt, J=9.3, 6.5 Hz, 2), 2.90 (dd, J=35.1, 11.3 Hz, 2H), 2.80-2.74 (m, 2), 2.47-2.36 (m, 5H), 2.31 (dd, J=8.0, 7.2 Hz, 2H), 2.11-1.79 (m, 11H), 1.79-1.66 (m, 3H), 1.66-1.49 (m, 12H), 1.49-1.23 (m, 24H), 1.08 (t, J=7.2 Hz, 3H), 0.94-0.86 (m, 2H). LCMS (Method A): found m/z for (M+H)=1044.6, RT=3.67 min.

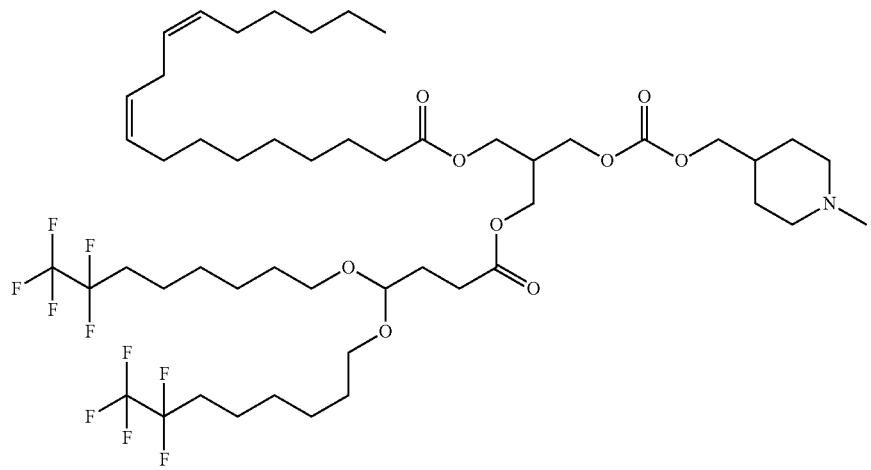

Example 39

Example 39, 3-((4,4-bis((7,7,8,8,8-pentafluorooctyl)oxy) butanoyl)oxy-2-(((((1-methylpiperidin-4-yl)methoxy)carbonyl)oxy)methyl)propyl (9Z,12Z)-octadeca-9,12-dienoate prepared from Intermediate IVf and (1-methylpiperidin-4-yl))methanol on a 0.09 mmol scale, yield 0.055 g (63%). LCMS (Method A): found m/z for (M+H)=1030.5, RT=3.68 min.

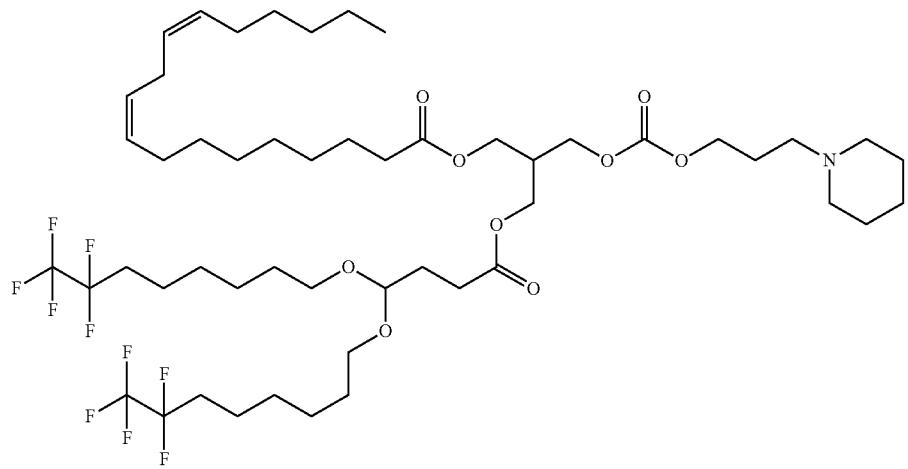

Example 40

Example 40, 3-((4,4-bis((7,7,8,8,8-pentafluorooctyl)oxy) butanoyl)oxy)-2-((((3-(piperidin-1-yl)propoxy)carbonyl) oxy)methyl)propyl (9Z,12Z)-octadeca-9,12-dienoate: prepared from Intermediate IVf and 3-(piperidin-1-yl)propan-1-ol on a 0.09 mmol scale, yield 0.052 g (58%). LCMS (Method A): found m/z for (M+H)=1044.5, RT=3.70 min.

Example 41

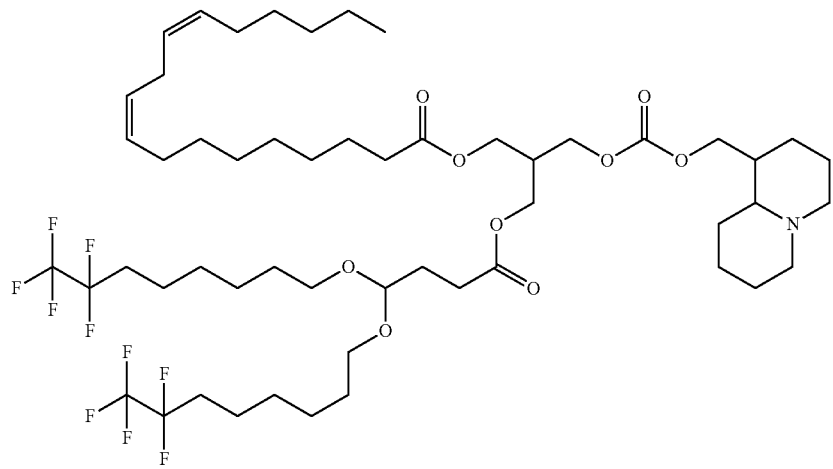

Example 41, 3-((4,4-bis((7,7,8,8,8-pentafluorooctyl)oxy)butanoyl)oxy)-2-(((((octahydro-2H-quinolizin-1-yl)methoxy)carbonyl)oxy)methyl)propyl (9Z,12Z)-octadeca-9,12-dienoate: prepared from Intermediate IVf and (octahydro-2H-quinolizin-1-yl)methanol on a 0.09 mmol scale, yield 0.050 g (55%) LCMS (Method A): found m/z for (M+H)=1070.6, RT=3.65 min.

Example 42

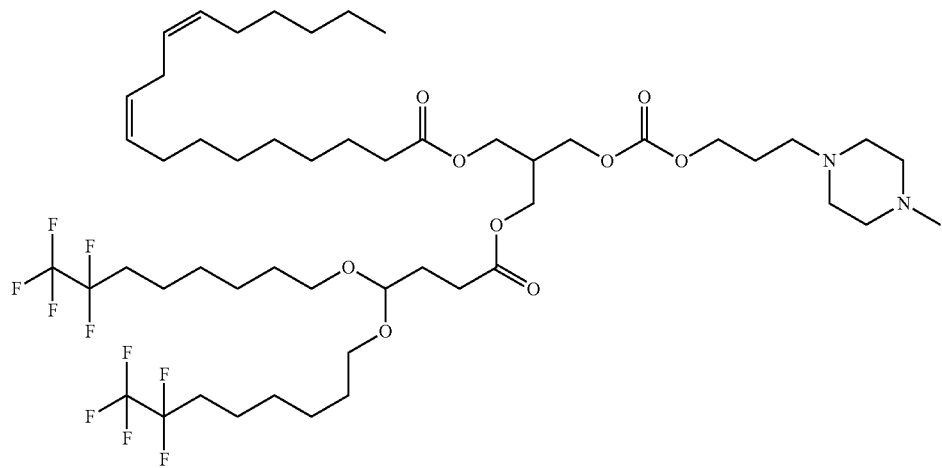

Example 42, 3-((4,4-bis((7,7,8,8,8-pentafluorooctyl)oxy)butanoyl)oxy)-2-((((3-(4-methylpiperazin-1-yl)propoxy)carbonyl)oxy)methyl)propyl (9Z,12Z)-octadeca-9,12-dienoate: prepared from Intermediate IVf and 3-(4-methylpiperazin-1-yl)propan-1-ol on a 0.09 mmol scale, yield 0.049 g (54%). LCMS (Method A): found n/z for (M+H)=1059.5, RT=3.66 min.

Example 43

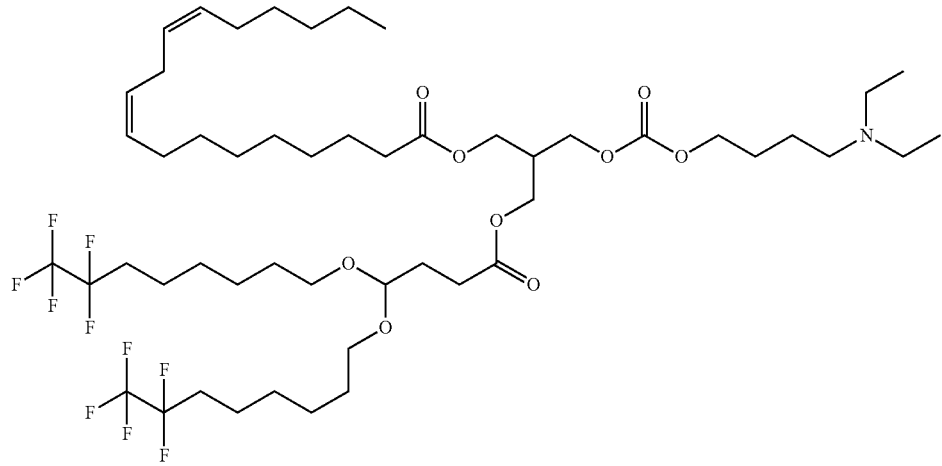

Example 43, 3-((4,4-bis((7,7,8,8,8-pentafluorooctyl)oxy)butanoyl)oxy)-2-((((4-(diethylamino)butoxy)carbonyl)oxy)methyl)propyl (9Z,12Z)-octadeca-9,12-dienoate: prepared from Intermediate IVf and 4-(diethylamino)butan-1-ol on a 0.09 mmol scale, yield 0.049 g (55%). LCMS (Method A): found m/z for (M+H)=1046.5, RT=3.62 min Example 44

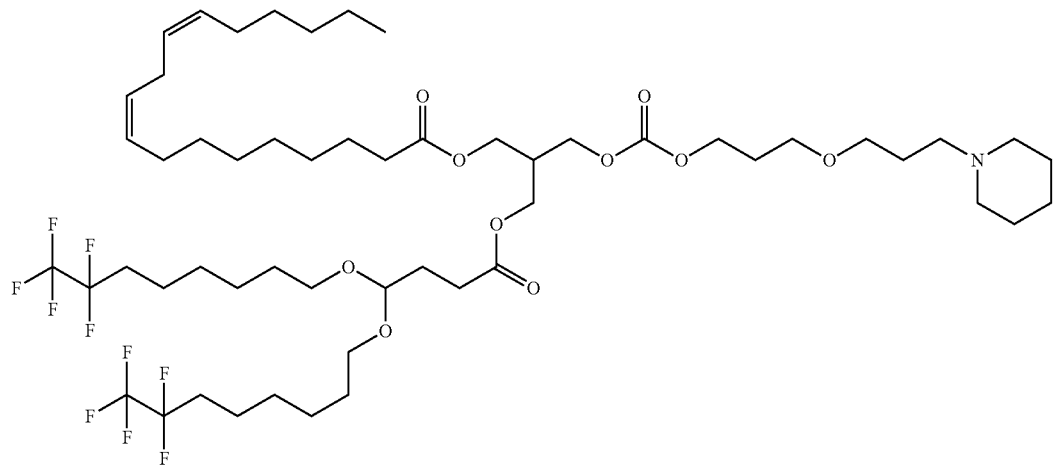

Example 44, 3-((4,4-bis((7,7,8,8,8-pentafluorooctyl)oxy)butanoyl)oxy)-2-((((3-(3-(piperidin-1-yl)propoxy)propoxy)carbonyl)oxy)methyl)propyl (9Z,12Z)-octadeca-9,12-dienoate: prepared from Intermediate IVf and 3-(3-(piperidin-1-yl)propoxy)propan-1-ol on a 0.09 mmcl scale, yield 0.044 g (46%). LCMS (Method A): found m/z for (M+H)=1102.5, RT=3.66 min.

Example 45

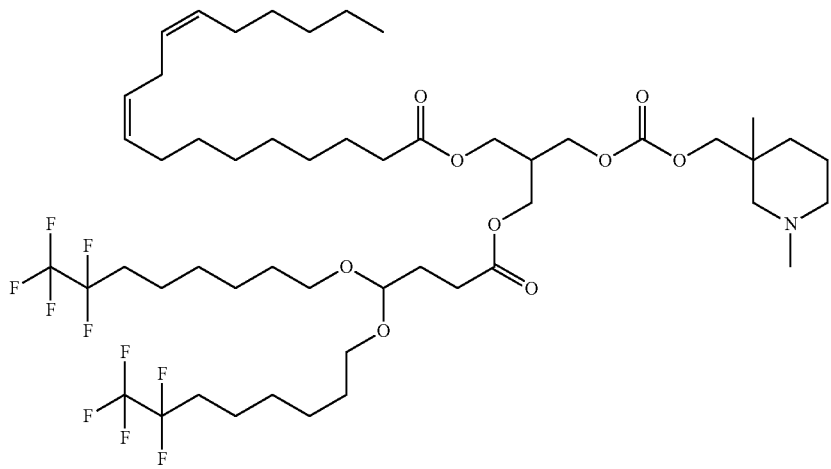

Example 45, 3-((4,4-bis((7,7,8,8,8-pentafluorooctyl)oxy)butanoyl)oxy)-2-(((((1,3-dimethylpiperidin-3-yl)methoxy)carbonyl)oxy)methyl)propyl (9Z,12Z-octadeca-9,12-dienoate: prepared from Intermediate IVf and (1,3-dimethylpiperidin-3-yl)methanol on a 0.06 mmol scale, yield 0.042 g (70%). LCMS (Method A): found m/z for (M+H)=1044.5, RT=3.68 min.

Example 46

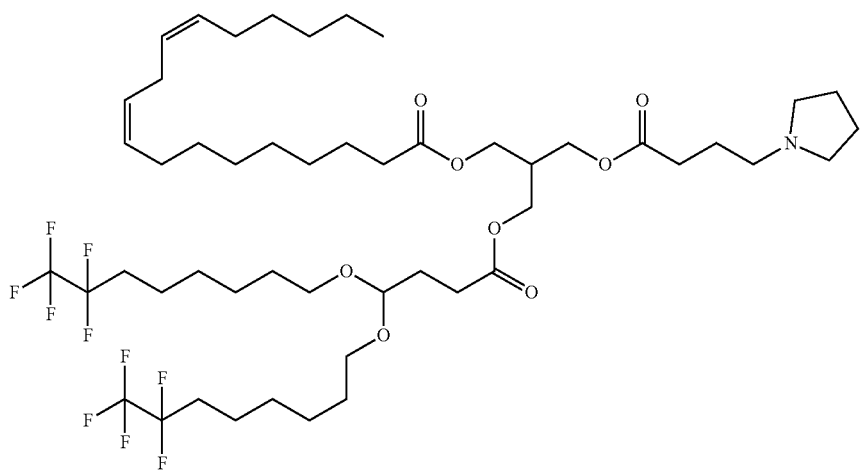

Example 46, 3-((4,4-bis((7,7,8,8,8-pentafluorooctyl)oxy)butanoyl)oxy)-2-(((4-(pyrrolidin-1-yl)butanoyl)oxy)methyl)propyl (9Z,12Z)-octadeca-9,12-dienoate: prepared according to General Procedure E from Intermediate IVf and 4-(pyrrolidin-1-yl)butanoic acid hydrochloride on a 0.09 mmol scale, yield 0.079 g (91%). $^1$H NMR (500 MHz, Chloroform-d) δ 5.43-5.28 (m, 4H), 4.51-4.46 (m, 1H), 4.22-4.10 (m, 6H), 3.57 (dtd, J=9.3, 6.6, 1.3 Hz, 2H), 3.41 (dt, J=9.3, 6.5 Hz, 2H), 2.80-2.74 (m, 2H), 2.55-2.27 (m, 12H), 2.11-1.72 (m, 15H), 1.69-1.52 (m, 16H), 1.47-1.23 (m, 18H), 0.92-0.86 (m, 3H) LCMS (Method A): found m/z for (M+H)=1014.4, RT=3.68 min.

The following examples 47 and 48 were prepared from Intermediate IVg according to General Procedure D.

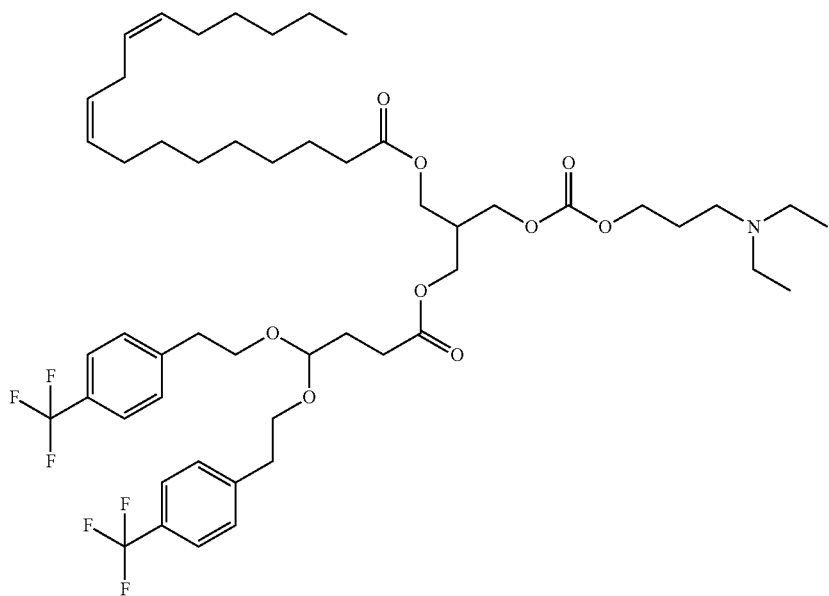

Example 47

Example 47, 3-((4,4-bis(4-(trifluoromethyl)phenethoxy) butanoyl)oxy)-2-((((3-(diethylamino)propoxy)carbonyl) oxy)methyl)propyl (9Z,12Z)-octadeca-9,12-dienoate-prepared from Intermediate IVg and 3-(diethylamino)propan-1-ol on a 0.12 mmol scale, yield 0.067 g (56%). LCMS (Method A): found m/z for (M+H)=972.5, RT=3.58 min.

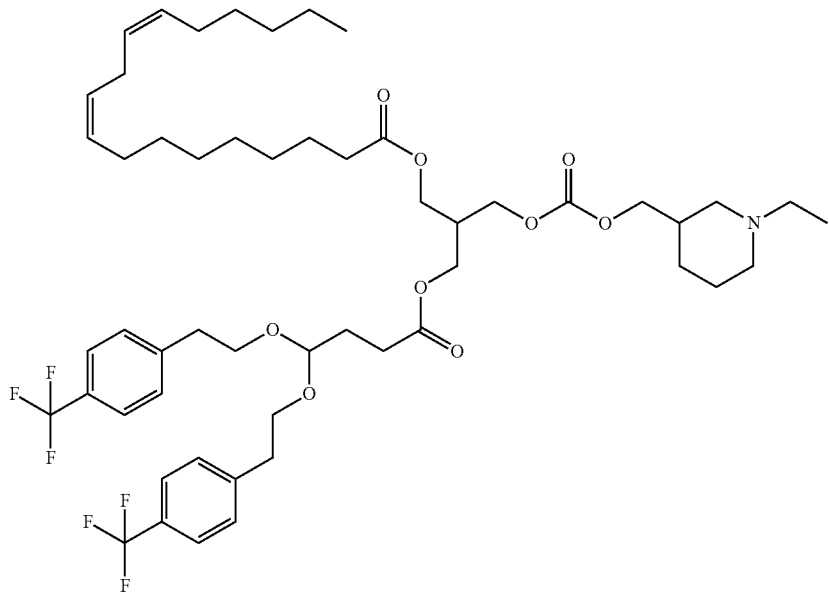

Example 48

Example 48, 3-((4,4-bis(4-(trifluoromethyl)phenethoxy) butanoyl)oxy)-2-(((((1-ethylpiperidin-3-yl)methoxy)carbonyl)oxy)methyl)propyl (9Z,12Z)-octadeca-9,12-dienoate: prepared from Intermediate IVg and (1-ethylpiperidin-3-yl) methanol on a 0.12 mmol scale, yield 0.045 g (37%). LCMS (Method A): found m/z for (M+H)=984.5, RT=3.56 min.

The following examples 49 and 50 were prepared from Intermediate IVh according to General Procedure D.

Example 49

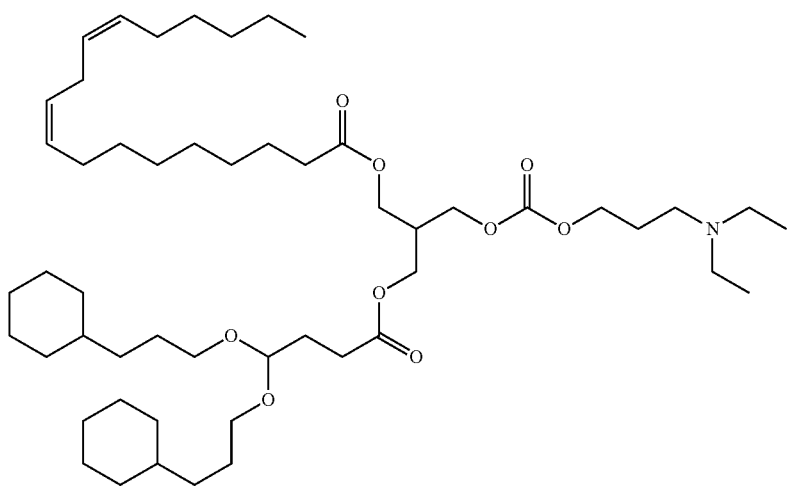

Example 49, 3-((4,4-bis(3-cyclohexylpropoxy)butanoyl)oxy)-2-((((3-(diethylamino)propoxy)carbonyl)oxy)methyl) propyl (9Z,12Z)-octadeca-9,12-dienoate-prepared from Intermediate IVh and 3-(diethylamino)propan-1-ol on a 0.14 mmol scale, yield 0.059 g (48%). LCMS (Method A): found m/z for (M+H)=876.6, RT=4.08 min.

Example 50

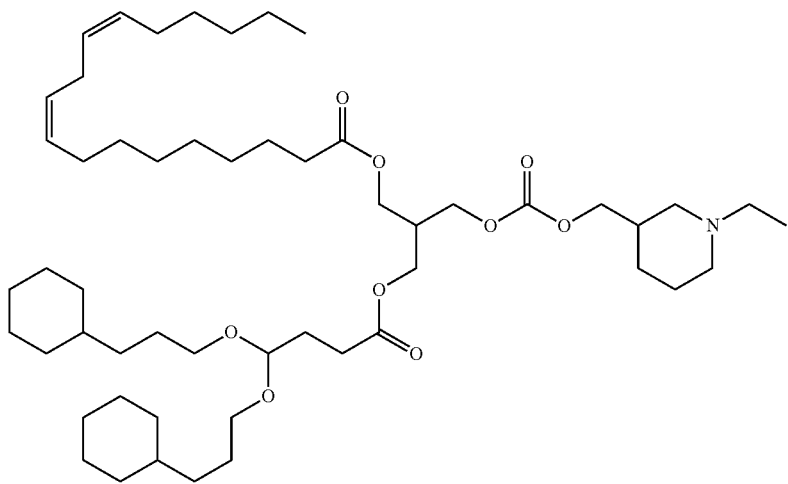

Example 50, 3-((4,4-bis(3-cyclohexylpropoxy)butanoyl)oxy)-2-(((((1-ethylpiperidin-3-yl)methoxy)carbonyl)oxy) methyl)propyl (9Z,12Z)-octadeca-9,12-dienoate: prepared from Intermediate IVh and (1-ethylpiperidin-3-yl)methanol on a 0.14 mmol scale, yield 0.048 g (39%). LCMS (Method A): found m/z for (M+H)=888.7, RT=4.04 min.

The following examples 51 and 52 were prepared from Intermediate IVh according to General Procedure E.

Example 51

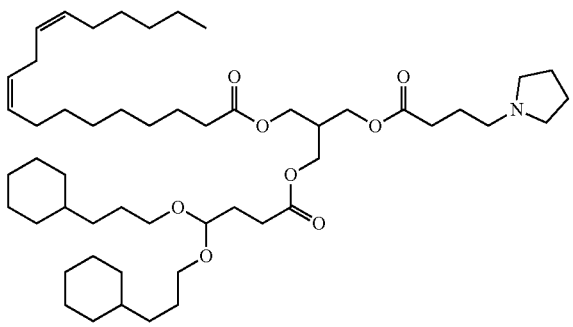

Example 52

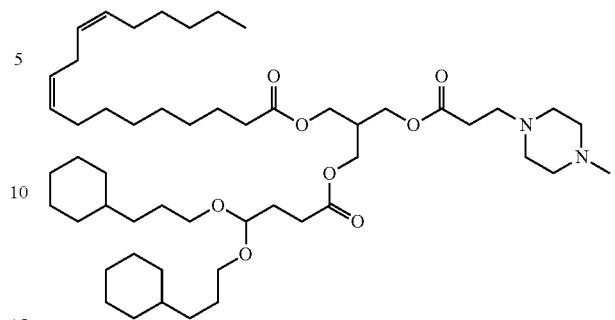

Example 51, 3-((4,4-bis(3-cyclohexylpropoxy)butanoyl)oxy)-2-(((4-(pyrrolidin-1-yl)butanoyl)oxy)methyl)propyl (9Z,12Z)-octadeca-9,12-dienoate: prepared from Intermediate IVh and 4-(pyrrolidin-1-yl)butanoic acid hydrochloride on a 0.14 mmol scale, yield 0.104 g (87%). LCMS (Method A): found m/z for (M+H)=858.8, RT=4.06 min.

Example 52, 3-((4,4-bis(3-cyclohexylpropoxy)butanoyl)oxy)-2-(((3-(4-methylpiperazin-1-yl)propanoyl)oxy)methyl)propyl (9Z,12Z)-octadeca-9,12-dienoate: prepared from Intermediate IVh and 3-(4-methylpiperazin-1-yl)propanoic acid dihydrochloride on a 0.14 mmol scale, yield 0.074 g (61%). LCMS (Method A): found m/z for (M+H)=873.7, RT=4.17 min Example 53

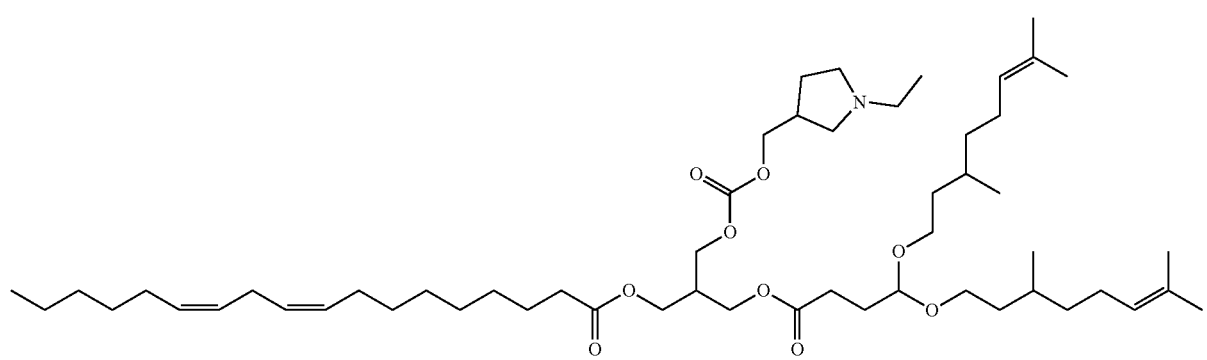

Example 53, 3-((4,4-bis((3,7-dimethyloct-6-en-1-yl)oxy)butanoyl)oxy)-2-(((((1-ethylpyrrolidin-3-yl)methoxy)carbonyl)oxy)methyl)propyl (9Z,12Z)-octadeca-9,12-dienoate prepared from Intermediate IVb and (1-ethylpyrrolidin-3-yl)methanol according to General Procedure D on a 0.08 mmol scale, yield 40 mg (55%) LCMS (Method A): found m/z for (M+H)=902.7, RT=3.99 min.

Example 54

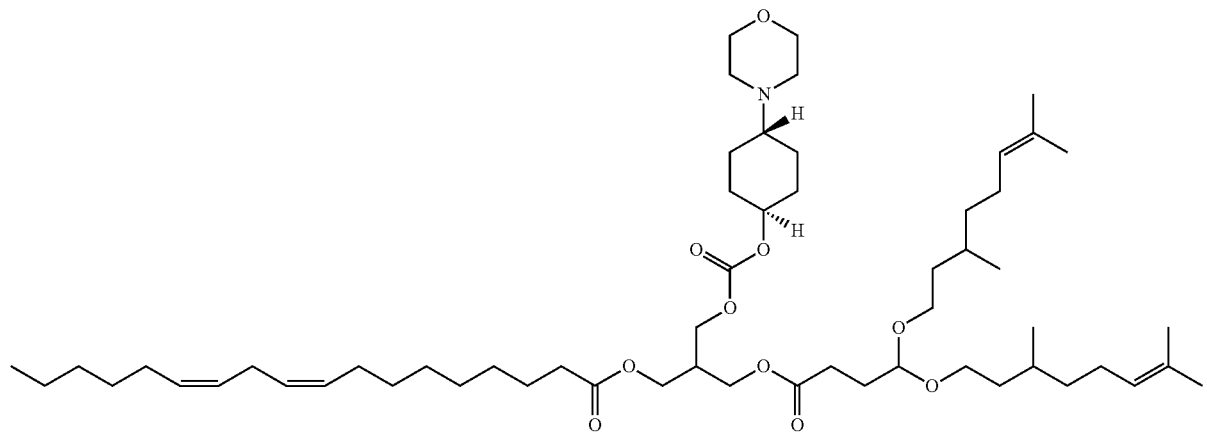

Example 54, 3-((4,4-bis((3,7-dimethyloct-6-en-1-yl)oxy)butanoyl)oxy)-2-(((((1r,4r)-4-morpholinocyclohexyl)oxy)carbonyl)oxy)methyl)propyl (9Z,12Z)-octadeca-9,12-dienoate: prepared from Intermediate IVb and trans-4-morpholinocyclohexan-1-ol according to General Procedure D on a 0.08 mmol scale, yield 36 mg (47%). LCMS (Method A): found m/z for (M+H)=958.6, RT=4.56 min Example 55

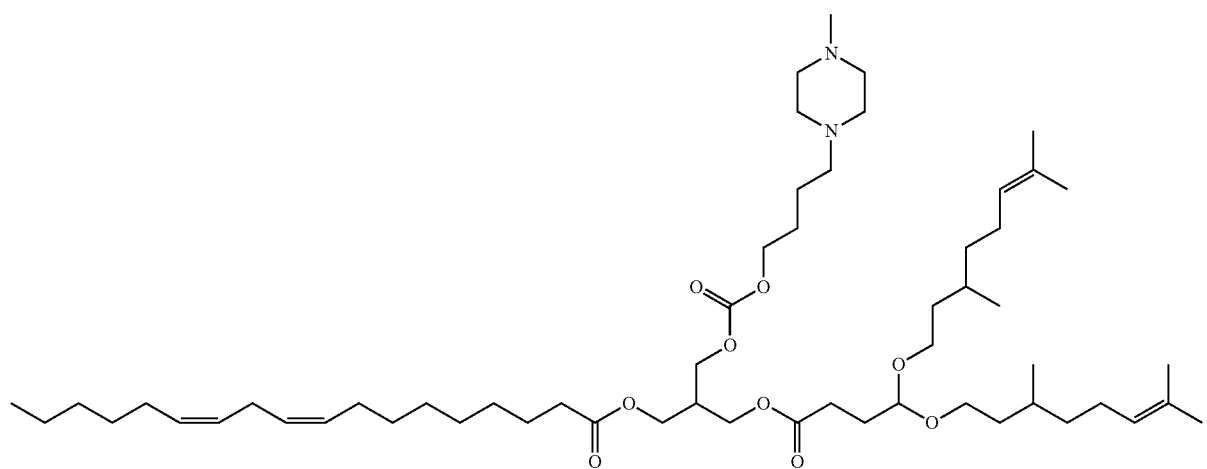

Example 55, 3-((4,4-bis((3,7-dimethyloct-6-en-1-yl)oxy)butanoyl)oxy)-2-((((4-(4-methylpiperazin-1-yl)butoxy)carbonyl)oxy)methyl)propyl (9Z,12Z)-octadeca-9,12-dienoate prepared from Intermediate IVb and 4-(4-methylpiperazin-1-yl)butan-1-ol according to General Procedure D on a 0.08 mmol scale, yield 27 mg (36%). LCMS (Method A): found m/z for (M+H)=945.7, RT=3.95 min.

Example 56

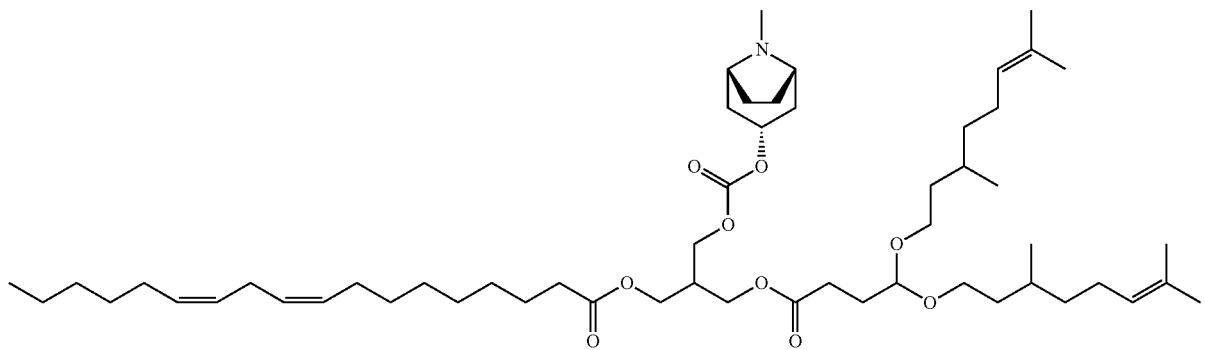

Example 56, 3-((4,4-bis((3,7-dimethyloct-6-en-1-yl)oxy)butanoyl)oxy)-2-((((((1r,3s,5s)-8-methyl-8-azabicyclo[3.2.1]octan-3-yl)oxy)carbonyl)oxy)methyl)propyl (9Z,12Z)-octadeca-9,12-dienoate: prepared from Intermediate IVb and pseudotropine according to General Procedure D on a 0.08 mmol scale, yield 19 mg (26%). LCMS (Method A): found m/z for (M+H)=914.8, RT=3.88 min.

Example 57

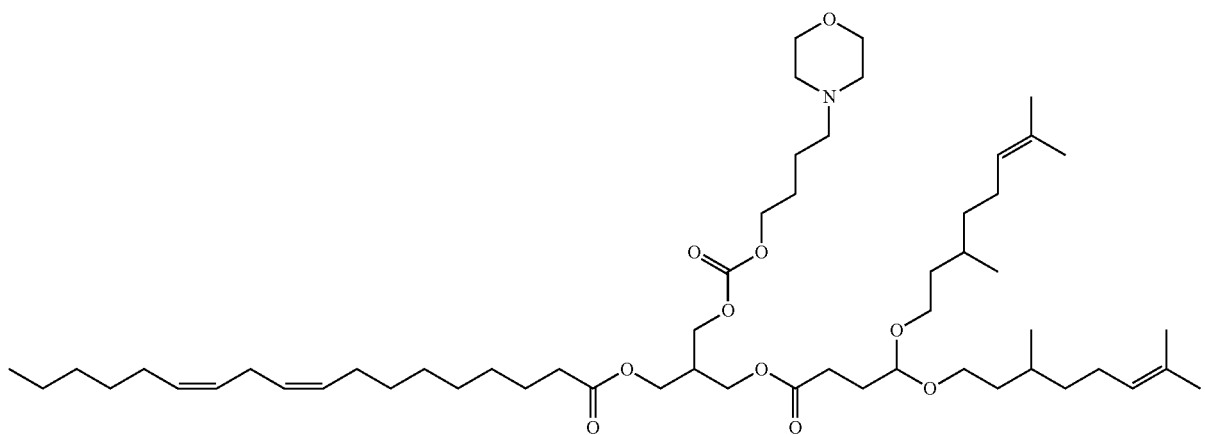

Example 57, 3-((4,4-bis((3,7-dimethyloct-6-en-1-yl)oxy)butanoyl)oxy)-2-((((4-morpholinobutoxy)carbonyl)oxy)methyl)propyl (9Z,12Z)-octadeca-9,12-dienoate: prepared from Intermediate IVb and 4-morpholinobutan-1-ol according to General Procedure D on a 0.08 mmol scale, yield 39 mg (52%). LCMS (Method A): found m/z for (M+H)=932.7, RT=4.58 min.

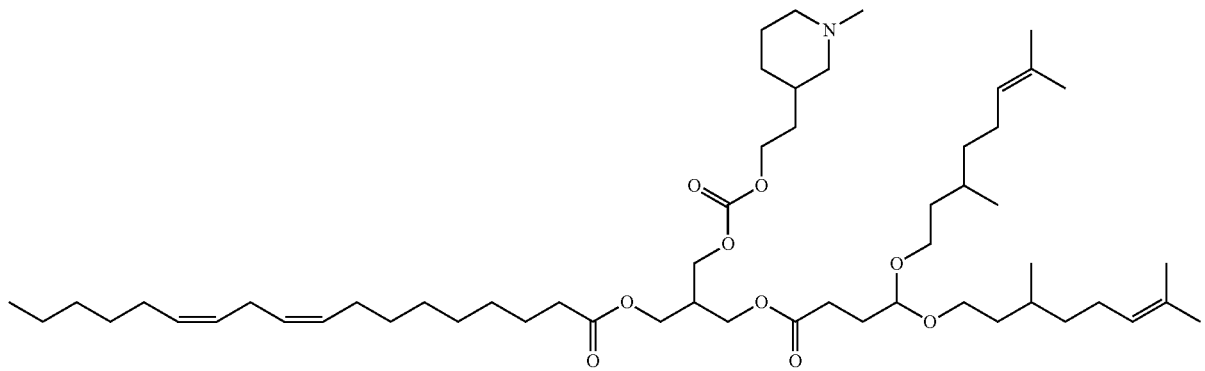

Example 58

Example 58, 3-((4,4-bis((3,7-dimethyloct-6-en-1-yl)oxy)butanoyl)oxy)-2-((((2-(1-methylpiperidin-3-yl)ethoxy)carbonyl)oxy)methyl)propyl (9Z,12Z)-octadeca-9,12-dienoate prepared from Intermediate IVb and 2-(1-methylpiperidin-3-yl)ethan-1-ol according to General Procedure D on a 0.08 mmol scale, yield 38 mg (52%). LCMS (Method A): found m/z for (M+H)=916.8, RT=3.94 min.

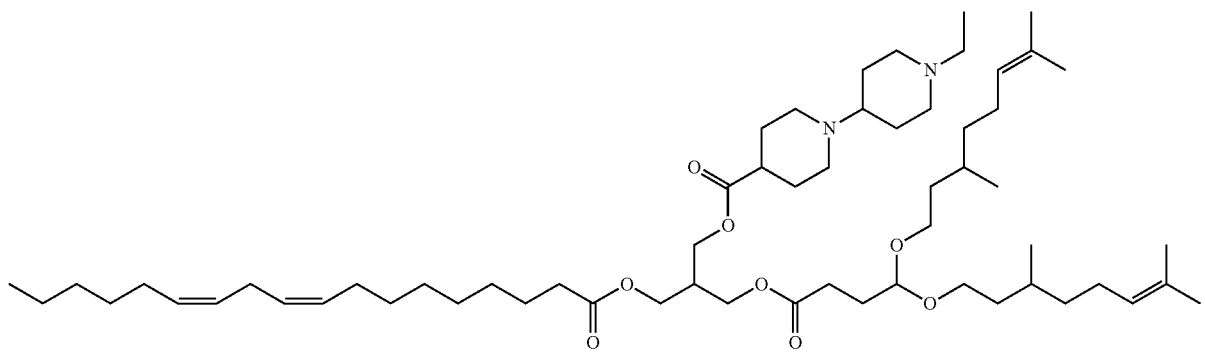

Example 59

Example 59, 3-((4,4-bis((3,7-dimethyloct-6-en-1-yl)oxy)butanoyl)oxy)-2-((((9Z,12Z)-octadeca-9,12-dienoyl)oxy)methyl)propyl 1'-ethyl-[1,4'-bipiperidine]-4-carboxylate: prepared from Intermediate IVb and 1'-ethyl-[1,4'-bipiperidine]-4-carboxylic acid dihydrochloride according to General Procedure E on a 0.08 mmol scale, yield 21 mg (27%). LCMS (Method A): found m/z for (M+H)=969.7, RT=3.41 min.

Example 60

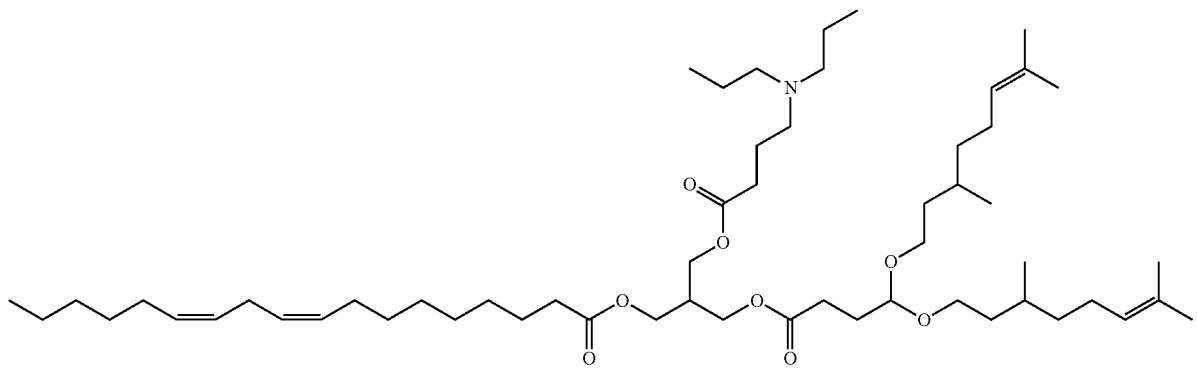

Example 60, 3-((4,4-bis((3,7-dimethyloct-6-en-1-yl)oxy) butanoyl)oxy)-2-(((4-(dipropylamino)butanoyl)oxy)methyl) propyl (9Z,12Z)-octadeca-9,12-dienoate: prepared from Intermediate IVb and 4-(dipropylamino)butanoic acid hydrochloride according to General Procedure E on a 0.08 mmol scale, yield 62 mg (84%). LCMS (Method A): found m/z for (M+H)=916.8, RT=4.00 min.

Example 61

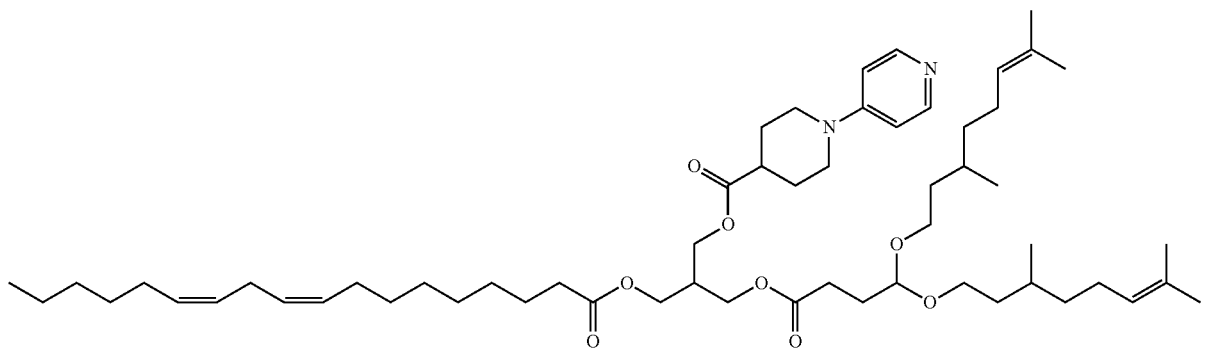

Example 61, 3-((4,4-bis((3,7-dimethyloct-6-en-1-yl)oxy) butanoyl)oxy)-2-((((9Z,12Z)-octadeca-9,12-dienoyl)oxy) methyl)propyl 1-(pyridin-4-yl)piperidine-4-carboxylate: prepared from Intermediate IVb and 1-(pyridin-4-yl)piperidine-4-carboxylic acid hydrochloride according to General Procedure E on a 0.08 mmol scale, yield 20 mg (27%). LCMS (Method A): found m/z for (M+H)=935.7, RT=3.87 min.

Example 62

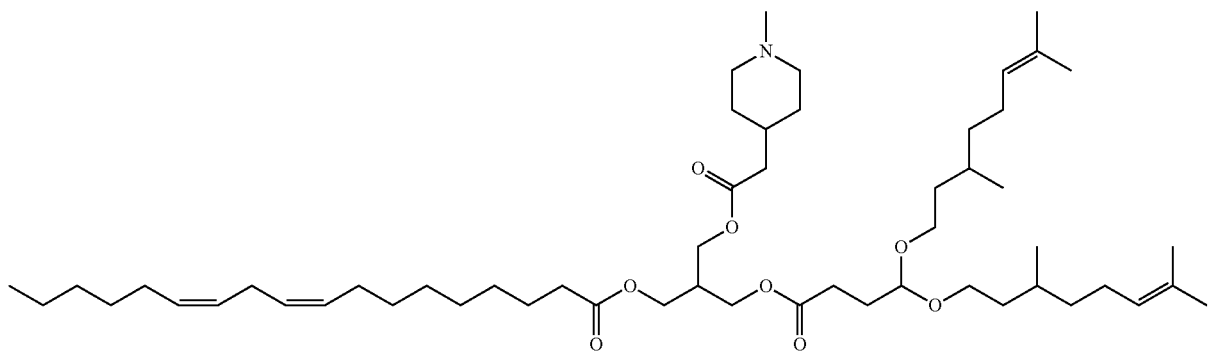

Example 62, 3-((4,4-bis((3,7-dimethyloct-6-en-1-yl)oxy) butanoyl)oxy)-2-((2-(1-methylpiperidin-4-yl)acetoxy) methyl)propyl (9Z,12Z)-octadeca-9,12-dienoate-prepared from Intermediate IVb and 2(-1-methylpiperidin-4-yl)acetic acid according to General Procedure E on a 0.08 mmol scale, yield 40 mg (56%). LCMS (Method A): found m/z for (M+H)=886.7, RT=3.95 min.

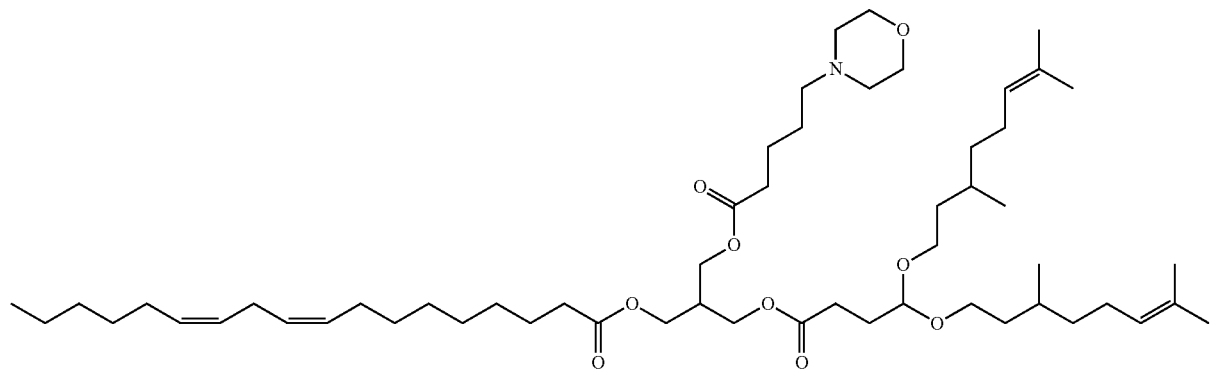

Example 63

Example 63, 3-((4,4-bis((3,7-dimethyloct-6-en-1-yl)oxy) butanoyl)oxy)-2-(((5-morpholinopentanoyl)oxy)methyl) propyl (9Z,12Z)-octadeca-9,12-dienoate: prepared from Intermediate IVb and 5-morpholinopentanoic acid hydrochloride according to General Procedure E on a 0.08 mmol scale, yield 64 mg (87%). LCMS (Method A): found m/z for (M+H)=916.9, RT=4.50 min.

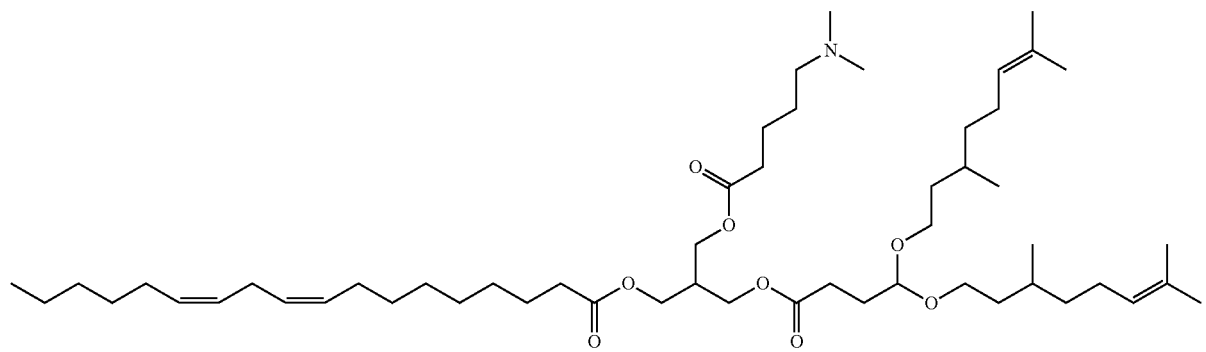

Example 64

Example 64, 3-((4,4-bis((3,7-dimethyloct-6-en-1-vi)oxy) butanoyl)oxy)-2-(((5-(dimethylamino)pentanoyl)oxy) methyl)propyl (9Z,12Z)-octadeca-9,12-dienoate: Example 63, 3-((4,4-bis((3,7-dimethyloct-6-en-1-yl)oxy)butanoyl) oxy)-2-(((5-morpholinopentanoyl)oxy)methyl)propyl (9Z, 12Z)-octadeca-9,12-dienoate: prepared from Intermediate IVb and 5-(dimethylamino)pentanoic acid hydrochloride according to General Procedure E on a 0.08 mmol scale, yield 57 mg (81%) LCMS (Method A): found m/z for (M+H)=874.8, RT=3.95 min.

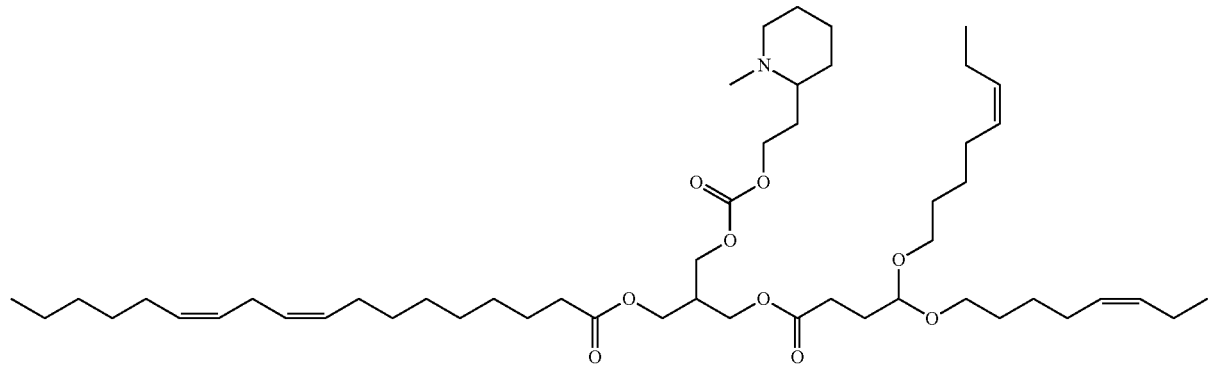

Example 65

Example 65, 3-((4,4-bis(((Z)-oct-5-en-1-yl)oxy)butanoyl)oxy)-2-((((2-(1-methylpiperidin-2-yl)ethoxy)carbonyl)oxy)methyl)propyl (9Z,12Z)-octadeca-9,12-dienoate: prepared from Intermediate IVa and 2-(1-methylpiperidin-2-yl)ethan-1-ol according to General Procedure D on a 0.087 mmol scale, yield 39 mg (52%). LCMS (Method A): found m/z for (M+H)=860.7, RT=3.83 min.

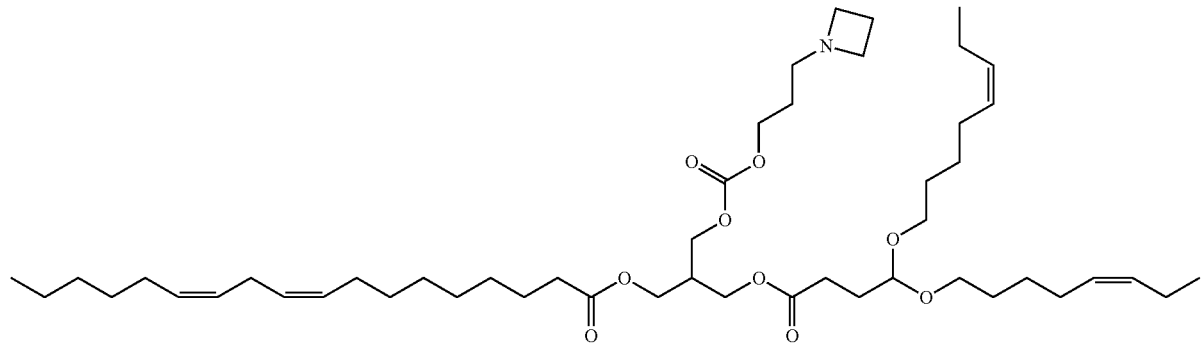

Example 66

Example 66, 3-(((3-(azetidin-1-yl)propoxy)carbonyl)oxy)-2-(((4,4-bis(((Z)-oct-5-en-1-yl)oxy)butanoyl)oxy)methyl)propyl (9Z,12Z)-octadeca-9,12-dienoate prepared from Intermediate IVa and 3-(azetidin-1-yl)propan-1-ol according to General Procedure D on a 0.087 mmol scale, yield 41 mg (57%) LCMS (Method A): found m/z for (M+H)=832.6, RT=3.74 min.

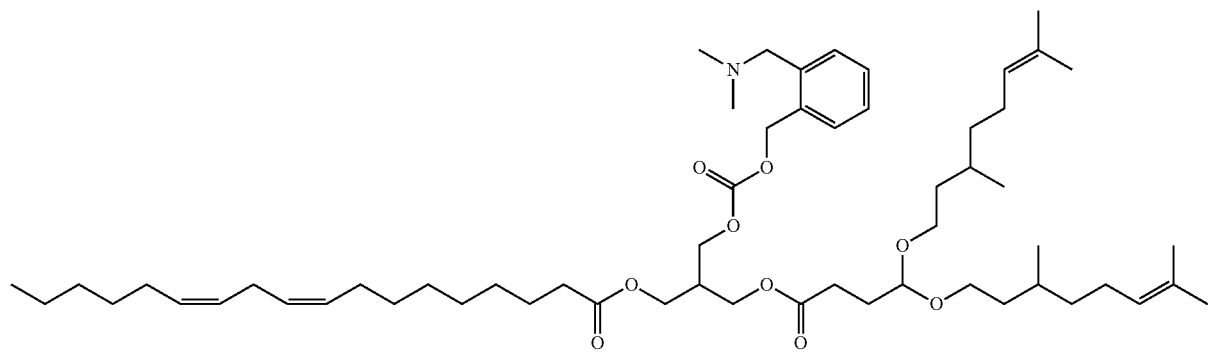

Example 67

Example 67, 3-((4,4-bis((3,7-dimethyloct-6-en-1-yl)oxy)butanoyl)oxy)-2-(((((2-((dimethylamino)methyl)benzyl)oxy)carbonyl)oxy)methyl)propyl (9Z,12Z)-octadeca-9,12-dienoate: prepared from Intermediate IVb and (2-((dimethylamino)methyl)phenyl)methanol according to General Procedure D on a 0.087 mmol scale, yield 30 mg (40%). LCMS (Method A): found m/z for (M+H)=938.7, RT=4.28 min.

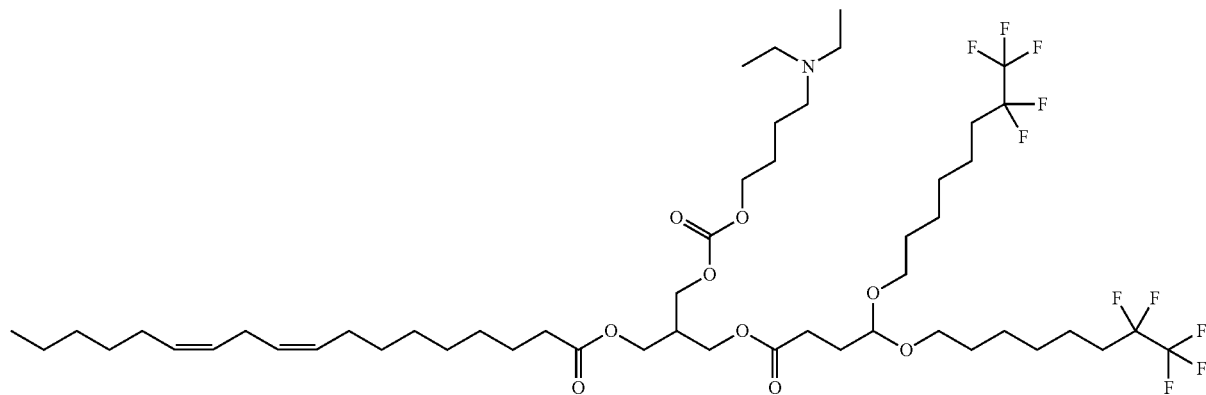

Example 68

Example 68, 3-((4,4-bis((7,7,8,8,8-pentafluorooctyl)oxy)butanoyl)oxy)-2-((((4-(diethylamino)butoxy)carbonyl)oxy)methyl)propyl (9Z,12Z)-octadeca-9,12-dienoate: prepared from Intermediate IVf and 4-(diethylamino)butan-1-ol according to General Procedure D on a 0.086 mmol scale, yield 49 mg (55%). LCMS (Method A): found m/z for (M+H)=1046.5, RT=3.63 min.

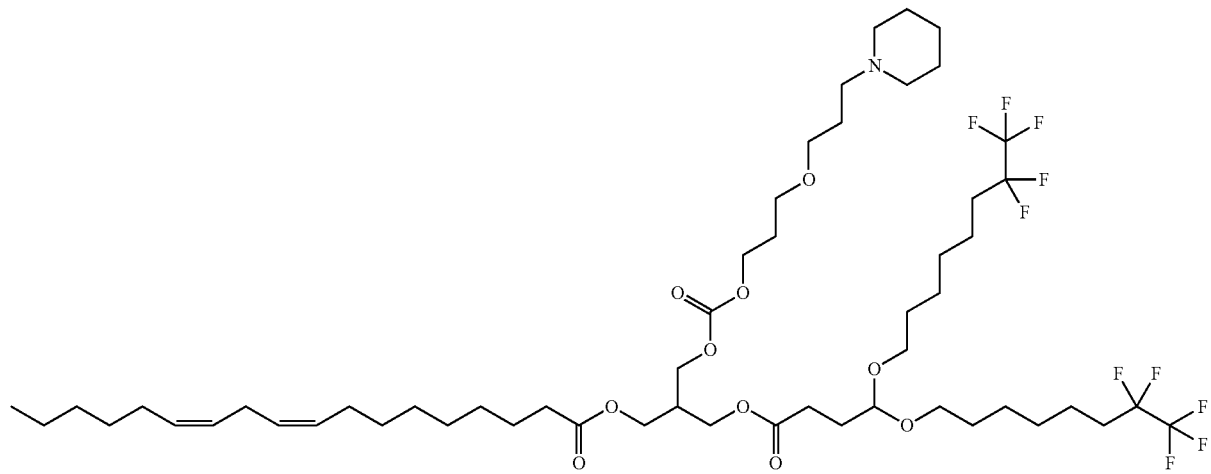

Example 69

Example 69, 3-((4,4-bis((7,7,8,8,8-pentafluorooctyl)oxy)butanoyl)oxy)-2-((((3-(3-(piperidin-1-yl)propoxy)propoxy)carbonyl)oxy)methyl)propyl (9Z,12Z)-octadeca-9,12-dienoate: prepared from Intermediate IVf and 3-(3-(piperidin-1-yl)propoxy)propan-1-ol according to General Procedure D on a 0.086 mmol scale, yield 44 mg (46%) LCMS (Method A): found m/z for (M+H)=1102.5, RT=3.66 min.

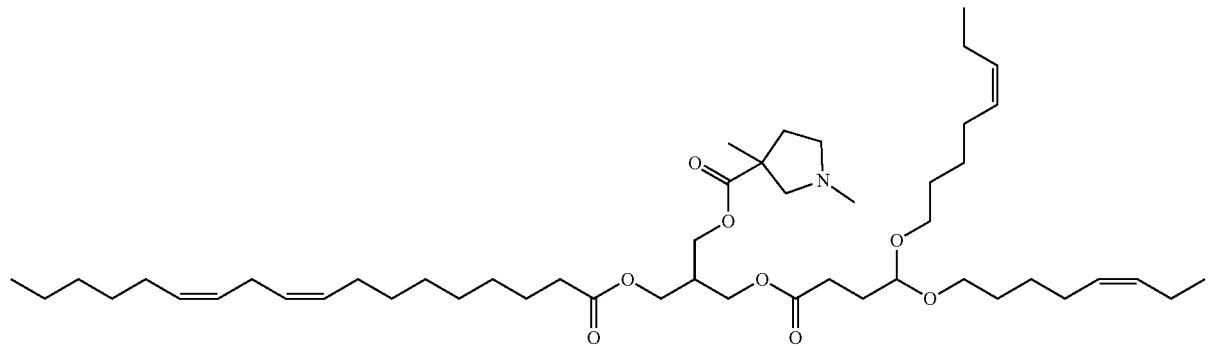

Example 70

Example 70, 3-((4,4-bis(((Z)-oct-5-en-1-yl)oxy)butanoyl) oxy)-2-((((9Z,12Z)-octadeca-9,12-dienoyl)oxy)methyl)propyl 1,3-dimethylpyrrolidine-3-carboxylate prepared from Intermediate IVa and 1,3-dimethylpyrrolidine-3-carboxylic acid according to General Procedure E on a 0.077 mmol scale, yield 7 mg (11%). LCMS (Method A): found m/z for (M+H)=816.6, RT=3.74 min.

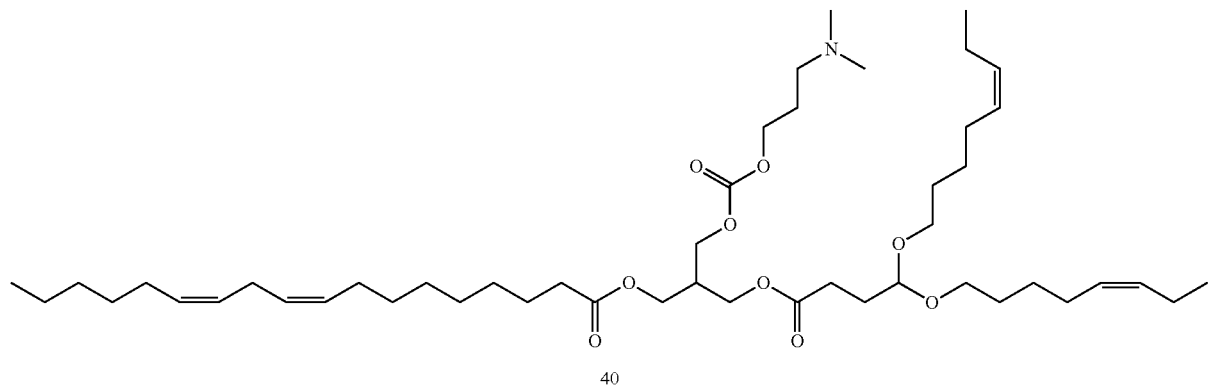

Example 71

Example 71, 3-((4,4-bis(((Z)-oct-5-en-1-yl)oxy)butanoyl) oxy)-2-((((3-(dimethylamino)propoxy)carbonyl)oxy) methyl)propyl (9Z,12Z)-octadeca-9,12-dienoate: prepared from Intermediate IVa and 3-(dimethylamino)propan-1-ol according to General Procedure D on a 0.077 mmol scale, yield 22 mg (35%). LCMS (Method A): found m/z for (M+H)=820.7, RT=3.76 min.

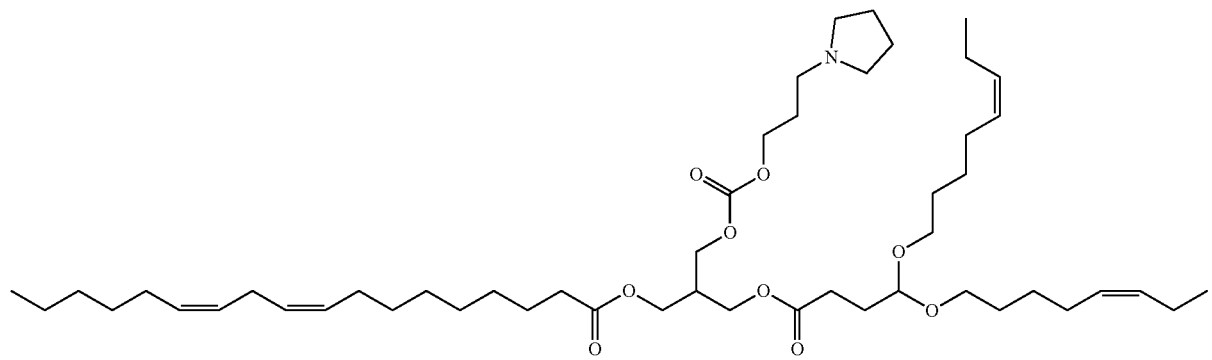

Example 72

Example 72, 3-((4,4-bis(((Z)-oct-5-en-1-yl)oxy)butanoyl)oxy)-2-((((3-(pyrrolidin-1-yl)propoxy)carbonyl)oxy)methyl)propyl (9Z,12Z)-octadeca-9,12-dienoate-prepared from Intermediate IVa and 3-(pyrrolidin-1-yl)propan-1-ol according to General Procedure D on a 0.077 mmol scale, yield 27 mg (41%) LCMS (Method A): found m/z for (M+H)=846.7, RT=3.73 min.

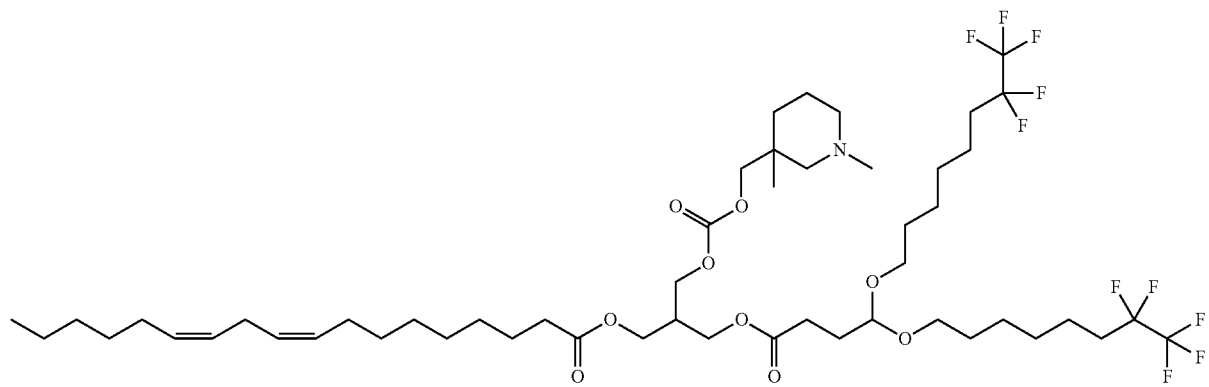

Example 73

Example 73, 3-((4,4-bis((7,7,8,8,8-pentafluorooctyl)oxy)butanoyl)oxy)-2-(((((1,3-dimethylpiperidin-3-yl)methoxy)carbonyl)oxy)methyl)propyl (9Z,12Z)-octadeca-9,12-dienoate: prepared from Intermediate IVf and (1,3-dimethylpiperidin-3-yl)methanol according to General Procedure D on a 0.057 mmol scale, yield 42 mg (70%). LCMS (Method A): found m/z for (M+H)=1044.5, RT=3.69 min.

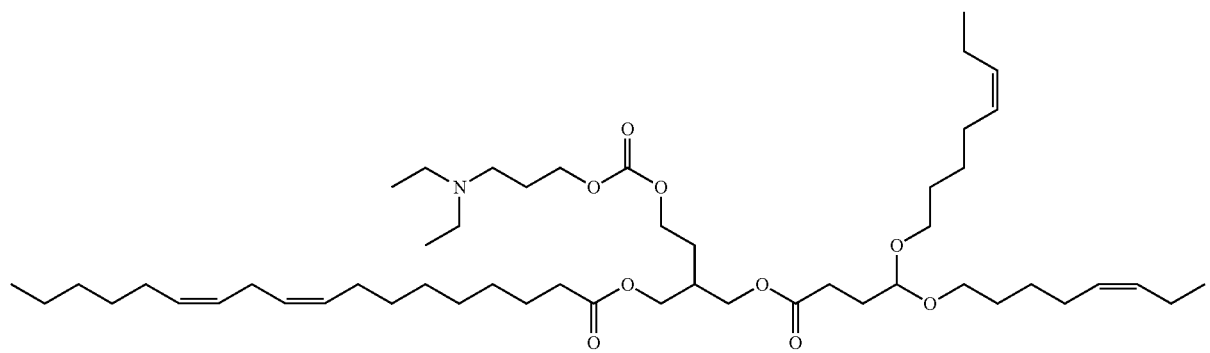

Example 74

Example 74

Example 74, 2-(((4,4-bis(((Z)-oct-5-en-1-yl)oxy)butanoyl)oxy)methyl)-4-(((3-(diethylamino)propoxy)carbonyl)oxy)butyl (9Z,12Z)-octadeca-9,12-dienoate

Step 1: 2-(hydroxymethyl)butane-1,4-diol

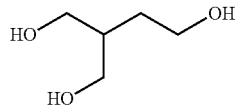

To a stirred solution of triethyl ethane-1,1,2-tricarboxylate (5 g, 20.3 mmol) in tert-butanol (80 mL) was added NaBH₄ (2.3 g, 60.9 mmol) under argon atmosphere at 25° C. The resulting suspension was heated to reflux and methanol (3 mL) was added drop wise in three portions within 30 min. The resulting solution was heated to reflux for another 3 h. Then the reaction mixture was cooled to 25° C. and neutralized with 5N HCl (2.5 mL). The precipitate was filtered and the filtrate was evaporated to afford crude material which was purified by combiflash column chromatography, eluted with 10-15% MeOH in DCM to afford 2-(hydroxymethyl)butane-1,4-diol (1.7 g, 69%) as a yellow liquid. $^1$H NMR (400 MHz, DMSO-d₆): δ 1.34-1.46 (m, 2H), 1.49-1.63 (m, 1H), 3.27-3.48 (m, 6H), 4.34 (t, J=5.2 Hz, 2H), 4.40 (t, J=5.1 Hz, 1H).

Step 2: 2-(2,2-dimethyl-1,3-dioxan-5-yl)ethan-1-ol

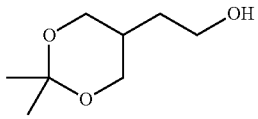

To a stirred solution of 2-(hydroxymethyl)butane-1,4-diol (1.7 g, 14.1 mmol) and 2,2-dimethoxypropane (4.3 mL, 35.3 mmol) in THF (10 mL) was added p-toluenesulfonic acid monohydrate (0.36 g, 3.1 mmol) at 25° C. under argon atmosphere. The reaction mixture was stirred at 25° C. for 16 h. After this time, the reaction was neutralized with triethylamine (5 mL). Solvent was removed under reduced pressure to afford crude material which was purified by combiflash column chromatography eluted with 15% ethyl acetate-hexane to afford 2-(2,2-dimethyl-1,3-dioxan-5-yl)ethan-1-ol (1.2 g, 53%) as a pale yellow liquid. $^1$H NMR (400 MHz, CDCl₃): δ 1.41 (s, 6H), 1.50-1.60 (m, 2H), 1.88-1.98 (m, 1H), 3.63 (dd, J=7.9, 11.8 Hz, 2H), 3.70 (t, J=6.4 Hz, 2H), 3.93 (dd, J=4.5, 11.8 Hz, 2H).

Step 3: 2-(2,2-dimethyl-1,3-dioxan-5-yl)ethyl (4-nitrophenyl) carbonate

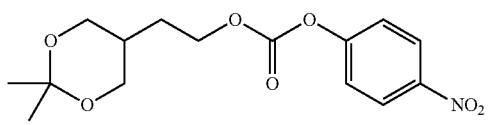 [SMILES: CC1(C)OCC(CCOC(=O)Oc2ccc([N+](=O)[O-])cc2)CO1]

To a solution of 2-(2,2-dimethyl-1,3-dioxan-5-yl)ethan-1-ol (400 mg, 2.5 mmol) in DCM (10 mL) was added pyridine (0.4 mL, 5.0 mmol), DMAP (30.5 mg, 0.25 mmol), and lastly 4-nitrophenyl chloroformate (604 mg, 2.9 mmol). The reaction was allowed to stir for 7 hours at 25° C. After this time, the reaction mixture was diluted with water (20 mL) and DCM (30 mL). The organic layer was separated, and the water layer was extracted with DCM (10 mL×2). The combined organic layers were dried with Na₂SO₄. Solvent was removed under reduced pressure to afford crude mass which was purified by combiflash column chromatography eluted with 30% ethyl acetate-hexane to afford 2-(2,2-dimethyl-1,3-dioxan-5-yl)ethyl (4-nitrophenyl) carbonate (0.302 g, 37%) as a colorless liquid. $^1$H NMR (400 MHz, CDCl3) δ 1.29-1.34 (m, 6H), 1.62 (q, J=6.7 Hz, 2H), 1.80 (bs, 11H), 3.54 (q, J=8.8 Hz, 2H), 3.83 (dd, J=11.4 Hz, 4.0 Hz, 2H), 4.28 (t, J=6.4 Hz, 2H), 7.57 (d, J=9.0 Hz, 2H), 8.31 (d, J=90 Hz, 2H).

Step 4: 3-(diethylamino)propyl (2-(2,2-dimethyl-1,3-dioxan-5-yl)ethyl) carbonate

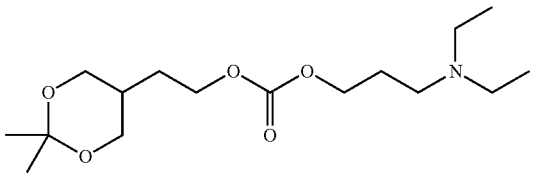 [SMILES: CCN(CC)CCCOC(=O)OCCC1COC(C)(C)OC1]

To a stirred solution of 2-(2,2-dimethyl-1,3-dioxan-5-yl)ethyl (4-nitrophenyl) carbonate (150 mg, 0.46 mmol) in 5 mL DCM were added DMAP (5.6 mg, 0.04 mmol) and pyridine (0.07 mL, 0.9 mmol) at 25° C. and stirred for 5 min. Then 3-(diethylamino)-1-propanol (78.7 mg, 0.6 mmol) was added at 25° C. The reaction mass was stirred for at 25° C. for 9 h. The completion of the reaction was judged by TLC (5% MeOH-DCM). Reaction mixture was diluted with water and extracted with DCM (3×15 mL). Combined organic layer was washed with brine, dried over anhydrous Na₂SO₄, filtered and concentrated under reduced pressure. Crude material thus obtained was purified by combiflash column chromatography eluted with 10% MeOH-DCM to afford 3-(diethylamino)propyl (2-(2,2-dimethyl-1,3-dioxan-5-yl)ethyl) carbonate (98 mg, 67%) as pale yellow liquid. $^1$H NMR (400 MHz, CDCl3) δ 1.03 (t, J=7.0 Hz, 3H), 1.40 (s, 3H), 1.63 (q, J=6.7 Hz, 1H), 1.80-1.87 (m, 1H), 2.54 (t, J=7.0 Hz, 3H), 3.58 (q, J=8.2 Hz, 1H), 3.91 (dd, J=11.8 Hz, 4.2 Hz, 1H), 4.13 (q, J=6.2 Hz, 2H).

Step 5: 3-(diethylamino)propyl (4-hydroxy-3-(hydroxymethyl)butyl) carbonate

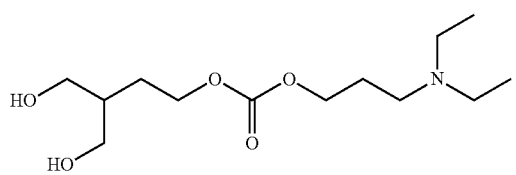 [SMILES: CCN(CC)CCCOC(=O)OCCC(CO)CO]

To a stirred solution of 3-(diethylamino)propyl (2-(2,2-dimethyl-1,3-dioxan-5-yl)ethyl) carbonate (92 mg, 0.3 mmol) in MeOH (1 mL) was added 1N HCl (0.9 mL, 0.9 mmol) at 25° C. The reaction mass was stirred for 2 h. The completion of the reaction was judged by TLC (5% MeOH-DCM). Reaction mixture was concentrated and azeotroped with toluene for two times to afford crude product 3-(diethylamino)propyl (4-hydroxy-3-(hydroxymethyl)butyl) carbonate (120 mg), which was directly used for next step without purification.

Step 6: 4-(((3-(diethylamino)propoxy)carbonyl)oxy)-2-(hydroxymethyl)butyl (9Z,12Z)-octadeca-9,12-dienoate

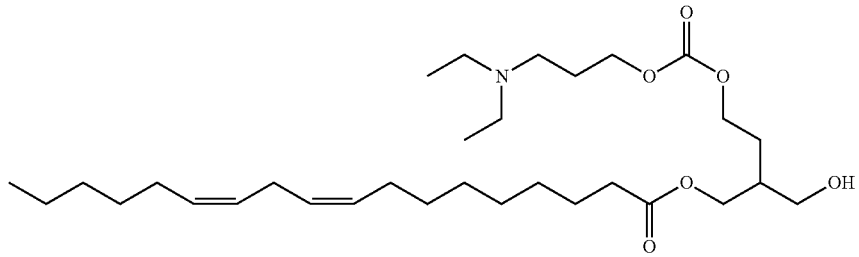 [SMILES: CCCCC/C=C\C/C=C\CCCCCCCC(=O)OCC(CO)CCOC(=O)OCCCN(CC)CC]

To a stirred solution of linoleic acid (0.08 mL, 0.26 mmol) in 3 mL DCM were added EDC (82.9 mg, 0.43 mmol) and DMAP (7.2 mg, 0.06 mmol) at 25° C. and stirred for 5 min. DIPEA (0.147 mL, 0.86 mmol) and 3-(diethylamino)propyl (4-hydroxy-3-(hydroxymethyl)butyl) carbonate (80 mg, 0.29 mmol) were added at 25° C. Then the reaction mixture was stirred at 25° C. for 16 h. The completion of the reaction was judged by LCMS of crude reaction mixture. Reaction mixture was diluted with water (10 mL) and extracted with DCM (15 mL×3). Combined organic layer was washed with brine (10 mL), dried over anhydrous $Na_2SO_4$, filtered and concentrated under reduced pressure. Crude material thus obtained was purified by combiflash column chromatography eluted with 10% MeOH-DCM to afford 4-(((3-(diethylamino)propoxy)carbonyl)oxy)-2-(hydroxymethyl)butyl (9Z,12Z)-octadeca-9,12-dienoate (42 mg, 27%) as pale yellow liquid. $^1$H NMR (400 MHz, CDCl3) δ 0.87 (d, J 6.6 Hz, 3H), 1.00-1.10 (m, 5H), 1.24-1.29 (m, 2H), 1.69-1.83 (m, 4H), 2.02 (t, J=6.6 Hz, 5H), 2.30 (t, J=7.3 Hz, 2H), 2.50-2.55 (m, 5H), 2.75 (d, J=7.3 Hz, 2H), 3.54-3.61 (m, 2H), 4.13-4.23 (m, 5H), 5.34 (t, J=4.5 Hz, 4H).

Step 7: 2-(((4,4-bis(((Z)-oct-5-en-1-yl)oxy)butanoyl)oxy)methyl)-4-(((3-(diethylamino)propoxy)carbonyl)oxy)butyl (9Z,12Z)-octadeca-9,12-dienoate (Example 74): to a stirred solution of 4,4-bis(((Z)-oct-5-en-1-yl)oxy)butanoic acid (Intermediate IIa) (24.1 mg, 0.07 mmol) in 2 mL DCM were added EDC (22.3 mg, 0.12 mmol) and DMAP (1.9 mg, 0.015 mmol) at 25° C. and stirred for 5 min. Then DIPEA (0.04 mL, 0.23 mmol) and 4-(((3-(diethylamino)propoxy)carbonyl)oxy)-2-(hydroxymethyl)butyl (9Z,12Z)-octadeca-9,12-dienoate (42 mg, 0.08 mmol) were added at 25° C. The reaction mixture was stirred at 25° C. for 16 h. The completion of the reaction was judged by LCMS of crude reaction mixture. Reaction mixture was diluted with $NaHCO_3$ solution (5 mL) and extracted with DCM (10 mL×3). Combined organic layer was washed with brine (10 mL), dried over anhydrous $Na_2SO_4$, filtered and concentrated under reduced pressure. Crude material thus obtained was purified by Prep-HPLC to afford -(((4,4-bis(((Z)-oct-5-en-1-yl)oxy)butanoyl)oxy)methyl)-4-(((3-(diethylamino)propoxy)carbonyl)oxy)butyl (9Z,12Z)-octadeca-9,12-dienoate (24 mg, 36%) as pale yellow liquid. LCMS (Method B): found m/z for (M+H)=867.7, RT=2.04 min.

Example 75

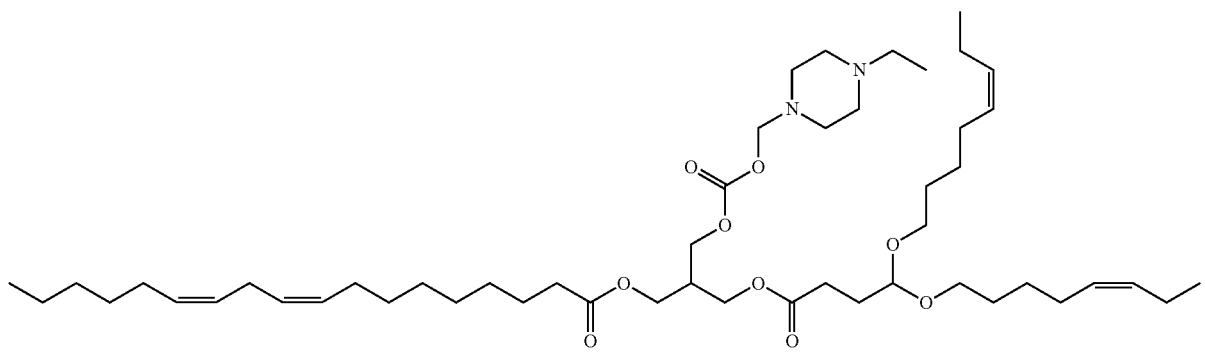

Example 75, 3-((4,4-bis(((Z)-oct-5-en-1-yl)oxy)
butanoyl)oxy)-2-(((3-(4-ethylpiperazin-1-yl)pro-
panoyl)oxy)methyl)propyl (9Z,12Z)-octadeca-9,12-
dienoate Step 1: 3-(acryloyloxy)-2-(((4,4-bis(((Z)-oct-5-en-1-
yl)oxy)butanoyl)oxy)methyl propyl (9Z,12Z)-octa-
deca-9,12-dienoate (Intermediate V)

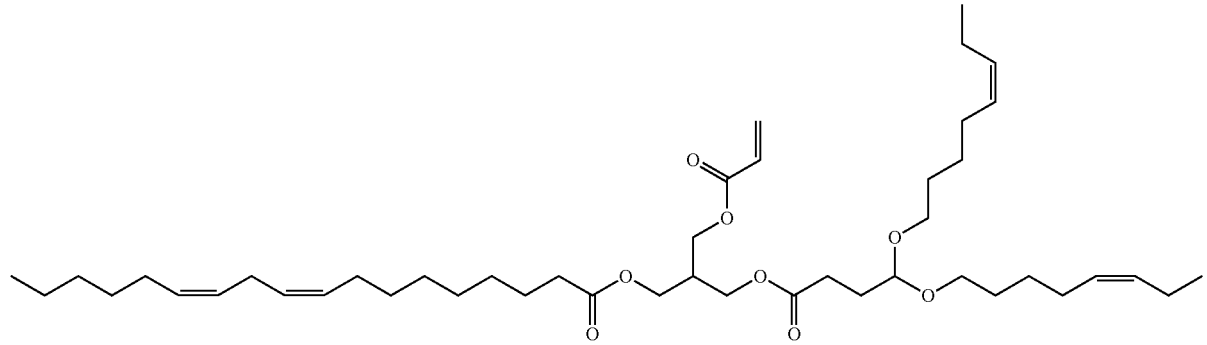

Intermediate V

To a stirred solution of 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa) (1.0 g, 1.4 mmol) in DCM (20 mL) wered added DMAP (18.0 mg, 0.1 mmol) and DIPEA (0.50 mL, 2.8 mmol). The resulting mixture was cooled in an ice bath, then acryloyl chloride (0.2 mL, 2.9 mmol) was added drop wise over 10 min. The mixture was stirred at room temperature for 1 h. After this time, the reaction mixture was extracted with DCM (20 mL×2). Combined organic layer was washed with water (20 mL×2) and brine (20 mL×2), dried over anhydrous $Na_2SO_4$, filtered and concentrated under reduced pressure. Crude material was purified by combiflash column chromatography, eluted with 10% ethyl acetate-hexane to afford 3-(acryloyloxy)-2-(((4,4-bis(((Z)-oct-5-en-1-yl)oxy)butanoyl)oxy)methyl)propyl (9Z,12Z)-octadeca-9,12-dienoate (860 mg, 79%) as colorless liquid. $^1H$ NMR (400 MHz, Chloroform-d) δ 0.84-0.91 (m, 3H), 0.94 (t, J=7.5 Hz, 6H), 1.17-1.47 (m, 20H), 1.53-1.65 (m, 4H), 1.86-1.95 (m, 2H), 1.97-2.09 (m, 12H), (m, 4H), 4.22 (d, J=6.0 Hz, 2H), 4.47 (t, J=5.6 Hz, 1H), 5.22-5.45 (m, 8H), 5.85 (d, J=11.3 Hz, 1H), 6.11 (dd, J=10.5, 17.3 Hz, 1H), 6.36-6.45 (m, 1H).

Step 2: 3-((4,4-bis(((Z)-oct-5-en-1-yl)oxy)butanoyl)oxy)-2-(((3-(4-ethylpiperazin-1-yl)propanoyl)oxy)methyl)propyl (9Z,12Z)-octadeca-9,12-dienoate (Example 75): the following is representative of General Procedure F. A mixture of 3-(acryloyloxy)-2-(((4,4-bis(((Z)-oct-5-en-1-yl)oxy)butanoyl)oxy)methyl)propyl (9Z,12Z)-octadeca-9,12-dienoate (Intermediate V) (50 mg, 0.067 mmol, 1 Eq) and 1-ethylpiperazine (38 mg, 0.34 mmol, 5 Eq) were heated to 50° C. for 16 h in the absence of solvent. After cooling to room temperature, the crude reaction mixture was purified by column chromatography eluting with 9:1 DCM/MeOH to afford 3-((4,4-bis(((Z)-oct-5-en-1-yl)oxy)butanoyl)oxy)-2-(((3-(4-ethylpiperazin-1-yl)propanoyl)oxy)methyl)propyl (9Z,12Z)-octadeca-9,12-dienoate (26 mg, 44%). LCMS (Method B): found m/z for (M+H)=859.9, RT=1.67 min.

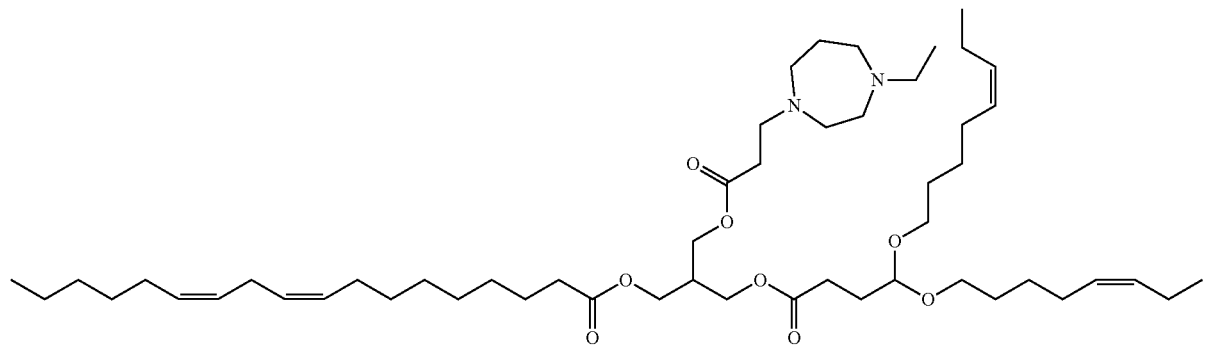

Example 76

2.30 (t, J=7.4 Hz, 2H), 2.34-2.47 (m, 3H), 2.76 (t, J=6.4 Hz, 2H), 3.34-3.45 (m, 2H), 3.56 (q, J=7.4 Hz, 2H), 4.11-4.18

Example 76, 3-((4,4-bis(((Z)-oct-5-en-1-yl)oxy)butanoyl)oxy)-2-(((3-(4-ethyl-1,4-diazepan-1-yl)propanoyl)oxy)

methyl)propyl (9Z,12Z)-octadeca-9,12-dienoate: prepared from Intermediate V and 1-ethyl-1,4-diazepane according to General Procedure F, yield 16 mg (46%). LCMS (Method B): found m/z for (M+H)=873.9, RT=1.56 min Example 77

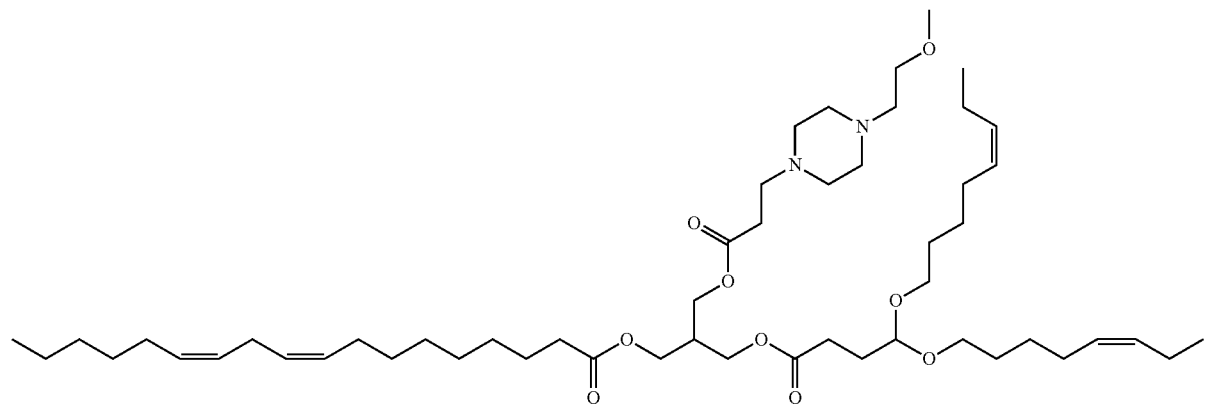

Example 77, 3-((4,4-bis(((Z)-oct-5-en-1-yl)oxy)butanoyl) oxy)-2-(((3-(4-(2-methoxyethyl)piperazin-1-yl)propanoyl) oxy)methyl)propyl (9Z,12Z)-octadeca-9,12-dienoate: prepared from Intermediate V and 1-(2-methoxyethyl) piperazine according to General Procedure F, yield 34 mg (57%) LCMS (Method B): found m/z for (M+H)=889.9, RT=1.69 min.

Example 78

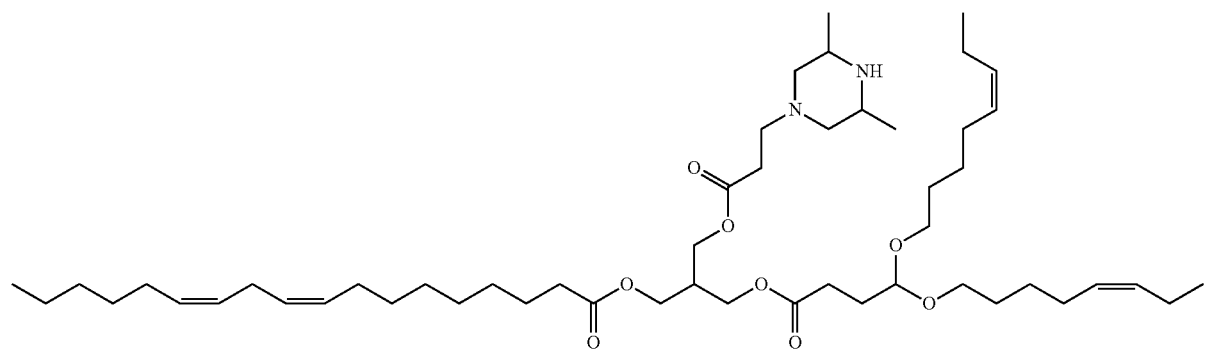

Example 78, 3-((4,4-bis(((Z)-oct-5-en-1-yl)oxy)butanoyl) oxy)-2-(((3-(3,5-dimethylpiperazin-1-yl)propanoyl)oxy) methyl)propyl (9Z,12Z)-octadeca-9,12-dienoate prepared from Intermediate V and 2,6-dimethylpiperazine according to General Procedure F, yield 38 mg (65%). LCMS (Method B): found m/z for (M+H)=859.9, RT=1.71 min.

Example 79

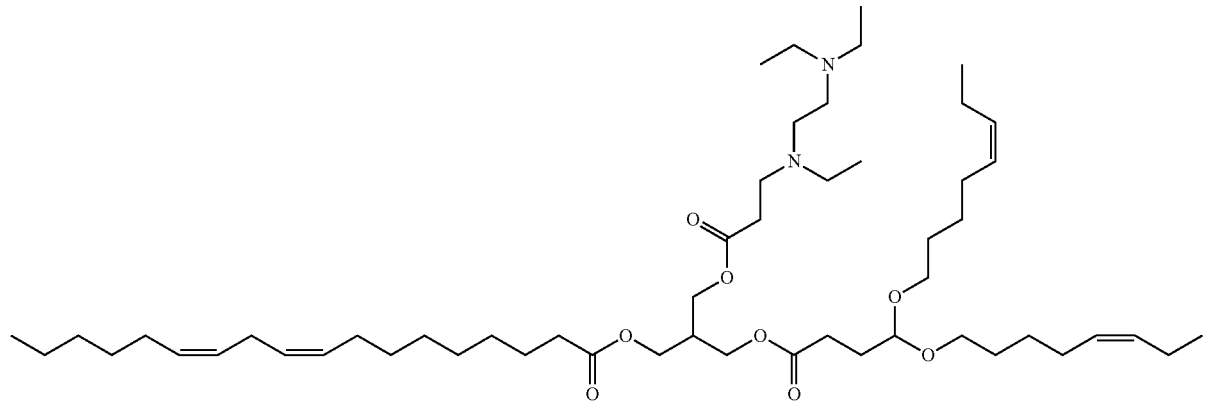

Example 79, 3-((4,4-bis(((Z)-oct-5-en-1-yl)oxy)butanoyl)oxy)-2-(((3-((2-(diethylamino)ethyl)(ethyl)amino)propanoyl)oxy)methyl)propyl (9Z,12Z)-octadeca-9,12-dienoate: prepared from Intermediate V and N1,N1,N2-triethylethane-1,2-diamine according to General Procedure F, yield 24 mg (48%). LCMS (Method B): found m/z for (M+H)=889.9, RT=2.29 min.

Example 80

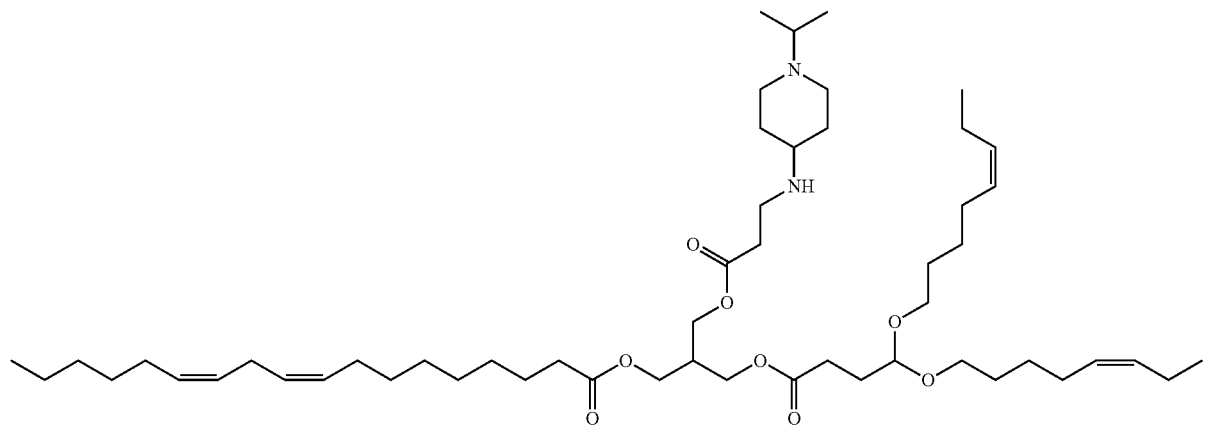

Example 80, 3-((4,4-bis(((Z)-oct-5-en-1-yl)oxy)butanoyl)oxy)-2-(((3-((1-isopropylpiperidin-4-yl)amino)propanoyl)oxy)methyl)propyl (9Z,12Z)-octadeca-9,12-dienoate: prepared from Intermediate V and 1-isopropylpiperidin-4-amine according to General Procedure F, yield 18 mg (37%). LCMS (Method B): found m/z for (M+H)=887.9, RT=1.34 min.

Example 81

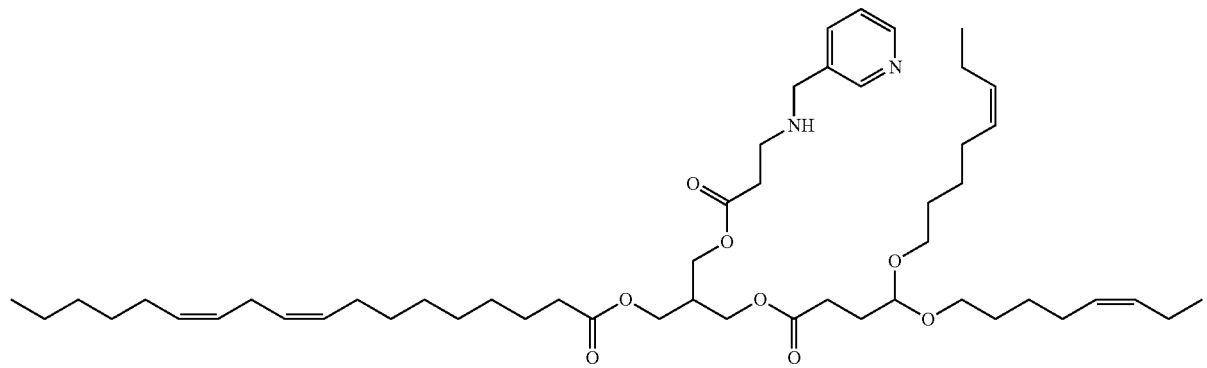

Example 81, 3-((4,4-bis(((Z)-oct-5-en-1-yl)oxy)butanoyl)oxy)-2-(((3-((pyridin-3-ylmethyl)amino)propanoyl)oxy)methyl)propyl (9Z,12Z)-octadeca-9,12-dienoate prepared from Intermediate V and pyridin-3-ylmethanamine according to General Procedure F, yield 20 mg (43%). LCMS (Method B): found m/z for (M+H)=854.0, RT=1.34 min.

Example 82

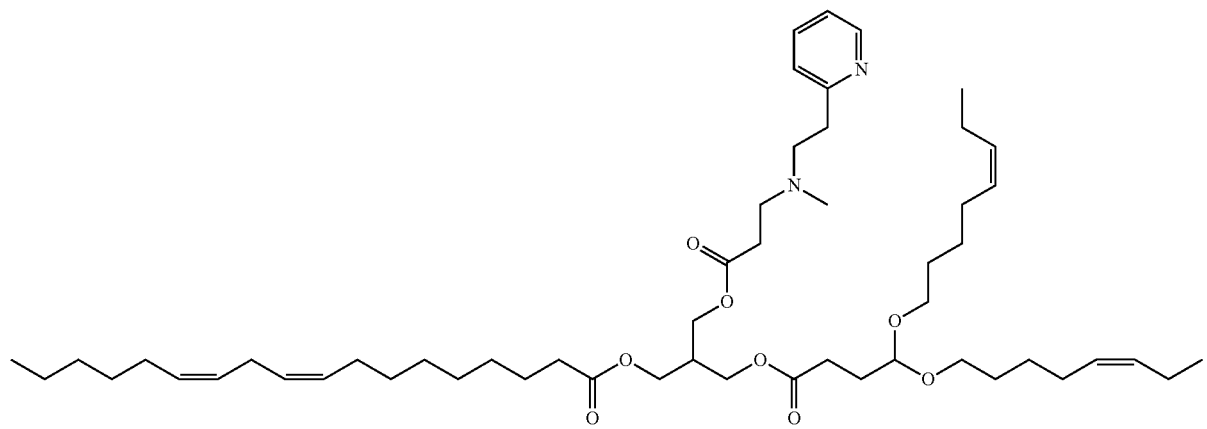

Example 82, 3-((4,4-bis(((Z)-oct-5-en-1-yl)oxy)butanoyl)oxy)-2-(((3-(methyl(2-(pyridin-2-yl)ethyl)amino)propanoyl)oxy)methyl)propyl (9Z,12Z)-octadeca-9,12-dienoate: prepared from Intermediate V and N-methyl-2-(pyridin-2-yl)ethan-1-amine according to General Procedure F, yield 34 mg (49%). LCMS (Method B): found m/z for (M+H)=882.0, RT=1.07 min.

Example 83

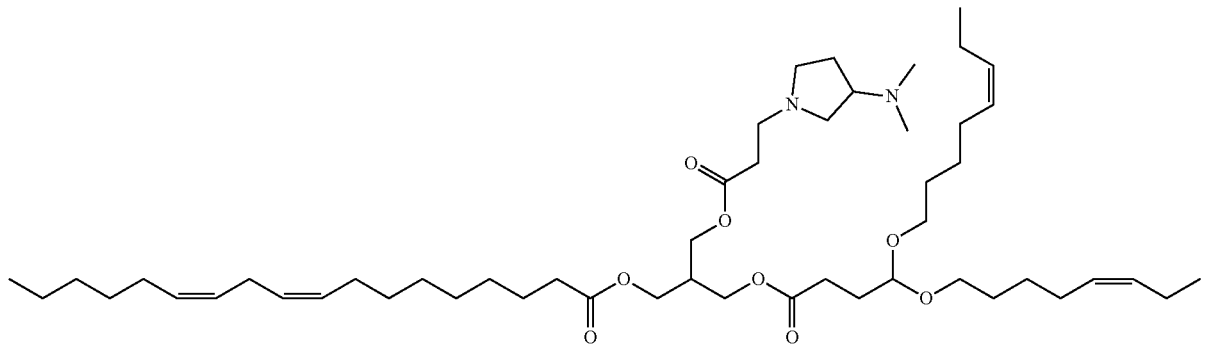

Example 83, 3-((4,4-bis(((Z)-oct-5-en-1-yl)oxy)butanoyl) oxy)-2-(((3-(3-(dimethylamino)pyrrolidin-1-yl)propanoyl) oxy)methyl)propyl (9Z,12Z)-octadeca-9,12-dienoate: prepared from Intermediate V and 3-(dimethylamino) pyrrolidine according to General Procedure F, yield 27 mg (58%). LCMS (Method B): found m/z for (M+H) 859.9, RT=1.62 min.

Example 84

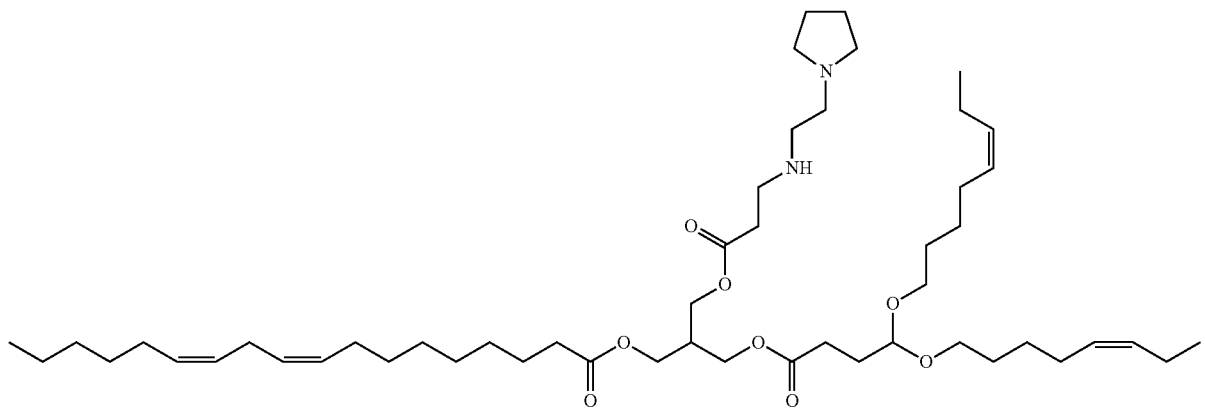

Example 84, 3-((4,4-bis(((Z)-oct-5-en-1-yl)oxy)butanoyl) oxy)-2-(((3-((2-(pyrrolidin-1-yl)ethyl)amino)propanoyl) oxy)methyl)propyl (9Z,12Z)-octadeca-9,12-dienoate: prepared from Intermediate V and 2-(pyrrolidin-1-yl)ethan-1-amine according to General Procedure F, yield 26 mg (56%). LCMS (Method B): found m/z for (M+H)=859.9, RT=1.34 min, Example 85

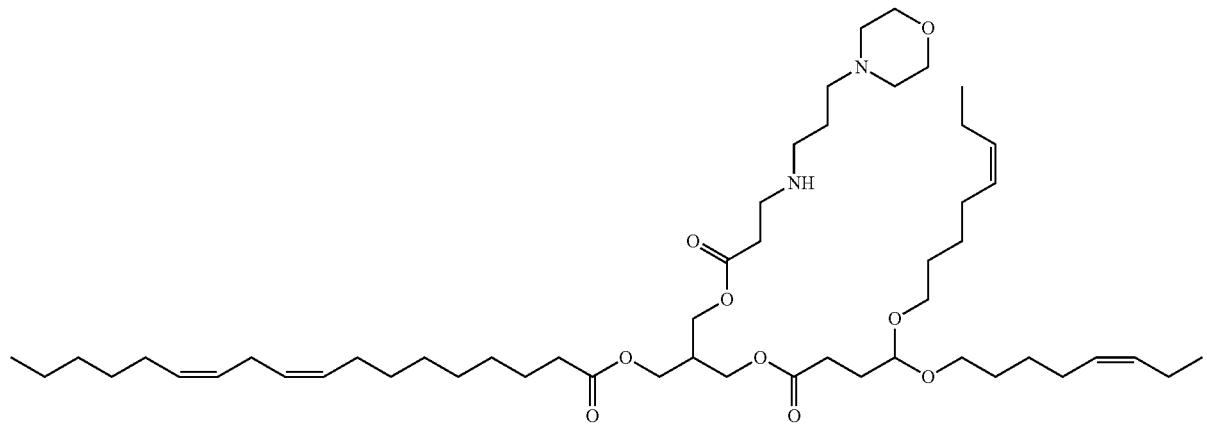

Example 85, 3-((4,4-bis(((Z)-oct-5-en-1-yl)oxy)butanoyl)oxy)-2-(((3-((3-morpholinopropyl)amino)propanoyl)oxy)methyl)propyl (9Z,12Z)-octadeca-9,12-dienoate prepared from Intermediate V and 2-(1-methylpyrrolidin-2-yl)ethan-1-amine according to General Procedure F, yield 17 mg (35%). LCMS (Method B): found m/z for (M+H)=873.8, RT=2.28 min.

Example 86

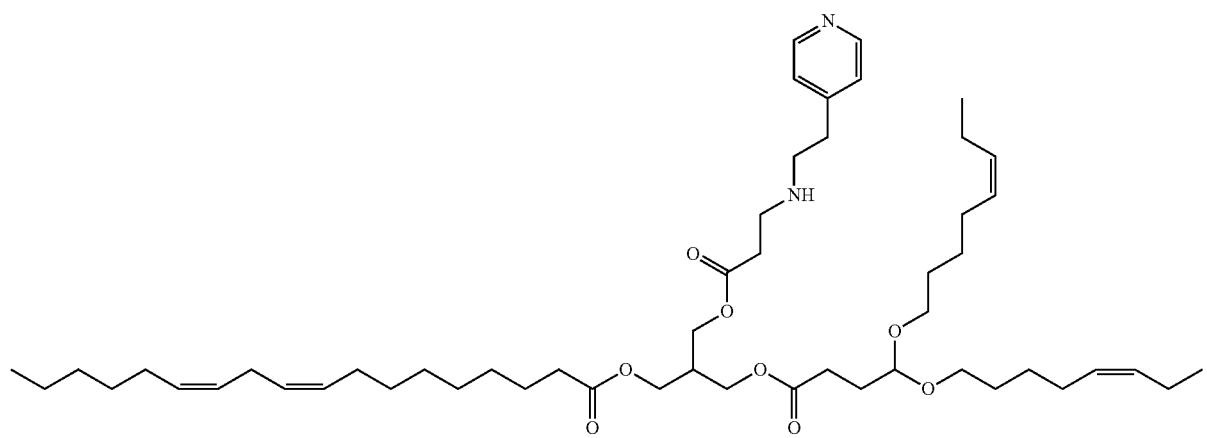

Example 86, 3-((4,4-bis(((Z)-oct-5-en-1-yl)oxy)butanoyl)oxy)-2-(((3-((2-(pyridin-4-yl)ethyl)amino)propanoyl)oxy)methyl)propyl (9Z,12Z)-octadeca-9,12-dienoate prepared from Intermediate V and 2-(pyridin-4-yl)ethan-1-amine according to General Procedure F, yield 18 mg (39%). LCMS (Method B): found m/z for (M+H)=867.9, RT=1.34 min Example 87

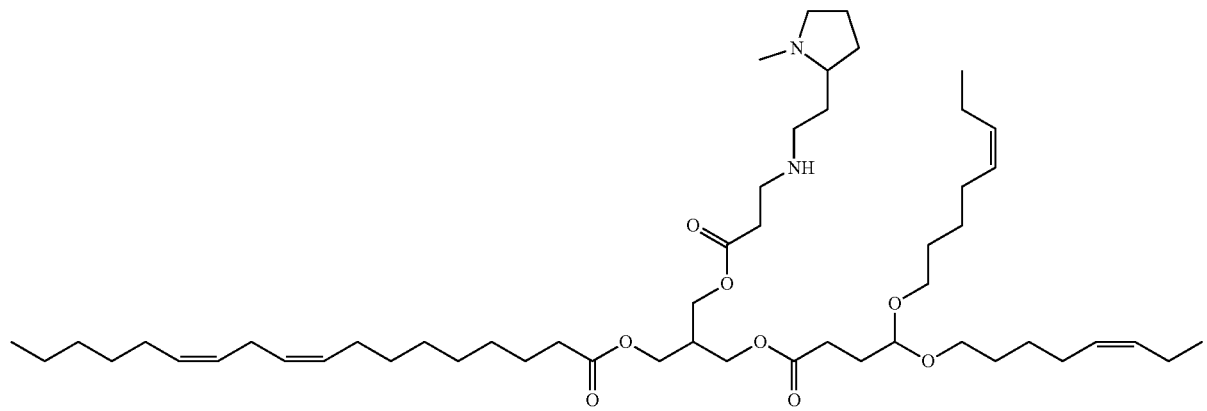

Example 87, 3-((4,4-bis(((Z)-oct-5-en-1-yl)oxy)butanoyl)oxy)-2-(((3-((2-(1-methylpyrrolidin-2-yl)ethyl)amino)propanoyl)oxy)methyl)propyl (9Z,12Z)-octadeca-9,12-dienoate prepared from Intermediate V and 2-(pyridin-4-yl)ethan-1-amine according to General Procedure F, yield 26 mg (43%). LCMS (Method B): found m/z for (M+H)=867.9, RT=1.34 min.

Prepared according to General Procedure A using (Z)-non-3-en-1-ol, yield 280 mg (41%). $^1$H NMR (400 MHz, Chloroform-d) δ 0.88 (t, J=6.7 Hz, 6H), 1.21-1.41 (m, 12H), 1.94 (q, J=7.2 Hz, 2H), 2.03 (q, J=7.2 Hz, 4H), 2.32 (q, J=7.0 Hz, 4H), 2.41 (t, J=7.4 Hz, 2H), 3.39-3.50 (m, 2H), 3.56-3.66 (m, 2H), 4.58 (t, J=5.3 Hz, 1H), 5.29-5.40 (m, 2H), 5.41-5.53 (m, 2H).

Example 88

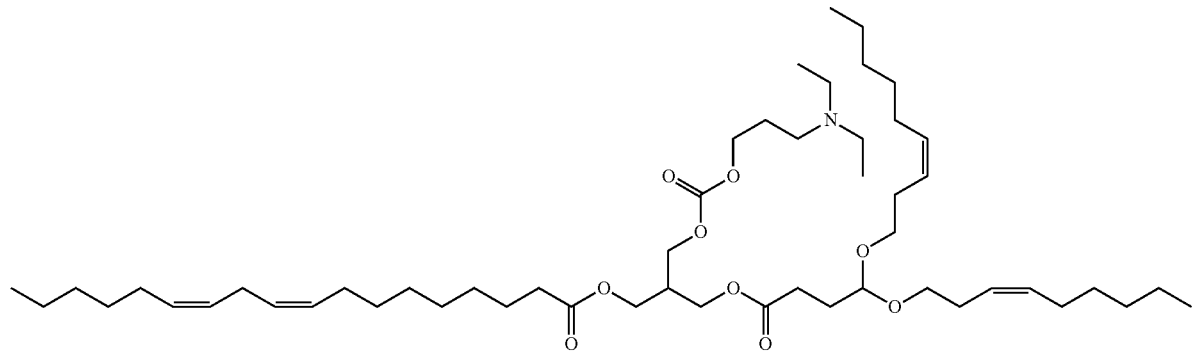

Example 88, 3-((4,4-bis(((Z)-non-3-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis (((Z-non-3-en-1-yl)oxy)butanenitrile

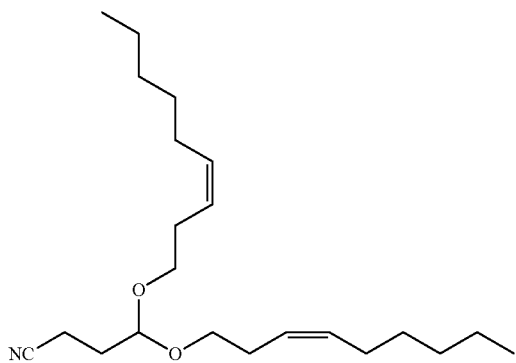 [SMILES: CCCCC/C=C\CCOC(CCC#N)OCC/C=C\CCCCC]

Step 2: 4,4-bis(((Z)-non-3-en-1-yl)oxy)butanoic acid

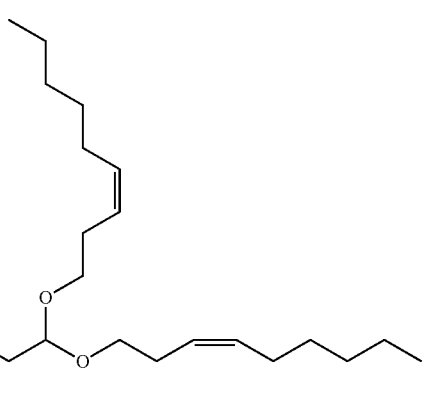

Prepared from 4,4-bis(((Z)-non-3-en-1-yl)oxy)butanenitrile according to General Procedure B, yield 230 mg (78%). $^1$H NMR (400 MHz, DMSO-d$_6$): δ 0.85 (t, J=6.6 Hz, 6H), 1.13-1.38 (m, 13H), 1.72 (q, J=7.1 Hz, 2H), 2.00 (q, J=7.0 Hz, 4H), 2.16-2.29 (m, 5H), 3.33-3.42 (m, 2H), 3.43-3.54 (m, 2H), 4.49 (t, J=5.6 Hz, 1H), 5.30-5.47 (m, 4H), 12.06 (s, 1H).

Step 3: 3-((4,4-bis(((Z)-non-3-en-1-yl)oxy)butanoyl)oxy)-2-(hydroxymethyl)propyl (9Z,12Z)-octadeca-9,12-dienoate

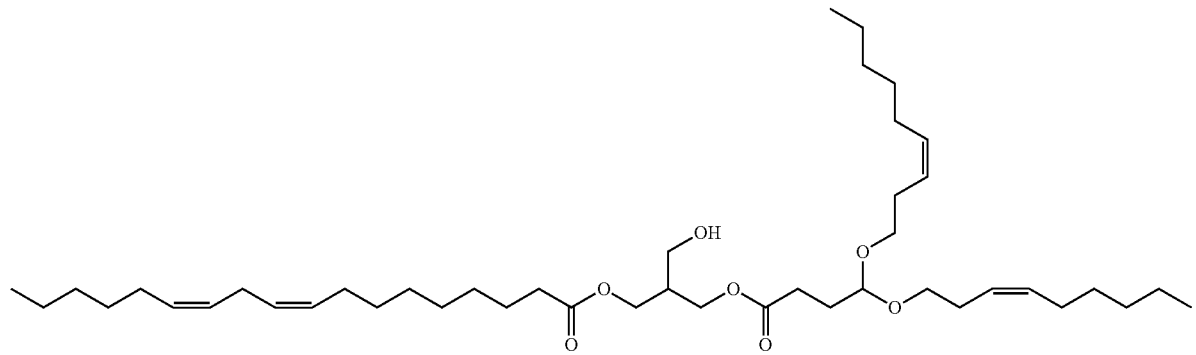 [SMILES: CCCCC/C=C\C/C=C\CCCCCCCC(=O)OCC(CO)COC(=O)CCC(OCC/C=C\CCCCC)OCC/C=C\CCCCC]

Prepared from 4,4-bis(((Z)-non-3-en-1-yl)oxy)butanoic acid according to General Procedure C, yield 340 mg (58%). $^1$H NMR (400 MHz, Chloroform-d): δ 0.82-0.92 (m, 9H), 1.21-1.40 (m, 26H), 1.61 (t, J=7.1 Hz, 2H), 1.88-2.09 (m, 10H), 2.13-2.23 (m, 2H), 2.30 (q, J=7.0 Hz, 6H), 2.41 (t, J=7.5 Hz, 2H), 2.76 (t, J=6.4 Hz, 2H), 3.36-3.47 (m, 2H), 3.52-3.65 (m, 4H), 4.13-4.23 (m, 4H), 4.52 (t, J=5.5 Hz, 1H), 5.26-5.51 (m, 8H).

Step 4: 3-((4,4-bis(((Z)-non-3-en-1-yl)oxy)butanoyl)oxy)-2-(((((3-(diethylamino)propoxy)carbonyl)oxy)methyl)propyl (9Z,12Z)-octadeca-9,12-dienoate (Example 88). Prepared from 3-((4,4-bis(((Z)-non-3-en-1-yl)oxy)butanoyl)oxy)-2-(hydroxymethyl)propyl (9Z,12Z)-octadeca-9,12-dienoate and 3-(diethylamino)propan-1-ol according to General Procedure D, yield 79 mg (83%). LCMS (Method B): found m/z for (M+H)=876.9, RT=1.91 min.

Example 89

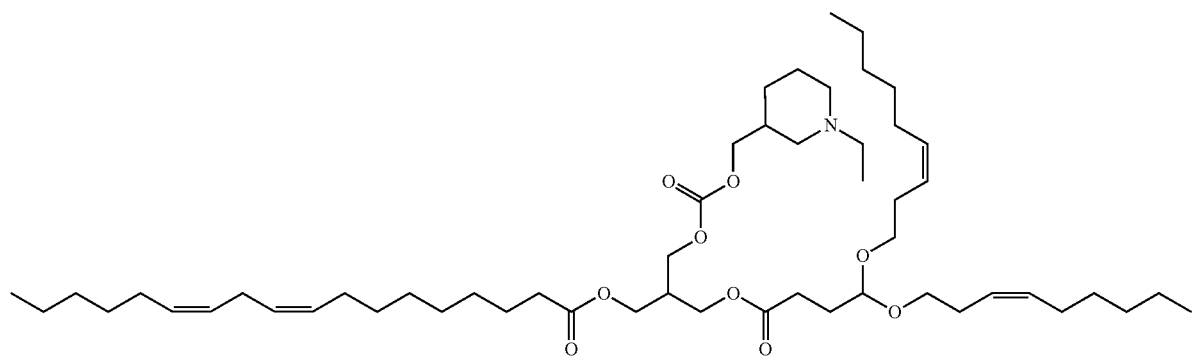

Example 89, 3-((4,4-bis(((Z)-non-3-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-non-3-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 50 mg (69%). LCMS (Method B): found m/z for (M+H)=889.0, RT=1.77 min Example 90

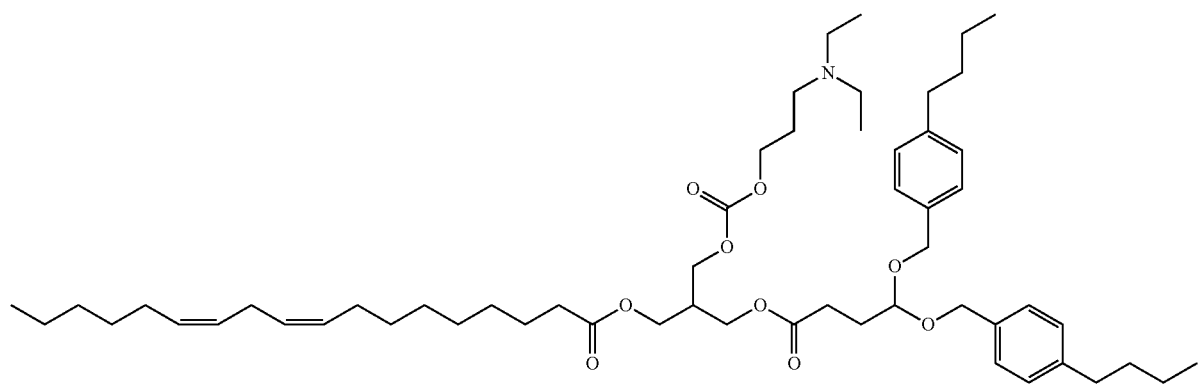

Example 90, 3-((4,4-bis((4-butylbenzyl)oxy)butanoyl)oxy)-2-((((3-(diethylamino)propoxy)carbonyl)oxy)methyl)propyl (9Z,12Z)-octadeca-9,12-dienoate Step 1: 4,4-bis((4-butylbenzyl)oxy)butanenitrile

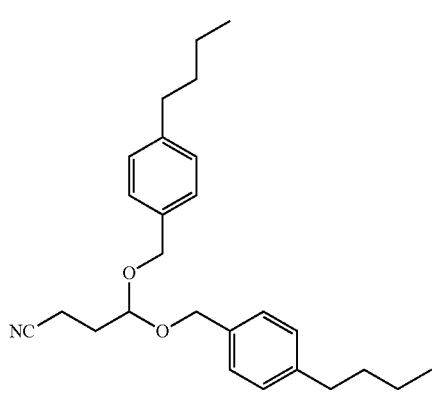 [SMILES: CCCCc1ccc(COC(CCC#N)OCc2ccc(CCCC)cc2)cc1]

Prepared according to General Procedure A using (4-butylphenyl)methanol, yield 1.1 g (36%). ¹H NMR (400 MHz, Chloroform-d): δ 0.92 (t, J=7.3 Hz, 6H), 1.28-1.40 (m, 4H), 1.51-1.65 (m, 4H), 1.97-2.07 (m, 2H), 2.41 (t, J=7.4 Hz, 2H), 2.60 (t, J=7.7 Hz, 4H), 4.51 (d, J=11.5 Hz, 2H), 4.64 (d, J=11.5 Hz, 2H), 4.79 (t, J=5.3 Hz, 1H), 7.16 (d, J=7.9 Hz, 4H), 7.20-7.28 (m, 4H).

Step 2: 4,4-bis((4-butylbenzyl)oxy)butanoic acid

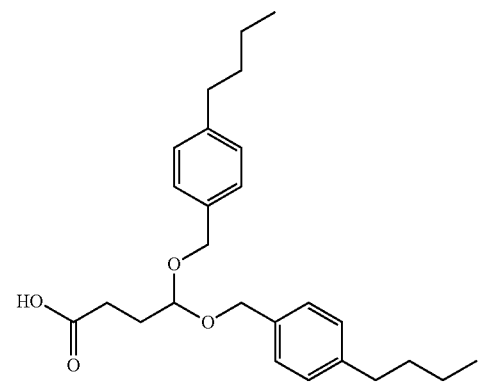 [SMILES: CCCCc1ccc(COC(CCC(=O)O)OCc2ccc(CCCC)cc2)cc1]

Prepared from 4,4-bis((4-butylbenzyl)oxy)butanenitrile according to General Procedure B, yield 1.1 g (91%). ¹H NMR (400 MHz, DMSO-$d_6$): δ 0.89 (t, J=7.3 Hz, 6H), 1.22-1.36 (m, 4H), 1.47-1.60 (m, 4H), 1.87 (q J=7.2 Hz, 2H), 2.27 (t, J=7.4 Hz, 2H), 2.56 (t, J=7.6 Hz, 4H), 4.45 (d, J=11.7 Hz, 2H), 4.56 (d, J=11.7 Hz, 2H), 4.72 (t, J=5.5 Hz, 1H), 7.15 (d, J=7.9 Hz, 4H), 7.22 (d, J=7.6 Hz, 4H), 12.09 (s, 1H).

Step 3: 3-((4,4-bis((4-butylbenzyl)oxy)butanoyl)oxy)-2-(hydroxymethyl)propyl (9Z,12Z)-octadeca-9,12-dienoate

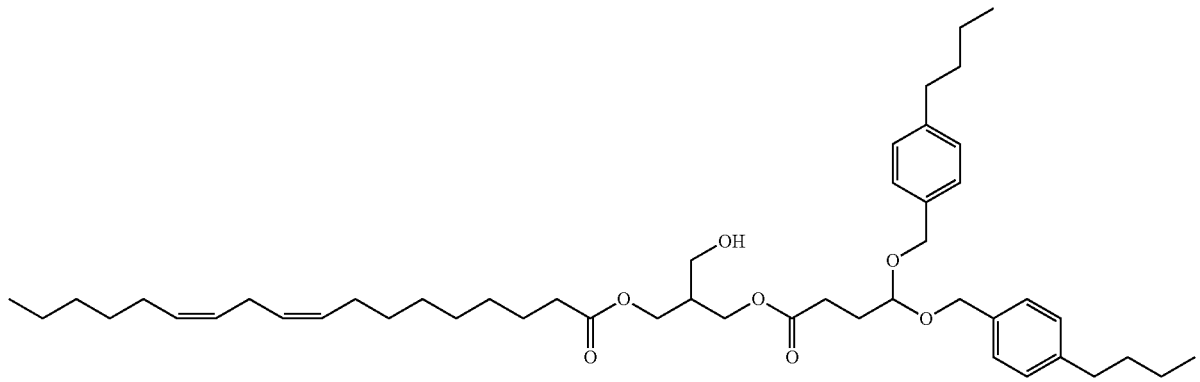 [SMILES: CCCCC/C=C\C/C=C\CCCCCCCC(=O)OCC(CO)COC(=O)CCC(OCc1ccc(CCCC)cc1)OCc1ccc(CCCC)cc1]

Prepared from 4,4-bis((4-butylbenzyl)oxy)butanoic acid according to General Procedure C, yield 400 mg (64%). $^1$H NMR (400 MHz, Chloroform-d): δ 0.83-0.96 (m, 9H), 1.21-1.42 (m, 17H), 1.52-1.66 (m, 7H), 1.99-2.19 (m, 8H), 2.30 (t, J=7.6 Hz, 2H), 2.44 (t, J=7.4 Hz, 2H), 2.59 (t, J=7.7 Hz, 4H), 2.76 (t, J=6.4 Hz, 2H), 3.55 (t, J=5.7 Hz, 2H), 4.04-4.19 (m, 4H), 4.50 (d, J=11.5 Hz, 2H), 4.61 (d, J=11.5 Hz, 2H), 4.74 (t, J=5.4 Hz, 1H), 5.26-5.42 (m, 4H), 7.15 (d, J=7.9 Hz, 4H), 7.22 (d, J=7.8 Hz, 4H).

Step 4: 3-((4,4-bis((4-butylbenzyl)oxy)butanoyl)oxy)-2-(((((3-(diethylamino)propoxy)carbonyl)oxy)methyl)propyl (9Z,12Z)-octadeca-9,12-dienoate (Example 90). Prepared from 3-((4,4-bis((4-butylbenzyl)oxy)butanoyl)oxy)-2-(hydroxymethyl)propyl (9Z,12Z)-octadeca-9,12-dienoate and 3-(diethylamino)propan-1-ol according to General Procedure D, yield 62 mg (83%). LCMS (Method B): found m/z for Example 91

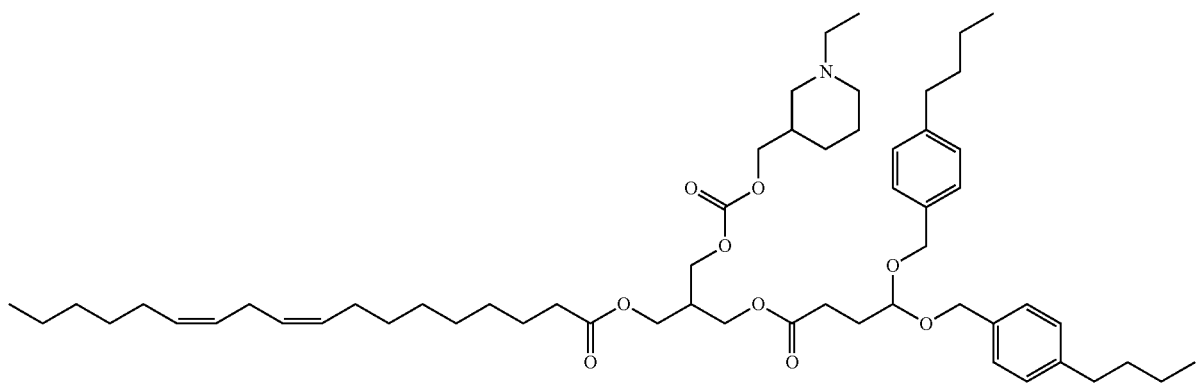

Example 91, 3-((4,4-bis((4-butylbenzyl)oxy)butanoyl)oxy)-2-(((((1-ethylpiperidin-3-yl)methoxy)carbonyl)oxy)methyl)propyl (9Z,12Z)-octadeca-9,12-dienoate. Prepared from 3-((4,4-bis((4-butylbenzyl)oxy)butanoyl)oxy)-2-(hydroxymethyl)propyl (9Z,12Z)-octadeca-9,12-dienoate and (1-ethylpiperidin-3-yl)methanol according to General Procedure D, yield 50 mg, 69%. LCMS (Method B): found m/z for (M+H)=889.0, RT=1.77 min Example 92

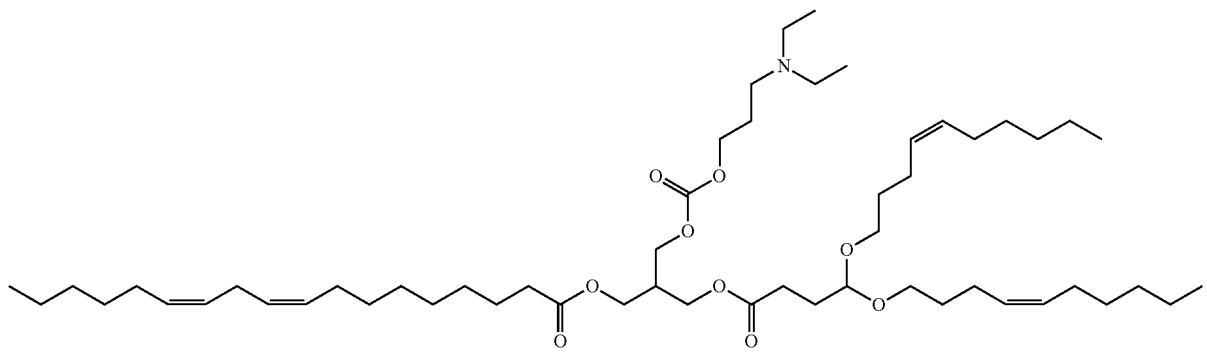

Example 92, 3-((4,4-bis(((Z)-dec-4-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-dec-4-en-1-yl)oxy)butanenitrile

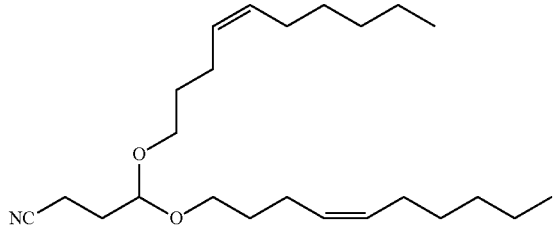 [SMILES: CCCCC/C=C\CCCOC(CCC#N)OCCC/C=C\CCCCC]

Prepared according to General Procedure A using (Z)-dec-4-en-1-ol, yield 750 mg (51%). $^1$H NMR (400 MHz, DMSO-$d_6$): δ 0.86 (t, J=6.8 Hz, 6H), 1.18-1.37 (n, 12H), 1.48-1.60 (m, 4H), 1.74-1.86 (m, 2H), 1.94-2.10 (m, 8H), 2.46 (t, J=7.2 Hz, 2H), 3.33-3.44 (m, 2H), 3.47-3.60 (m, 2H), 4.51 (t, J=5.4 Hz, 1H), 5.28-5.42 (m, 4H).

Step 2: 4,4-bis(((Z)-dec-4-en-1-yl)oxy)butanoic acid

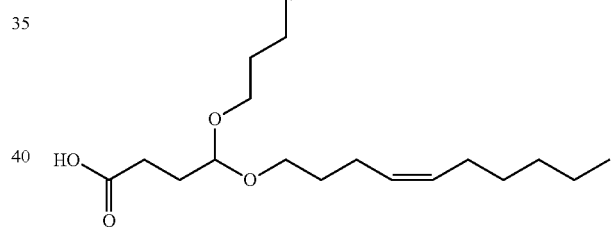

Prepared from 4,4-bis(((Z)-dec-4-en-1-yl)oxy)butanenitrile according to General Procedure B, yield 300 mg (71%). $^1$H NMR (400 MHz, DMSO-$d_6$): δ 0.85 (t, J=6.7 Hz, 6H), 1.19-1.36 (m, 12H), 1.53 (q, J=6.9 Hz, 4H), 1.73 (q, J=7.0 Hz, 2H), 1.91-2.09 (m, 8H), 2.22 (t, J=7.5 Hz, 2H), 3.29-3.40 (m, 2H), 3.44-3.55 (m, 2H), 4.45 (t, J=5.5 Hz, 1H), 5.27-5.42 (m, 4H), 12.05 (s, 1H).

Step 3: 3-((4,4-bis(((Z)-dec-4-en-1-yl)oxy)butanoyl)oxy)-2-(hydroxymethyl)propyl (9Z,12Z)-octadeca-9,12-dienoate

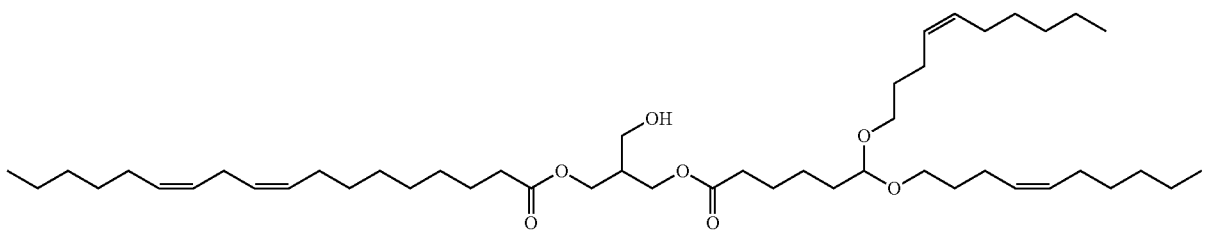 [SMILES: CCCCC/C=C\C/C=C\CCCCCCCC(=O)OCC(CO)COC(=O)CCCCC(OCCC/C=C\CCCCC)OCCC/C=C\CCCCC]

Prepared from 4,4-bis(((Z)-dec-4-en-1-yl)oxy)butanoic acid according to General Procedure C, yield 270 mg (47%). ¹H NMR (400 MHz, Chloroform-d): δ 0.83-0.92 (m, 9H), 1.07-1.15 (m, 2H), 1.20-1.41 (m, 23H), 1.47-1.76 (m, 9H), 1.88-2.13 (m, 10H), 2.17-2.23 (m, 2H), 2.31 (t, J=7.5 Hz, 2H), 2.41 (t, J=7.4 Hz, 2H), 2.76 (t, J=6.6 Hz, 2H), 3.35-3.50 (m, 3H), 3.52-3.65 (m, 4H), 3.97-4.06 (m, 1H), 4.10-4.22 (m, 4H), 4.48 (t, J=5.4 Hz, 1H), 5.26-5.44 (m, 8H).

Step 4: 3-((4,4-bis(((Z)-dec-4-en-1-yl)oxy)butanoyl)oxy)-2-((((3-(diethylamino)propoxy)carbonyl)oxy)methyl)propyl (9Z,12Z)-octadeca-9,12-dienoate (Example 92). Prepared from 3-((4,4-bis(((Z)-dec-4-en-1-yl)oxy)butanoyl)oxy)-2-(hydroxymethyl)propyl (9Z,12Z)-octadeca-9,12-dienoate and 3-(diethylamino)-1-propanol according to General Procedure D, yield 40 mg (61%). LCMS (Method B): found m/z for (M+H)=905.0, RT=1.90 min.

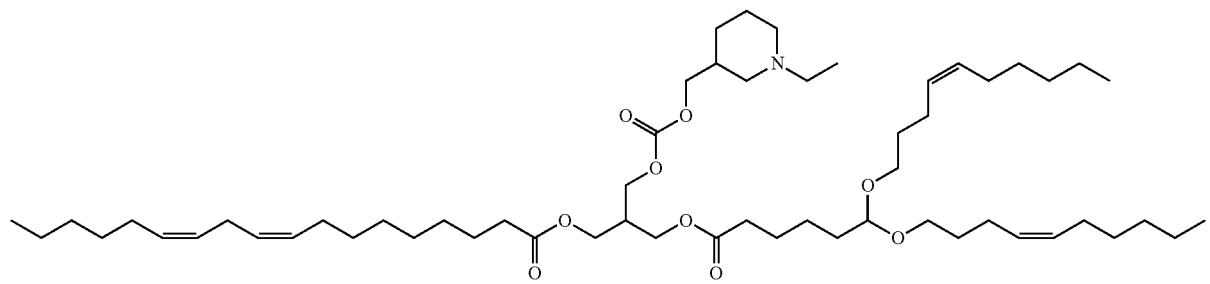 [SMILES: CCCCC/C=C\C/C=C\CCCCCCCC(=O)OCC(COC(=O)CCCCC(OCCC/C=C\CCCCC)OCCC/C=C\CCCCC)COC(=O)OCC1CCCN(CC)C1]

Example 93

Example 93, 3-((4,4-bis(((Z)-dec-4-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-dec-4-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 50 mg (68%). LCMS (Method B): found m/z for (M+H)=917.0, RT=1.91 min

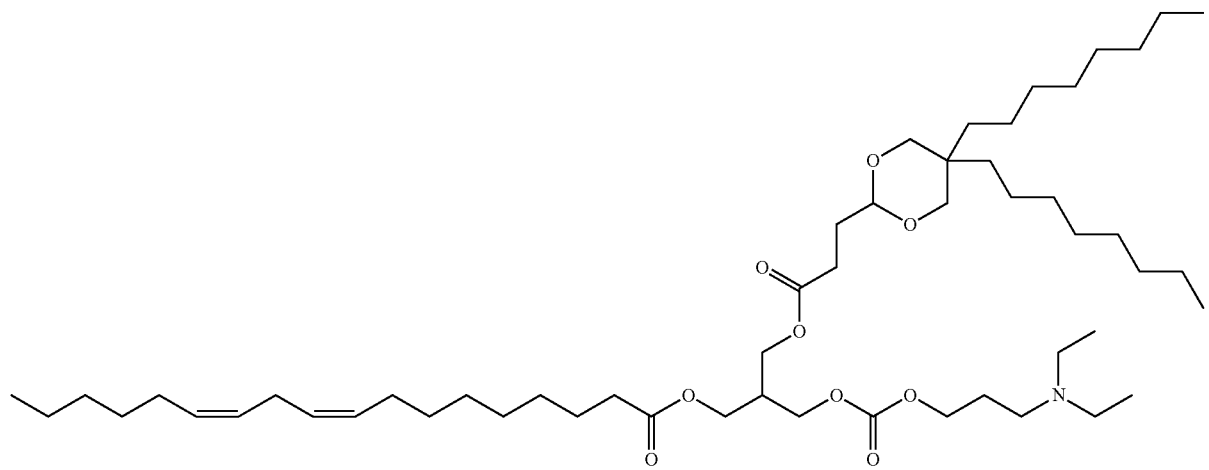 [SMILES: CCCCC/C=C\C/C=C\CCCCCCCC(=O)OCC(COC(=O)CCC1OCC(CCCCCCCC)(CCCCCCCC)CO1)COC(=O)OCCCN(CC)CC]

Example 94

Example 94, 3-(((3-(diethylamino)propoxy)carbonyl)oxy)-2-(((3-(5,5-dioctyl-1,3-dioxan-2-yl)propanoyl)oxy)methyl)propyl (9Z,12Z)-octadeca-9,12-dienoate Step 1: 3-(5,5-dioctyl-1,3-dioxan-2-yl)propanenitrile

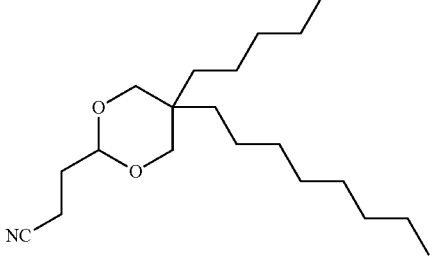

Prepared according to General Procedure A using 2,2-dioctylpropane-1,3-diol, yield 500 mg (70%). $^1$H NMR (400 MHz, Chloroform-d): δ 0.83-0.91 (m, 6H), 0.92-1.02 (m, 2H), 1.05-1.35 (m, 2H), 1.53-1.63 (m, 2H), 1.89-1.99 (m, 2H), 2.47 (t, J=7.4 Hz, 2H), 3.37 (d, J=11.1 Hz, 2H), 3.76 (d, J=11.1 Hz, 2H), 4.55 (t, J=4.6 Hz, 1H).

Step 2: 3-(5,5-dioctyl-1,3-dioxan-2-yl)propanoic acid

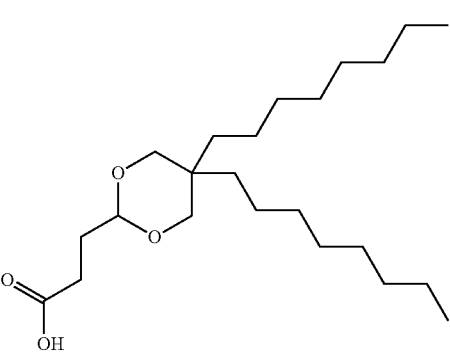 [SMILES: CCCCCCCCC1(CCCCCCCC)COC(CCC(=O)O)OC1]

Prepared from 3-(5,5-dioctyl-1,3-dioxan-2-yl)propanenitrile according to General Procedure B, yield 400 mg (70%), 1H NMR (400 MHz, DMSO-d6): δ 0.78-0.97 (m, 8H), 1.02-1.35 (m, 2H), 1.47-1.57 (m, 2H), 1.67-1.76 (m, 21H), 2.26 (t, J=7.5 Hz, 2H), 3.33 (d, J=10.3 Hz, 2H), 3.67 (d, J=10.9 Hz, 2H), 4.44 (t, J=4.8 Hz, 1H), 12.05 (s, 1H).

Step 3: 3-((3-(5-hexyl-5-octyl-1,3-dioxan-2-yl)propanoyl)oxy)-2-(hydroxymethyl)propyl (9Z,12Z)-octadeca-9,12-dienoate

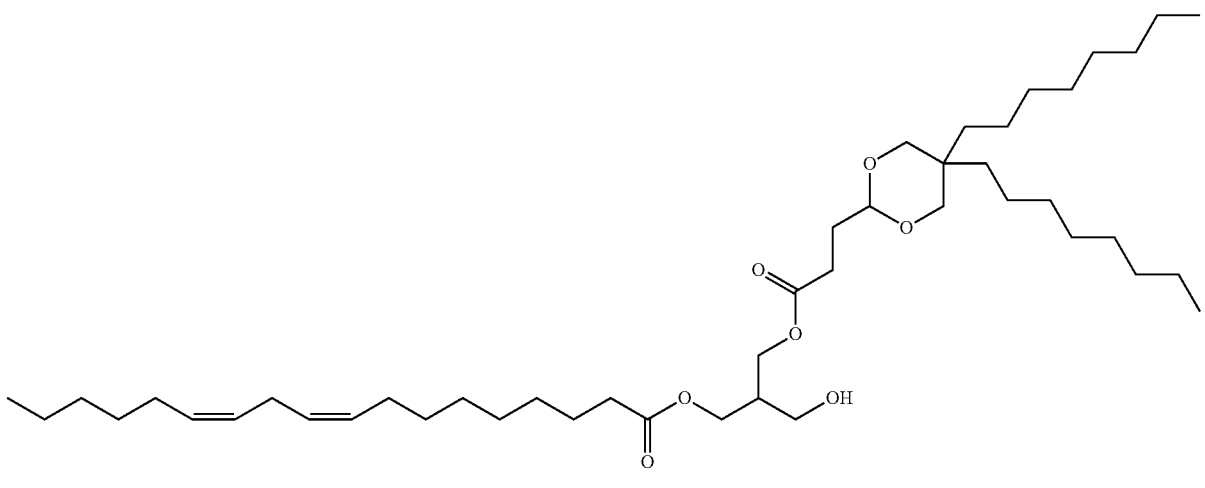 [SMILES: CCCCC/C=C\C/C=C\CCCCCCCC(=O)OCC(CO)COC(=O)CCC1OCC(CCCCCCCC)(CCCCCCCC)CO1]

Prepared from 3-(5,5-dioctyl-1,3-dioxan-2-yl)propanoic acid according to General Procedure C, yield 80 mg (40%) $^1$H NMR (400 MHz, Chloroform-d): δ 0.79-1.01 (m, 11H), 1.02-1.45 (m, 38H), 1.56-1.65 (m, 4H), 1.89-1.99 (m, 2H), 1.99-2.09 (m, 4H), 2.12-2.26 (m, 2H), 2.31 (t, J=7.6 Hz, 2H), 2.47 (t, J=7.5 Hz, 2H), 2.76 (t, J=6.3 Hz, 2H), 3.34 (d, J=11.0 Hz, 2H), 3.60 (t, J=6.0 Hz, 2H), 3.74 (d, J=11.1 Hz, 2H), 4.17 (t, J=7.1 Hz, 4H), 4.42-4.54 (m, 1H), 5.30-5.39 (m, 4H).

Step 4: 3-(((3-(diethylamino)propoxy)carbonyl)oxy)-2-(((3-(5,5-dioctyl-1,3-dioxan-2-yl)propanoyl)oxy)methyl)propyl (9Z,12Z)-octadeca-9,12-dienoate (Example 94). Prepared from 3-((3-(5-hexyl-5-octyl-1,3-dioxan-2-yl)propanoyl)oxy)-2-(hydroxymethyl)propyl (9Z,12Z)-octadeca-9,12-dienoate and 3-(diethylamino)-1-propanol according to General Procedure D, yield 27 mg (73%) LCMS (Method B): found m/z for (M+H)=892.9, RT=1.93 min.

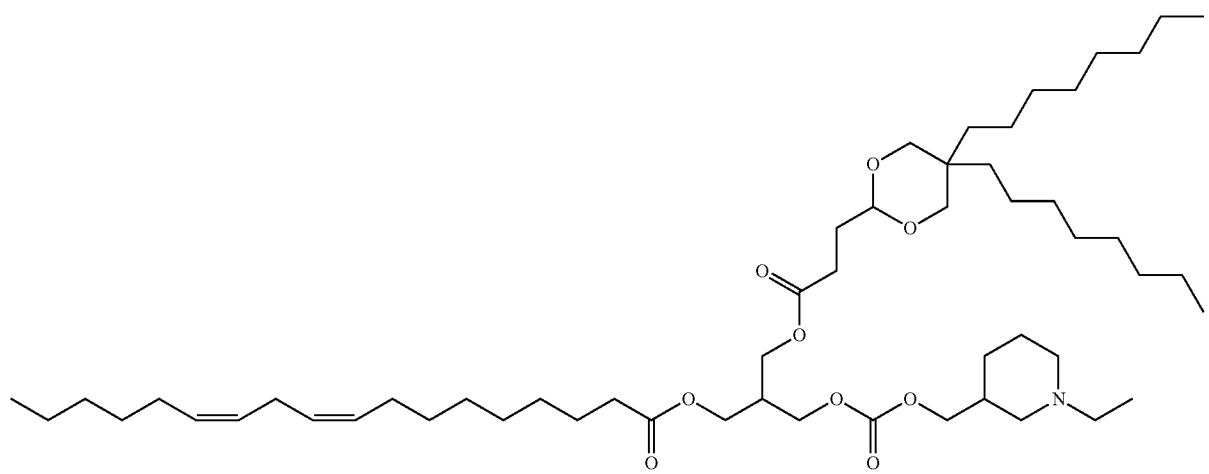 [SMILES: CCCCC/C=C\C/C=C\CCCCCCCC(=O)OCC(COC(=O)CCC1OCC(CCCCCCCC)(CCCCCCCC)CO1)COC(=O)OCC1CCCN(CC)C1]

Example 95

Example 95, 3-((3-(5,5-dioctyl-1,3-dioxan-2-yl)propanoyl)oxy)-2-(((((1-ethylpiperidin-3-yl)methoxy)carbonyl)oxy)methyl)propyl (9Z,12Z)-octadeca-9,12-dienoate prepared from 3-((3-(5-hexyl-5-octyl-1,3-dioxan-2-yl)propanoyl)oxy)-2-(hydroxymethyl)propyl (9Z,12Z)-octadeca-9,12-dienoate and (1-ethylpiperidin-3-yl)methanol according to General Procedure D, yield 27 mg (59%). LCMS (Method B): found m/z for (M+H)=905.0, RT=1.94 min.

Prepared according to General Procedure A using 2-(octyloxy)ethan-1-ol, yield 340 mg (21%). $^1$H NMR (400 MHz, Chloroform-d): δ 0.87 (t, J=6.7 Hz, 6H), 1.23-1.37 (m, 20H), 1.53 (d, J=7.7 Hz, 2H), 1.58 (d, J=7.8 Hz, 2H), 1.93-2.03 (m, 2H), 2.44 (t, J=7.4 Hz, 2H), 3.43 (t, J=6.8 Hz, 4H), 3.55 (t, J=4.8 Hz, 4H), 3.58-3.69 (m, 2H), 3.70-3.80 (m, 2H), 4.70 (t, J=5.4 Hz, 1H).

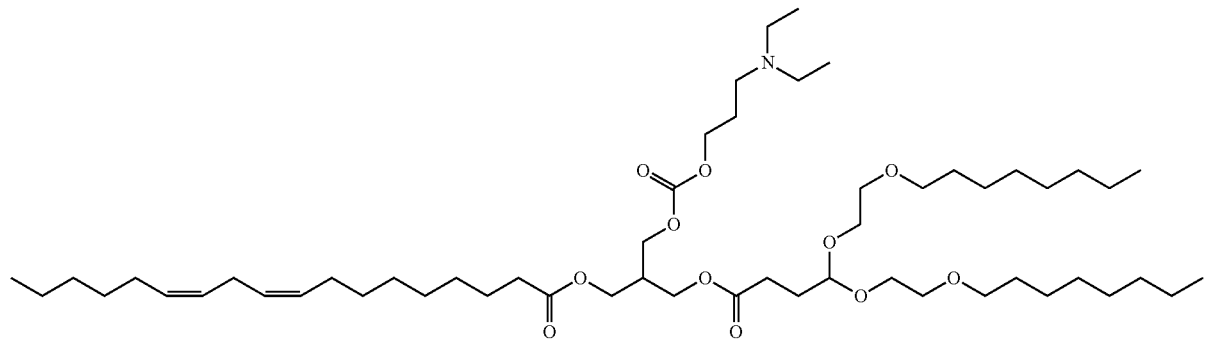 [SMILES: CCCCC/C=C\C/C=C\CCCCCCCC(=O)OCC(COC(=O)CCC(OCCOCCCCCCCC)OCCOCCCCCCCC)COC(=O)OCCCN(CC)CC]

Example 96

Example 96, 3-((4,4-bis(2-(octyloxy)ethoxy)butanoyl)oxy)-2-((((3-(diethylamino)propoxy)carbonyl)oxy)methyl)propyl (9Z,12Z)-octadeca-9,12-dienoate

Step 1: 4,4-bis(2-(octyloxy)ethoxy)butanenitrile

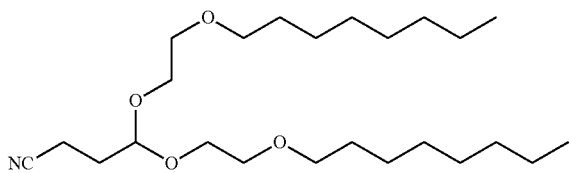 [SMILES: CCCCCCCCOCCOC(CCC#N)OCCOCCCCCCCC]

Step 2: 4,4-bis(2-(octyloxy)ethoxy)butanoic acid

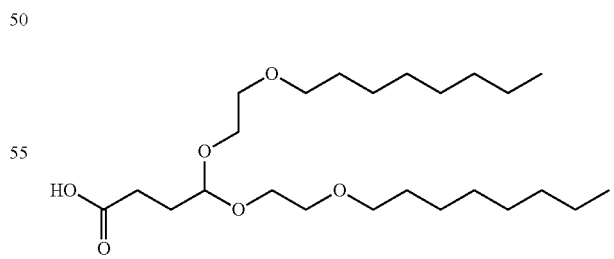

Prepared from 4,4-bis(2-(octyloxy)ethoxy)butanenitrile according to General Procedure B, yield 136 mg (81%). $^1$H NMR (400 MHz, DMSO-d$_6$): δ 0.85 (t, J=6.7 Hz, 6H), 1.07-1.36 (m, 20H), 1.47 (t, J=6.9 Hz, 4H), 1.68-1.79 (m, 2H), 2.23 (t, J=7.5 Hz, 2H), 3.36 (t, J=6.5 Hz, 4H), 3.42-3.56 (m, 6H), 3.58-3.63 (m, 2H), 4.55 (t, J=5.6 Hz, 1H), 12.04 (s, 1H).

Step 3, 3-((4,4-bis(2-(octyloxy)ethoxy)butanoyl)oxy)-2-(hydroxymethyl)propyl (9Z,12Z)-octadeca-9,12-dienoate

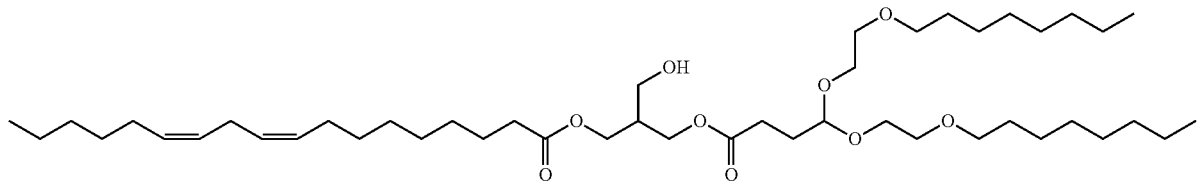 [SMILES: CCCCC/C=C\C/C=C\CCCCCCCC(=O)OCC(CO)COC(=O)CCC(OCCOCCCCCCCC)OCCOCCCCCCCC]

Prepared from 4,4-bis(2-(octyloxy)ethoxy)butanoic acid according to General Procedure C, yield 147 mg (53%). $^1$H NMR (400 MHz, Chloroform-d): δ 0.83-0.92 (m, 9H), 1.13-1.41 (m, 37H), 1.55-1.65 (m, 3H), 1.92-2.09 (m, 6H), 2.13-2.22 (m, 1H), 2.27-2.36 (m, 3H), 2.42 (t, J=7.4 Hz, 2H), 2.76 (t, J=6.5 Hz, 2H), 3.43 (t, J=6.8 Hz, 4H), 3.55 (t, J=4.8 Hz, 4H), 3.56-3.66 (m, 4H), 3.67-3.77 (m, 2H), 4.08-4.23 (m, 4H), 4.64 (t, J=5.5 Hz, 1H), 5.28-5.41 (m, 4H).

Step 4: 3-((4,4-bis(2-(octyloxy)ethoxy)butanoyl)oxy)-2-((((3-(diethylamino)propoxy)carbonyl)oxy)methyl)propyl (9Z,12Z)-octadeca-9,12-dienoate (Example 96). Prepared from 3-((4,4-bis(2-(octyloxy)ethoxy)butanoyl)oxy)-2-(hydroxymethyl)propyl (9Z,12Z)-octadeca-9,12-dienoate and 3-(diethylamino)-1-propanol according to General Procedure D, yield 36 mg (62%). LCMS (Method B): found m/z for (M+H) 941.0, RT=1.80 min.

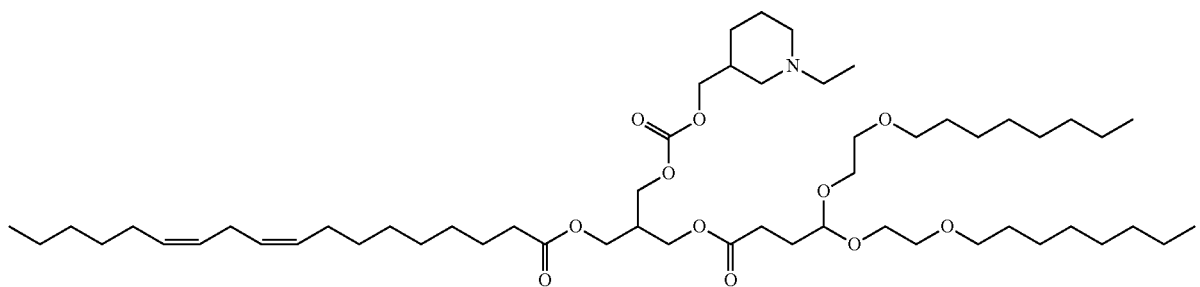 [SMILES: CCCCC/C=C\C/C=C\CCCCCCCC(=O)OCC(COC(=O)CCC(OCCOCCCCCCCC)OCCOCCCCCCCC)COC(=O)OCC1CCCN(CC)C1]

Example 97

Example 97, 3-((4,4-bis(2-(octyloxy)ethoxy)butanoyl)oxy)-2-(((((1-ethylpiperidin-3-yl)methoxy)carbonyl)oxy)methyl)propyl (9Z,12Z)-octadeca-9,12-dienoate prepared from 3-((4,4-bis(2-(octyloxy)ethoxy)butanoyloxy)-2-(hydroxymethyl)propyl (9Z,12Z)-octadeca-9,12-dienoate and (1-ethylpiperidin-3-yl)methanol according to General Procedure D, yield 27 ng (58%). LCMS (Method B): found m/z for (M+H)=953.0, RT=1.81 min.

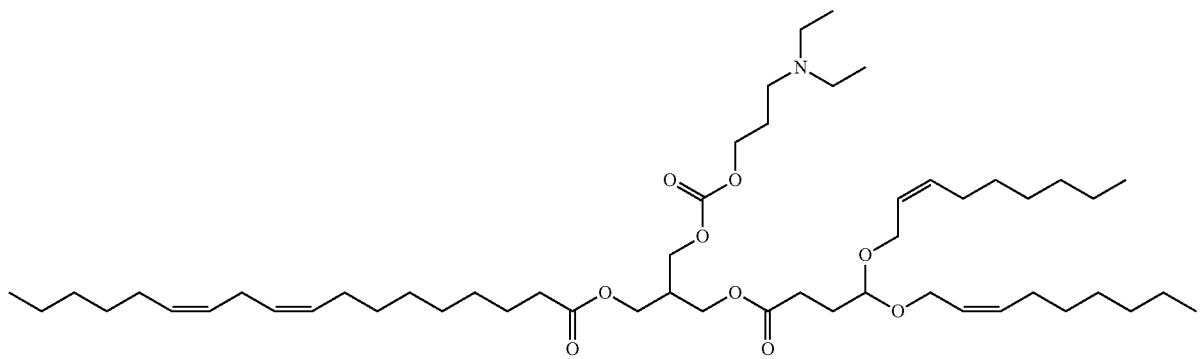 [SMILES: CCCCC/C=C\C/C=C\CCCCCCCC(=O)OCC(COC(=O)CCC(OC/C=C\CCCCCC)OC/C=C\CCCCCC)COC(=O)OCCCN(CC)CC]

Example 98

Example 98, 3-((4,4-bis(((Z)-non-2-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-non-2-en-1-yl)oxy)butanenitrile

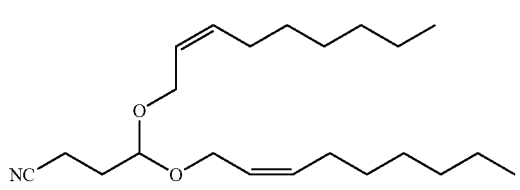 [SMILES: CCCCCC/C=C\COC(CCC#N)OC/C=C\CCCCCC]

Prepared according to General Procedure A using (Z)-non-2-en-1-ol, yield 610 mg (38%) ¹H NMR (400 MHz, Chloroform-d) δ 0.87 (t, J=6.7 Hz, 6H), 1.19-1.41 (m, 18H), 1.97 (q, J=7.3 Hz, 2H), 2.05 (q, J=7.2 Hz, 4H), 2.42 (t, J=7.4 Hz, 2H), 4.04-4.21 (m, 4H), 4.65 (t, J=5.3 Hz, 1H), 5.45-5.65 (m, 4H).

Step 2: 4,4-bis(((Z)-non-2-en-1-yl)oxy)butanoic acid

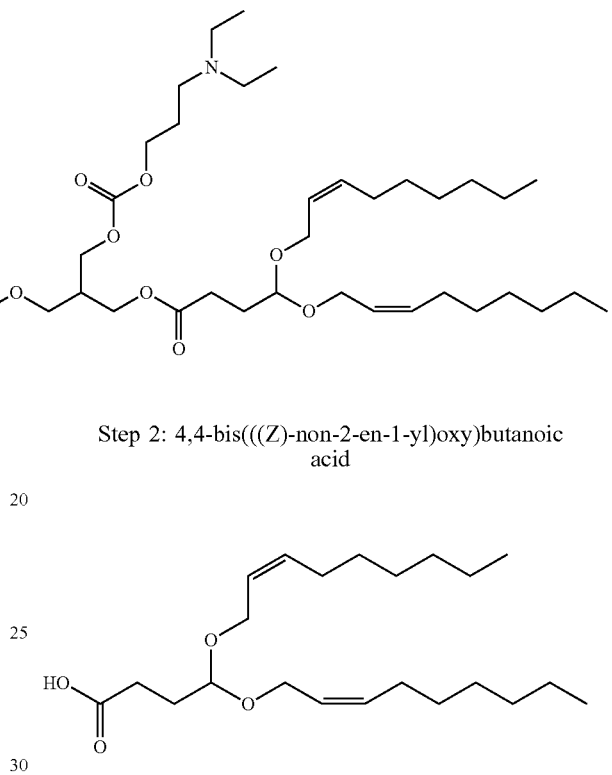

Prepared from 4,4-bis(((Z)-non-2-en-1-yl)oxy)butanenitrile according to General Procedure B, yield 550 mg, 87%. ¹H NMR (400 MHz, DMSO-d₆) δ 0.85 (t, J=6.4 Hz, 6H), 1.09-1.39 (m, 16H), 1.76 (q, J=6.9 Hz, 2H), 2.02 (q, J=6.8 Hz, 4H), 2.22 (t, J=7.4 Hz, 2H), 3.95-4.11 (m, 4H), 4.53 (t, J=5.6 Hz, 1H), 5.41-5.57 (m, 4H), 12.06 (s, 1H).

Step 3: 3-((4,4-bis(((Z)-non-2-en-1-yl)oxy)butanoyl)oxy)-2-(hydroxymethyl)propyl (9Z,12Z)-octadeca-9,12-dienoate

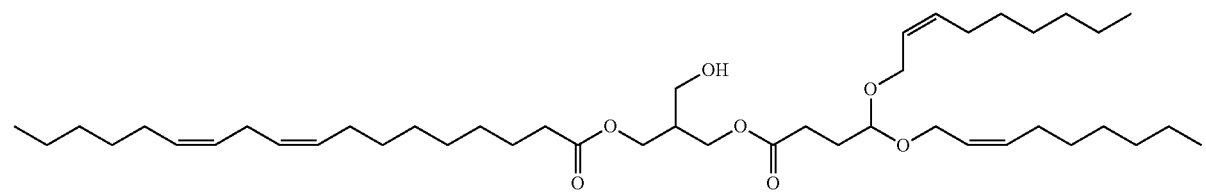 [SMILES: CCCCC/C=C\C/C=C\CCCCCCCC(=O)OCC(CO)COC(=O)CCC(OC/C=C\CCCCCC)OC/C=C\CCCCCC]

Prepared from 4,4-bis(((Z)-non-2-en-1-yl)oxy)butanoic acid according to General Procedure C, yield 390 mg, 71% ¹H NMR (400 MHz, Chloroform-d) δ 0.80-0.94 (m, 9H), 1.19-1.40 (m, 29H), 1.56-1.67 (m, 2H), 1.90-2.10 (m, 10H), 2.12-2.27 (m, 2H), 2.31 (t, J=7.6 Hz, 2H), 2.41 (t, J=7.4 Hz, 2H), 2.76 (t, J=6.4 Hz, 2H), 3.60 (t, J=5.9 Hz, 2H), 4.01-4.23 (m, 8H), 4.58 (t, J=5.5 Hz, 1H), 5.26-5.43 (m, 4H), 5.44-5.62 (m, 4H).

Step 4: 3-((4,4-bis(((Z)-non-2-en-1-yl)oxy)butanoyl)oxy)-2-((((3-(diethylamino)propoxy)carbonyl)oxy)methyl)propyl (9Z,12Z)-octadeca-9,12-dienoate (Example 98). Prepared from 3-((4,4-bis(((Z)-non-2-en-1-yl)oxy)butanoyl)oxy)-2-(hydroxymethyl)propyl (9Z,12Z)-octadeca-9,12-dienoate and 3-(diethylamino)-1-propanol according to General Procedure D, yield 70 mg (71%). LCMS (Method B): found m/z for (M+H)=876.9, RT=1.81 min.

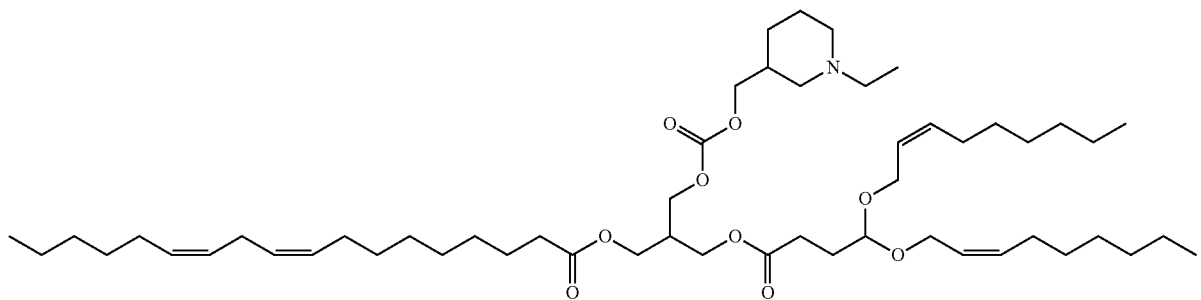 [SMILES: CCCCC/C=C\C/C=C\CCCCCCCC(=O)OCC(COC(=O)CCC(OC/C=C\CCCCCC)OC/C=C\CCCCCC)COC(=O)OCC1CCCN(CC)C1]

Example 99

Example 99, 3-((4,4-bis(((Z)-non-2-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-non-2-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 45 mg (81%). LCMS (Method B): found m/z for (M+H)=860.9, RT=1.56 min

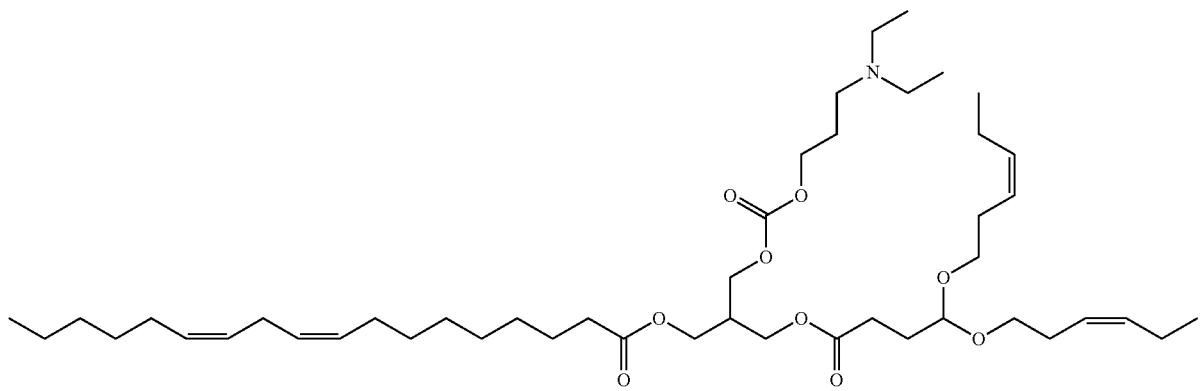 [SMILES: CC/C=C\CCOC(CCC(=O)OCC(COC(=O)CCCCCCC/C=C\C/C=C\CCCCC)COC(=O)OCCCN(CC)CC)OCC/C=C\CC]

Example 100

Example 100, 3-((4,4-bis(((Z)-hex-3-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-hex-3-en-1-yl)oxy)butanenitrile

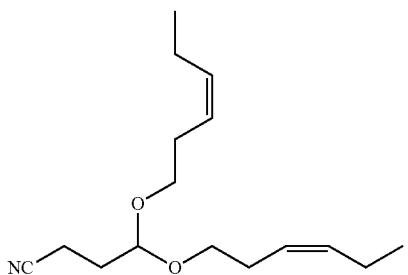 [SMILES: CC/C=C\CCOC(CCC#N)OCC/C=C\CC]

Prepared according to General Procedure A using (Z)-hex-3-en-1-ol, yield 350 mg (51%).

Step 2: 4,4-bis(((Z)-hex-3-en-1-yl)oxy)butanoic acid

Prepared from 4,4-bis(((Z)-hex-3-en-1-yl)oxy)butanenitrile according to General Procedure B, yield 310 mg (82%). $^1$H NMR (400 MHz, DMSO-$d_6$) δ 0.92 (t, J=7.5 Hz, 6H), 1.72 (q, J=7.0 Hz, 2H), 1.95-2.07 (m, 4H), 2.17-2.27 (m, 6H), 3.31-3.42 (m, 2H), 3.44-3.55 (m, 2H), 4.49 (t, J=5.6 Hz, 1H), 5.27-5.38 (m, 2H), 5.36-5.47 (m, 2H), 12.05 (s, 1H).

Step 3: 3-((4,4-bis(((Z)-hex-3-en-1-yl)oxy)butanoyl)oxy)-2-(hydroxymethyl)propyl (9Z,12Z)-octadeca-9,12-dienoate

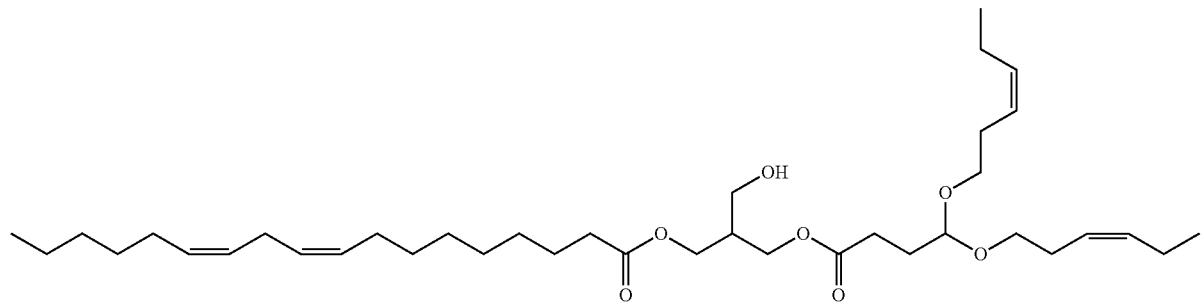 [SMILES: CC/C=C\CCOC(CCC(=O)OCC(CO)COC(=O)CCCCCCC/C=C\C/C=C\CCCCC)OCC/C=C\CC]

Prepared from 4,4-bis(((Z)-hex-3-en-1-yl)oxy)butanoic acid according to General Procedure C, yield 165 mg (37%). $^1$H NMR (400 MHz, Chloroform-d) δ 0.88 (t, J=6.7 Hz, 3H), 0.95 (t, J=7.5 Hz, 6H), 1.30 (s, 16H), 1.56-1.66 (m, 2H), 1.88-1.98 (m, 2H), 2.04 (q, J=7.2 Hz, 8H), 2.18 (t, J=6.8 Hz, 2H), 2.31 (t, J=7.3 Hz, 6H), 2.41 (t, J=7.5 Hz, 2H), 2.76 (t, J=6.4 Hz, 2H), 3.42 (q, J=7.4 Hz, 2H), 3.52-3.65 (m, 4H), 4.17 (t, J=5.3 Hz, 4H), 4.52 (t, J=5.6 Hz, 1H), 5.27-5.41 (m, 4H), 5.41-5.50 (m, 2H).

Step 4: 3-((4,4-bis(((Z)-hex-3-en-1-yl)oxy)butanoyl)oxy)-2-((((3-(diethylamino)propoxy)carbonyl)oxy)methyl)propyl (9Z,12Z)-octadeca-9,12-dienoate (Example 100). Prepared from 3-((4,4-bis(((Z)-hex-3-en-1-yl)oxy)butanoyl)oxy)-2-(hydroxymethyl)propyl (9Z,12Z)-octadeca-9,12-dienoate and 3-(diethylamino)-1-propanol according to General Procedure D, yield 29 mg (52%) LCMS (Method B): found m/z for (M+H)=792.8, RT=1.49 min.

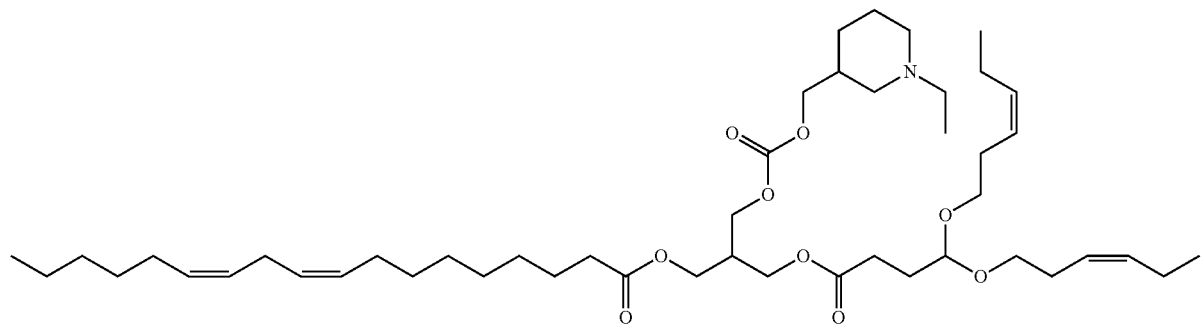 [SMILES: CC/C=C\CCOC(CCC(=O)OCC(COC(=O)CCCCCCC/C=C\C/C=C\CCCCC)COC(=O)OCC1CCCN(CC)C1)OCC/C=C\CC]

Example 101

Example 101, 3-((4,4-bis(((Z)-hex-3-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-hex-3-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 29 mg (51%). LCMS (Method B): found m/z for (M+H)=804.8, RT=1.50 min

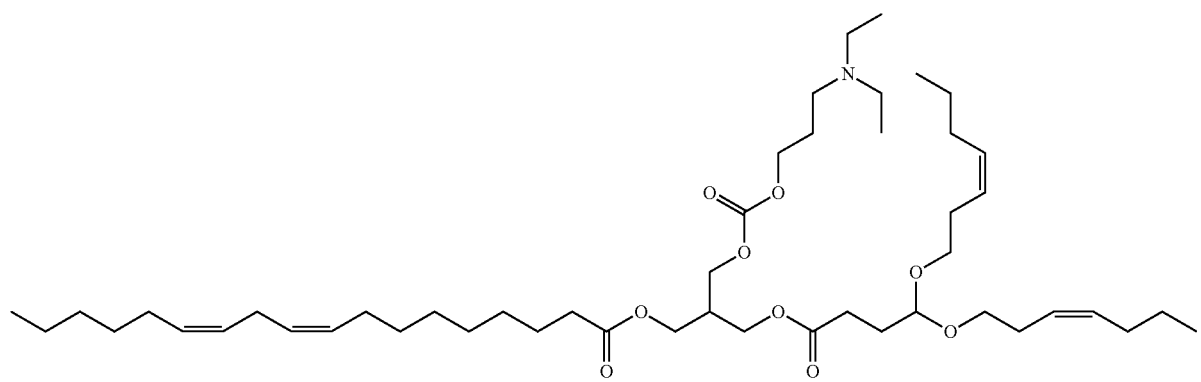 [SMILES: CCC/C=C\CCOC(CCC(=O)OCC(COC(=O)CCCCCCC/C=C\C/C=C\CCCCC)COC(=O)OCCCN(CC)CC)OCC/C=C\CCC]

Example 102

Example 102, 3-((4,4-bis(((Z)-hept-3-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-hept-3-en-1-yl)oxy)butanenitrile

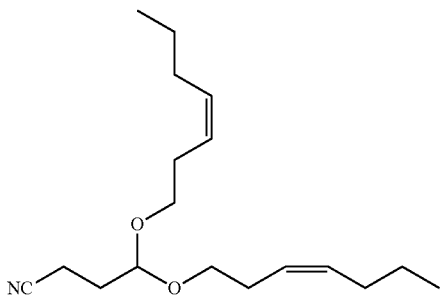 [SMILES: CCC/C=C\CCOC(CCC#N)OCC/C=C\CCC]

Prepared according to General Procedure A using (Z)-hept-3-en-1-ol, yield 310 mg (41%). $^1$H NMR (400 MHz, Chloroform-d) δ 0.90 (t, J=7.4 Hz, 6H), 1.30-1.44 (m, 4H), 1.89-1.99 (m, 2H), 2.02 (q, J=7.3 Hz, 4H), 2.32 (q, J 7.0 Hz, 4H), 2.41 (t, J=7.4 Hz, 2H), 3.40-3.48 (m, 2H), 3.54-3.66 (m, 2H), 4.58 (t, J=5.3 Hz, 1H), 5.31-5.42 (m, 2H), 5.42-5.53 (m, 2H).

Step 2: 4,4-bis(((Z)-hept-3-en-1-yl)oxy)butanoic acid

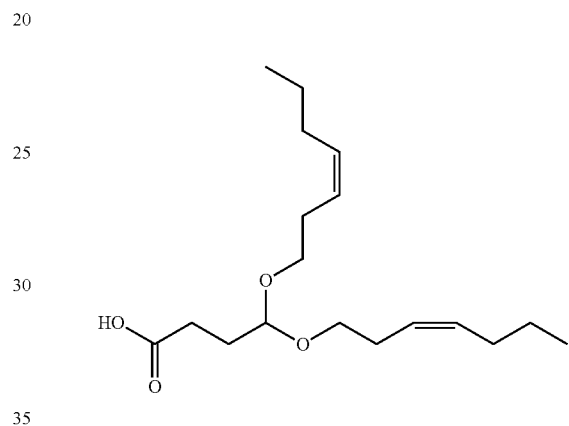

Prepared from 4,4-bis(((Z)-hept-3-en-1-yl)oxy)butanenitrile according to General Procedure B, yield 320 mg (83%). $^1$H NMR (400 MHz, DMSO-d$_6$) δ 0.86 (t, J=7.3 Hz, 6H), 1.21-1.40 (m, 4H), 1.72 (q, J=7.2 Hz, 2H), 1.99 (q, J=6.9 Hz, 4H), 2.18-2.28 (m, 6H), 3.31-3.42 (m, 2H), 3.44-3.55 (m, 2H), 4.49 (t, J=5.6 Hz, 1H), 5.31-5.47 (m, 4H), 12.05 (s, 1H).

Step 3: 3-((4,4-bis(((Z)-hept-3-en-1-yl)oxy)butanoyl)oxy)-2-(hydroxymethyl)propyl (9Z,17Z)-octadeca-9,12-dienoate

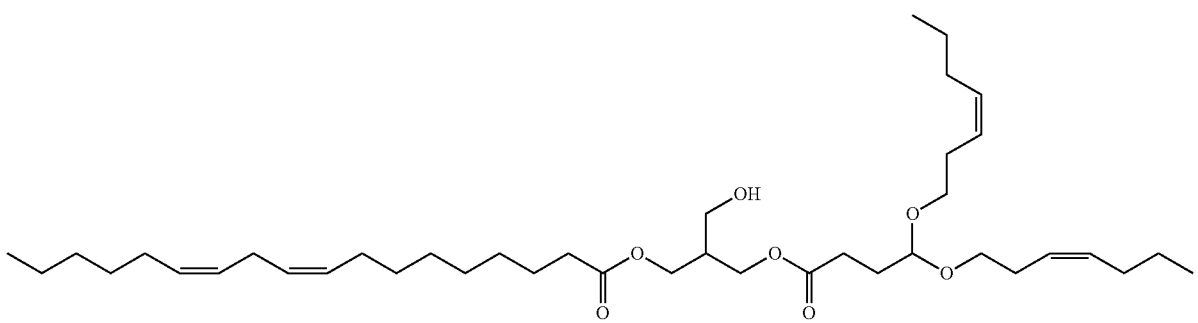 [SMILES: CCC/C=C\CCOC(CCC(=O)OCC(CO)COC(=O)CCCCCCC/C=C\C/C=C\CCCCC)OCC/C=C\CCC]

Prepared from 4,4-bis(((Z)-hept-3-en-1-yl)oxy)butanoic acid according to General Procedure C, yield 295 mg, 45%. $^1$H NMR (400 MHz, Chloroform-d) δ 0.83-0.93 (m, 9H), 1.22-1.44 (m, 18H), 1.57-1.67 (m, 2H), 1.88-2.09 (m, 10H), 2.19 (q, J=5.9 Hz, 2H), 2.25-2.35 (m, 6H), 2.41 (t, J=7.5 Hz, 2H), 2.76 (t, J=6.5 Hz, 2H), 3.36-3.47 (m, 2H), 3.52-3.65 (m, 4H), 4.10-4.23 (m, 4H), 4.52 (t, J=5.5 Hz, 1H), 5.26-5.51 (m, 8H).

Step 4: 3-((4,4-bis(((Z)-hept-3-en-1-yl)oxy)butanoyl) oxy)-2-((((3-(diethylamino)propoxy)carbonyl)oxy)methyl) propyl (9Z,12Z)-octadeca-9,12-dienoate (Example 102). Prepared from 3-((4,4-bis(((Z)-hept-3-en-1-yl)oxy)bu-tanoyl)oxy)-2-(hydroxymethyl)propyl (9Z,12Z)-octadeca-9, 12-dienoate and 3-(diethylamino)-1-propanol according to General Procedure D, yield 40 ng (72%). LCMS (Method B): found m/z for (M+H)=820.8, RT=1.60 min.

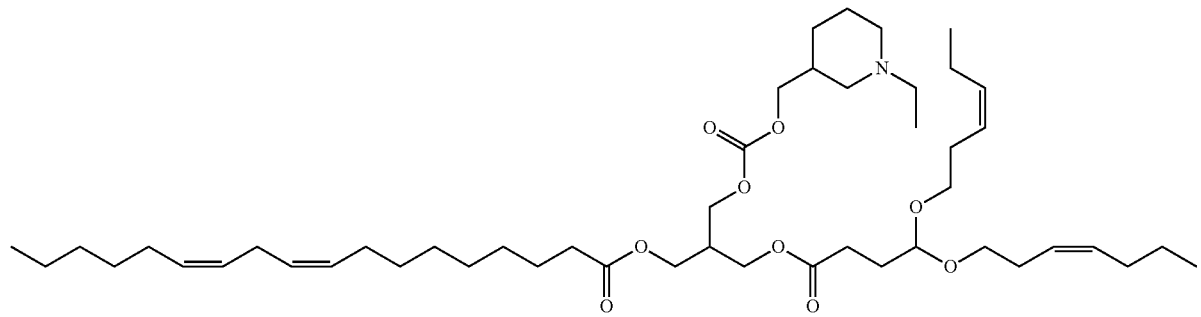 [SMILES: CC/C=C\CCOC(CCC(=O)OCC(COC(=O)CCCCCCC/C=C\C/C=C\CCCCC)COC(=O)OCC1CCCN(CC)C1)OCC/C=C\CCC]

Example 103

Example 103, 3-((4,4-bis(((Z)-hept-3-en-1-yl)oxy)bu-tanoyl)oxy)-2-(((((1-ethylpiperidin-3-yl)methoxy)carbonyl) oxy)methyl)propyl (9Z,12Z)-octadeca-9,12-dienoate pre-pared from 3-((4,4-bis(((Z)-hex-3-en-1-yl)oxy) butanoyloxy)-2-(hydroxymethyl)propyl (9Z,12Z)-octadeca-9,12-dienoate and (1-ethylpiperidin-3-yl)methanol according to General Procedure D, yield 46 ng (83%). LCMS (Method B): found m/z for (M+H)=832.8, RT=1.61 min.

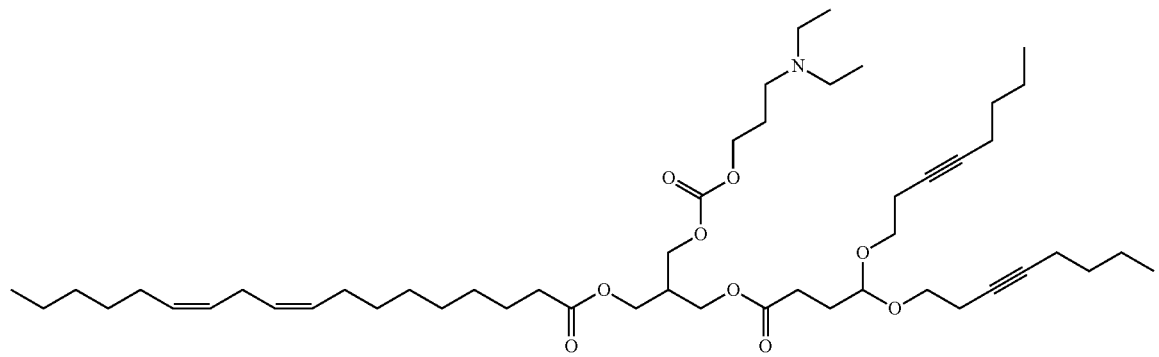 [SMILES: CCCCC#CCCOC(CCC(=O)OCC(COC(=O)CCCCCCC/C=C\C/C=C\CCCCC)COC(=O)OCCCN(CC)CC)OCCC#CCCCC]

Example 104

Example 104, 3-((4,4-bis(oct-3-yn-1-yloxy)butanoyl)oxy)-2-((((3-(diethylamino)propoxy)carbonyl)oxy)methyl)propyl (9Z,12Z)-octadeca-9,12-dienoate Step 1: 4,4-bis(oct-3-yn-1-yloxy)butanenitrile

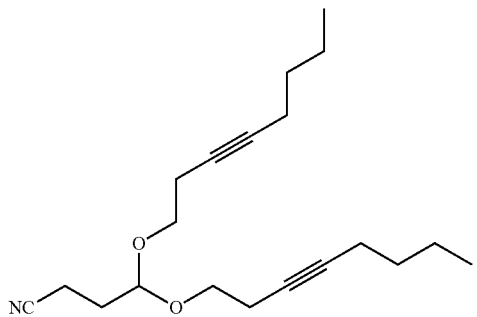 [SMILES: CCCCC#CCCOC(CCC#N)OCCC#CCCCC]

Prepared according to General Procedure A using oct-3-yn-1-ol, yield 410 mg (28%). ¹H NMR (400 MHz, Chloroform-d) δ 0.89 (t, J=7.1 Hz, 6H), 1.31-1.51 (m, 8H), 1.92-2.02 (m, 2H), 2.09-2.19 (m, 4H), 2.38-2.49 (m, 6H), 3.50-3.61 (m, 2H), 3.64-3.74 (m, 2H), 4.67 (t, J=5.4 Hz, 1H).

Step 2: 4,4-bis(oct-3-yn-1-yloxy)butanoic acid

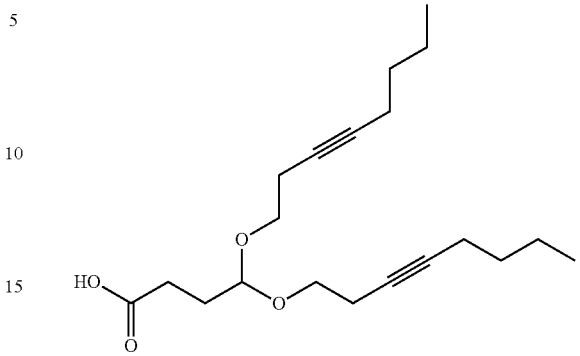

Prepared from 4,4-bis(oct-3-yn-1-yloxy)butanenitrile according to General Procedure B, yield 310 mg (82%). ¹H NMR (400 MHz, DMSO-$d_6$) δ 0.86 (t, J=7.0 Hz, 6H), 1.26-1.45 (m, 8H), 1.74 (q, J=7.0 Hz, 2H), 2.07-2.17 (m, 4H), 2.25 (t, J=7.5 Hz, 2H), 2.30-2.41 (m, 4H), 3.40-3.51 (m, 2H), 3.52-3.62 (m, 2H), 4.56 (t, J=5.7 Hz, 1H), 12.06 (s, 1H).

Step 3: 3-((4,4-bis(oct-3-yn-1-yloxy)butanoyl)oxy)-2-(hydroxymethyl)propyl (9Z,12Z)-octadeca-9,12-dienoate

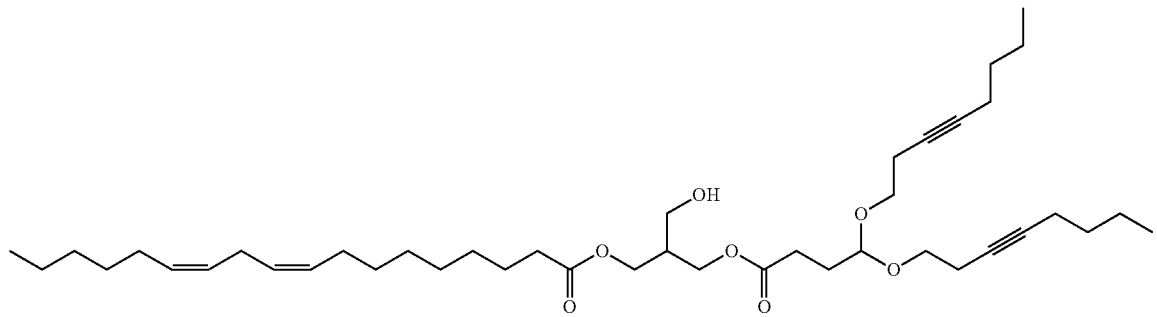 [SMILES: CCCCC#CCCOC(CCC(=O)OCC(CO)COC(=O)CCCCCCC/C=C\C/C=C\CCCCC)OCCC#CCCCC]

Prepared from 4,4-bis(oct-3-yn-1-yloxy)butanoic acid according to General Procedure C, yield 390 mg (60%). ¹H NMR (400 MHz, Chloroform-d) δ 0.83-0.93 (m, 9H), 1.22-1.51 (m, 22H), 1.57-1.65 (m, 2H), 1.90-2.00 (n, 2H), 2.04 (q, J=6.9 Hz, 4H), 2.08-2.23 (m, 6H), 2.31 (t, J=7.6 Hz, 2H), 2.36-2.47 (m, 6H), 2.76 (t, J=6.4 Hz, 2H), 3.48-3.71 (m, 6H), 4.08-4.23 (m, 4H), 4.60 (t, J=5.6 Hz, 1H), 5.26-5.42 (m, 4H).

Step 4: 3-((4,4-bis(oct-3-yn-1-yloxy)butanoyl)oxy)-2-((((3-(diethylamino)propoxy)carbonyl)oxy)methyl)propyl (9Z,12Z)-octadeca-9,12-dienoate (Example 104). Prepared from 3-((4,4-bis(oct-3-yn-1-yloxy)butanoyl)oxy)-2-(hydroxymethyl)propyl (9Z,12Z)-octadeca-9,12-dienoate and 3-(diethylamino)-1-propanol according to General Procedure D, yield 62 mg (67%). LCMS (Method B): found m/z for (M+H)=844.9, RT=1.56 min.

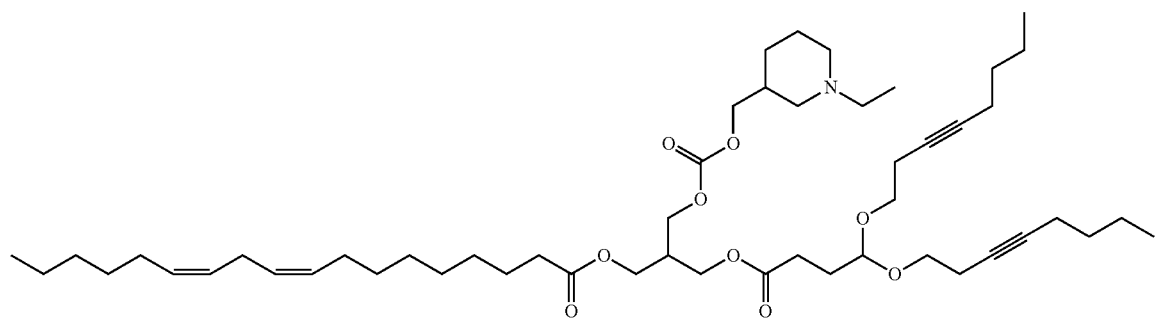 [SMILES: CCCCC#CCCOC(CCC(=O)OCC(COC(=O)CCCCCCC/C=C\C/C=C\CCCCC)COC(=O)OCC1CCCN(CC)C1)OCCC#CCCCC]

Example 105

Example 105, 3-((4,4-bis(oct-3-yn-1-yloxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-hex-3-en-1-yl)oxy)butanoyl)oxy)-2-(hydroxymethyl)propyl (9Z,2Z)-octadeca-9,12-dienoate and (1-ethylpiperidin-3-yl)methanol according to General Procedure D, yield 43 mg (51%). LCMS (Method B): found m/z for (M+H)=856.9, RT=1.57 min

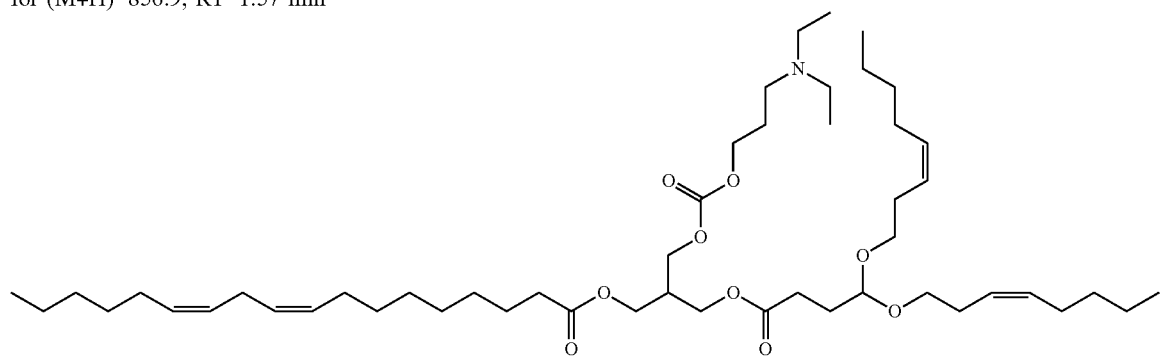

Example 106

Example 106, 3-((4,4-bis(((Z)-oct-3-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-oct-3-en-1-yl)oxy)butanenitrile

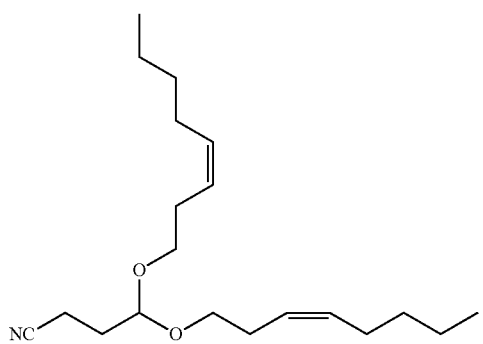 [SMILES: CCCC/C=C\CCOC(CCC#N)OCC/C=C\CCCC]

Prepared according to General Procedure A using (Z)-oct-3-en-1-ol, yield 100 mg (40%). $^1$H NMR (400 MHz, Chloroform-d) δ 0.79-0.99 (m, 7H), 1.16-1.39 (m, 9H), 1.90-1.98 (m, 21H), 2.03 (d, J=6.9 Hz, 4H), 2.32 (q, J=7.0 Hz, 4H), 2.41 (t, J=7.4 Hz, 2H), 3.39-3.49 (m, 2H), 3.56-3.66 (m, 2H), 4.57 (t, J=5.4 Hz, 1H), 5.29-5.40 (m, 2H), 5.41-5.52 (m, 2H).

Step 2: 4,4-bis(((Z)-3-en-1-yl)oxy)butanoic acid

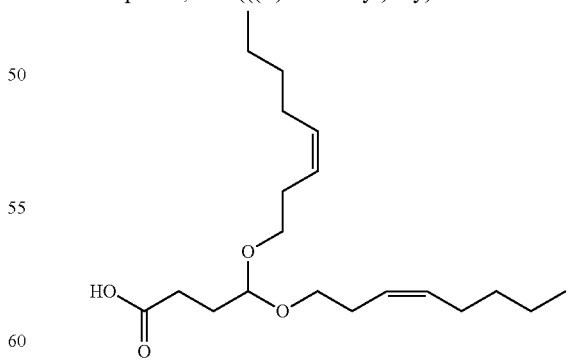

Prepared from 4,4-bis(((Z)-3-en-1-yl)oxy)butanenitrile according to General Procedure B, yield 320 mg, 83%. $^1$H NMR (400 MHz, DMSO-d$_6$) δ 0.83-0.89 (m, 6H), 1.18-1.36 (m, 8H), 1.72 (q, J=7.0 Hz, 2H), 2.01 (q, J=6.7 Hz, 4H), 2.15-2.29 (m, 6H), 3.31-3.42 (m, 2H), 3.44-3.54 (m, 2H), 4.49 (t, J=5.5 Hz, 1H), 5.30-5.47 (m, 4H), 12.06 (s, 1H).

Step 3: 3-((4,4-bis(((Z)-oct-3-en-1-yl)oxy)butanoyl)oxy)-2-(hydroxymethyl)propyl (9Z,12Z)-octadeca-9,12-dienoate

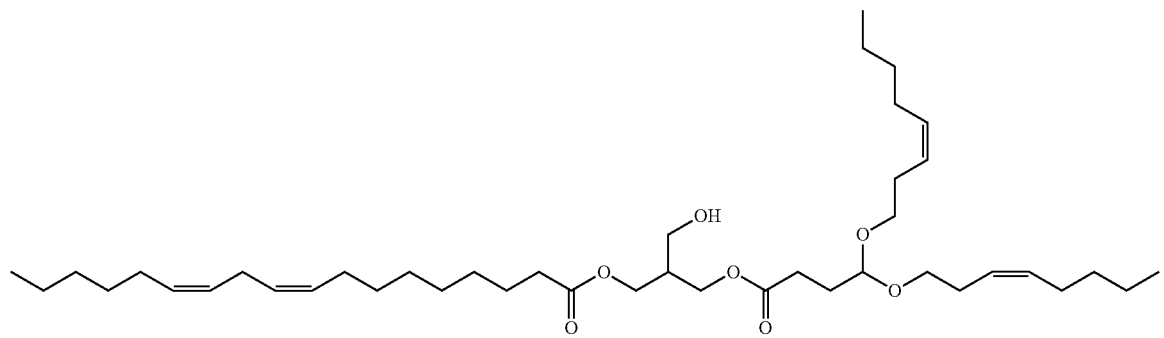 [SMILES: CCCC/C=C\CCOC(CCC(=O)OCC(CO)COC(=O)CCCCCCC/C=C\C/C=C\CCCCC)OCC/C=C\CCCC]

Prepared from 4,4-bis(((Z)-oct-3-en-1-yl)oxy)butanoic acid according to General Procedure C, yield 310 mg, 48%. $^1$H NMR (400 MHz, Chloroform-d) δ 0.84-0.93 (m, 9H), 1.20-1.42 (m, 25H), 1.55-1.69 (m, 2H), 1.89-1.98 (m, 2H), 1.98-2.08 (m, 7H), 2.13-2.22 (m, 2H), 2.31 (t, J=7.2 Hz, 5H), 2.41 (t, J=7.5 Hz, 2H), 2.76 (t, J=6.0 Hz, 2H), 3.42 (q, J=7.6 Hz, 2H), 3.52-3.65 (m, 4H), 4.09-4.28 (m, 4H), 4.48-4.56 (m, 1H), 5.27-5.41 (m, 5H), 5.39-5.53 (m, 2H).

Step 4: 3-((4,4-bis(((Z)-oct-3-en-1-yl)oxy)butanoyl)oxy)-2-(((((3-(diethylamino)propoxy)carbonyl)oxy)methyl)propyl (9Z,12Z)-octadeca-9,12-dienoate (Example 106). Prepared from 3-((4,4-bis(((Z)-oct-3-en-1-yl)oxy)butanoyl)oxy)-2-(hydroxymethyl)propyl (9Z,12Z)-octadeca-9,12-dienoate and 3-(diethyl amino)-1-propanol according to General Procedure D, yield 47 mg (82%). LCMS (Method B): found m/z for (M+H)=848.9, RT=1.72 min.

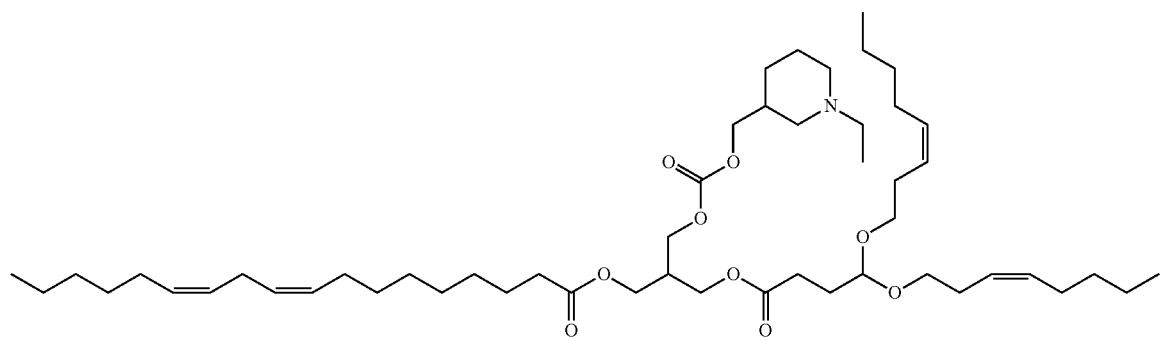 [SMILES: CCCC/C=C\CCOC(CCC(=O)OCC(COC(=O)CCCCCCC/C=C\C/C=C\CCCCC)COC(=O)OCC1CCCN(CC)C1)OCC/C=C\CCCC]

Example 107

Example 107, 3-((4,4-bis(((Z)-oct-3-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis(((Z)-oct-3-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 45 mg (81%). LCMS (Method B): found m/z for (M+H)=860.9, RT=1.56 min.

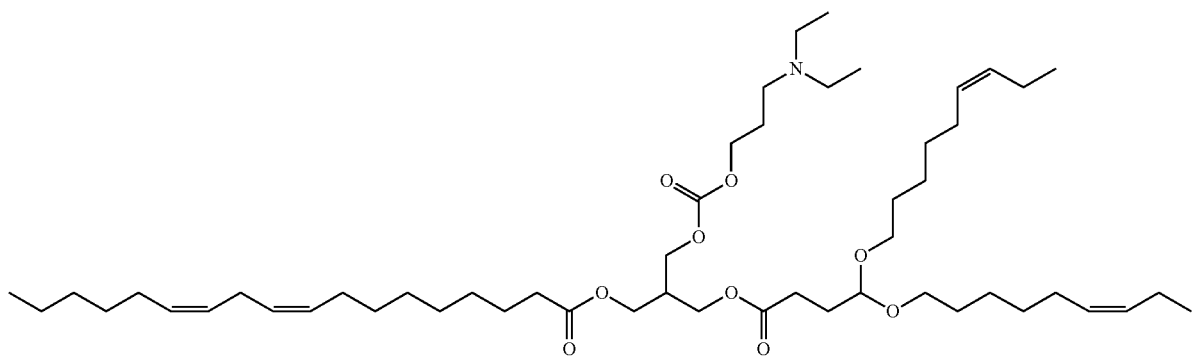 [SMILES: CC/C=C\CCCCCOC(CCC(=O)OCC(COC(=O)CCCCCCC/C=C\C/C=C\CCCCC)COC(=O)OCCCN(CC)CC)OCCCCC/C=C\CC]

Example 108

Example 108, 3-((4,4-bis(((Z)-non-6-en-1-yl)oxy)butanoyl)oxy)-2-((((3-(diethylamino)propoxy)carbonyl)oxy)methyl)propyl (9Z,12Z)-octadeca-9,12-dienoate Step 1: 4,4-bis(((Z)-non-6-en-1-yl)oxy)butanenitrile

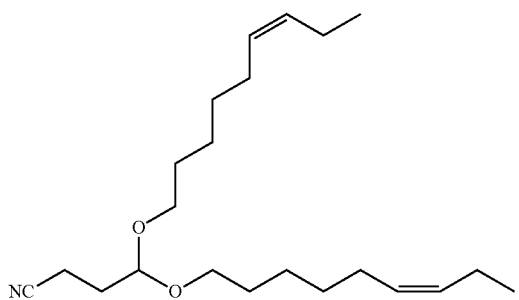 [SMILES: CC/C=C\CCCCCOC(CCC#N)OCCCCC/C=C\CC]

Prepared according to General Procedure A using (Z)-non-6-en-1-ol, yield 610 mg (37%). ¹H NMR (400 MHz, Chloroform-d) δ 0.94 (t, J=7.5 Hz, 6H), 1.29-1.43 (m, 8H), 1.53-1.63 (m, 4H), 1.89-1.97 (m, 2H), 1.96-2.11 (m, 8H), 2.41 (t, J=7.4 Hz, 2H), 3.36-3.47 (m, 2H), 3.53-3.65 (m, 2H), 4.54 (t, J=6.9 Hz, 1H), 5.18-5.52 (m, 4H).

Step 2: 4,4-bis(((Z)-non-6-en-1-yl)oxy butanoic acid

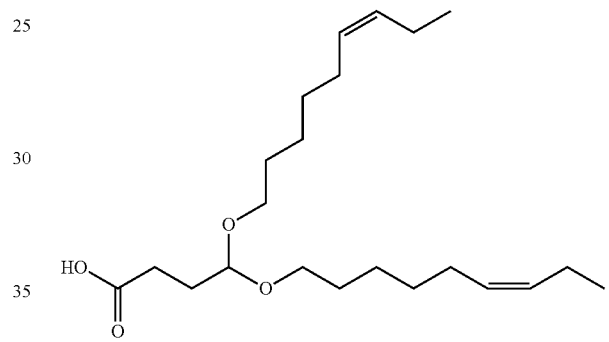

Prepared from 4,4-bis(((Z)-non-6-en-1-yl)oxy)butanenitrile according to General Procedure B, yield 280 mg, 73%. ¹H NMR (400 MHz, DMSO-d$_6$) δ 0.91 (t, J=7.5 Hz, 6H), 1.21-1.34 (m, 13H), 1.40 (t, J=6.7 Hz, 2H), 1.43-1.52 (m, 2H), 1.72 (q, J=7.1 Hz, 1H), 1.91-2.07 (m, 8H), 2.21 (t, J=7.4 Hz, 1H), 3.32-3.41 (m, 3H), 3.42-3.53 (m, 1H), 4.32 (s, 1H), 5.24-5.39 (m, 4H).

Step 3: 3-((4,4-bis(((Z)-non-6-en-1-yl)oxy)butanoyl)oxy)-2-(hydroxymethyl)propyl (9Z,12Z)-octadeca-9,12-dienoate

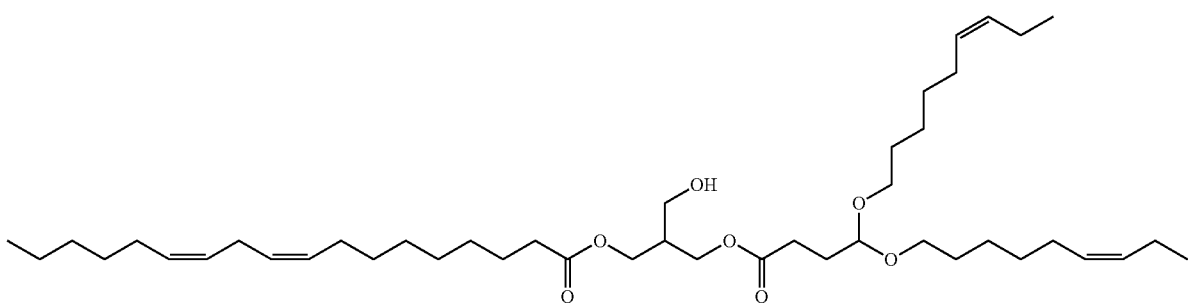 [SMILES: CC/C=C\CCCCCOC(CCC(=O)OCC(CO)COC(=O)CCCCCCC/C=C\C/C=C\CCCCC)OCCCCC/C=C\CC]

Prepared from 4,4-bis(((Z)-non-6-en-1-yl)oxy)butanoic acid according to General Procedure C, yield 318 mg, 49%. $^{1}$H NMR (400 MHz, Chloroform-d) δ 0.86-0.90 (m, 4H), 0.94 (t, J=7.5 Hz, 9H), 1.30-1.41 (m, 15H), 1.56-1.67 (m, 2H), 1.92 (q, J=7.3 Hz, 3H), 2.01-2.04 (m, 5H), 2.19 (q, J=6.5 Hz, 3H), 2.31 (t, J=7.6 Hz, 3H), 2.40 (t, J=7.5 Hz, 3H), 2.76 (t, J=6.4 Hz, 3H), 3.34-3.44 (m, 3H), 3.50-3.65 (m, 6H), 4.06-4.23 (m, 7H), 4.48 (t, J=5.5 Hz, 2H), 5.17-5.50 (m, 12H).

Step 4: 3-((4,4-bis(((Z)-non-6-en-1-yl)oxy)butanoyl)oxy)-2-((((3-(diethylamino)propoxy)carbonyl)oxy)methyl)propyl (9Z,12Z)-octadeca-9,12-dienoate (Example 108). Prepared from 3-((4,4-bis(((Z)-non-6-en-1-yl)oxy)butanoyl)oxy)-2-(hydroxymethyl)propyl (9Z,12Z)-octadeca-9,12-dienoate and 3-(diethylamino)-1-propanol according to General Procedure D, yield 36 ng (69%). LCMS (Method B): found m/z for (M+H)=876.9, RT=1.78 min.

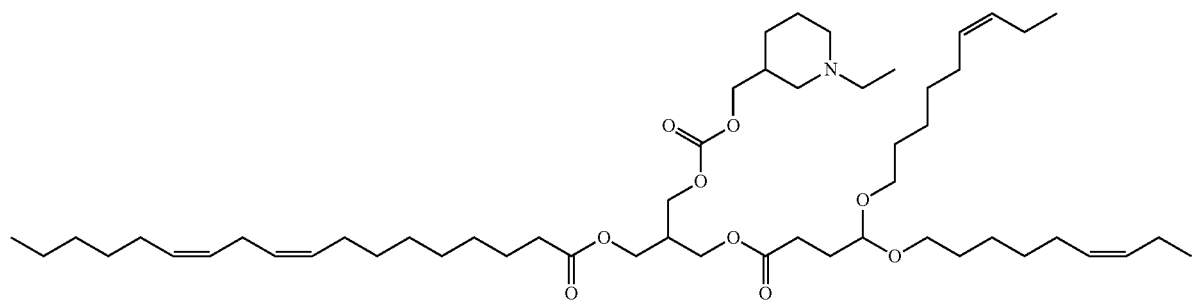 [SMILES: CC/C=C\CCCCCOC(CCC(=O)OCC(COC(=O)CCCCCCC/C=C\C/C=C\CCCCC)COC(=O)OCC1CCCN(CC)C1)OCCCCC/C=C\CC]

Example 109

Example 109, 3-((4,4-bis(((Z)-non-6-en-1-yl)oxy)butanoyl)oxy)-2-(((((1-ethylpiperidin-3-yl)methoxy)carbonyl)oxy)methyl)propyl (9Z,12Z)-octadeca-9,12-dienoate prepared from 3-((4,4-bis(((Z)-non-6-en-1-yl)oxy)butanoyl)oxy)-2-(hydroxymethyl)propyl (9Z,12Z)-octadeca-9,12-dienoate and (1-ethylpiperidin-3-yl)methanol according to General Procedure D, yield 37 mg (67%). LCMS (Method B): found m/z for (M+H)=888.9, RT=1.77 min.

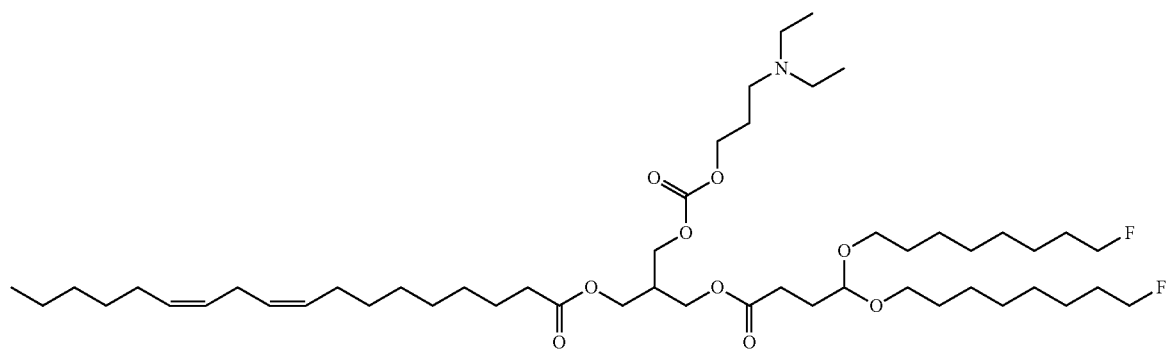 [SMILES: CCCCC/C=C\C/C=C\CCCCCCCC(=O)OCC(COC(=O)CCC(OCCCCCCCCF)OCCCCCCCCF)COC(=O)OCCCN(CC)CC]

Example 110

Example 110, 3-((4,4-bis((8-fluorooctyl)oxy)butanoyl)oxy)-2-((((3-(diethylamino)propoxy)carbonyl)oxy)methyl)propyl (9Z,12Z)-octadeca-9,12-dienoate Step 1: 4,4-bis((8-bromooctyl)oxy)butanenitrile

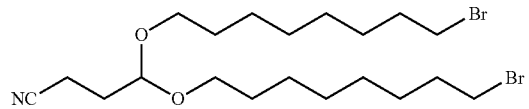 [SMILES: N#CCCC(OCCCCCCCCBr)OCCCCCCCCBr]

Prepared according to General Procedure A using 8-bromooctan-1-ol, yield 750 mg (33%). $^1$H NMR (400 MHz, Chloroform-d) δ 1.22-1.41 (m, 12H), 1.37-1.48 (m, 4H), 1.56 (t, J=7.3 Hz, 4H), 1.78-1.91 (m, 4H), 1.88-1.98 (m, 2H), 2.41 (t, J=7.3 Hz, 2H), 3.33-3.47 (m, 6H), 3.51-3.64 (m, 2H), 4.54 (t, J=5.3 Hz, 1H).

Step 2: 4,4-bis((8-fluorooctyl)oxy)butanenitrile

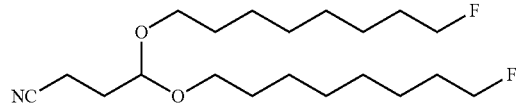 [SMILES: N#CCCC(OCCCCCCCCF)OCCCCCCCCF]

A solution of tetrabutylammonium fluoride in THF (1M, 4.65 mL, 4.65 mmol, 3 Eq) was added to 4,4-bis((8-bromooctyl)oxy)butanenitrile (750 mg, 1.55 mmol). The mixture was allowed to stir for 24 h at 80° C. After this time, the reaction mass was poured into ice cold water and then the organic layer was extracted with ethyl acetate (30 mL×3). The organic layer was washed with brine (5 mL×3) and then it was dried over sodium sulfate. The organic layer was evaporated to get the crude. Crude was subjected to column chromatography (using ethyl acetate/hexane) to afford 4,4-bis((8-fluorooctyl)oxy)butanenitrile (210 mg, 37%) as a pale yellow gum. $^1$H NMR (400 MHz, Chloroform-d) δ 1.30-1.45 (m, 18H), 1.56-1.77 (m, 6H), 1.88-1.98 (m, 2H), 2.41 (t, J=7.3 Hz, 2)), 3.32-3.47 (m, 2H), 3.54-3.64 (m, 2H), 4.37 (t, J=6.2 Hz, 2H), 4.48 (t, J=6.1 Hz, 2H), 4.54 (t, J=5.3 Hz, 1H).

Step 3: 4,4-bis((8-fluorooctyl)oxy)butanoic acid

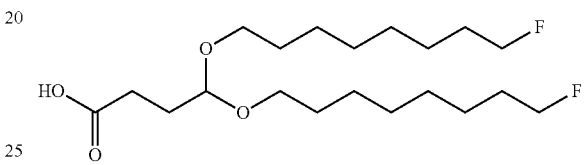

Prepared from 4,4-bis((8-fluorooctyl)oxy)butanenitrile according to General Procedure B, yield 200 mg (92%). $^1$H NMR (400 MHz, DMSO-$d_6$) δ 1.21-1.37 (m, 14H), 1.48 (t, J=6.6 Hz, 4H), 1.53-1.77 (m, 6H), 2.22 (t, J=7.4 Hz, 2H), 3.27-3.40 (m, 3H), 3.43-3.54 (m, 2H), 4.36 (t, J=6.1 Hz, 2H), 4.41-4.52 (m, 3H), 12.05 (s, 1H).

Step 4: 3-((4,4-bis((8-fluorooctyl)oxy)butanoyl)oxy)-2-(hydroxymethyl)propyl (9Z,12Z)-octadeca-9,12-dienoate

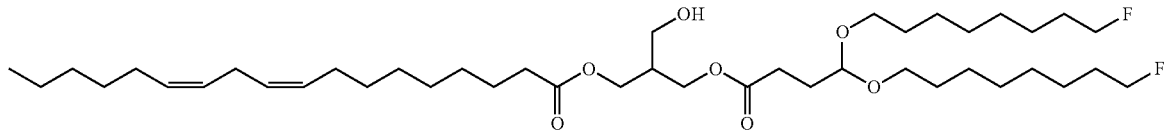 [SMILES: CCCCC/C=C\C/C=C\CCCCCCCC(=O)OCC(CO)COC(=O)CCC(OCCCCCCCCF)OCCCCCCCCF]

Prepared from 4,4-bis((8-fluorooctyl)oxy)butanoic acid according to General Procedure C, yield 160 mg, 37%. $^1$H NMR (400 MHz, Chloroform-d) δ 0.88 (t, J=6.9 Hz, 3H), 1.21-1.44 (m, 34H), 1.58-1.77 (m, 6H), 1.87-1.97 (m, 2H), 2.04 (q, J=6.8 Hz, 4H), 2.13-2.24 (m, 2H), 2.31 (t, J=7.6 Hz, 2H), 2.40 (t, J=7.5 Hz, 2H), 2.76 (t, J=6.4 Hz, 2H), 3.34-3.44 (m, 2H), 3.50-3.65 (m, 4H), 4.10-4.23 (m, 4H), 4.36 (t, J=6.1 Hz, 2H), 4.44-4.52 (m, 3H), 5.25-5.44 (m, 4H).

Step 5: 3-((4,4-bis((8-fluorooctyl)oxy)butanoyl)oxy)-2-((((3-(diethylamino)propoxy)carbonyl)oxy)methyl)propyl (9Z,12Z)-octadeca-9,12-dienoate (Example 110). Prepared from 3-((4,4-bis((8-fluorooctyl)oxy)butanoyl)oxy)-2-(hydroxymethyl)propyl (9Z,12Z)-octadeca-9,12-dienoate and 3-(diethylamino)-1-propanol according to General Procedure D, yield 18 mg (21%). LCMS (Method B): found m/z for (M+H)=888.9, RT=1.40 min.

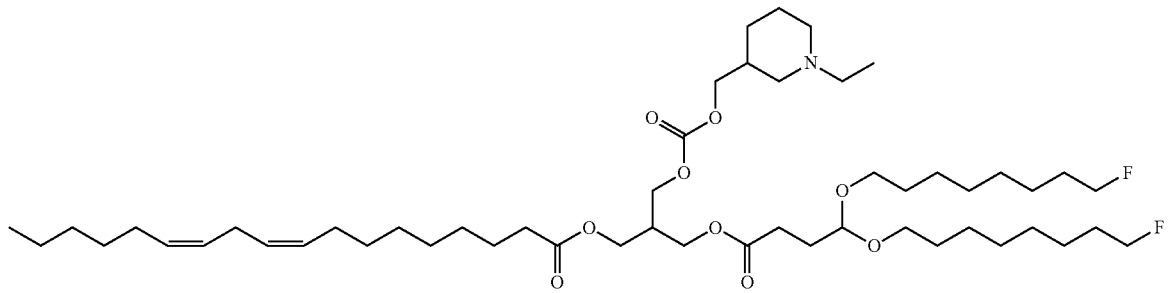 [SMILES: CCCCC/C=C\C/C=C\CCCCCCCC(=O)OCC(COC(=O)CCC(OCCCCCCCCF)OCCCCCCCCF)COC(=O)OCC1CCCN(CC)C1]

Example 111

Example 111, 3-((4,4-bis((8-fluorooctyl)oxy)butanoyl)oxy)-2-(((((1-ethylpiperidin-3-yl)methoxy)carbonyl)oxy)methyl)propyl (9Z,12Z)-octadeca-9,12-dienoate: prepared from 3-((4,4-bis((8-fluorooctyl)oxy)butanoyl)oxy)-2-(hydroxymethyl)propyl (9Z,12Z)-octadeca-9,12-dienoate and (1-ethylpiperidin-3-yl)methanol according to General Procedure D, yield 41 mg (48%). LCMS (Method B): found m/z for (M+H)=900.9, RT=1.41 min

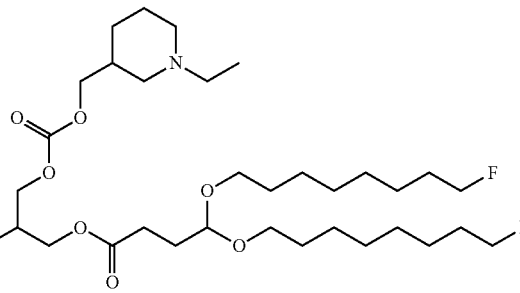

Example 112

Example 112, 3-((6,6-bis(((Z)-oct-3-en-1-yl)oxy)hexanoyl)oxy)-2-((((3-(diethylamino)propoxy)carbonyl)oxy)methyl)propyl (9Z,12Z)-octadeca-9,12-dienoate

Step 1: 2-methoxycyclohexan-1-one oxime

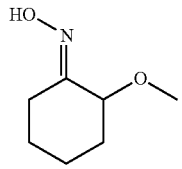

To a stirred solution of 2-methoxycyclohexan-1-one (5 g, 39.0 mmol) in MeOH—H$_2$O (150 ml, 1:2) was added sodium acetate (6.41 g, 78.1 mmol) followed by the addition of hydroxylamine hydrochloride (5.43 g, 78.1 mmol). The resulting mixture was heated at 70° C. in a sealed tube for 16 h. After that time, MeOH was evaporated and the mixture was diluted with water, extracted with ethyl acetate (3×50 mL), washed with brine and dried over sodium sulfate and concentrated under reduced pressure. The crude thus obtained was purified by flash column chromatography eluting with 3% ethyl acetate in hexane to afford 2-methoxycyclohexan-1-one oxime (4.1 g, 88%) as colorless oil. $^1$H NMR (400 MHz, DMSO-d$_6$) δ 1.17-1.32 (m, 1H), 1.40-1.56 (m, 2H), 1.59-1.82 (m, 3H), 1.92-1.99 (m, 1H), 2.93-3.01 (m, 1H), 3.11 (s, 3H), 3.63 (s, 1H), 10.61 (s, 1H).

Step 2: 6,6-dimethoxyhexanenitrile

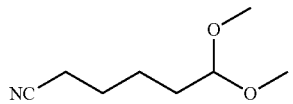

To a stirred solution of 2-methoxycyclohexan-1-one oxime (2.0 g, 14.0 mmol) in CCl$_4$ (20 ml) was added thionyl chloride (1.2 ml, 16.8 mmol) dropwise at 0° C. and stirred for 10 min. After that time, dry MeOH (20 ml) was added to the reaction mixture at 5-10° C. After addition was complete, the reaction mixture was allowed to reach room temperature and was left for 2 h. The mixture was then diluted with ethyl acetate and washed with brine, dried over sodium sulfate and concentrated to afford 6,6-dimethoxyhexanenitrile (1.6 g, 81%) as light yellow oil. $^1$H NMR (400 MHz, Chloroform-d) δ 1.44-1.56 (m, 2H), 1.57-1.75 (m, 4H), 2.34 (t, J=7.0 Hz, 2H), 3.31 (s, 6H), 4.34 (t, J=5.5 Hz, 1H).

167

Step 3: 6,6-bis(((Z)-oct-3-en-1-yl)oxy)hexanenitrile

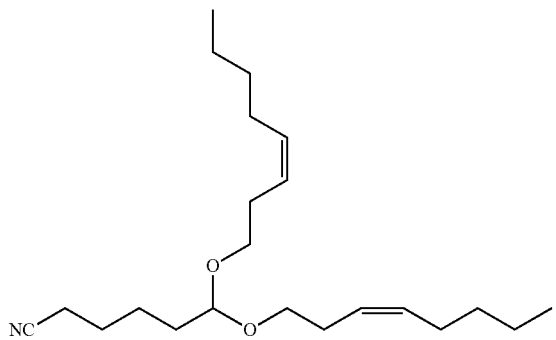 [SMILES: CCCC/C=C\CCOC(CCCCC#N)OCC/C=C\CCCC]

Prepared from 6,6-dimethoxyhexanenitrile and (Z)-oct-3-en-1-ol according to General Procedure A, yield 280 mg (50%). $^1$H NMR (400 MHz, DMSO-d$_6$) δ 0.83-0.89 (m, 6H), 1.21-1.32 (m, 8H), 1.31-1.43 (m, 2H), 1.47-1.61 (m, 4H), 2.01 (q, J=6.7 Hz, 4H), 2.23 (q, J=6.8 Hz, 4H), 2.47 (d, J=7.1 Hz, 2H), 3.32-3.42 (m, 2H), 3.44-3.54 (m, 2H), 4.47 (t, J=5.6 Hz, 1H), 5.30-5.47 (m, 4H).

168

Step 4: 6,6-bis(((Z)-oct-3-en-1-yl)oxy)hexanoic acid

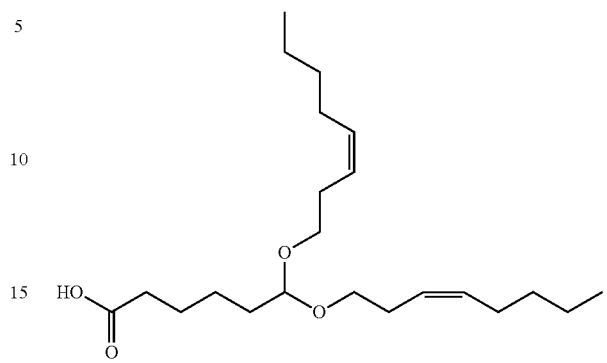

Prepared from 6,6-dimethoxyhexanenitrile according to General Procedure B, yield 260 mg (80%). $^1$H NMR (400 MHz, DMSO-d$_6$) δ 0.86 (q, J=3.8, 5.1 Hz, 6H), 1.21-1.34 (m, 10H), 1.48 (t, J=7.6 Hz, 4H), 2.00 (t, J=6.7 Hz, 4H), 2.14-2.27 (m, 6H), 3.30-3.41 (m, 2H), 3.42-3.53 (m, 2H), 4.44 (t, J=5.6 Hz, 1H), 5.30-5.46 (m, 4H), 11.97 (s, 1H).

Step 5: 3-((6,6-bis(((Z)-oct-3-en-1-yl)oxy)hexanoyl)oxy)-2-(hydroxymethyl)propyl (9Z,12Z)-octadeca-9,12-dienoate

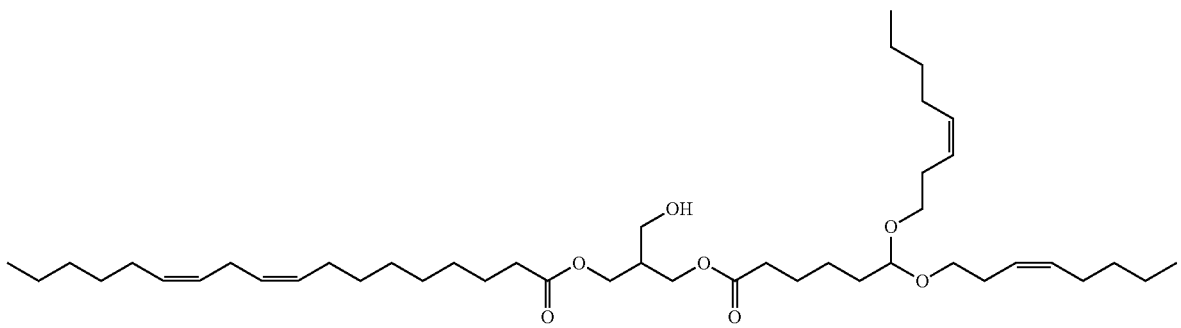 [SMILES: CCCC/C=C\CCOC(CCCCC(=O)OCC(CO)COC(=O)CCCCCCC/C=C\C/C=C\CCCCC)OCC/C=C\CCCC]

Prepared from 6,6-bis(((Z)-oct-3-en-1-yl)oxy)hexanoic acid according to General Procedure C, yield 70 mg (55%). $^1$H NMR (400 MHz, Chloroform-d) δ 0.83-0.95 (m, 9H), 1.17-1.42 (m, 25H), 1.57-1.70 (m, 5H), 2.04 (d, J=7.0 Hz, 8H), 2.18 (t, J=6.2 Hz, 2H), 2.31 (t, J=6.7 Hz, 8H), 2.76 (t, J=6.5 Hz, 2H), 3.41 (q, J=7.5 Hz, 2H), 3.50-3.64 (m, 4H), 4.09-4.20 (m, 4H), 4.48 (t, J=5.6 Hz, 1H), 5.32-5.37 (m, 5H), 5.33-5.48 (m, 3H).

Step 6: 3-((6,6-bis(((Z)-oct-3-en-1-yl)oxy)hexanoyl)oxy)-2-((((3-(diethylamino)propoxy)carbonyl)oxy)methyl)propyl (9Z,12Z)-octadeca-9,12-dienoate (Example 112). Prepared from 3-((6,6-bis(((Z)-oct-3-en-1-yl)oxy)hexanoyl)oxy)-2-(hydroxymethyl)propyl (9Z,12Z)-octadeca-9,12-dienoate and 3-(diethylamino)-1-propanol according to General Procedure D, yield 37 mg (64%). LCMS (Method B): found m/z for (M+H)=877.0, RT=1.70 min.

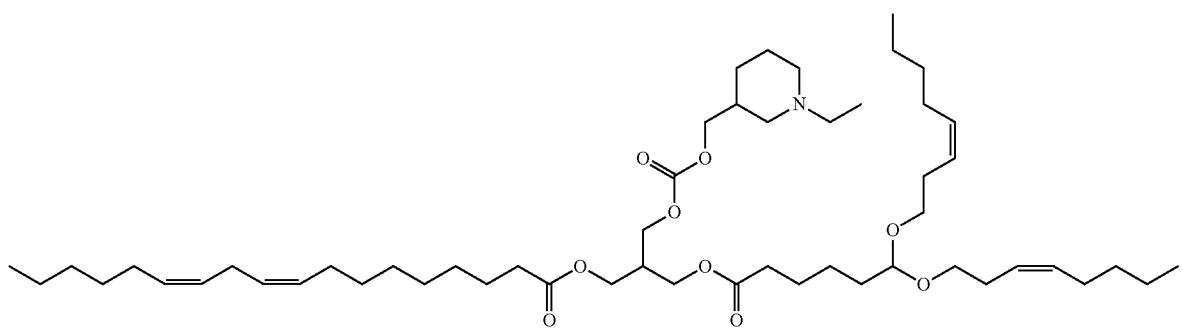 [SMILES: CCCC/C=C\CCOC(CCCCC(=O)OCC(COC(=O)CCCCCCC/C=C\C/C=C\CCCCC)COC(=O)OCC1CCCN(CC)C1)OCC/C=C\CCCC]

Example 113

Example 113, 3-((6,6-bis(((Z)-oct-3-en-1-yl)oxy)hexanoyl)oxy)-2-(((((1-ethylpiperidin-3-yl)methoxy)carbonyl)oxy)methyl)propyl (9Z,12Z)-octadeca-9,12-dienoate: prepared from 3-((6,6-bis(((Z)-oct-3-en-1-yl)oxy)hexanoyl)oxy)-2-(hydroxymethyl)propyl (9Z,12Z)-octadeca-9,12-dienoate and (1-ethylpiperidin-3-yl)methanol according to General Procedure D, yield 89 mg (70%). LCMS (Method B): found m/z for (M+H)=889.0, RT=1.79 min.

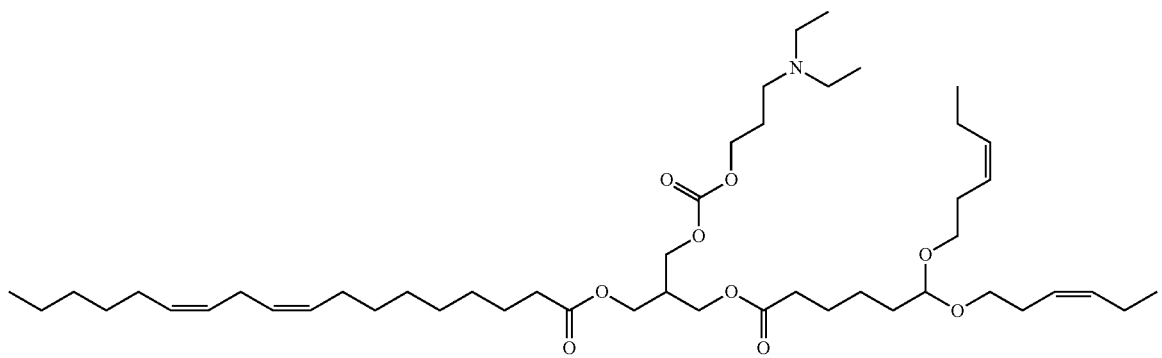 [SMILES: CC/C=C\CCOC(CCCCC(=O)OCC(COC(=O)CCCCCCC/C=C\C/C=C\CCCCC)COC(=O)OCCCN(CC)CC)OCC/C=C\CC]

Example 114

Example 114, 3-((6,6-bis(((Z)-hex-3-en-1-yl)oxy)hexanoyl)oxy)-2-((((3-(diethylamino)propoxy)carbonyl)oxy)methyl)propyl (9Z,12Z)-octadeca-9,12-dienoate Step 1: 6,6-bis(((Z)-hex-3-en-1-yl)oxy)hexanenitrile

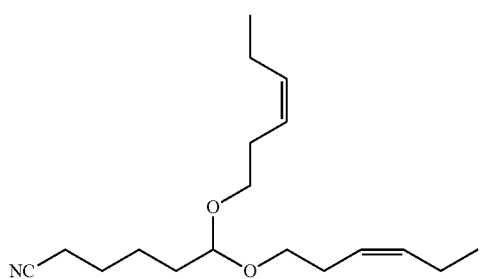 [SMILES: CC/C=C\CCOC(CCCCC#N)OCC/C=C\CC]

Prepared from 6,6-dimethoxyhexanenitrile and (Z)-hex-3-en-1-ol according to General Procedure A, yield 190 mg, 42%. $^1$H NMR (400 MHz, Chloroform-d) δ 0.96 (t, J=7.5 Hz, 6H), 1.58-1.74 (m, 6H), 1.99-2.11 (m, 4H), 2.20-2.38 (m, 6H), 3.36-3.47 (m, 2H), 3.52-3.62 (m, 2H), 4.48 (t, J=5.5 Hz, 1H), 5.27-5.39 (m, 2H), 5.46 (q, J=7.6 Hz, 2H).

Step 2: 6,6-bis(((Z)-hex-3-en-1-yl)oxy)hexanoic acid

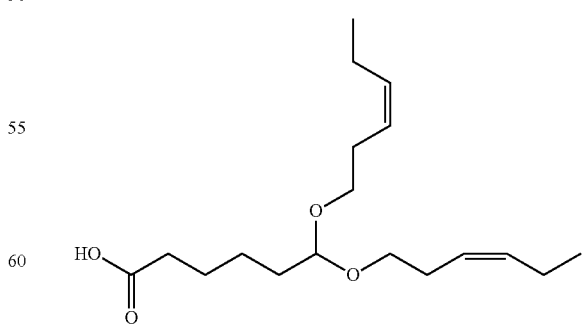

Prepared from 6,6-bis(((Z)-hex-3-en-1-yl)oxy)hexanenitrile according to General Procedure B, yield 170 mg, 82%. $^1$H NMR (400 MHz, DMSO-d$_6$) δ 0.92 (t, J=7.5 Hz, 6H), 1.21-1.32 (m, 2H), 1.42-1.55 (m, 4H), 1.95-2.07 (m, 4H), 2.14-2.27 (m, 6H), 3.31-3.42 (m, 2H), 3.43-3.54 (m, 2H), 4.45 (t, J=5.6 Hz, 1H), 5.27-5.38 (m, 2H), 5.36-5.47 (m, 2H), 11.96 (s, 1H).

Step 3: 3-((6,6-bis(((Z)-hex-3-en-1-yl)oxy)hexanoyl)oxy)-2-(hydroxymethyl)propyl (9Z,12Z)-octadeca-9,12-dienoate

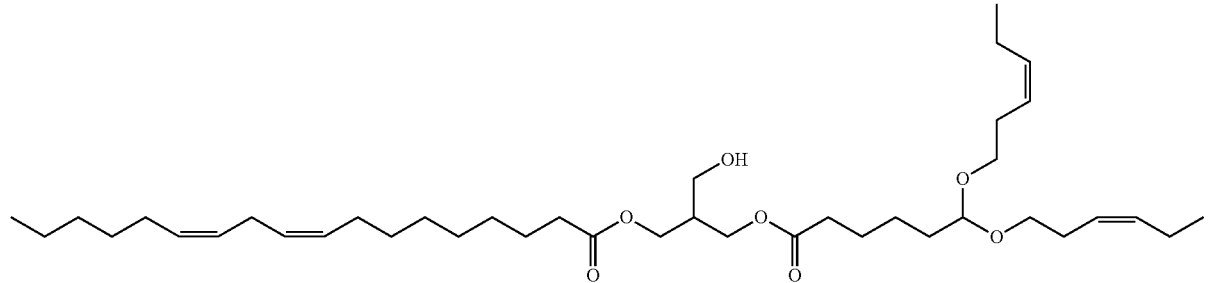 [SMILES: CC/C=C\CCOC(CCCCC(=O)OCC(CO)COC(=O)CCCCCCC/C=C\C/C=C\CCCCC)OCC/C=C\CC]

Prepared from 6,6-bis(((Z)-hex-3-en-1-yl)oxy)hexanoic acid according to General Procedure C, yield 60 mg (45%) $^1$H NMR (400 MHz, Chloroform-d) δ 0.88 (t, J=6.7 Hz, 3H), 0.95 (t, J=7.5 Hz, 6H), 1.18-1.44 (m, 15H), 1.56-1.70 (m, 7H), 1.99-2.11 (m, 8H), 2.13-2.23 (m, 2H), 2.23-2.37 (m, 8H), 2.76 (t, J=6.4 Hz, 2H), 3.36-3.47 (m, 2H), 3.50-3.64 (m, 4H), 4.09-4.24 (m, 4H), 4.48 (t, J=5.6 Hz, 1H), 5.26-5.51 (m, 8H).

Step 4: 3-((6,6-bis(((Z)-hex-3-en-1-yl)oxy)hexanoyl)oxy)-2-((((3-(diethylamino)propoxy)carbonyl)oxy)methyl)propyl (9Z,12Z)-octadeca-9,12-dienoate (Example 114). Prepared from 3-((6,6-bis(((Z)-hex-3-en-1-yl)oxy)hexanoyl)oxy)-2-(hydroxymethyl)propyl (9Z,12Z)-octadeca-9,12-dienoate and 3-(diethylamino)-1-propanol according to General Procedure D, yield 36 mg (62%). LCMS (Method B): found m/z for (M+H)=820.9, RT=1.70 min.

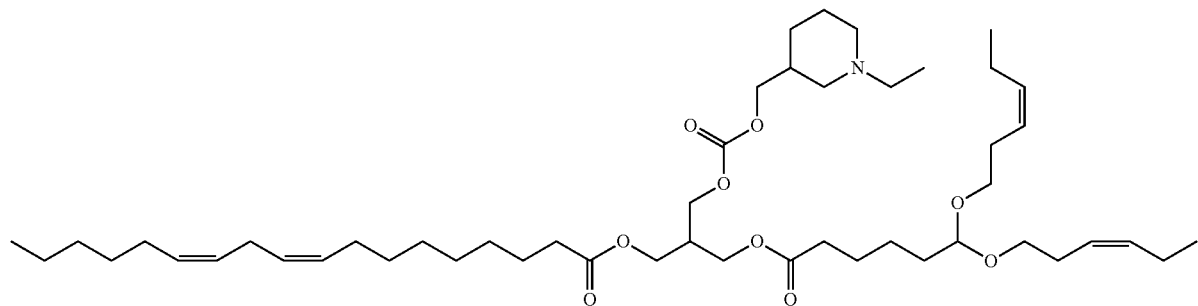 [SMILES: CC/C=C\CCOC(CCCCC(=O)OCC(COC(=O)CCCCCCC/C=C\C/C=C\CCCCC)COC(=O)OCC1CCCN(CC)C1)OCC/C=C\CC]

Example 115

Example 115, 3-((6,6-bis(((Z)-hex-3-en-1-yl)oxy)hexanoyl)oxy)-2-(((((1-ethylpiperidin-3-yl)methoxy)carbonyl)oxy)methyl)propyl (9Z,12Z)-octadeca-9,12-dienoate: prepared from 3-((6,6-bis(((Z)-hex-3-en-1-yl)oxy)hexanoyl)oxy)-2-(hydroxymethyl)propyl (9Z,12Z)-octadeca-9,12-dienoate and (1-ethylpiperidin-3-yl)methanol according to General Procedure D, yield 69 mg (72%). LCMS (Method B): found m/z for (M+H)=833.0, RT=1.60 min

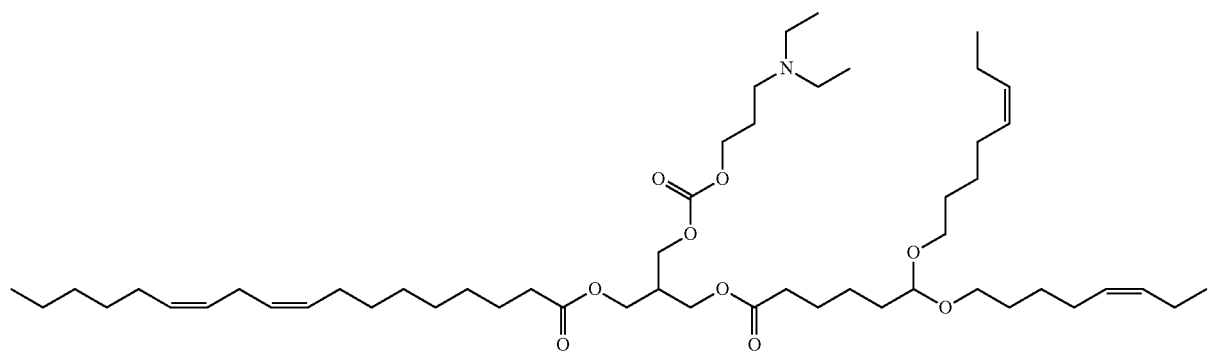 [SMILES: CC/C=C\CCCCOC(CCCCC(=O)OCC(COC(=O)CCCCCCC/C=C\C/C=C\CCCCC)COC(=O)OCCCN(CC)CC)OCCCC/C=C\CC]

Example 116

Example 116, 3-((6,6-bis(((Z)-oct-5-en-1-yl)oxy)hexanoyl)oxy)-2-((((3-(diethylamino)propoxy)carbonyl)oxy)methyl)propyl (9Z,12Z)-octadeca-9,12-dienoate Step 1: 6,6-bis(((Z)-oct-5-en-1-yl)oxy)hexanenitrile

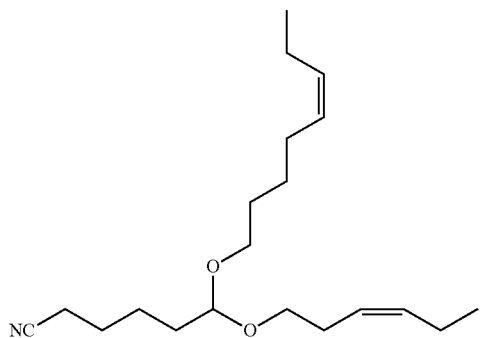 [SMILES: CC/C=C\CCCCOC(CCCCC#N)OCC/C=C\CC]

Prepared from 6,6-dimethoxyhexanenitrile and (Z)-oct-5-en-1-ol according to General Procedure A, yield 210 mg (47%). $^1$H NMR (400 MHz, Chloroform-d) δ 0.94 (t, J=7.5 Hz, 6H), 1.34-1.52 (m, 4H), 1.47-1.74 (m, 10H), 1.95-2.10 (m, 8H), 2.33 (t, J=7.1 Hz, 2H), 3.34-3.45 (m, 2H), 3.51-3.61 (m, 2H), 4.44 (t, J=5.5 Hz, 1H), 5.25-5.42 (m, 4H).

Step 2: 6,6-bis(((Z)-oct-5-en-1-yl)oxy)hexanoic acid

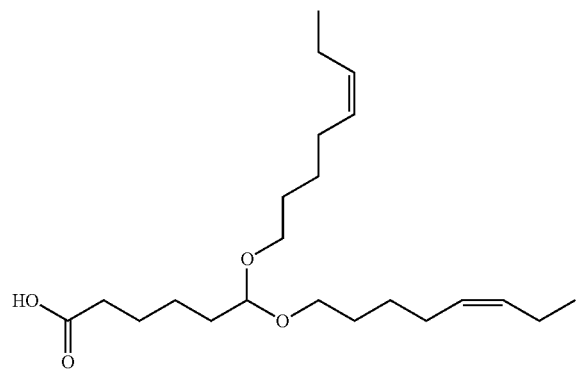 [SMILES: CC/C=C\CCCCOC(CCCCC(=O)O)OCCCC/C=C\CC]

Prepared from 6,6-bis(((Z)-oct-5-en-1-yl)oxy)hexanenitrile according to General Procedure B, yield 150 mg, 94%. $^1$H NMR (400 MHz, DMSO-d$_6$) δ 0.91 (t, J=7.5 Hz, 6H), 1.24-1.41 (m, 6H), 1.42-1.53 (m, 8H), 1.93-2.06 (m, 8H), 2.18 (t, J=7.3 Hz, 2H), 3.31-3.40 (m, 2H), 3.43-3.53 (m, 2H), 4.40 (t, J=5.6 Hz, 1H), 5.19-5.45 (m, 4H), 11.97 (s, 1H).

Step 3: 3-((6,6-bis(((Z)-oct-5-en-1-yl)oxy)hexanoyl)oxy)-2-(hydroxymethyl)propyl (9Z,12Z)-octadeca-9,12-dienoate

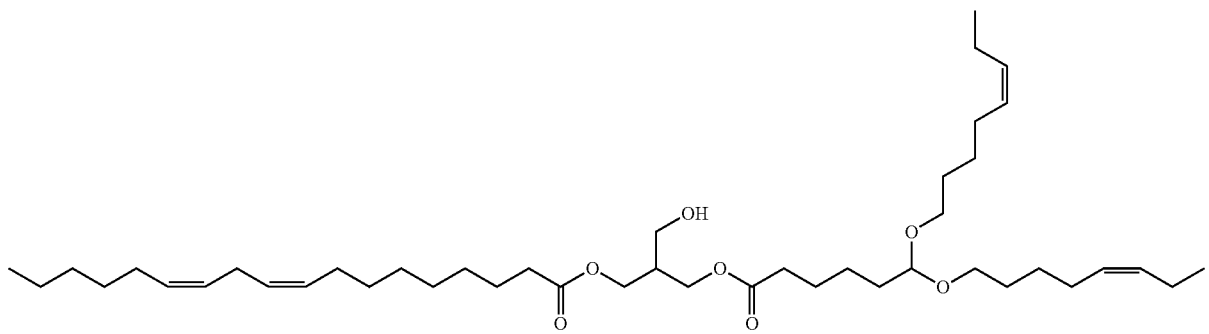 [SMILES: CC/C=C\CCCCOC(CCCCC(=O)OCC(CO)COC(=O)CCCCCCC/C=C\C/C=C\CCCCC)OCCCC/C=C\CC]

Prepared from 6,6-bis(((Z)-oct-5-en-1-yl)oxy)hexanoic acid according to General Procedure C, yield 90 mg (45%). $^1$H NMR (400 MHz, Chloroform-d) δ 0.88 (t, J=6.8 Hz, 3H), 0.94 (t, J=7.5 Hz, 6H), 1.20-1.47 (m, 23H), 1.50-1.70 (m, 9H), 1.94-2.11 (m, 12H), 2.10-2.23 (m, 2H), 2.27-2.37 (m, 4H), 2.76 (t, J=6.4 Hz, 2H), 3.34-3.44 (m, 2H), 3.50-3.58

(m, 2H), 3.60 (t, J=5.6 Hz, 2H), 4.09-4.24 (m, 4H), 4.44 (t, J=5.6 Hz, 1H), 5.25-5.43 (m, 8H).

Step 4: 3-((6,6-bis(((Z)-oct-5-en-1-yl)oxy)hexanoyl)oxy-2-((((3-(diethylamino)propoxy)carbonyl)oxy)methyl)propyl (9Z,12Z)-octadeca-9,12-dienoate (Example 116). Prepared from 3-((6,6-bis(((Z)-oct-5-en-1-yl)oxy)hexanoyl)oxy)-2-(hydroxymethyl)propyl (9Z,12Z)-octadeca-9,12-dienoate and 3-(diethylamino)-1-propanol according to General Procedure D, yield 24 mg (57%). LCMS (Method B): found m/z for (M+H)=876.8, RT=1.70 min.

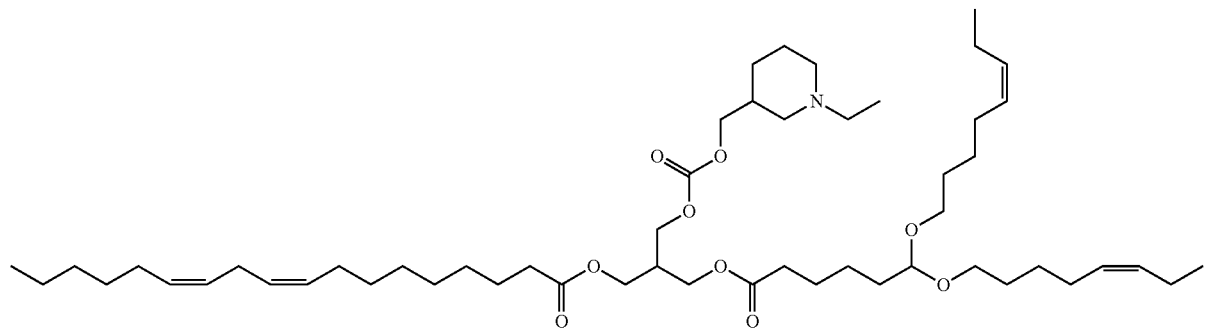 [SMILES: CC/C=C\CCCCOC(CCCCC(=O)OCC(COC(=O)CCCCCCC/C=C\C/C=C\CCCCC)COC(=O)OCC1CCCN(CC)C1)OCCCC/C=C\CC]

Example 117

Example 117, 3-((6,6-bis(((Z)-oct-5-en-1-yl)oxy)hexanoyl)oxy)-2-(((((1-ethylpiperidin-3-yl)methoxy)carbonyl)oxy)methyl)propyl (9Z,12Z)-octadeca-9,12-dienoate: prepared from 3-((6,6-bis(((Z)-oct-5-en-1-yl)oxy)hexanoyl)oxy)-2-(hydroxymethyl)propyl (9Z,2Z)-octadeca-9,12-dienoate and (1-ethylpiperidin-3-yl)methanol according to General Procedure D, yield 50 mg (50%). LCMS (Method B): found m/z for (M+H)=889.2, RT=1.73 min

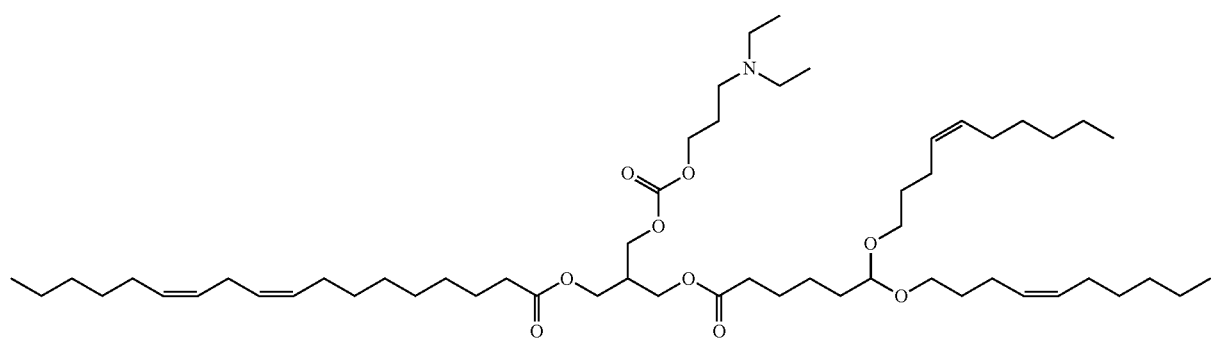 [SMILES: CCCCC/C=C\C/C=C\CCCCCCCC(=O)OCC(COC(=O)CCCCC(OCCC/C=C\CCCCC)OCCC/C=C\CCCCC)COC(=O)OCCCN(CC)CC]

Example 118

Example 118, 3-((6,6-bis(((Z)-dec-4-en-1-yl)oxy)hexanoyl)oxy)-2-((((3-(diethylamino)propoxy)carbonyl)oxy)methyl)propyl (9Z,12Z)-octadeca-9,12-dienoate Step 1: 6,6-bis(((Z)-dec-4-en-1-yl)oxy)hexanenitrile

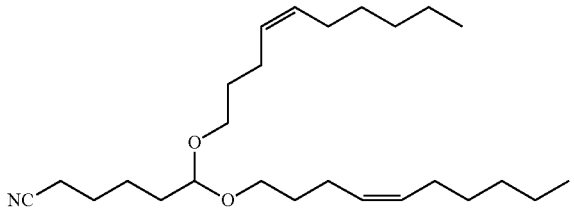 [SMILES: CCCCC/C=C\CCCOC(CCCCC#N)OCCC/C=C\CCCCC]

Prepared from 6,6-dimethoxyhexanenitrile and (Z)-dec-4-en-1-ol according to General Procedure A, yield 150 mg (38%). $^1$H NMR (400 MHz, Chloroform-d) δ 0.88 (t, J=6.7 Hz, 6H), 1.17-1.41 (m, 12H), 1.45-1.57 (m, 2H), 1.59-1.74 (m, 8H), 1.87-2.20 (m, 8H), 2.33 (t, J=7.1 Hz, 2H), 3.35-3.45 (m, 2H), 3.50-3.70 (m, 2H), 4.44 (t, J=5.5 Hz, 1H), 5.28-5.45 (m, 4H).

Step 2: 6,6-bis(((Z)-dec-4-en-1-yl)oxy)hexanoic acid

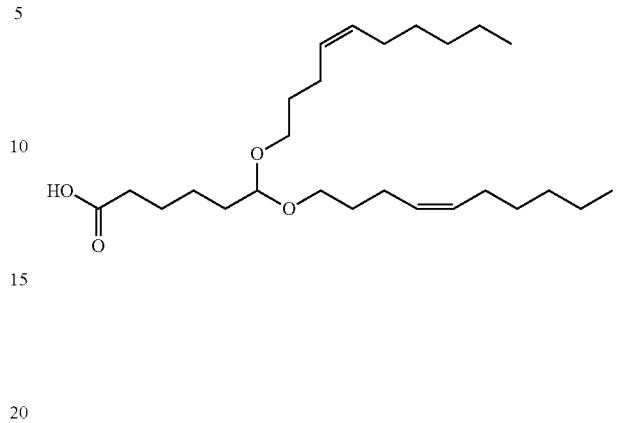

Prepared from 6,6-bis(((Z)-dec-4-en-1-yl)oxy)hexanenitrile according to General Procedure B, yield 150 mg, 95%. $^1$H NMR (400 MHz, DMSO-$d_6$) δ 0.85 (t, J=6.7 Hz, 6H), 1.18-1.37 (m, 1H), 1.45-1.56 (m, 8H), 1.91-2.10 (m, 8H), 2.18 (t, J=7.4 Hz, 2H), 3.32-3.41 (m, 2H), 3.43-3.53 (m, 2H), 4.37-4.44 (m, 1H), 5.25-5.46 (m, 4H), 11.96 (s, 1H).

Step 3: 3-((6,6-bis(((Z)-dec-4-en-1-yl)oxy)hexanoyl)oxy)-2-(hydroxymethyl)propyl (9Z,12Z)-octadeca-9,12-dienoate

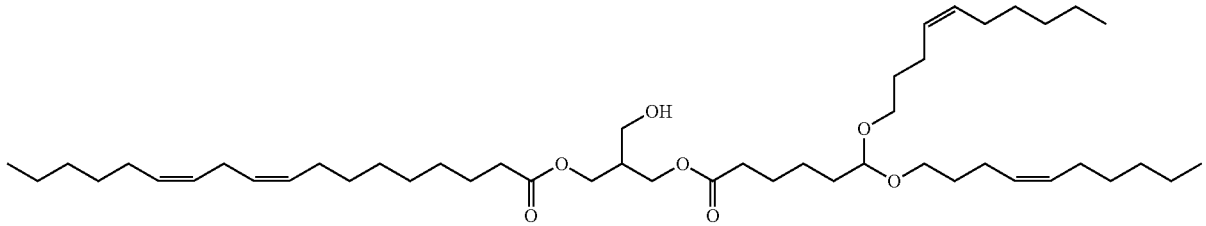 [SMILES: CCCCC/C=C\C/C=C\CCCCCCCC(=O)OCC(CO)COC(=O)CCCCC(OCCC/C=C\CCCCC)OCCC/C=C\CCCCC]

Prepared from 6,6-bis(((Z)-dec-4-en-1-yl)oxy)hexanoic acid according to General Procedure C, yield 87 mg (42%). $^1$H NMR (400 MHz, Chloroform-d) δ 0.88 (t, J=6.8 Hz, 9H), 1.17-1.45 (m, 24H), 1.51-1.71 (m, 10H), 1.96-2.17 (m, 12H), 2.32 (q, J=7.3 Hz, 4H), 2.76 (t, J=6.5 Hz, 2H), 3.35-3.45 (m, 2H), 3.51-3.64 (m, 4H), 4.09-4.24 (m, 4H), 4.44 (t, J=5.6 Hz, 1H), 5.28-5.44 (m, 8H).

Step 4: 3-((6,6-bis(((Z)-dec-4-en-1-yl)oxy)hexanoyl)oxy)-2-((((3-(diethylamino)propoxy)carbonyl)oxy)methyl)propyl (9Z,12Z)-octadeca-9,12-dienoate. Prepared from 3-((6,6-bis(((Z)-dec-4-en-1-yl)oxy)hexanoyl)oxy)-2-(hydroxymethyl)propyl (9Z,12Z)-octadeca-9,12-dienoate and 3-(diethylamino)-1-propanol according to General Procedure D, yield 32 mg (59%). LCMS (Method B): found m/z for (M+H)=932.9, RT=1.70 min.

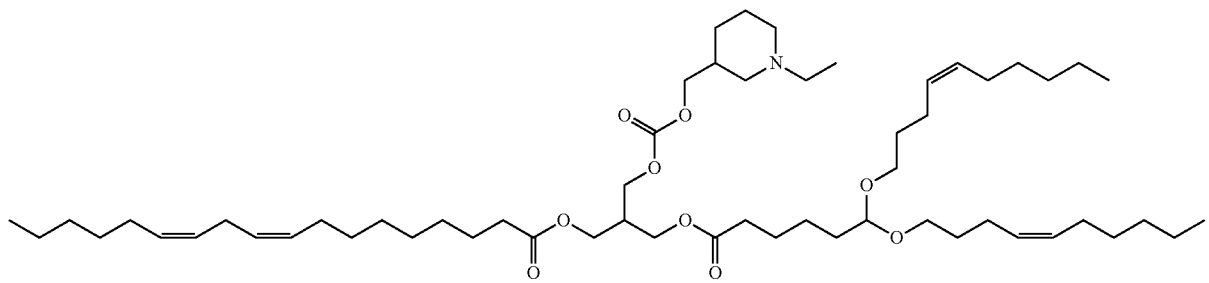 [SMILES: CCCCC/C=C\C/C=C\CCCCCCCC(=O)OCC(COC(=O)CCCCC(OCCC/C=C\CCCCC)OCCC/C=C\CCCCC)COC(=O)OCC1CCCN(CC)C1]

Example 119

Example 119, 3-((6,6-bis(((Z)-dec-4-en-1-yl)oxy)hexanoyl)oxy)-2-(((((1-ethylpiperidin-3-yl)methoxy)carbonyl)oxy)methyl)propyl (9Z,12Z)-octadeca-9,12-dienoate prepared from 3-((6,6-bis(((Z)-dec-4-en-1-yl)oxy)hexanoyl)oxy)-2-(hydroxymethyl)propyl (9Z,12Z)-octadeca-9,12-dienoate and (1-ethylpiperidin-3-yl)methanol according to General Procedure D, yield 51 mg (52%). LCMS (Method B): found m/z for (M+H)=945.2, RT=1.70 min.

Prepared from 6,6-dimethoxyhexanenitrile and 3,7-dimethyloct-6-en-1-ol according to General Procedure A, yield 220 mg (42%). $^1$H NMR (400 MHz, Chloroform-d) δ 0.88 (d, J=6.4 Hz, 61H), 1.11-1.22 (m, 3H), 1.25-1.43 (m, 6H), 1.45-1.77 (m, 19H), 1.87-2.04 (m, 4H), 2.33 (t, J=7.1 Hz, 2H); 3.35-3.50 (m, 2H), 3.52-3.66 (m, 2H), 4.44 (t, J=5.5 Hz, 1H), 5.08 (t, J=7.3 Hz, 2H).

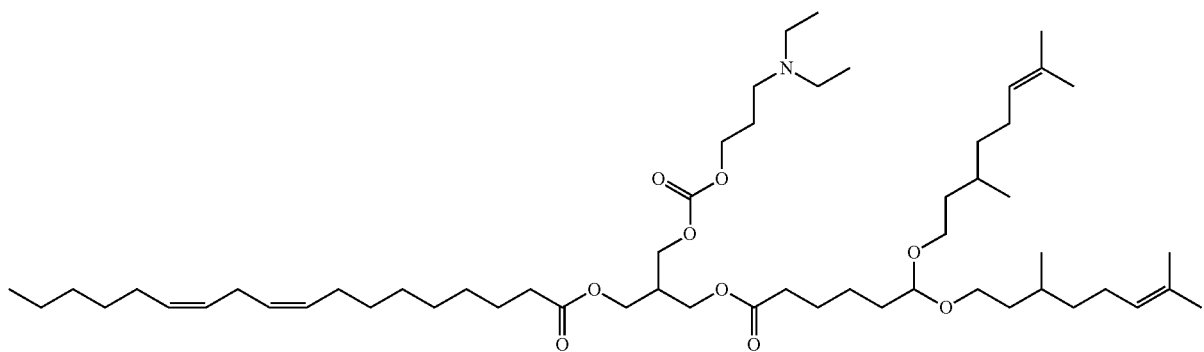 [SMILES: CCCCC/C=C\C/C=C\CCCCCCCC(=O)OCC(COC(=O)CCCCC(OCCC(C)CCC=C(C)C)OCCC(C)CCC=C(C)C)COC(=O)OCCCN(CC)CC]

Example 120

Example 120, 3-((6,6-bis((3,7-dimethyloct-6-en-1-yl)oxy)hexanoyl)oxy)-2-((((3-(diethylamino)propoxy)carbonyl)oxy)methyl)propyl (9Z,12Z)-octadeca-9,12-dienoate Step 1: 6,6-bis((3,7-dimethyloct-6-en-1-yl)oxy)hexanenitrile

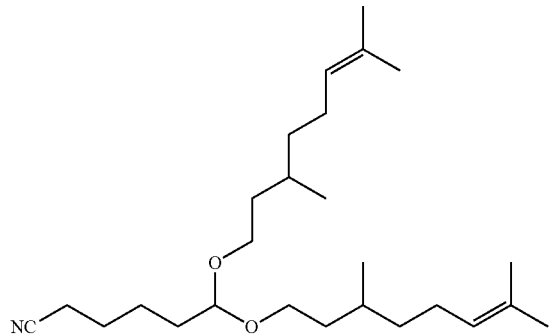 [SMILES: CC(C)=CCCC(C)CCOC(CCCCC#N)OCCC(C)CCC=C(C)C]

Step 2: 6,6-bis((3,7-dimethyloct-6-en-1-yl)oxy)hexanoic acid

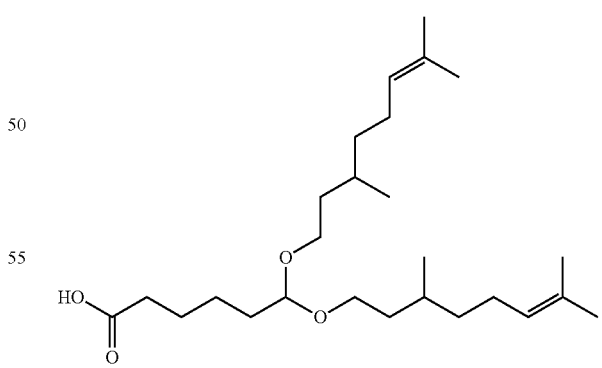

Prepared from 6,6-bis((3,7-dimethyloct-6-en-1-yl)oxy)hexanenitrile according to General Procedure B, yield 220 mg (95%) $^1$H NMR (400 MHz, DMSO-d$_6$) δ 0.85 (d, J=5.9 Hz, 6H), 1.13-1.03 (m, 2H), 1.40-1.17 (m, 8H), 1.58-1.44 (m, 12H), 1.70-1.59 (m, 6H), 2.03-1.87 (m, 5H), 2.18 (t, J=7.3 Hz, 1H), 3.44-3.33 (m, 2H), 3.60-3.44 (m, 2H), 4.40 (t, J=5.4 Hz, 1H), 5.07 (t, J=7.3 Hz, 2H), 11.97 (s, 1H).

Step 3: 3-((6,6-bis((3,7-dimethyloct-6-en-1-yl)oxy)hexanoyl)oxy)-2-(hydroxymethyl)propyl (9Z,12Z)-octadeca-9,12-dienoate

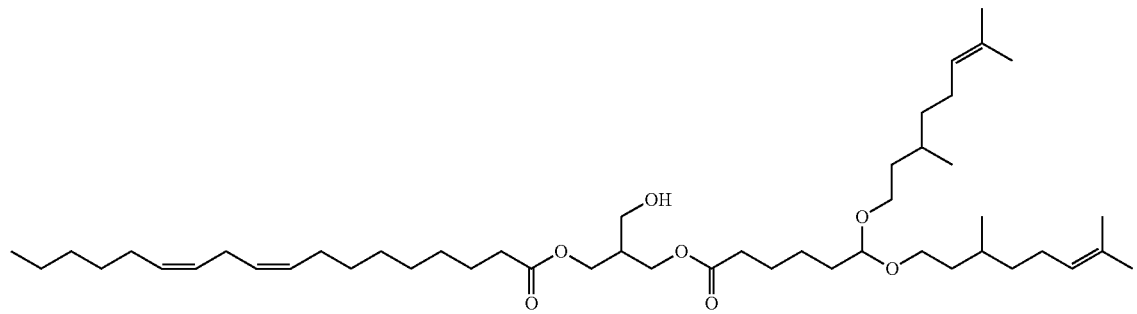 [SMILES: CCCCC/C=C\C/C=C\CCCCCCCC(=O)OCC(CO)COC(=O)CCCCC(OCCC(C)CCC=C(C)C)OCCC(C)CCC=C(C)C]

Prepared from 6,6-bis((3,7-dimethyloct-6-en-1-yl)oxy)hexanoic acid according to General Procedure C, yield 90 mg (42%). $^1$H NMR (400 MHz, Chloroform-d) δ 0.88 (d, J=6.1 Hz, 10H), 1.18-1.45 (m, 15H), 1.51-1.57 (m, 22H), 1.67 (s, 5H), 1.83-2.09 (m, 8H), 2.16-2.23 (m, 2H), 2.32 (q, J=7.5 Hz, 4H), 2.75 (d, J=6.1 Hz, 2H), 3.32-3.69 (m, 7H), 4.10-4.21 (m, 4H), 4.40-4.48 (m, 1H), 5.03-5.16 (m, 2H), 5.28-5.42 (m, 4H).

Step 4: 3-((6,6-bis((3,7-dimethyloct-6-en-1-yl)oxy)hexanoyl)oxy)-2-(((((3-(diethylamino)propoxy)carbonyl)oxy)methyl)propyl (9Z,12Z)-octadeca-9,12-dienoate (Example 120). Prepared from 3-((6,6-bis((3,7-dimethyloct-6-en-1-yl)oxy)hexanoyl)oxy)-2-(hydroxymethyl)propyl (9Z,12Z)-octadeca-9,12-dienoate and 3-(diethylamino)-1-propanol according to General Procedure D, yield 32 mg (59%) LCMS (Method B): found m/z for (M+H)=933.0, RT=1.70 min.

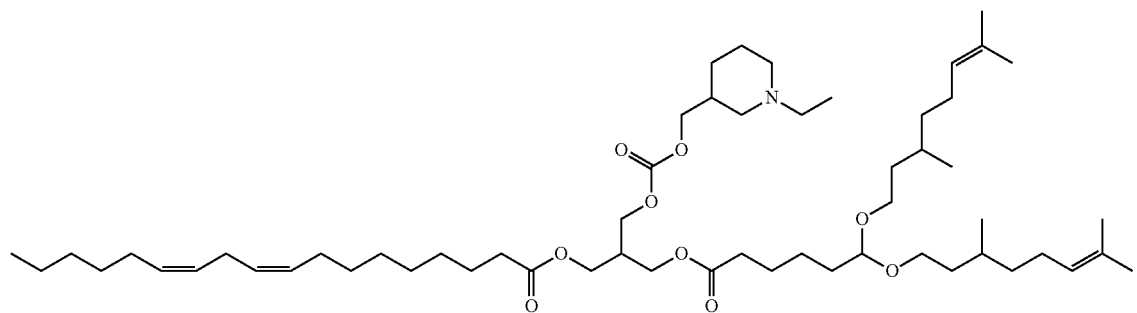 [SMILES: CCCCC/C=C\C/C=C\CCCCCCCC(=O)OCC(COC(=O)CCCCC(OCCC(C)CCC=C(C)C)OCCC(C)CCC=C(C)C)COC(=O)OCC1CCCN(CC)C1]

Example 121

Example 121, 3-((6,6-bis((3,7-dimethyloct-6-en-1-yl)oxy)hexanoyl)oxy)-2-(((((1-ethylpiperidin-3-yl)methoxy)carbonyl)oxy)methyl)propyl (9Z,12Z)-octadeca-9,12-dienoate: prepared from 3-((6,6-bis((3,7-dimethyloct-6-en-1-yl)oxy)hexanoyl)oxy)-2-(hydroxymethyl)propyl (9Z,12Z)-octadeca-9,12-dienoate and (1-ethylpiperidin-3-yl)methanol according to General Procedure D, yield 32 mg (59%). LCMS (Method B): found m/z for (M+H)=945.2, RT=1.96 min.

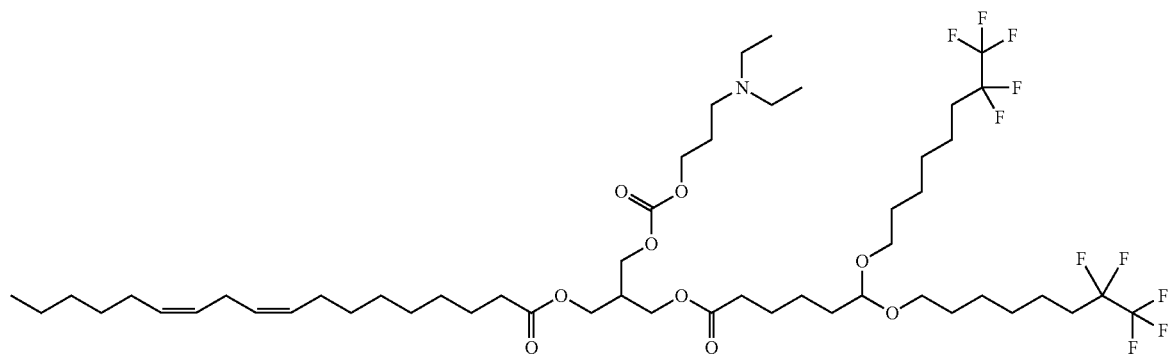 [SMILES: CCCCC/C=C\C/C=C\CCCCCCCC(=O)OCC(COC(=O)CCCCC(OCCCCCCC(F)(F)C(F)(F)F)OCCCCCCC(F)(F)C(F)(F)F)COC(=O)OCCCN(CC)CC]

Example 122

Example 122, 3-((6,6-bis((7,7,8,8,8-pentafluorooctyl)oxy)hexanoyl)oxy)-2-((((3-(diethylamino)propoxy)carbonyl)oxy)methyl)propyl (9Z,12Z)-octadeca-9,12-dienoate Step 1: 6,6-bis((7,7,8,8,8-pentafluorooctyl)oxy)hexanenitrile

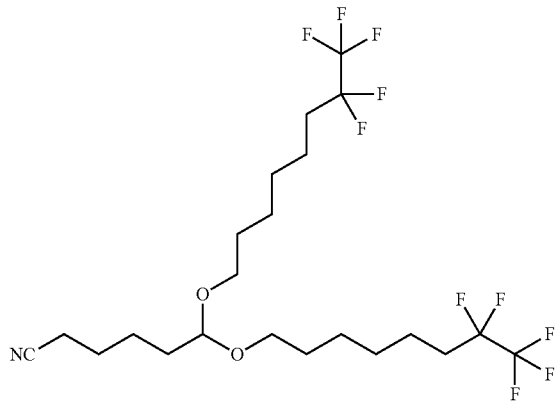 [SMILES: N#CCCCCC(OCCCCCCC(F)(F)C(F)(F)F)OCCCCCCC(F)(F)C(F)(F)F]

Prepared from 6,6-dimethoxyhexanenitrile and 7,7,8,8,8-pentafluorooctan-1-ol according to General Procedure A, yield 300 mg (44%). $^1$H NMR (400 MHz, Chloroform-d) δ 1.35-1.45 (m, 8H), 1.45-1.56 (m, 2H), 1.54-1.74 (m, 12H), 1.91-2.09 (m, 4H), 2.34 (t, J=7.0 Hz, 2H), 3.34-3.45 (m, 2H), 3.51-3.61 (m, 2H), 4.44 (t, J=5.5 Hz, 1H).

Step 2: 6,6-bis((7,7,8,8,8-pentafluorooctyl)oxy)hexanoic acid

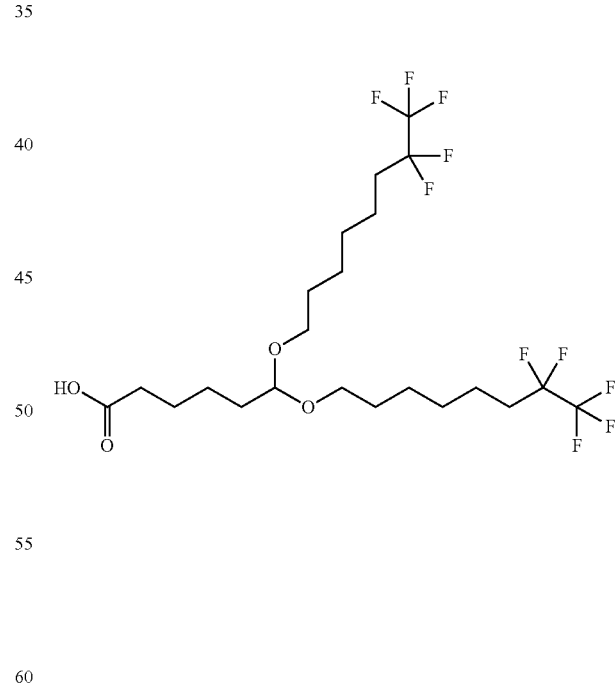

Prepared from 6,6-bis((7,7,8,8,8-pentafluorooctyl)oxy)hexanenitrile according to General Procedure B, yield 296 mg (95%) $^1$H NMR (400 MHz, DMSO-d$_6$) δ 1.18-1.40 (m, 10H), 1.38-1.55 (m, 12H), 2.04-2.23 (m, 6H), 3.29-3.38 (m, 2H), 3.40-3.51 (m, 2H), 4.39 (t, J=5.6 Hz, 1H), 11.93 (s, 1H).

Step 3: 3-((6,6-bis((7,7,8,8,8-pentafluorooctyl)oxy)
hexanoyl)oxy)-2-(hydroxymethyl)propyl (9Z,12Z)-
octadeca-9,12-dienoate

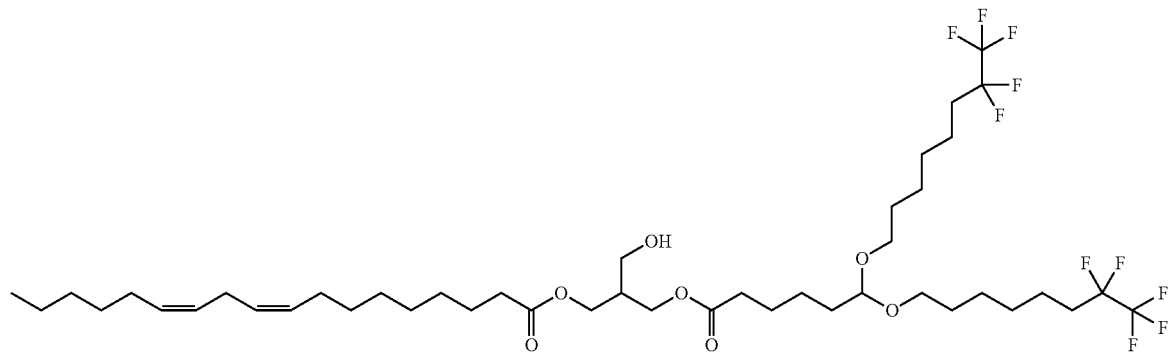 [SMILES: CCCCC/C=C\C/C=C\CCCCCCCC(=O)OCC(CO)COC(=O)CCCCC(OCCCCCCC(F)(F)C(F)(F)F)OCCCCCCC(F)(F)C(F)(F)F]

Prepared from 6,6-bis((7,7,8,8,8-pentafluorooctyl)oxy) hexanoic acid according to General Procedure C, yield 140 mg (57%). $^1$H NMR (400 MHz, Chloroform-d) δ 0.87 (d, J=7.3 Hz, 3H), 1.22-1.46 (m, 27H), 1.56-1.70 (m, 9H), 1.88-2.10 (m, 9H), 2.11-2.25 (m, 2H), 2.26-2.37 (m, 4H), 2.76 (t, J=7.3 Hz, 2H), 3.36-3.44 (m, 2H), 3.49-3.58 (m, 2H), 3.60 (t, J=5.7 Hz, 2H), 3.91-4.10 (m, 1H), 4.09-4.26 (m, 4H), 4.36-4.53 (m, 1H), 5.22-5.52 (m, 4H).

Step 4: 3-((6,6-bis((7,7,8,8,8-pentafluorooctyl)oxy) hexanoyl)oxy)-2-((((3-(diethylamino)propoxy)carbonyl) oxy)methyl)propyl (9Z,12Z)-octadeca-9,12-dienoate (Example 122). Prepared from 3-((6,6-bis((7,7,8,8-pentafluorooctyl)oxy)hexanoyl)oxy)-2-(hydroxymethyl) propyl (9Z,12Z)-octadeca-9,12-dienoate and 3-(diethylamino)-1-propanol according to General Procedure D, yield 51 mg (61%). LCMS (Method B): found m/z for (M+H)=1060.7, RT=1.70 min.

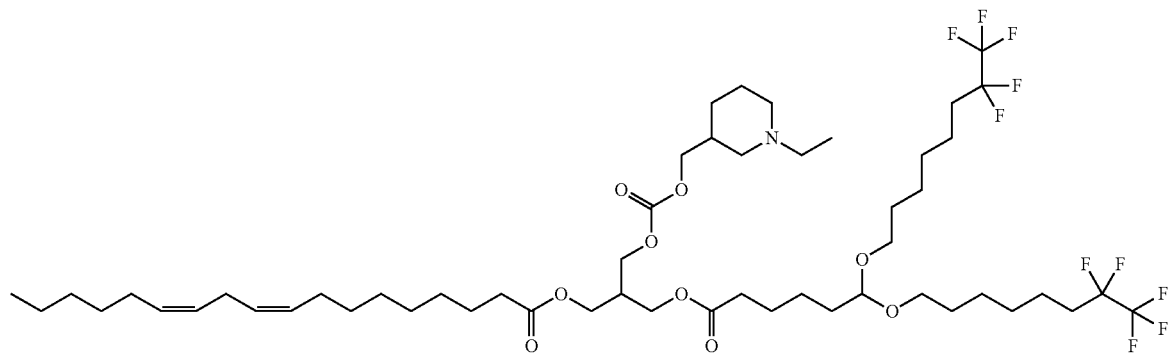 [SMILES: CCCCC/C=C\C/C=C\CCCCCCCC(=O)OCC(COC(=O)CCCCC(OCCCCCCC(F)(F)C(F)(F)F)OCCCCCCC(F)(F)C(F)(F)F)COC(=O)OCC1CCCN(CC)C1]

Example 123

Example 123, 3-((6,6-bis((7,7,8,8,8-pentafluorooctyl) oxy)hexanoyl)oxy)-2-(((((1-ethylpiperidin-3-yl)methoxy) carbonyl)oxy)methyl)propyl (9Z,12Z)-octadeca-9,12-dienoate: prepared from 3-((6,6-bis((7,7,8,8-pentafluorooctyl)oxy)hexanoyl)oxy)-2-(hydroxymethyl) propyl (9Z,12Z)-octadeca-9,12-dienoate and (1-ethylpiperidin-3-yl)methanol according to General Procedure D, yield 80 mg (74%). LCMS (Method B): found m/z for (M+H)=1073.2, RT=1.81 min.

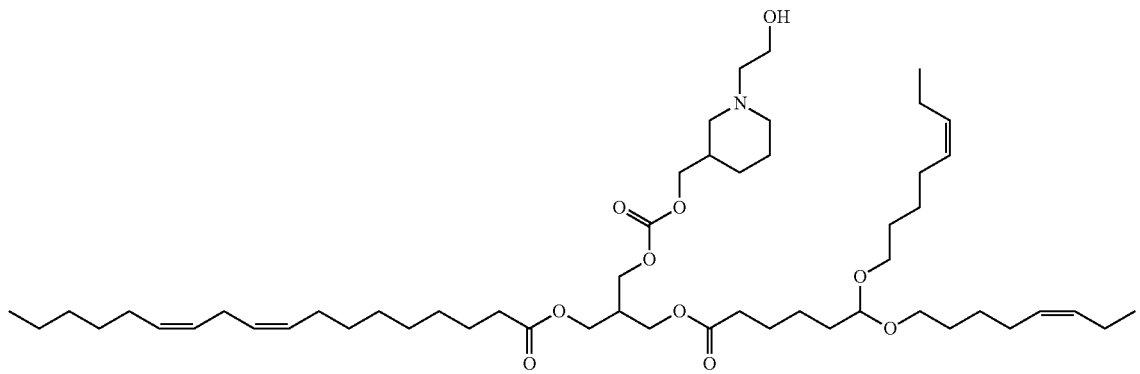 [SMILES: CC/C=C\CCCCOC(CCCCC(=O)OCC(COC(=O)CCCCCCC/C=C\C/C=C\CCCCC)COC(=O)OCC1CCCN(CCO)C1)OCCCC/C=C\CC]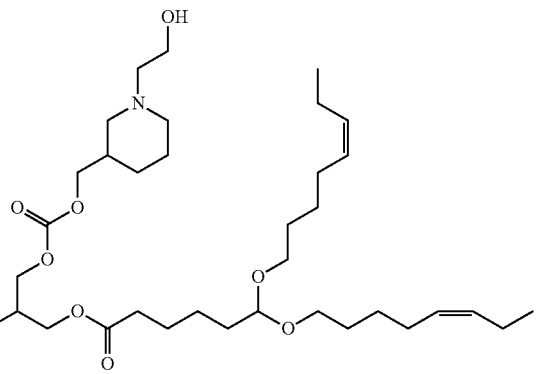

Example 124

Example 124, 3-((4,4-bis(((Z)-oct-5-en-1-yl)oxy)butanoyl)oxy)-2-(((((1-(2-hydroxyethyl)piperidin-3-yl)methoxy)carbonyl)oxy)methyl)propyl (9Z,12Z)-octadeca-9,12-dienoate Step 1: ethyl 1-(2-hydroxyethyl)piperidine-3-carboxylate

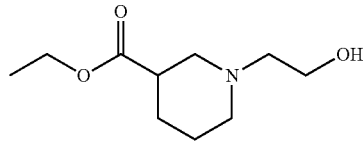

To a stirred solution of ethyl piperidine-3-carboxylate (2 g, 12.74 mmol) in anhydrous acetone (10 mL) were added 2-bromoethan-1-ol (1.89 g, 15.28 mmol), dried powdered $K_2CO_3$ (3.5 g, 25.47 mmol) and KI (0.42 g, 2.55 mmol). The reaction mixture was stirred at 25° C. for 18 h. The reaction mixture was filtered, and the filtrate was evaporated under reduced pressure. Crude material thus obtained was purified by combiflash column chromatography, eluted with 30% ethyl acetate-hexane to afford ethyl 1-(2-hydroxyethyl)piperidine-3-carboxylate (2.2 g, 85%) as colorless oil. $^1$H NMR (400 MHz, Chloroform-d) δ 1.17-1.29 (m, 3H), 1.46-1.62 (m, 2H), 1.60-1.76 (m, 1H), 1.81-1.95 (m, 1H), 2.14-2.19 (m, 1H), 2.38 (t, J=10.4 Hz, 11H), 2.42-2.59 (m, 4H), 2.62-2.71 (m, 1H), 2.80-2.89 (m, 1H), 3.52-3.63 (m, 2H), 4.10 (q, J=7.1 Hz, 2H).

Step 2: ethyl 1-(2-((tert-butyldimethylsilyl)oxy)ethyl)piperidine-3-carboxylate

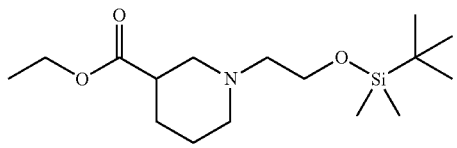 [SMILES: CCOC(=O)C1CCCN(CCO[Si](C)(C)C(C)(C)C)C1]

To a stirred solution of ethyl 1-(2-hydroxyethyl)piperidine-3-carboxylate (200 mg, 0.99 mmol) in DCM (2 mL) were added triethylamine (0.35 mL, 2.48 mmol), and tert-butyldimethylsilyl chloride (225 mg, 1.49 mmol) at 0° C. The reaction mixture was stirred at 25° C. for 14 h. Then reaction mixture was quenched with water and extracted with DCM (50 mL), washed with brine solution (25 mL). Organic layer was dried over anhydrous $Na_2SO_4$, filtered and concentrated under reduced pressure. The crude material thus obtained was purified by combiflash chromatography, eluted with 5% ethyl acetate-hexane to afford ethyl 1-(2-((tert-butyldimethylsilyl)oxy)ethyl)piperidine-3-carboxylate (160 mg, 51%) as sticky solid. $^1$H NMR (400 MHz, Chloroform-d) δ 0.04 (s, 6H), 0.87 (s, 9H), 1.23 (t, J=7.1 Hz, 3H), 1.32-1.48 (m, 1H), 1.47-1.64 (m, 1H), 1.63-1.77 (m, 1H), 1.87-1.98 (m, 1H), 2.00-2.13 (m, 1H), 2.22 (t, J=10.9 Hz, 1H), 2.48-2.59 (m, 3H), 2.78 (d, J=11.2 Hz, 1H), 3.04 (d, J=13.4 Hz, 1H), 3.73 (t, J=6.4 Hz, 2H), 4.11 (q, J=7.1 Hz, 2H).

Step 3: (1-(2-((tert-butyldimethylsilyl)oxy)ethyl)piperidin-3-yl)methanol

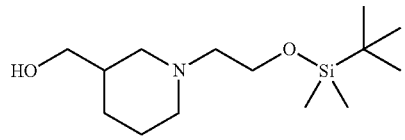 [SMILES: CC(C)(C)[Si](C)(C)OCCN1CCCC(CO)C1]

To a stirred solution of ethyl 1-(2-((tert-butyldimethylsilyl)oxy)ethyl)piperidine-3-carboxylate (500 mg, 1.58 mmol) in THF (5 mL) was added lithium aluminium hydride (1M in THF) (3.2 mL, 3.17 mmol) at 0° C. and reaction mixture was stirred at 25° C. for 1 Ih. Upon completion, reaction mass was quenched with aq. saturated $Na_2SO_4$ solution (10 mL) at 0° C. and filtered. The filtrate was concentrated under reduced pressure to afford (1-(2-((tert-butyldimethylsilyl)oxy)ethyl)piperidin-3-yl)methanol (400 mg, 92%) as colorless oil, which was carried to next step without further purification. $^1$H NMR (400 MHz, Chloroform-d) δ 0.04 (s, 6H), 0.87 (s, 9H), 1.07-1.22 (m, 1H), 1.49-1.62 (m, 1H), 1.62-1.72 (m, 1H), 1.72-1.85 (m, 3H), 2.11 (d, J=10.5 Hz, 1H), 2.23 (d, J=11.6 Hz, 1H), 2.48 (t, J=6.5 Hz, 2H), 2.55-2.72 (m, 1H), 2.82 (d, J=10.8 Hz, 1H), 3.53 (dd, J=5.8, 10.6 Hz, 1H), 3.57-3.70 (m, 1H), 3.73 (t, J=6.4 Hz, 2H).

Step 4: 3-((4,4-bis(((Z)-oct-5-en-1-yl)oxy)butanoyl) oxy)-2-(((((1-(2-((tert-butyldimethylsilyl)oxy)ethyl) piperidin-3-yl)methoxy)carbonyl)oxy)methyl)propyl (9Z,12Z)-octadeca-9,12-dienoate

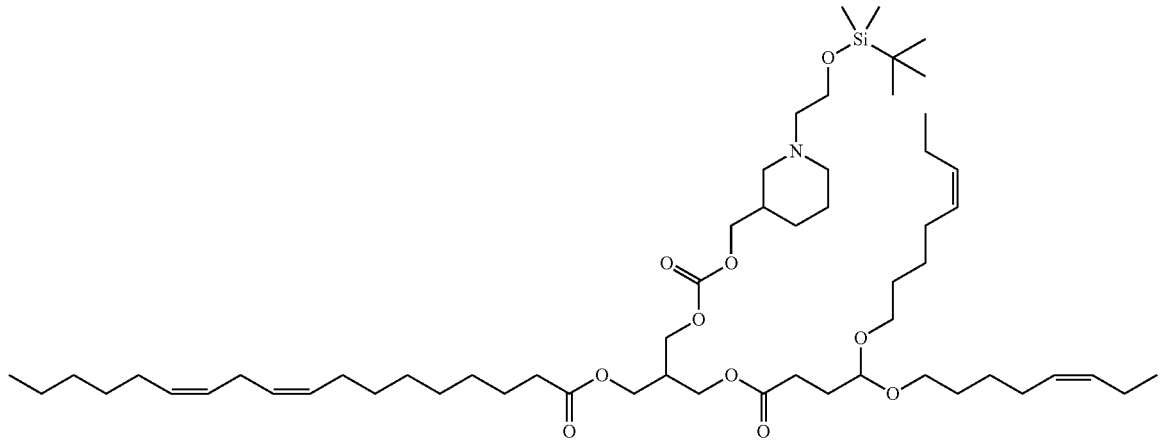 [SMILES: CC/C=C\CCCCOC(CCC(=O)OCC(COC(=O)CCCCCCC/C=C\C/C=C\CCCCC)COC(=O)OCC1CCCN(CCO[Si](C)(C)C(C)(C)C)C1)OCCCC/C=C\CC]

To a stirred solution of 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa) (100 mg, 0.14 mmol) in DCM (1 mL) were added pyridine (0.03 mL, 0.29 mmol), N,N-dimethylpyridin-4-amine (5.3 mg, 0.04 mmol) and 4-nitrophenyl chloroformate (72.36 mg, 0.29 mmol) and stirred at 25° C. for 1 h. Then (1-(2-((tert-butyldimethylsilyl) oxy)ethyl)piperidin-3-yl)methanol (158 mg, 0.58 mmol) and DIPEA (0.1 mL, 0.58 mmol) were added and stirred for another 16 h. The reaction mixture was diluted with DCM (10 mL), washed with 1M $Na_2CO_3$ solution (3×10 mL) and washed with water (10 mL) and brine. The combined organic part was dried over anhydrous $Na_2SO_4$, filtered and concentrated under reduced pressure. The crude material thus obtained was purified by combiflash column chromatography, eluted with 2% MeOH-DCM to afford 3-((4,4-bis (((Z)-oct-5-en-1-yl)oxy)butanoyl)oxy)-2-(((((1-(2-((tert-butyldimethylsilyl)oxy)ethyl)piperidin-3-yl)methoxy) carbonyl)oxy)methyl)propyl (9Z,12Z)-octadeca-9,12-dienoate (50 mg, 35%) as pale yellow oil. LCMS (Method B): found m/z for (M+H)=991.1, RT=1.14 min.

Step 5: 3-((4,4-bis(((Z)-oct-5-en-1-yl)oxy)butanoyl)oxy)-2-(((((1-(2-hydroxyethyl)piperidin-3-yl)methoxy)carbonyl) oxy)methyl)propyl (9Z,12Z)-octadeca-9,12-dienoate (Example 124). To a stirred solution of 3-((4,4-bis(((Z)-oct-5-en-1-yl)oxy)butanoyl)oxy)-2-(((((1-(2-((tert-butyidimethylsilyl)oxy)ethyl)piperidin-3-yl)methoxy) carbonyl)oxy)methyl)propyl (9Z,12Z)-octadeca-9,12-dienoate (60 mg, 0.061 mmol) in dry THF (1 mL) at 0° C. was added tetra-n-butylammonium fluoride (TBAF) (0.12 mL, 0.12 mmol) (1 M solution in tetrahydrofuran). The resulting solution stirred for 4 h after allowing the mixture to warm to room temperature. The resulting solution was diluted with DCM (5 mL) and quenched with water (5 mL). The organic layer was extracted with DCM (2×5 mL), brine (5 mL) and dried over anhydrous $Na_2SO_4$, filtered concentrated under reduced pressure. The crude material thus obtained was purified by combiflash column chromatography, eluted with 2% MeOH-DCM to afford 3-((4,4-bis(((Z)-oct-5-en-1-yl)oxy)butanoyl)oxy)-2-(((((1-(2-hydroxyethyl) piperidin-3-yl)methoxy)carbonyl)oxy)methyl)propyl (9Z, 12Z)-octadeca-9,12-dienoate (35 mg, 66%) as brown sticky gum. LCMS (Method B): found m/z for (M+H)=876.7, RT=1.58 min.

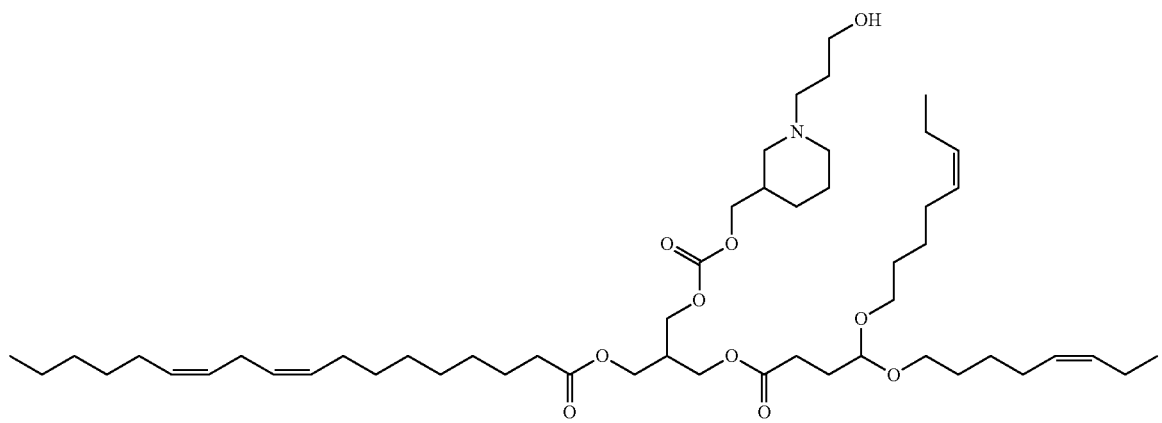 [SMILES: CC/C=C\CCCCOC(CCC(=O)OCC(COC(=O)CCCCCCC/C=C\C/C=C\CCCCC)COC(=O)OCC1CCCN(CCCO)C1)OCCCC/C=C\CC]

Example 125

Example 125, 3-((4,4-bis(((Z)-oct-5-en-1-yl)oxy)butanoyl)oxy)-2-(((((1-(3-hydroxypropyl)piperidin-3-yl)methoxy)carbonyl)oxy)methyl)propyl (9Z,12Z)-octadeca-9,12-dienoate

Step 1 ethyl 1-(3-hydroxypropyl)piperidine-3-carboxylate

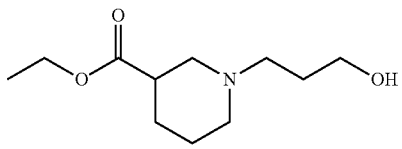

To a stirred solution of ethyl piperidine-3-carboxylate (2 g, 12.74 mmol) in anhydrous acetone (10 mL) were added 3-bromopropan-1-ol (2.12 g, 15.28 mmol), dried powdered $K_2CO_3$ (3.5 g, 25.47 mmol) and KI (0.42 g, 2.55 mmol). The reaction mixture was stirred at 25° C. for 16 h. The reaction mixture was filtered, and the filtrate was evaporated under reduced pressure. Crude material thus obtained was purified by combiflash column chromatography, eluted with 25% ethyl acetate-hexane to afford ethyl 1-(3-hydroxypropyl)piperidine-3-carboxylate (2.0 g, 73%) as colorless oil. $^1$H NMR (400 MHz, Chloroform-d) δ 1.23 (t, J=7.1 Hz, 3H), 1.37-1.59 (m, 2H), 1.62-1.79 (m, 3H), 1.88-1.95 (m, 1H), 1.96-2.08 (m, 1H), 2.11-2.22 (m, 2H), 2.47-2.56 (m, 1H), 2.58 (t, J=5.7 Hz, 2H), 2.84 (d, J=11.3 Hz, 1H), 3.06 (d, J=9.7 Hz, 1H), 3.76 (t, J=5.2 Hz, 2H), 4.10 (q, J=7.1 Hz, 2H).

Step 2: ethyl 1-(3-((tert-butyldimethylsilyl)oxy)propyl)piperidine-3-carboxylate

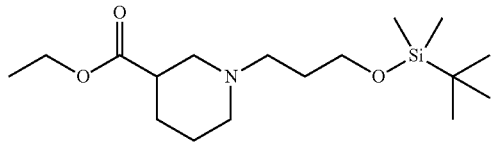 [SMILES: CCOC(=O)C1CCCN(CCCO[Si](C)(C)C(C)(C)C)C1]

To a stirred solution of ethyl 1-(3-hydroxypropyl)piperidine-3-carboxylate (200 mg, 0.93 mmol) in DCM (2 mL) were added triethylamine (0.3 mL, 3.31 mmol) and tert-butyldimethylsilyl chloride (211 mg, 1.39 mmol) at 0° C. The reaction mixture was slowly warmed to 25° C. and stirred for 14 h. Then reaction mixture was quenched with water and extracted with DCM, washed with brine solution. The combined organic layer was dried over anhydrous $Na_2SO_4$, filtered and concentrated under reduced pressure. Crude material thus obtained was purified by combiflash column chromatography, eluted with 5% ethyl acetate-hexane to afford ethyl 1-(3-((tert-butyidimethylsilyl)oxy)propyl)piperidine-3-carboxylate (160 mg, 52%) as sticky solid. $^1$H NMR (400 MHz, Chloroform-d) δ 0.03 (s, 6H), 0.87 (s, 9H), 1.24 (t, J=7.1 Hz, 3H), 1.34-1.63 (m, 2H), 1.63-1.75 (m, 3H), 1.87-2.01 (m, 2H), 2.11 (t, J=10.7 Hz, 1H), 2.35-2.44 (m, 2H), 2.47-2.59 (m, 1H), 2.75 (d, J=11.2 Hz, 1H), 2.96 (d, J=10.1 Hz, 1H), 3.63 (t, J=6.3 Hz, 2H), 4.11 (q, J=7.1 Hz, 2H).

Step 3: (1-(3-((tert-butyldimethylsilyl)oxy)propyl)piperidin-3-yl)methanol

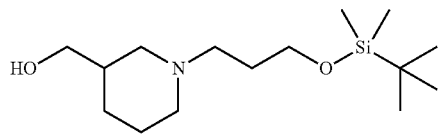 [SMILES: CC(C)(C)[Si](C)(C)OCCCN1CCCC(CO)C1]

To a stirred solution of 1-(3-((tert-butyidimethylsilyl)oxy)propyl)piperidine-3-carboxylate (100 mg, 0.30 mmol) in THF (2 mL) was added lithium aluminium hydride (1M in THF) (0.6 mL, 0.60 mmol) at 0° C. and the reaction mass was stirred at 0° C. for 1 h. Upon completion, the reaction mass was quenched with aq. saturated $Na_2SO_4$ solution at 0° C. and filtered. The filtrate was evaporated to afford (1-(3-((tert-butyldimethylsilyl)oxy)propyl)piperidin-3-yl)methanol (80 mg, 92%) as colorless oil which was used for the next step without further purification. $^1$H NMR (400 MHz, Chloroform-d) δ 0.03 (s, 6H), 0.88 (s, 9H), 1.10-1.23 (m, 11H), 1.49-1.87 (m, 7H), 1.95-2.24 (m, 2H), 2.32-2.41 (m, 2H), 2.50-2.67 (m, 1H), 2.77 (d, J=11.0 Hz, 1H), 3.54 (dd, J=5.7, 10.5 Hz, 1H), 3.59-3.71 (m, 3H).

Step 4: 3-((4,4-bis(((Z)-oct-5-en-1-yl)oxy)butanoyl)oxy)-2-(((((1-(3-((tert-butyldimethylsilyl)oxy)propyl)piperidin-3-yl)methoxy)carbonyl)oxy)methyl)propyl (9Z,12Z)-octadeca-9,12-dienoate

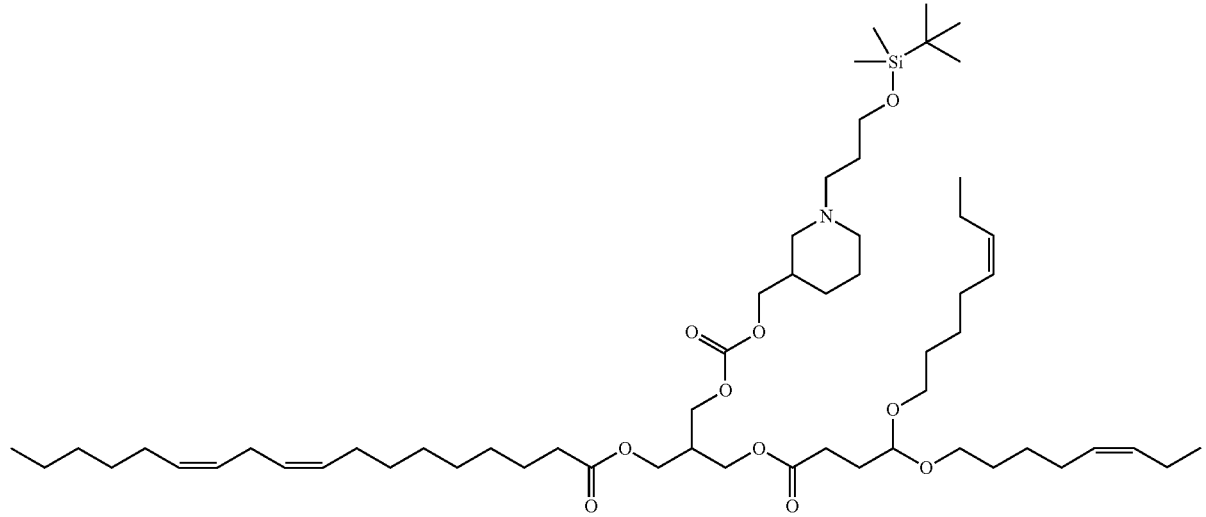 [SMILES: CC/C=C\CCCCOC(CCC(=O)OCC(COC(=O)CCCCCCC/C=C\C/C=C\CCCCC)COC(=O)OCC1CCCN(CCCO[Si](C)(C)C(C)(C)C)C1)OCCCC/C=C\CC]

To a stirred solution of 3-((4,4-bis(((Z)-oct-5-en-1-yl)oxy)butanoyl)oxy)-2-(hydroxymethyl)propyl (9Z,12Z)-octadeca-9,12-dienoate (Intermediate IVa) (50 mg, 0.07 mmol) in DCM (1.0 mL) was added pyridine (0.01 mL, 0.14 mmol), N, N-dimethylpyridin-4-amine (2.65 mg, 0.02 mmol) and 4-nitrophenyl chloroformate (36.18 mg, 0.14 mmol) and stirred at RT for 1 h. After 1 h, (1-(3-((tert-butyldimethylsilyl)oxy)propyl)piperidin-3-yl) (83.06 mg, 0.28 mmol) and DIPEA (0.05 mL, 0.28 mmol) were added and stirred at 25° C. for 16 h. Upon completion, the reaction mixture was diluted with DCM (10 mL), washed with 1M sodium carbonate solution (3×10 mL), and washed with water (10 mL) and brine. The combined organic part was dried over $Na_2SO_4$, filtered and concentrated under reduced pressure and purified by combiflash column chromatography, eluted with 2% MeOH-DCM to afford 3-((4,4-bis(((Z)-oct-5-en-1-yl)oxy)butanoyl)oxy)-2-(((((1-(3-((tert-butyldimethylsilyl)oxy)propyl)piperidin-3-yl)methoxy)carbonyl)oxy)methyl)propyl (9Z,12Z)-octadeca-9,12-dienoate (50 mg, 30%) as pale yellow oil. LCMS (Method B): found m/z for (M+H)=1005.1, RT=1.12 min.

Step 5: 3-((4,4-bis(((Z)-oct-5-en-1-yl)oxy)butanoyl)oxy)-2-(((((1-(3-hydroxypropyl)piperidin-3-yl)methoxy)carbonyl)oxy)methyl)propyl (9Z,12Z)-octadeca-9,12-dienoate (Example 125). To a solution of 3-((4,4-bis(((Z)-oct-5-en-1-yl)oxy)butanoyl)oxy)-2-(((((1-(3-((tert-butyldimethylsilyl)oxy)propyl)piperidin-3-yl)methoxy)carbonyl)oxy)methyl)propyl (9Z,12Z)-octadeca-9,12-dienoate (85 mg, 0.085 mmol) in dry THF (1.0 mL) at 0° C. was added tetra-n-butyl ammonium fluoride (TBAF) (0.17 mL, 0.17 mmol) (1 M solution in tetrahydrofuran). The resulting solution was stirred for 4 h after allowing the mixture to warm to 25° C. The resulting solution was diluted with DCM (10 mL) and quenched with water (5 mL). The organic layer was extracted with DCM (2×5 mL), brine (5 mL) and dried over anhydrous $Na_2SO_4$, filtered and concentrated under reduced pressure. The crude material thus obtained was purified by combiflash column chromatography, eluted with 1.5% MeOH-DCM to afford 3-((4,4-bis(((Z)-oct-5-en-1-yl)oxy)butanoyl)oxy)-2-(((((1-(3-hydroxypropyl)piperidin-3-yl)methoxy)carbonyl)oxy)methyl)propyl (9Z,12Z)-octadeca-9,12-dienoate (36 mg, 52%) as light yellow sticky gum LCMS (Method B): found m/z for (M+H) 891.0, RT=1.61 min.

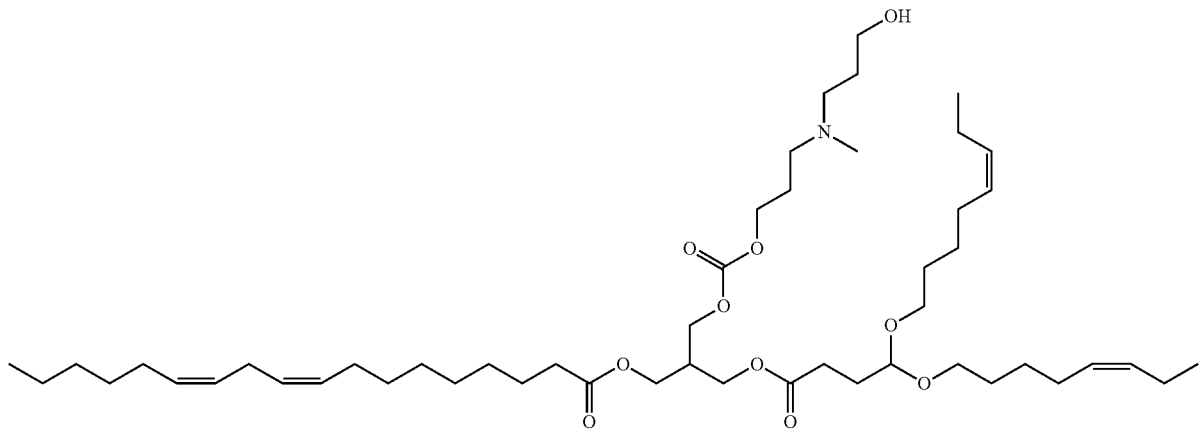 [SMILES: CC/C=C\CCCCOC(CCC(=O)OCC(COC(=O)CCCCCCC/C=C\C/C=C\CCCCC)COC(=O)OCCCN(C)CCCO)OCCCC/C=C\CC]

Example 126

Example 126, 3-((4,4-bis(((Z)-oct-5-en-1-yl)oxy)butanoyl)oxy)-2-((((3-((3-hydroxypropyl)(methyl)amino)propoxy)carbonyl)oxy)methyl)propyl (9Z,12Z)-octadeca-9,12-dienoate Step 1: 3,3'-(methylazanediyl)bis(propan-1-ol)

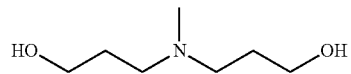

To a stirred solution of 3-(methylamino)propan-1-ol (100 mg, 1.12 mmol) in EtOH (2 mL) were added Na$_2$CO$_3$ (260 mg, 2.24 mmol) and 3-chloropropanol (0.1 mL, 1.12 mmol) under argon atmosphere. Reaction mixture was refluxed at 80° C. for 4 h. Upon completion, the reaction mixture was concentrated under reduced pressure. Crude material thus obtained was purified by combiflash column chromatography, eluted with 2% acetone-hexane to afford 3,3'-(methylazanediyl)bis(propan-1-ol) (90 mg, 55%) as colorless oil. $^1$H NMR (400 MHz, DMSO-d$_6$) δ 1.53-1.67 (m, 2H), 1.68-1.78 (m, 1H), 1.84 (t, J=6.2 Hz, 1H), 2.26 (s, 2H), 2.52 (d, J=6.7 Hz, 3H), 2.90 (t, J=7.5 Hz, 1H), 3.39-3.51 (m, 61H), 3.68 (t, J=6.5 Hz, 1H).

Step 2: 3-((4,4-bis(((Z)-oct-5-en-1-yl)oxy)butanoyl)oxy)-2-((((3-((3-hydroxypropyl)(methyl)amino)propoxy)carbonyl)oxy)methyl)propyl (9Z,12Z)-octadeca-9,12-dienoate (Example 126). Prepared from Intermediate IVa and 3,3'-(methylazanediyl)bis(propan-1-ol) according to General Procedure D, yield 18 mg (23%) LCMS (Method B): found m/z for (M+H)=864.7, RT=1.55 min

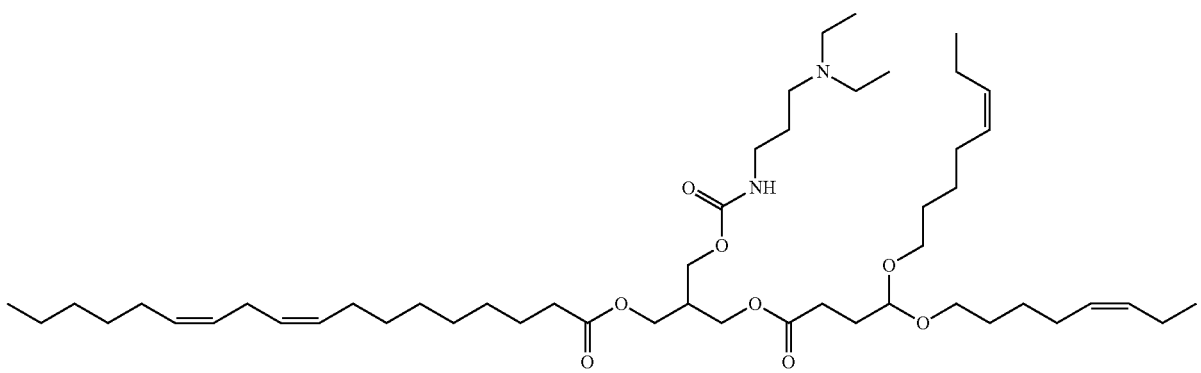 [SMILES: CC/C=C\CCCCOC(CCC(=O)OCC(COC(=O)CCCCCCC/C=C\C/C=C\CCCCC)COC(=O)NCCCN(CC)CC)OCCCC/C=C\CC]

Example 127

Example 127, 3-((4,4-bis(((Z)-oct-5-en-1-yl)oxy)butanoyl)oxy)-2-((((3-(diethylamino)propyl)carbamoyl)oxy)methyl)propyl (9Z,12Z)-octadeca-9,12-dienoate-prepared from Intermediate IVa and N1,N1-diethylpropane-1,3-diamine according to General Procedure D, yield 32 mg (53%). LCMS (Method B): found m/z for (M+H)=848.0, RT=1.55 min.

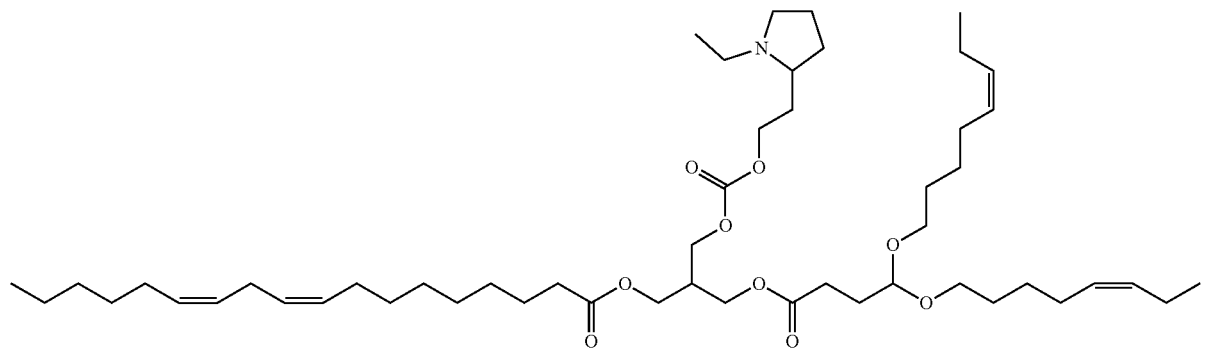 [SMILES: CC/C=C\CCCCOC(CCC(=O)OCC(COC(=O)CCCCCCC/C=C\C/C=C\CCCCC)COC(=O)OCCC1CCCN1CC)OCCCC/C=C\CC]

Example 128

Example 128, 3-((4,4-bis(((Z)-oct-5-en-1-yl)oxy)butanoyl)oxy)-2-((((2-(1-ethylpyrrolidin-2-yl)ethoxy)carbonyl)oxy)methyl)propyl (9Z,12Z)-octadeca-9,12-dienoate Step 1: 2-(1-ethylpyrrolidin-2-yl)ethan-1-ol

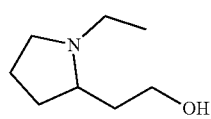

The following is representative of General Procedure G. To a stirred solution of 2-(pyrrolidin-2-yl)ethan-1-ol (20 mg, 0.21 mmol) in acetonitrile (1 mL) were added $K_2CO_3$ (72 mg, 0.65 mmol) and EtI (0.01 mL, 0.21 mmol) under nitrogen atmosphere. The resulting mixture was stirred at 56° C. for 16 h. Reaction mass was cooled to room temperature and it was filtered through celite bed, filtrate was evaporated under reduced pressure to afford 2-(1-ethylpyrrolidin-2-yl)ethan-1-ol (18 mg, 58%) as colorless liquid. $^1$H NMR (400 MHz, Chloroform-d) δ 1.08 (t, J=7.2 Hz, 3H), 1.37-1.48 (m, 1H), 1.65-1.96 (m, 5H), 1.92-2.05 (m, 1H), 2.04-2.18 (m, 2H), 2.72-2.83 (m, 1H), 2.87-3.04 (m, 1H), 3.10-3.20 (m, 1H), 3.62-3.72 (n, 1H), 3.89-4.05 (m, 1H).

3-((4,4-bis(((Z)-oct-5-en-1-yl)oxy)butanoyl)oxy)-2-((((2-(1-ethylpyrrolidin-2-yl)ethoxy)carbonyl)oxy)methyl)propyl (9Z,12Z)-octadeca-9,12-dienoate (Example 128). Prepared from Intermediate IVa and 2-(1-ethylpyrrolidin-2-yl)ethan-1-ol according to General Procedure D, yield 28 mg (52%). LCMS (Method B): found m/z for (M+H) 860.8, RT=1.55 min.

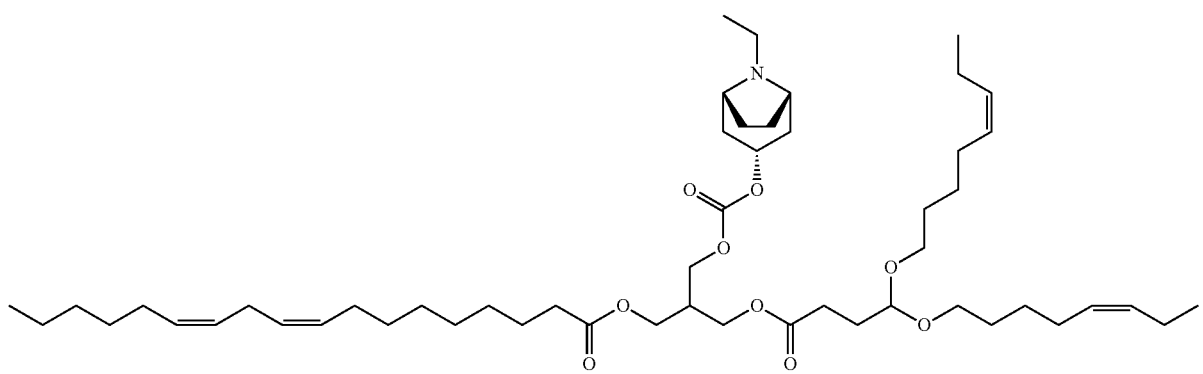 [SMILES: CC/C=C\CCCCOC(CCC(=O)OCC(COC(=O)CCCCCCC/C=C\C/C=C\CCCCC)COC(=O)O[C@@H]1C[C@H]2CC[C@@H](C1)N2CC)OCCCC/C=C\CC]

Example 129

Example 129, 3-((4,4-bis(((Z)-oct-5-en-1-yl)oxy)butanoyl)oxy)-2-((((((1R,3s,5S)-8-ethyl-8-azabicyclo[3.2.1]octan-3-yl)oxy)carbonyl)oxy)methyl)propyl (9Z,2Z)-octadeca-9,12-dienoate Step 1: (1R,3r,5S)-8-ethyl-8-azabicyclo[3.2.1]octan-3-ol

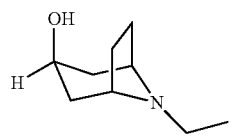

Prepared from (1R,3r,5S)-8-azabicyclo[3.2.1]octan-3-ol according to General Procedure G, yield 180 mg, 73%.

Step 2: -((4,4-bis(((Z)-oct-5-en-1-yl)oxy)butanoyl)oxy)-2-((((((1R,3s,5S)-8-ethyl-8-azabicyclo[3.2.1]octan-3-yl)oxy)carbonyl)oxy)methyl)propyl (9Z,12Z)-octadeca-9,12-dienoate (Example 129). Prepared from Intermediate IVa and (1R,3r,5S)-8-ethyl-8-azabicyclo[3.2.1]octan-3-ol according to General Procedure D, yield 16 mg (51%) LCMS (Method B): found m/z for (M+H)=872.8, RT=1.70 min.

Example 130

Example 130, 3-((4,4-bis(((Z)-oct-5-en-1-yl)oxy)butanoyl)oxy)-2-((((((1R,3r,5S)-8-ethyl-8-azabicyclo[3.2.1]octan-3-yl)oxy)carbonyl)oxy)methyl)propyl (9Z,12Z)-octadeca-9,12-dienoate Step 1: (1R,3r,5S)-8-ethyl-8-azabicyclo[3.2.1]octan-3-ol

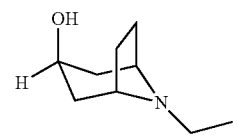

Prepared from (1R,3r,5S)-8-azabicyclo[3.2.1]octan-3-ol according to General Procedure G, yield 80 mg (92%).

Step 2: 3-((4,4-bis(((Z)-oct-5-en-1-yl)oxy)butanoyl)oxy)-2-((((((1R,3r,5S)-8-ethyl-8-azabicyclo[3.2.1]octan-3-yl)oxy)carbonyl)oxy)methyl)propyl (9Z,12Z)-octadeca-9,12-dienoate (Example 130). Prepared from Intermediate IVa and (1R,3r,5S)-8-ethyl-8-azabicyclo[3.2.1]octan-3-ol according to General Procedure D, yield 16 mg (51%) LCMS (Method B): found m/z for (M+H)=872.9, RT=1.64 mi.

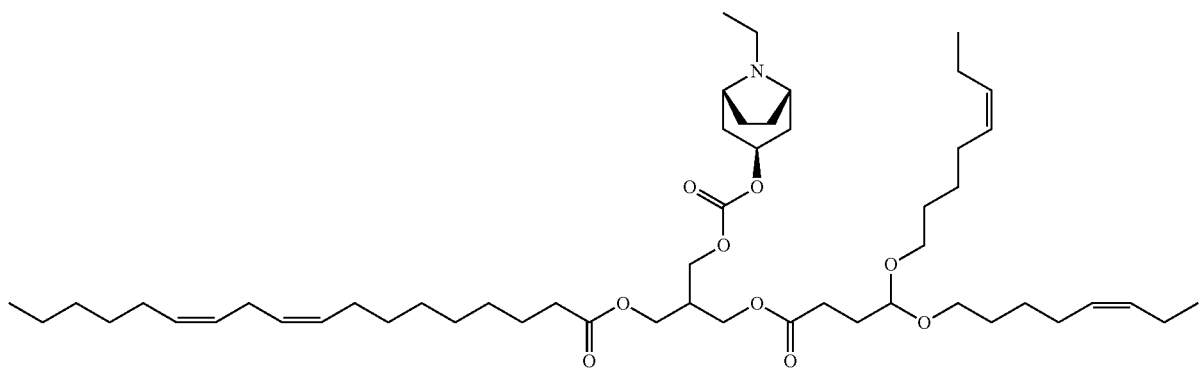 [SMILES: CC/C=C\CCCCOC(CCC(=O)OCC(COC(=O)CCCCCCC/C=C\C/C=C\CCCCC)COC(=O)O[C@H]1C[C@H]2CC[C@@H](C1)N2CC)OCCCC/C=C\CC]

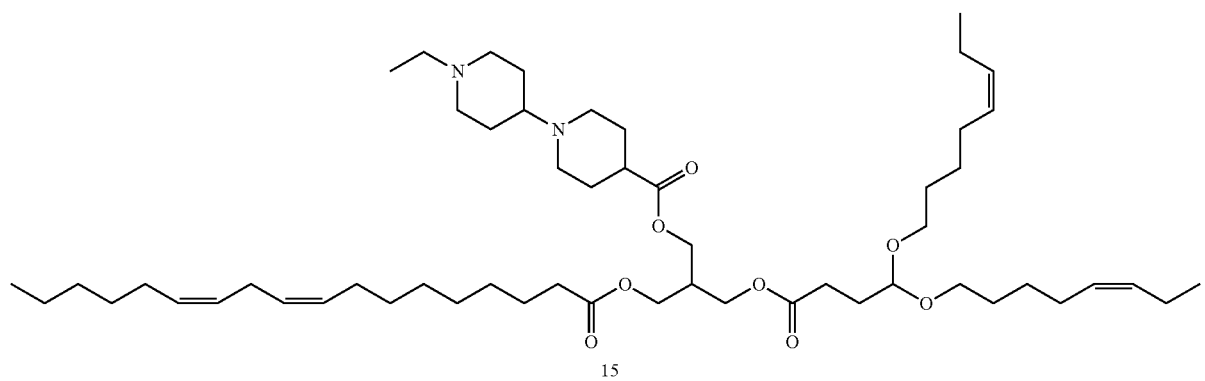

Example 131

Example 131, 3-((4,4-bis(((Z)-oct-5-en-1-yl)oxy)butanoyl)oxy)-2-((((9Z,12Z)-octadeca-9,12-dienoyl)oxy)methyl)propyl 1'-ethyl-[1,4'-bipiperidine]-4-carboxylate: prepared from Intermediate IVa and 1'-ethyl-[1,4'-bipiperidine]-4-carboxylic acid dihydrochloride according to General Procedure E, yield 138 mg (52%). LCMS (Method A): found m/z for (M+H)=913.7, RT=3.21 min.

Example 132

Example 132, 3-((4,4-bis((7,7,8,8,8-pentafluorooctyl)oxy)butanoyl)oxy)-2-((((9Z,12Z)-octadeca-9,12-dienoyl)oxy)methyl)propyl 1'-ethyl-[1,4'-bipiperidine]-4-carboxylate: prepared from Intermediate IVf and 1'-ethyl-[1,4'-bipiperidine]-4-carboxylic acid dihydrochloride according to General Procedure E, yield 195 mg (78%). LCMS (Method A): found m/z for (M+H)=1097.5, RT=3.19 min.

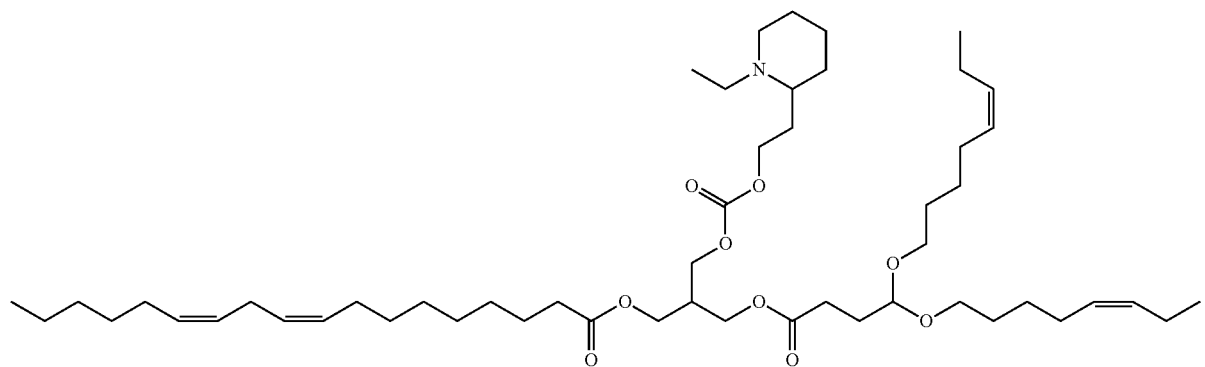 [SMILES: CC/C=C\CCCCOC(CCC(=O)OCC(COC(=O)CCCCCCC/C=C\C/C=C\CCCCC)COC(=O)OCCC1CCCCN1CC)OCCCC/C=C\CC]

Example 133

Example 133, 3-((4,4-bis(((Z)-oct-5-en-1-yl)oxy)butanoyl)oxy)-2-((((2-(1-ethylpiperidin-2-yl)ethoxy)carbonyl)oxy)methyl)propyl (9Z,12Z)-octadeca-9,12-dienoate: prepared from Intermediate IVa and 2-(1-ethylpiperidin-2-yl)ethan-1-ol according to General Procedure D, yield 38 mg (40%). LCMS (Method A): found m/z for (M+H)=874.7, RT=3.98 min.

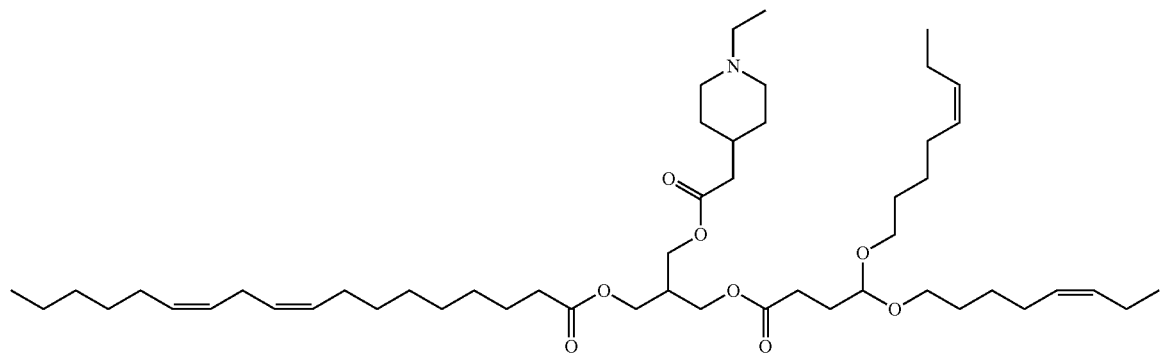 [SMILES: CC/C=C\CCCCOC(CCC(=O)OCC(COC(=O)CCCCCCC/C=C\C/C=C\CCCCC)COC(=O)CC1CCN(CC)CC1)OCCCC/C=C\CC]

Example 134

Example 134, 3-((4,4-bis(((Z)-oct-5-en-1-yl)oxy)butanoyl)oxy)-2-((2-(1-ethylpiperidin-4-yl)acetoxy)methyl) propyl (9Z,12Z)-octadeca-9,12-dienoate: prepared from Intermediate IVa and 2-(1-ethylpiperidin-4-yl)acetic acid according to General Procedure E, yield 66 mg (72%). LCMS (Method A): found m/z for (M+H)=844.7, RT=3.95 min.

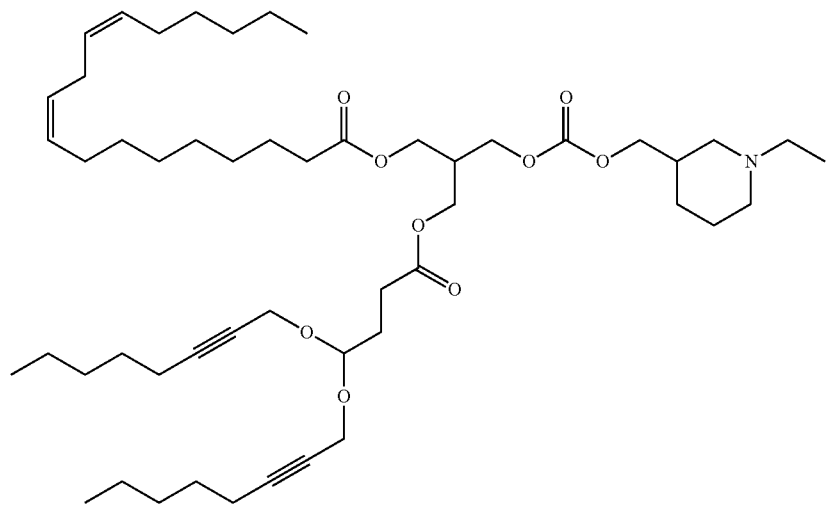 [SMILES: CCCCCC#CCOC(CCC(=O)OCC(COC(=O)CCCCCCC/C=C\C/C=C\CCCCC)COC(=O)OCC1CCCN(CC)C1)OCC#CCCCCC]

Example 135

Example 135, 3-((4,4-bis(oct-2-yn-1-yloxy)butanoyl)oxy)-2-(((((1-ethylpiperidin-3-yl)methoxy)carbonyl)oxy)methyl)propyl (9Z,12Z)-octadeca-9,12-dienoate: prepared using similar procedures as Example 3, substituting oct-2-yn-1-ol for (Z)-oct-5-en-1-ol in General Procedure A, Yield of final step: 91 mg (92%). LCMS (Method A): found m/z for (M+H)=856.7, RT=3.63 min.

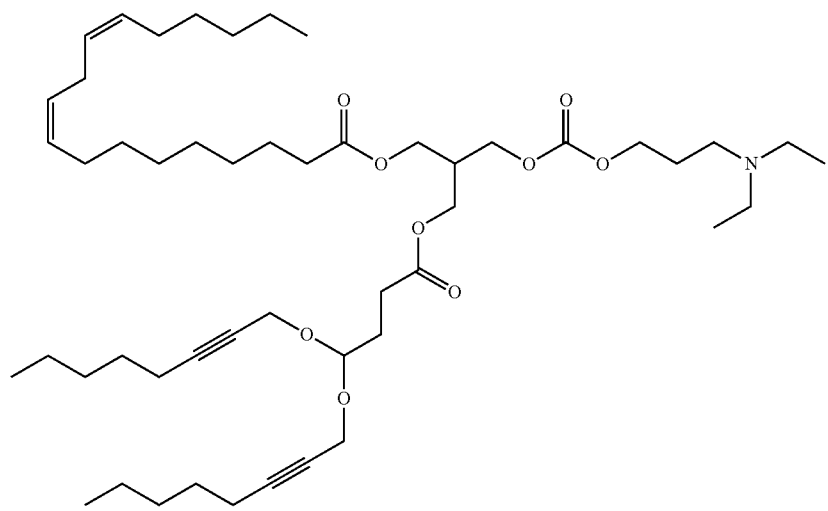 [SMILES: CCCCCC#CCOC(CCC(=O)OCC(COC(=O)CCCCCCC/C=C\C/C=C\CCCCC)COC(=O)OCCCN(CC)CC)OCC#CCCCCC]

Example 136

Example 136, 3-((4,4-bis(oct-2-yn-1-yloxy)butanoyl)oxy)-2-((((3-(diethylamino)propoxy)carbonyl)oxy)methyl) propyl (9Z,12Z)-octadeca-9,12-dienoate: prepared using similar procedures as Example 1, substituting oct-2-yn-1-ol for (Z)-oct-5-en-1-ol in General Procedure A. Yield of final step: 80 mg (82%). LCMS (Method A): found m/z for (M+H)=844.7, RT=3.66 min.

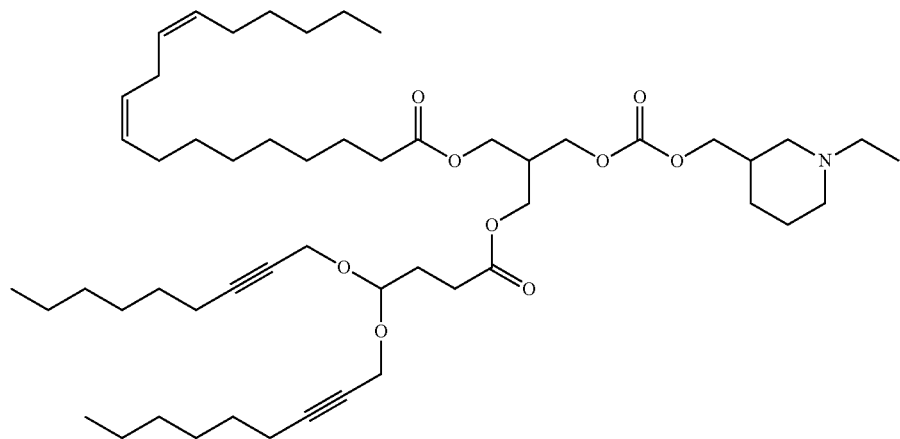

Example 137

Example 137, 3-((4,4-bis(non-2-yn-1-yloxy)butanoyl)oxy)-2-(((((1-ethylpiperidin-3-yl)methoxy)carbonyl)oxy)methyl)propyl (9Z,12Z)-octadeca-9,12-dienoate: prepared using similar procedures as Example 3, substituting non-2-yn-1-ol for (Z)-oct-5-en-1-ol in General Procedure A. Yield of final step: 86 mg (88%). LCMS (Method A): found m/z for (M+H)=884.7, RT=3.73 min

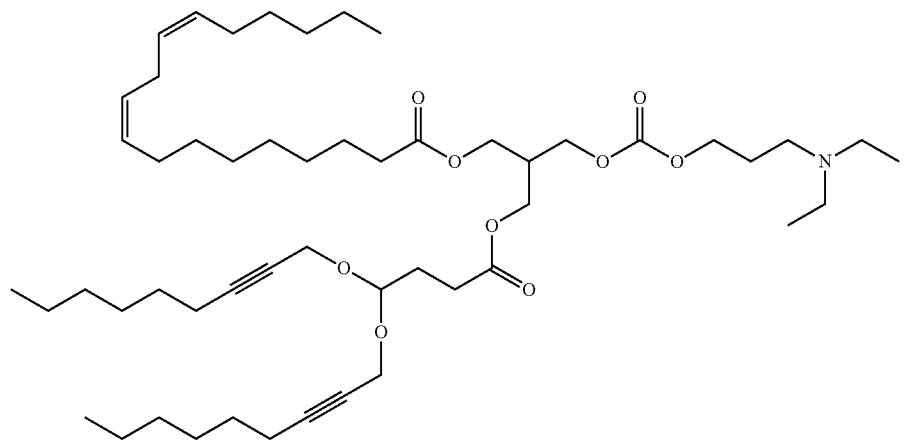

Example 138

Example 138, 3-((4,4-bis(non-2-yn-1-yloxy)butanoyl)oxy)-2-((((3-(diethylamino)propoxy)carbonyl)oxy)methyl)propyl (9Z,12Z)-octadeca-9,12-dienoate-prepared using similar procedures as Example 1, substituting non-2-yn-1-ol for (Z)-oct-5-en-1-ol in General Procedure A. Yield of final step: 87 mg (90%). LCMS (Method A): found m/z for (M+H)=872.7, RT=3.69 min.

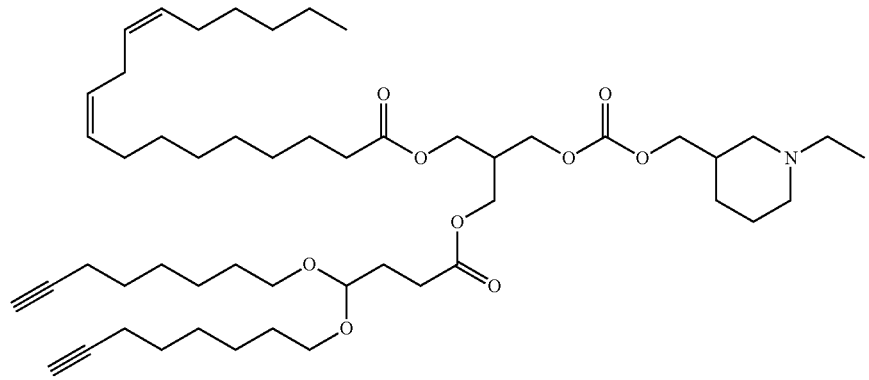

Example 139

Example 139, 3-((4,4-bis(oct-7-yn-1-yloxy)butanoyl)oxy)-2-(((((1-ethylpiperidin-3-yl)methoxy)carbonyl)oxy)methyl)propyl (9Z,12Z)-octadeca-9,12-dienoate-prepared using similar procedures as Example 3, substituting oct-7-yn-1-ol for (Z)-oct-5-en-1-ol in General Procedure A. Yield of final step: 111 mg (84%) LCMS (Method A): found m/z for (M+H)=856.7, RT=3.74 min.

Example 140

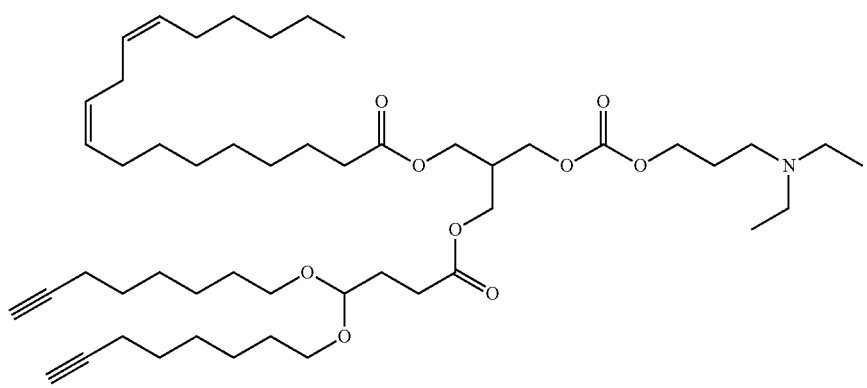

Example 140, 3-((4,4-bis(oct-7-yn-1-yloxy)butanoyl)oxy)-2-((((3-(diethylamino)propoxy)carbonyl)oxy)methyl)propyl (9Z,12Z)-octadeca-9,12-dienoate: prepared using similar procedures as Example 1, substituting oct-7-yn-1-ol for (Z)-oct-5-en-1-ol in General Procedure A. Yield of final step 108 mg (83%). LCMS (Method A): found m/z for (M+H)=844.7, RT=3.76 min.

Example 141

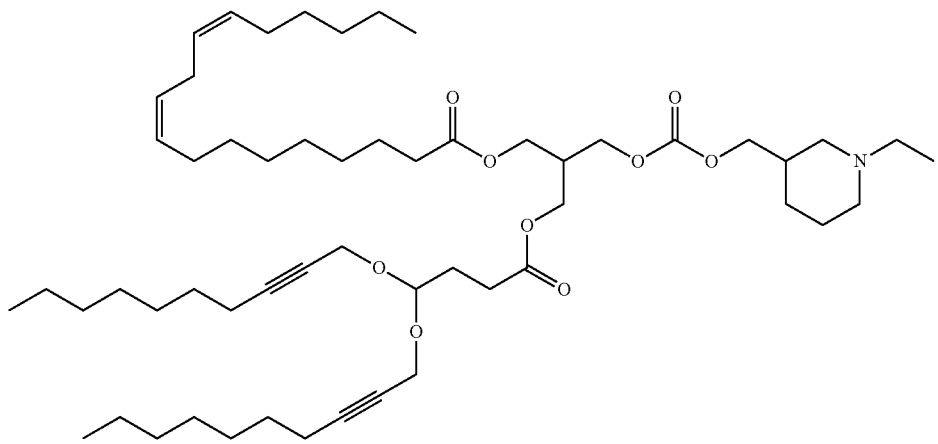

Example 141, 3-((4,4-bis(dec-2-yn-1-yloxy)butanoyl)oxy)-2-(((((1-ethylpiperidin-3-yl)methoxy)carbonyl)oxy)methyl)propyl (9Z,12Z)-octadeca-9,12-dienoate: prepared using similar procedures as Example 3, substituting dec-2-yn-1-ol for (Z)-oct-5-en-1-ol in General Procedure A. Yield of final step: 122 mg (88%). LCMS (Method A): found m/z for (M+H)=912.8, RT=4.13 min.

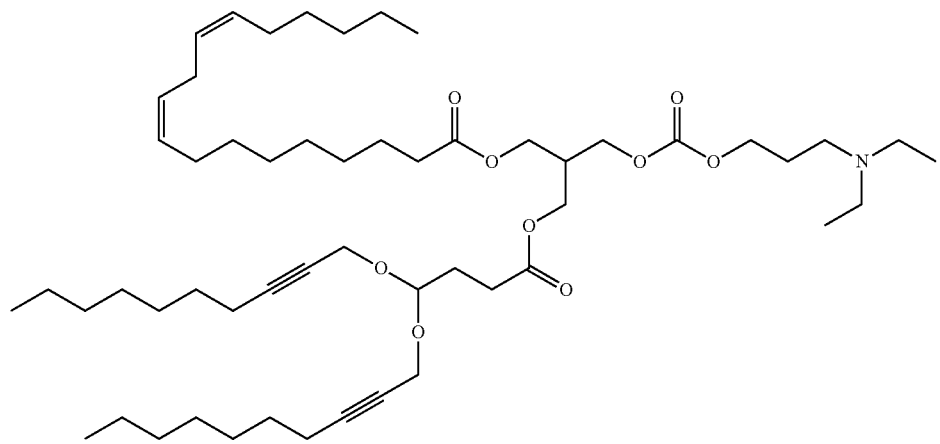

Example 142

Example 142, 3-((4,4-bis(dec-2-yn-1-yloxy)butanoyl) oxy)-2-((((3-(diethylamino)propoxy)carbonyl)oxy)methyl) propyl (9Z,12Z)-octadeca-9,12-dienoate-prepared using similar procedures as Example 1, substituting dec-2-yn-1-ol for (Z)-oct-5-en-1-ol in General Procedure A. Yield of final step: 115 mg (84%). LCMS (Method A): found m/z for (M+H)=900.8, RT=4.04 min.

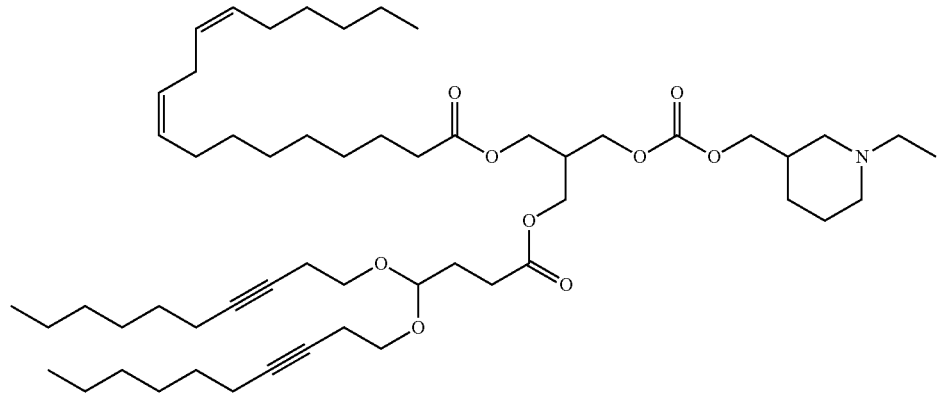

Example 143

Example 143, 3-((4,4-bis(dec-3-yn-1-yloxy)butanoyl) oxy)-2-(((((1-ethylpiperidin-3-yl)methoxy)carbonyl)oxy) methyl)propyl (9Z,12Z)-octadeca-9,12-dienoate: prepared using similar procedures as Example 3, substituting dec-3-yn-1-ol for (Z)-oct-5-en-1-ol in General Procedure A. Yield of final step: 104 mg (89%). LCMS (Method A): found m/z for (M+H)=912.8, RT=3.97 min.

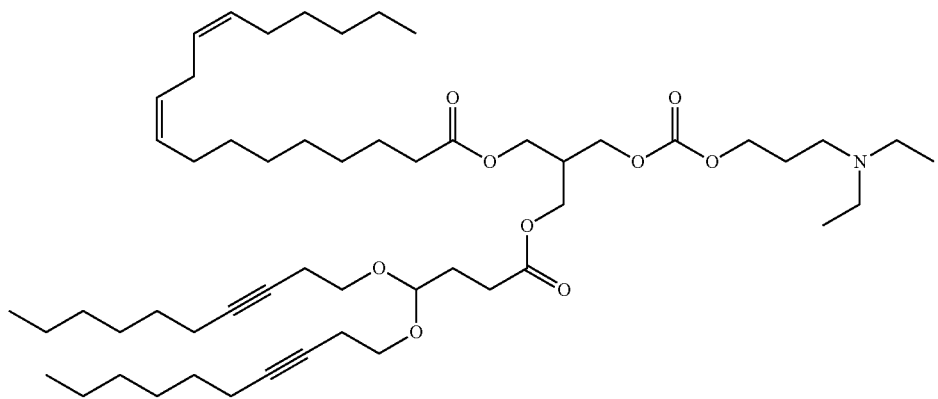

Example 144

Example 144, 3-((4,4-his(dec-3-yn-1-yloxy)butanoyl) oxy)-2-((((3-(diethylamino)propoxy)carbonyl)oxy)methyl) propyl (9Z,12Z)-octadeca-9,12-dienoate: prepared using similar procedures as Example 1, substituting dec-3-yn-1-ol for (Z)-oct-5-en-1-ol in General Procedure A. Yield of final step: 108 mg (94%). LCMS (Method A): found m/z for (M+H)=900.8, RT=3.93 min.

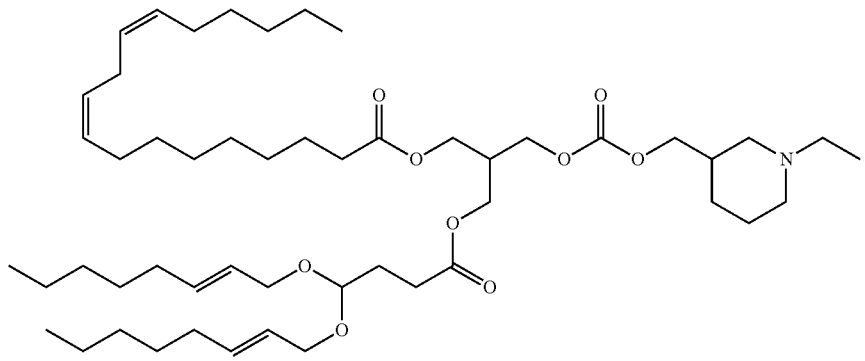

Example 145

Example 145, 3-((4,4-bis(((Z)-oct-2-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared using similar procedures as Example 3, substituting (E)-oct-2-en-1-ol for (Z)-oct-5-en-1-ol in General Procedure A. Yield of final step: 74 mg (89%) LCMS (Method A): found m/z for (M+H)=860.7, RT=3.87 min.

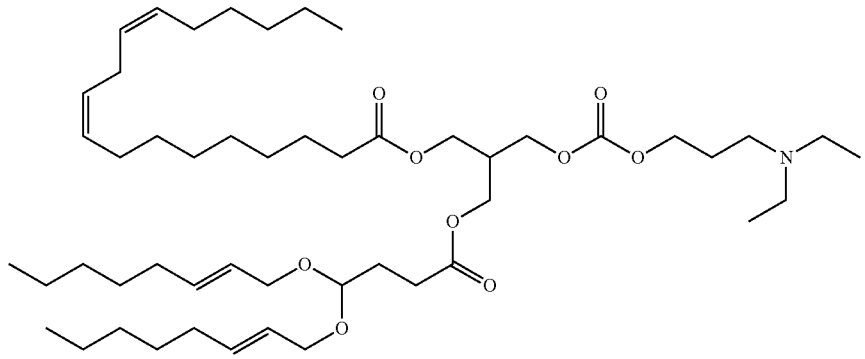

Example 146

Example 146, 34(4,4-bis(((E)-oct-2-en-1-yl)oxy)butanoyl)oxy)-2-((((3-(diethylamino)propoxy)carbonyl)oxy)methyl)propyl (9Z,12Z)-octadeca-9,12-dienoate-prepared using similar procedures as Example 1, substituting (E)-oct-2-en-1-ol for (Z)-oct-5-en-1-ol in General Procedure A. Yield of final step 68 mg (83%). LCMS (Method A): found m/z for (M+H)=848.8, RT=3.89 min.

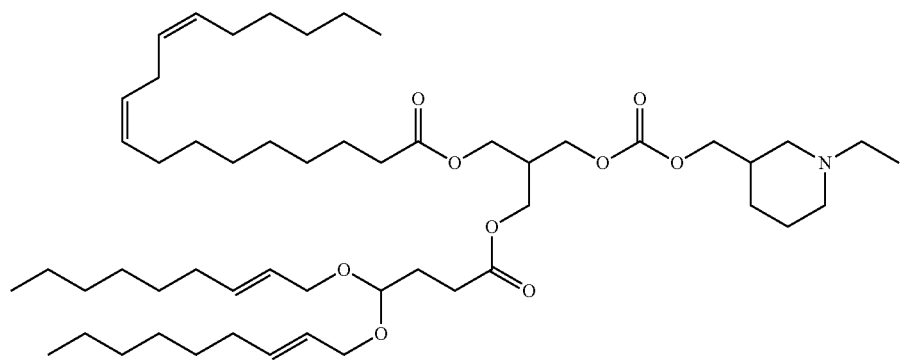

Example 147, 3-((4,4-bis(((F)-non-2-en-1-yl)oxy)butanoyl)oxy)-2-(((((1-ethylpiperidin-3-yl)methoxy)carbonyl)oxy)methyl)propyl (9Z,12Z)-octadeca-9,12-dienoate: prepared using similar procedures as Example 3, substituting (E)-non-2-en-1-ol for (Z)-oct-5-en-1-ol in General Procedure A. Yield of final step: 68 mg (81%) LCMS (Method A): found m/z for (M+H)=888.8, RT=4.01 min.

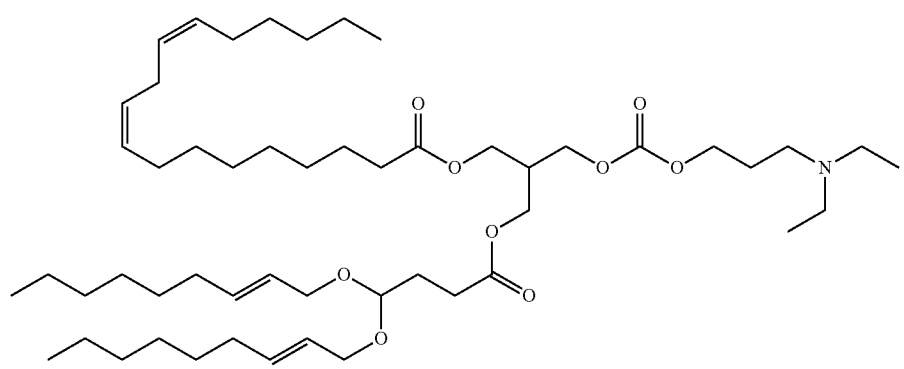

Example 148, 3-((4,4-bis(((E)-non-2-en-1-yl)oxy)butanoyl)oxy)-2-((((3-(diethylamino)propoxy)carbonyl)oxy)methyl)propyl (9Z,12Z)-octadeca-9,12-dienoate: prepared using similar procedures as Example 1, substituting (E)-non-2-en-1-ol for (Z)-oct-5-en-1-ol in General Procedure A. Yield of final step: 34 mg (41%) LCMS (Method A): found m/z for (M+H)=877.9, RT=4.07 min.

Lipid Nanoparticles

F. LNP Formulation

The lipid nanoparticle components are dissolved in 100% ethanol at specified lipid component molar ratios. The nucleic acid (NA) cargo is dissolved in 10 mM citrate, 100 mM NaCl, pH 4.0, resulting in a concentration of NA cargo of approximately 0.22 mg/mL. In some embodiments, NA cargos consist of both a functional NA (e.g. siRNA, antisense, expressing DNA, mRNA) as well as a reporter DNA barcode (as previously described by Sago, 2018 PNAS) mixed at mass ratios of 1:10 to 10:1 functional NA to barcode.

The LNPs are formulated with a total lipid to NA mass ratio of 11.7. The LNPs are formed by microfluidic mixing of the lipid and NA solutions using a Precision Nanosystems NanoAssemblr Spark or Benchtop Instrument, according to the manufacturers protocol. A 2:1 ratio of aqueous to organic solvent is maintained during mixing using differential flow rates. After mixing, the LNPs are collected, diluted in PBS (approximately 1:1 v/v), and further buffer exchange is conducted using dialysis in PBS at 4° C. for 8 to 24 hours against a 20 kDa filter. After this initial dialysis, each individual LNP formulation is characterized via DLS to measure the size and polydispersity, and the pKa of a subpopulation of LNPs is measured via TNS assay. LNPs falling within specific diameter and polydispersity ranges are pooled, and further dialyzed against PBS at 4° C. for 1 to 4 hours against a 100 kDa dialysis cassette. After the second dialysis, LNPs are sterile filtered using 0.22 μM filter and stored at 4° C. for further use.

G. LNP Characterization

DLS—LNP hydrodynamic diameter and polydispersity percent (PDI %) are measured using high throughput dynamic light scattering (DLS) (DynaPro plate reader II, Wyatt). LNPs were diluted 1×PBS to an appropriate concentration and analyzed.

Concentration & Encapsulation Efficiency—Concentration of NA is determined by Qubit microRNA kit (for siRNA) or HS RNA kit (for mRNA) per manufacturer's instructions. Encapsulation efficiency are determined by measuring unlysed and lysed LNPs.

pKa—A stock solution of 10 mM HEPES (Sigma Aldrich), 10 mM MES (Sigma Aldrich), 10 mM sodium acetate (Sigma), and 140 nM sodium chloride (Sigma Aldrich) is prepared and pH adjusted using hydrogen chloride and sodium hydroxide to a range of pH 4-10. Using 4 replicates for each pH, 140 µL pH-adjusted buffer is added to a 96-well plate, followed by the addition 5 µL of 2-(p-toluidino)-6-napthalene sulfonic acid (60 µg, mL). 5 µL of LNP is added to each well. After 5 min of incubation under gentle shaking, fluorescence is measured using an excitation wavelength of 325 nm and emission wavelength of 435 nm (BioTek Synergy H4 Hybrid).

LNP Administration—Male and female mice aged approximately 8-12 weeks are used for all studies. Each mouse is temporarily restrained, and pooled LNP is administered IV via tail vein injection in up to five animals per experiment. Age-matched mice are also used to administer vehicle (1×PBS) via tail vein injection in up to three animals per experiment. At 72 hours post-dose, tissues including liver, spleen, bone marrow and blood are collected for analysis.

Flow—Liver tissues are mechanically, and then enzymatically digested using a mixture of proteinases, then passed through a 70 uM filter to generate single cell suspensions. Spleen tissues are mechanically digested to generate single cell suspensions. All tissues are treated with ACK buffer to lyse red blood cells, and then stained with fluorescently-labeled antibodies for flow cytometry and fluorescence-activated cell sorting (FACS). All antibodies are commercially available antibodies. Using a BD FACSMelody (Becton Dickinson), all samples are acquired via flwo cytometry to generate gates prior to sorting. In general, the gating structure is size→singlet cells→live cells→cells of interest. T cells are defined as CD45+CD3+, monocytes are defined as CD45+CD11b+, and B cells are defined as CD45+CD19+. In the liver, endothelial cells are defined as CD31+, Kupffer cells as CD45+CD11b+ and hepatocytes as CD3−/CD45−. For siRNA studies, we gate for downregulation of the target gene, whereas for mRNA studies, we gate for upregulation of the target gene. Tissues from vehicle-dosed mice are used to set the gates for sorting. Up to 20,000 cells of each cell subset with the correct phenotype are sorted into 1×PBS. After sorting, cells were pelleted via centrifugation and DNA is extracted using Quick Extract DNA Extraction Solution (Lucigen) according to the manufacturer's protocol. DNA is stored at −20° C.

Barcoding Sequencing—DNA (genomic and DNA barcodes) are isolated using QuickExtract (Lucigen) and sequenced using Illumina MiniSeq as previously described (Sago et al. PNAS 2018, Sago et al. JACs 2018, Sago, Lokugamage et al. Nano Letters 2018), normalizing frequency DNA barcode counts in FACS isolated samples to frequency in injected input. These data are plotted as 'Normalized Fold Above Input'.

H. Confirmation

LNP Formulation

The lipid nanoparticle components are dissolved in 100% ethanol at specified lipid component molar ratios. The nucleic acid (NA) cargo is dissolved in 10 mM citrate, 100 mM NaCl, pH 4.0, resulting in a concentration of NA cargo of approximately 0.22 mg/mL. In some embodiments, NA cargos consist of a functional NA (e.g. siRNA, anti-sense, expressing DNA, mRNA). The LNPs are formulated with a total lipid to NA mass ratio of 11:7. The LNPs are formed by microfluidic mixing of the lipid and NA solutions using a Precision Nanosystems NanoAssemblr Spark or Benchtop Instrument, according to the manufacturers protocol. A 3:1 ratio of aqueous to organic solvent is maintained during mixing using differential flow rates. After mixing, the LNPs are collected, diluted in PBS (approximately 1:1 v/v), and further buffer exchange is conducted using dialysis in PBS at 4° C. for 8 to 24 hours against a 20 kDa filter. After this initial dialysis, each individual LNP formulation is characterized via DLS to measure the size and polydispersity, and the pKa of a subpopulation of LNPs is measured via TNS assay. After dialysis, LNPs are sterile filtered using 0.22 micron sterile filter and stored at 4° C. for further use.

LNP Characterization

DLS—LNP hydrodynamic diameter and polydispersity percent (PDI %) are measured using high throughput dynamic light scattering (DLS) (DynaPro plate reader II, Wyatt). LNPs are diluted 1×PBS to an appropriate concentration and analyzed.

Concentration & Encapsulation Efficiency—Concentration of NA is determined by Qubit microRNA kit (for siRNA) or HS RNA kit (for mRNA) per manufacturer's instructions. Encapsulation efficiency is determined by measuring unlysed and lysed LNPs.

pKa—A stock solution of 10 mM HEPES (Sigma Aldrich), 10 mM MES (Sigma Aldrich), 10 mM sodium acetate (Sigma), and 140 nM sodium chloride (Sigma Aldrich) is prepared and pH adjusted using hydrogen chloride and sodium hydroxide to a range of pH 4-10. Using 4 replicates for each pH, 140 µL pH-adjusted buffer is added to a 96-well plate, followed by the addition 5 µL of 2-(p-toluidino)-6-napthalene sulfonic acid (60 µg mL). 5 µL of LNP is added to each well. After 5 min of incubation under gentle shaking, fluorescence is measured using an excitation wavelength of 325 nm and emission wavelength of 435 nm (BioTek Synergy H4 Hybrid).

LNP Administration—Male and female mice aged approximately 8-12 weeks are used for all studies. Each mouse is temporarily restrained, and pooled LNP is administered IV via tail vein injection in up to five animals per experiment. Age-matched mice are also used to administer vehicle (1×PBS) via tail vein injection in up to three animals per experiment. At 72 hours post-dose, tissues including liver, spleen, bone marrow and blood are collected for analysis.

hEPO Expression—For human EPO (hEPO) protein expression, mice were temporarily restrained and bled at 6 hours post-administration (via tail vein). Blood was collected in heparin tubes, processed to plasma, and stored at −80° C. until ready to use. Appropriate dilutions of plasma were used to measure hEPO protein using R&D systems ELISA kit (DuoSet; DY286-05) according to manufacturer's instructions. Various exemplified ionizable lipids were formulated into LNPs A1 to A17 using the following molar ratios: 45% ionizable lipid/9% distearoylphosphatidylcholine (DSPC)/44% Cholesterol/2% PEG lipid or 50% ionizable lipid/9% distearoylphosphatidylcholine (DSPC)/38% Cholesterol/3% PEG lipid with lipid to nucleic acid (human EPO mRNA) at mass ratios of either 11.7:1; 18:1, or 25:1. Activity was determined by measuring hEPO expression in plasma 6 hours following administration via tail vein injection as described at a nucleic acid dose of 0.15 mg/kg. Representative data is provided in Table 1 for LNP encapsulation efficiency, hydrodynamic diameter, polydispersity (PDI), and measured hEPO in plasma at 6 hrs post administration for the LNP formulations.

TABLE 1

| No. | Ionizable Lipid (Example No.) | Encapsulation % | LNP Diameter (nM) | PDI | hEPO in plasma at 6 hrs (pg/mL) |
|-----|-------------------------------|-----------------|-------------------|------|--------------------------------|
| A1  | 1  | 91.59 | 136 | 0.1  | 68600  |
| A2  | 3  | 94.36 | 118 | 0.06 | 122800 |
| A3  | 14 | 94.83 | 127 | 0.08 | 140900 |
| A4  | 15 | 93.21 | 174 | 0.23 | 105200 |
| A5  | 15 | 95.52 | 109 | 0.08 | 116200 |
| A6  | 23 | 91.29 | 131 | 0.1  | 76250  |
| A7  | 24 | 87.18 | 147 | 0.08 | 122000 |
| A8  | 31 | 78.1  | 208 | 0.13 | 20800  |
| A9  | 32 | 83.25 | 199 | 0.13 | 34800  |
| A10 | 34 | 90.45 | 145 | 0.09 | 72300  |
| A11 | 36 | 92.52 | 124 | 0.16 | 7300   |
| A12 | 37 | 91.78 | 148 | 0.08 | 63700  |
| A13 | 38 | 92.89 | 120 | 0.09 | 53100  |
| A14 | 38 | 94.64 | 113 | 0.09 | 116200 |
| AIS | 47 | 69.05 | 191 | 0.09 | 7600   |
| A16 | 48 | 75.69 | 171 | 0.12 | 12700  |
| A17 | 50 | 96.43 | 110 | 0.1  | 15100  |

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A compound having the following structure:

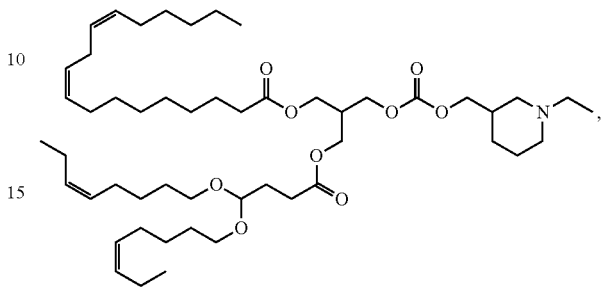

Example 3 or a pharmaceutically acceptable salt thereof.

2. A lipid nanoparticle (LNP) comprising the compound of claim 1, or a pharmaceutically acceptable salt thereof.

* * * * *